(12) United States Patent
Li et al.

(10) Patent No.: US 12,346,769 B2
(45) Date of Patent: Jul. 1, 2025

(54) TWO-DIMENSIONAL CODE RECOGNITION METHOD, ELECTRONIC DEVICE, AND STORAGE MEDIUM

(71) Applicant: Honor Device Co., Ltd., Shenzhen (CN)

(72) Inventors: Renpeng Li, Shenzhen (CN); Lu Mao, Shenzhen (CN); Chaoran Zhuge, Shenzhen (CN)

(73) Assignee: Honor Device Co., Ltd., Shenzhen (CN)

( * ) Notice: Subject to any disclaimer, the term of this patent is extended or adjusted under 35 U.S.C. 154(b) by 0 days.

(21) Appl. No.: 18/039,422

(22) PCT Filed: Dec. 5, 2022

(86) PCT No.: PCT/CN2022/136697
§ 371 (c)(1),
(2) Date: May 30, 2023

(87) PCT Pub. No.: WO2024/016564
PCT Pub. Date: Jan. 25, 2024

(65) Prior Publication Data
US 2024/0394490 A1    Nov. 28, 2024

(30) Foreign Application Priority Data
Jul. 21, 2022 (CN) ............................ 202210855909

(51) Int. Cl.
| | | |
|---|---|---|
| *H04N 23/71* | (2023.01) | |
| *G01S 11/12* | (2006.01) | |
| *G06K 7/14* | (2006.01) | |
| *G06T 7/50* | (2017.01) | |
| *H04N 23/60* | (2023.01) | |
| *H04N 23/61* | (2023.01) | |
| *H04N 23/68* | (2023.01) | |

(52) U.S. Cl.
CPC ............ *G06K 7/1417* (2013.01); *G01S 11/12* (2013.01); *G06T 7/50* (2017.01); *H04N 23/61* (2023.01);
(Continued)

(58) Field of Classification Search
None
See application file for complete search history.

(56) References Cited

U.S. PATENT DOCUMENTS 11,393,017 B2  7/2022  Tong
2012/0252420 A1  10/2012  Czaja et al.
(Continued)

FOREIGN PATENT DOCUMENTS

CN  102902943 A  1/2013
CN  106446745 A  2/2017
(Continued)

*Primary Examiner* — Nasser M Goodarzi
*Assistant Examiner* — Charles N Hicks
(74) *Attorney, Agent, or Firm* — Leydig, Voit & Mayer, Ltd.

(57) ABSTRACT

Embodiments of this application provide a two-dimensional code recognition method, an electronic device, and a storage medium. The method is applied to a terminal device. The method includes: determining a screen status of the terminal device; if it is determined that the screen status represents that the terminal device is in a screen-on unlocked state, determining posture change information and a screen orientation of the terminal device; and if it is determined that a value represented by the posture change information is greater than or equal to a first preset threshold and the screen orientation is a direction other than a first direction, calling a front-facing camera of the terminal device to obtain an image, recognizing two-dimensional code information in the image, and displaying an application interface corresponding to the two-dimensional code information, where the first direction is a positive direction of a z-axis of a world coordinate system.

20 Claims, 94 Drawing Sheets

(52) U.S. Cl.
CPC ............. *H04N 23/64* (2023.01); *H04N 23/71* (2023.01); *H04N 23/6812* (2023.01)

(56) References Cited

U.S. PATENT DOCUMENTS

| | | | |
|---|---|---|---|
| 2017/0085775 A1* | 3/2017 | Ito | G03B 17/38 |
| 2021/0150171 A1 | 5/2021 | Wang | |
| 2021/0297585 A1* | 9/2021 | Eki | G03B 13/36 |
| 2022/0398057 A1 | 12/2022 | Cheng et al. | |

FOREIGN PATENT DOCUMENTS

| | | |
|---|---|---|
| CN | 106548561 A | 3/2017 |
| CN | 108038405 A | 5/2018 |
| CN | 108491240 A | 9/2018 |
| CN | 109033912 A | 12/2018 |
| CN | 109151180 A | 1/2019 |
| CN | 109254809 A | 1/2019 |
| CN | 109711226 A | 5/2019 |
| CN | 110309684 A | 10/2019 |
| CN | 110324443 A | 10/2019 |
| CN | 111262975 A | 6/2020 |
| CN | 112383664 A | 2/2021 |
| CN | 112613475 A | 4/2021 |
| CN | 112862479 A | 5/2021 |
| CN | 113436576 A | 9/2021 |
| CN | 113643024 A | 11/2021 |
| CN | 113919382 A | 1/2022 |
| CN | 113935349 A | 1/2022 |
| CN | 114449171 A | 5/2022 |
| CN | 115079886 A | 9/2022 |
| EP | 3493100 A1 | 6/2019 |

\* cited by examiner

CONT.
FROM

TO

CONT.
FROM

TO

CONT.
FROM

TO

CONT.
FROM

TO

CONT.
FROM

TO

CONT. FROM FIG. 16(a)

TO FIG. 16(c)

CONT. FROM FIG. 17(a)

TO FIG. 17(c)

CONT. FROM FIG. 21(a)

TO FIG. 21(c)

CONT. FROM FIG. 22(a)

TO FIG. 22(c)

CONT. FROM FIG. 23(a)

TO FIG. 23(c)

CONT. FROM FIG. 24(b)

TO FIG. 24(d)

TWO-DIMENSIONAL CODE RECOGNITION METHOD, ELECTRONIC DEVICE, AND STORAGE MEDIUM

CROSS-REFERENCE TO RELATED APPLICATIONS

This application is a national stage of International Application No. PCT/CN2022/136697, filed on Dec. 5, 2022, which claims priority to Chinese Patent Application No. 202210855909.X, filed on Jul. 21, 2022. The disclosures of both of the aforementioned applications are hereby incorporated by reference in their entireties.

TECHNICAL FIELD

This application relates to the field of terminal technologies, and in particular, to a two-dimensional code recognition method, an electronic device, and a storage medium.

BACKGROUND

Currently, with development of terminal technologies, terminal devices have become an important tool in people's life. The terminal device provides various functions for a user.

In the conventional technology, the terminal device scans a two-dimensional code in response to a series of operations of the user, to accomplish life and work purposes.

However, when the terminal device is to scan the two-dimensional code, the user needs to perform a series of operations on the terminal device to trigger the terminal device to scan the two-dimensional code. It needs to take some time to perform the triggering process, resulting in relatively low two-dimensional code recognition efficiency.

SUMMARY

Embodiments of this application provide a two-dimensional code recognition method, an electronic device, and a storage medium, so as to reduce time for triggering two-dimensional code recognition, and improve two-dimensional code recognition efficiency.

According to a first aspect, an embodiment of this application provides a two-dimensional code recognition method. The method includes: determining a screen status of a terminal device; if it is determined that the screen status represents that the terminal device is in a screen-on unlocked state, determining posture change information and a screen orientation of the terminal device; and if it is determined that a value represented by the posture change information is greater than or equal to a first preset threshold and the screen orientation is a direction other than a first direction, calling a front-facing camera of the terminal device to obtain an image, and recognizing two-dimensional code information in the image, where the first direction is a positive direction of a z-axis of a world coordinate system.

In this way, it is directly determined, based on the posture change information and the screen orientation of the terminal device, to call the front-facing camera to capture an image, and two-dimensional code information is recognized. The terminal device can be triggered to scan a two-dimensional code, without requiring a user to perform a series of touch operations on the terminal device, so that two-dimensional code recognition time is reduced, and two-dimensional code recognition efficiency is improved.

In a possible implementation, the determining posture change information of the terminal device includes: obtaining acceleration change data collected by an acceleration sensor in the terminal device within a preset time period, and/or obtaining angle change data collected by a gyroscope sensor in the terminal device within the preset time period; and determining the posture change information based on the acceleration change data and/or the angle change data.

In this way, posture change data of the terminal device in a short time is accurately determined by using the acceleration sensor and the gyroscope sensor, and the posture change information of the terminal device is obtained based on the posture change data.

In a possible implementation, the determining a screen orientation of the terminal device includes: obtaining angle data collected by a gyroscope sensor in the terminal device at a current moment; and determining the screen orientation of the terminal device based on the angle data.

In this way, it is accurately determined, by using the gyroscope sensor, whether a screen orientation of the terminal device at the current moment is not upward.

In a possible implementation, before the determining posture change information and a screen orientation of the terminal device, the method further includes: determining proximity light information of the terminal device; and if it is determined that a value represented by the proximity light information is greater than or equal to a second preset threshold, determining that the terminal device is in a proximity light unshielded state.

In this way, it is determined, based on the proximity light information of the terminal device, whether the terminal device is in the proximity light unshielded state, and the terminal device becomes moderately spaced from a two-dimensional code based on the proximity light unshielded state. An excessively short distance between the terminal device and the two-dimensional code easily causes a code scanning failure. A code scanning success rate can be increased based on the condition. In addition, scanning can be prevented from starting when a user puts a screen-on unlocked mobile phone upside down on a desktop, so that power consumption can be further reduced.

In a possible implementation, before the calling a front-facing camera of the terminal device to obtain an image, the method further includes: determining ambient light information of the terminal device; and if it is determined that a value represented by the ambient light information is greater than or equal to a third preset threshold, performing the step of calling the front-facing camera of the terminal device to obtain an image.

In this way, the terminal device determines whether the value represented by the ambient light information of the terminal device is greater than or equal to the third preset threshold, and further, when determining that the value represented by the ambient light information is greater than or equal to the third preset threshold, the terminal device performs subsequent processes of calling the front-facing camera to capture an image and recognizing a two-dimensional code in the image. Only when the value represented by the ambient light information is greater than or equal to the third preset threshold, can it be ensured that an environment in which the terminal device is located is not a relatively dark environment and the front-facing camera of the terminal device can capture a clear image.

In a possible implementation, before the determining posture change information and a screen orientation of the terminal device, the method further includes: determining a running status of the terminal device; and if it is determined that the running status represents that the terminal device is in a desktop state, performing the step of determining the posture change information and the screen orientation of the terminal device.

In this way, if another application is interrupted to call the front-facing camera when the terminal device runs the another application in the foreground, running of the another application may be abnormal. The terminal device performs a subsequent action only when determining that the terminal device is in the desktop state, and calls, based on a subsequent determining process, the front-facing camera to capture an image, so that another application or the terminal device is prevented from being abnormal if running of the another application is directly interrupted when the terminal device runs the another application in the foreground.

In a possible implementation, before the calling a front-facing camera of the terminal device to obtain an image, the method further includes: determining current location information of the terminal device; and if it is determined that the current location information represents that the terminal device falls within a preset geofencing range, determining that the terminal device enters a preset location.

In this way, when the terminal device is at the preset location, it is determined that the terminal device enters a place in which scanning is required, to accurately trigger the terminal device to recognize a two-dimensional code.

In a possible implementation, the calling a front-facing camera of the terminal device to obtain an image includes: calling the front-facing camera of the terminal device to capture a first image at a first frame rate; and if it is determined that a suspected two-dimensional code image exists in the first image, calling the front-facing camera of the terminal device to capture a second image at a second frame rate, where the first frame rate is less than the second frame rate.

In this way, a low-frame rate image is first captured, and if no suspected two-dimensional code image exists in the low-frame rate image, two-dimensional code recognition does not need to be performed, so that resource consumption is reduced, and power consumption of the terminal device is reduced.

In a possible implementation, before the calling the front-facing camera of the terminal device to capture a second image at a second frame rate, the method further includes: determining distance information between the terminal device and the suspected two-dimensional code image; and if it is determined that a value represented by the distance information is less than or equal to a preset distance, performing the step of calling the front-facing camera of the terminal device to capture the second image at the second frame rate.

In this way, the terminal device is prevented from being unable to accurately recognize a two-dimensional code because the terminal device is too far from the two-dimensional code.

In a possible implementation, the method further includes: if it is determined that the value represented by the distance information is greater than the preset distance, generating and sending first prompt information, where the first prompt information is used to prompt that the front-facing camera of the terminal device needs to approach the suspected two-dimensional code image.

In this way, when the terminal device is relatively far from a two-dimensional code, the user is prompted to make the front-facing camera of the terminal device approach the two-dimensional code.

In a possible implementation, the recognizing two-dimensional code information in the image includes: recognizing two-dimensional code information in the second image, and displaying an application interface corresponding to the two-dimensional code information. The application interface corresponding to the two-dimensional code information may include an interface of a WeChat application, for example, a WeChat payment interface or a WeChat applet interface (for example, a health code interface or an ordering interface), an interface of an Alipay application, for example, an Alipay payment interface or an Alipay applet interface (for example, a health code interface or an ordering interface), an interface of a conference application, an interface for connecting to wifi, a package pickup interface, or the like.

In this way, a two-dimensional code in a higher-frame rate image captured by the terminal device is recognized, so that the two-dimensional code can be accurately recognized.

In a possible implementation, the recognizing two-dimensional code information in the image includes: recognizing the two-dimensional code information to obtain and display a plurality of two-dimensional code images; and in response to a confirmation instruction, calling an application interface corresponding to a two-dimensional code image indicated by the confirmation instruction, where the confirmation instruction is used to indicate a two-dimensional code image selected by a user.

In this way, when a plurality of two-dimensional codes are obtained, human-computer interaction is performed, the user determines the two-dimensional code that needs to be triggered, and then an application of the two-dimensional code indicated by the user is called.

According to a second aspect, an embodiment of this application provides a two-dimensional code recognition apparatus. The two-dimensional code recognition apparatus may be an electronic device, a terminal device, or a chip or a chip system in a terminal device. The two-dimensional code recognition apparatus may include a display unit and a processing unit. When the two-dimensional code recognition apparatus is a terminal device, the display unit may be a display screen. The display unit is configured to perform a display step, so that the terminal device implements the two-dimensional code recognition method described in any one of the first aspect or the possible implementations of the first aspect. When the two-dimensional code recognition apparatus is a terminal device, the processing unit may be a processor. The two-dimensional code recognition apparatus may further include a storage unit, and the storage unit may be a memory. The storage unit is configured to store instructions, and the processing unit executes the instructions stored in the storage unit, so that the terminal device implements the two-dimensional code recognition method described in any one of the first aspect or the possible implementations of the first aspect. When the two-dimensional code recognition apparatus is a chip or a chip system in a terminal device, the processing unit may be a processor. The processing unit executes the instructions stored in the storage unit, so that the terminal device implements the two-dimensional code recognition method described in any one of the first aspect or the possible implementations of the first aspect. The storage unit may be a storage unit (for example, a register or a cache) in the chip, or may be a storage unit (for example, a read-only memory or a random access memory) located outside the chip in the terminal device.

According to a third aspect, an embodiment of this application provides an electronic device, including a unit configured to perform any method in any one of the first aspect or the possible implementations of the first aspect.

According to a fourth aspect, an embodiment of this application provides an electronic device, including a display unit, a processor, and an interface circuit. The interface circuit is configured to communicate with another apparatus, the display unit is configured to perform a display step, and the processor is configured to run code instructions or a computer program to perform the method in any one of the possible implementations of the first aspect.

In a possible implementation, the electronic device further includes a memory, and the memory is configured to store code instructions or a computer program.

According to a fifth aspect, an embodiment of this application provides a computer-readable storage medium. The computer-readable storage medium stores a computer program or instructions, and when the computer program or the instructions run on a computer, the computer is enabled to perform the method that is performed by a terminal device and that is described in any one of the possible implementations of the first aspect.

According to a sixth aspect, an embodiment of this application provides a computer program product including a computer program. When the computer program runs on a computer, the computer is enabled to perform the method that is performed by a terminal device and that is described in any one of the possible implementations of the first aspect.

It should be understood that technical solutions of the second aspect to the sixth aspect of this application correspond to those of the first aspect of this application, beneficial effects achieved in these aspects and corresponding feasible implementations are similar, and details are not described again.

DESCRIPTION OF EMBODIMENTS

Figure 1:
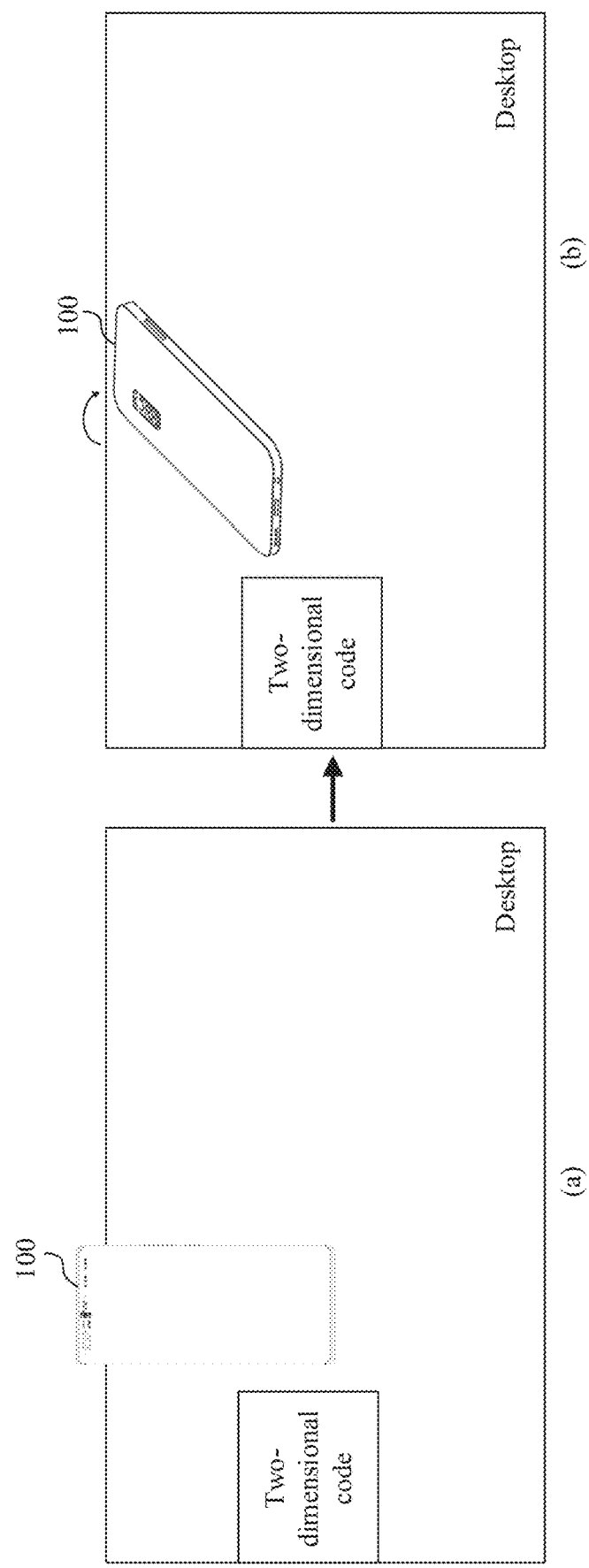
FIG. 1 is a schematic diagram 1 of a scenario to which a two-dimensional code recognition method in embodiments of this application is applicable.

In embodiments of this application, words such as "first" and "second" are used to distinguish between same items or similar items that have basically same functions and purposes. For example, a first chip and a second chip are merely intended to distinguish between different chips, but not to limit a sequence of the first chip and the second chip. A person skilled in the art may understand that words such as "first" and "second" do not limit a quantity or an execution order, and the words such as "first" and "second" do not necessarily indicate a difference.

It should be noted that in embodiments of this application, words such as "an example" or "for example" are used to indicate an example, an illustration, or a description. Any embodiment or design solution described as "an example" or "for example" in this application should not be construed as more preferred or advantageous than other embodiments or design solutions. Exactly, use of the words such as "an example" or "for example" is intended to present related concepts in a specific manner.

In embodiments of this application, "at least one" means one or more, and "a plurality of" means two or more. "And/or" describes an association relationship between associated objects, and represents that three relationships may exist. For example, A and/or B may represent the following cases: Only A exists, both A and B exist, and only B exists, where A and B may be singular or plural. The character "/" usually indicates an "or" relationship between associated objects. "At least one of the following items" or a similar expression thereof means any combination of these items, including any combination of one or more of the items. For example, at least one of a, b, and c may represent a, b, c, "a and b", "a and c", "b and c", or "a, b, and c", where a, b, and c may be singular or plural.

With development of terminal technologies, terminal devices have become an important tool in people's life. The terminal device provides various functions for a user. The terminal device scans a two-dimensional code in response to a series of operations of the user, to accomplish life and work purposes.

For example, when the user needs to scan a two-dimensional code by using the terminal device, the user triggers an application or an applet of the terminal device, and further, the terminal device triggers a two-dimensional code recognition function based on a portal of the application or the applet triggered by the user. Then the terminal device can call a camera to obtain an image, and further, the terminal device recognizes the obtained image.

It can be learned that when the terminal device is to scan the two-dimensional code, the user needs to perform a series of operations on the terminal device to trigger the terminal device to scan the two-dimensional code. It needs to take some time to perform the triggering process, resulting in relatively low two-dimensional code recognition efficiency.

In view of this, embodiments of this application provide a two-dimensional code recognition method, an electronic device, and a storage medium. In the method, posture change information and a screen orientation of a terminal device may be detected to directly call a front-facing camera of the terminal device to capture an image and recognize a two-dimensional code, so that two-dimensional code recognition time is reduced, and two-dimensional code recognition efficiency is improved, thereby improving user experience.

FIG. 1 is a schematic diagram 1 of a scenario to which a two-dimensional code recognition method in embodiments of this application is applicable. As shown in (a) in FIG. 1, a user holds a terminal device 100, and the terminal device 100 is in a screen-on unlocked state. As shown in (b) in FIG. 1, the user turns over the terminal device 100, in other words, the user turns a wrist. Further, according to the two-dimensional code recognition method in embodiments of this application, the terminal device 100 calls a front-facing camera of the terminal device to obtain an image on a desktop, and recognizes two-dimensional code information in the image. The terminal device 100 calls, based on the recognized two-dimensional code information, an application interface corresponding to the two-dimensional code information.

Figure 2:
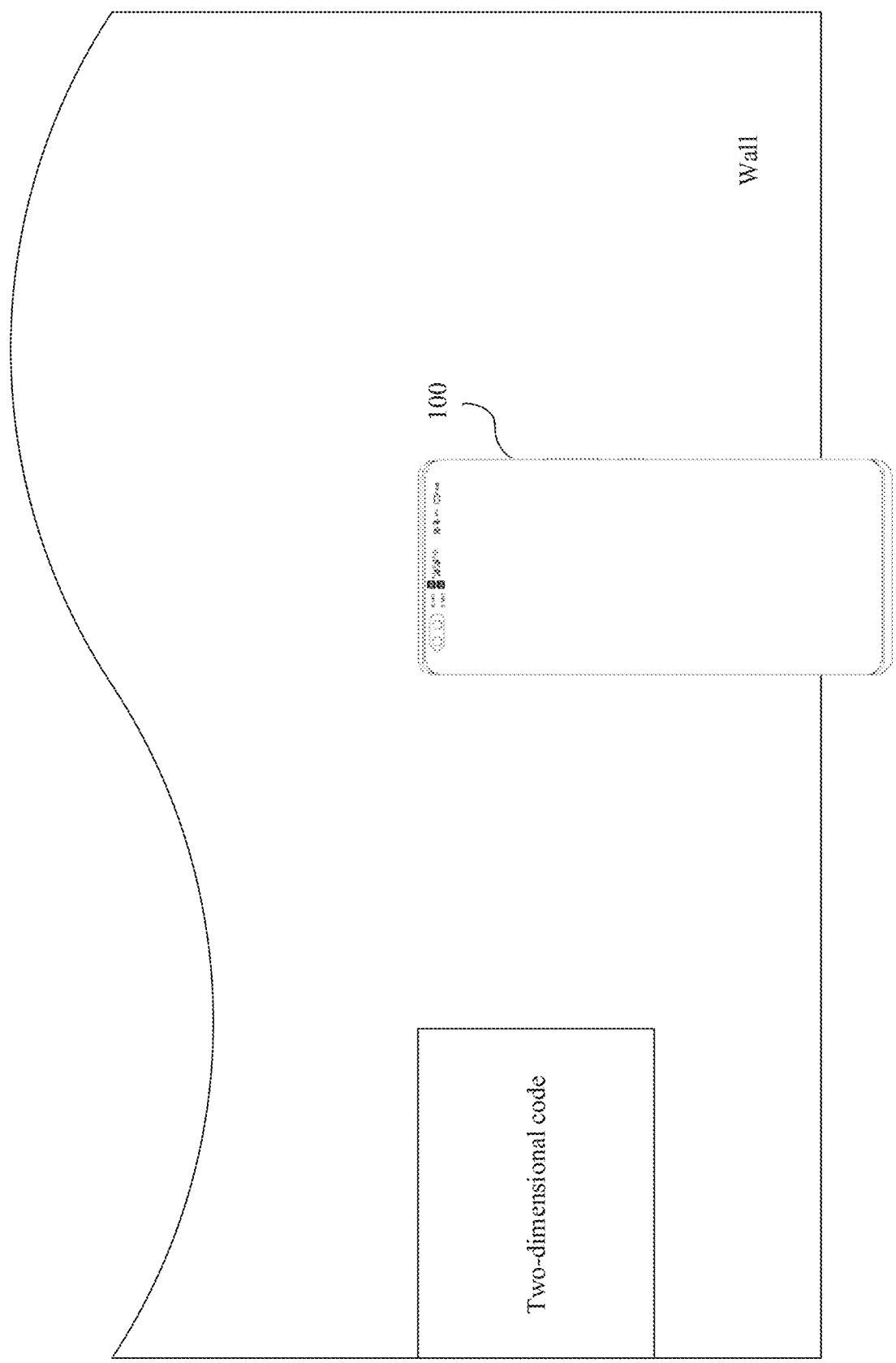
FIG. 2 is a schematic diagram 2 of a scenario to which a two-dimensional code recognition method in embodiments of this application is applicable.

FIG. 2 is a schematic diagram 2 of a scenario to which a two-dimensional code recognition method in embodiments of this application is applicable. As shown in FIG. 2, a user holds a terminal device 100, and according to the two-dimensional code recognition method in embodiments of this application, the terminal device 100 calls a rear-facing camera of the terminal device to obtain an image on a wall, and recognizes two-dimensional code information in the image. The terminal device 100 calls, based on the recognized two-dimensional code information, an application interface corresponding to the two-dimensional code information.

The terminal device 100 may also be referred to as a terminal, a user equipment (UE), a mobile station (MS), a mobile terminal (MT), or the like. The terminal device may be a mobile phone, a smart television, a wearable device, a tablet computer (Pad), a computer having a wireless reception/transmission function, a virtual reality (VR) terminal device, an augmented reality (AR) terminal device, a wireless terminal in industrial control, a wireless terminal in self-driving, a wireless terminal in remote medical surgery, a wireless terminal in a smart grid, a wireless terminal in transportation safety, a wireless terminal in a smart city, a wireless terminal in a smart home, or the like. A specific technology and a specific device form that are used by the terminal device are not limited in embodiments of this application.

The terminal device 100 has a function of displaying an interface and a function of obtaining an image.

To better understand embodiments of this application, the following describes a structure of the terminal device in embodiments of this application.

Figure 3:
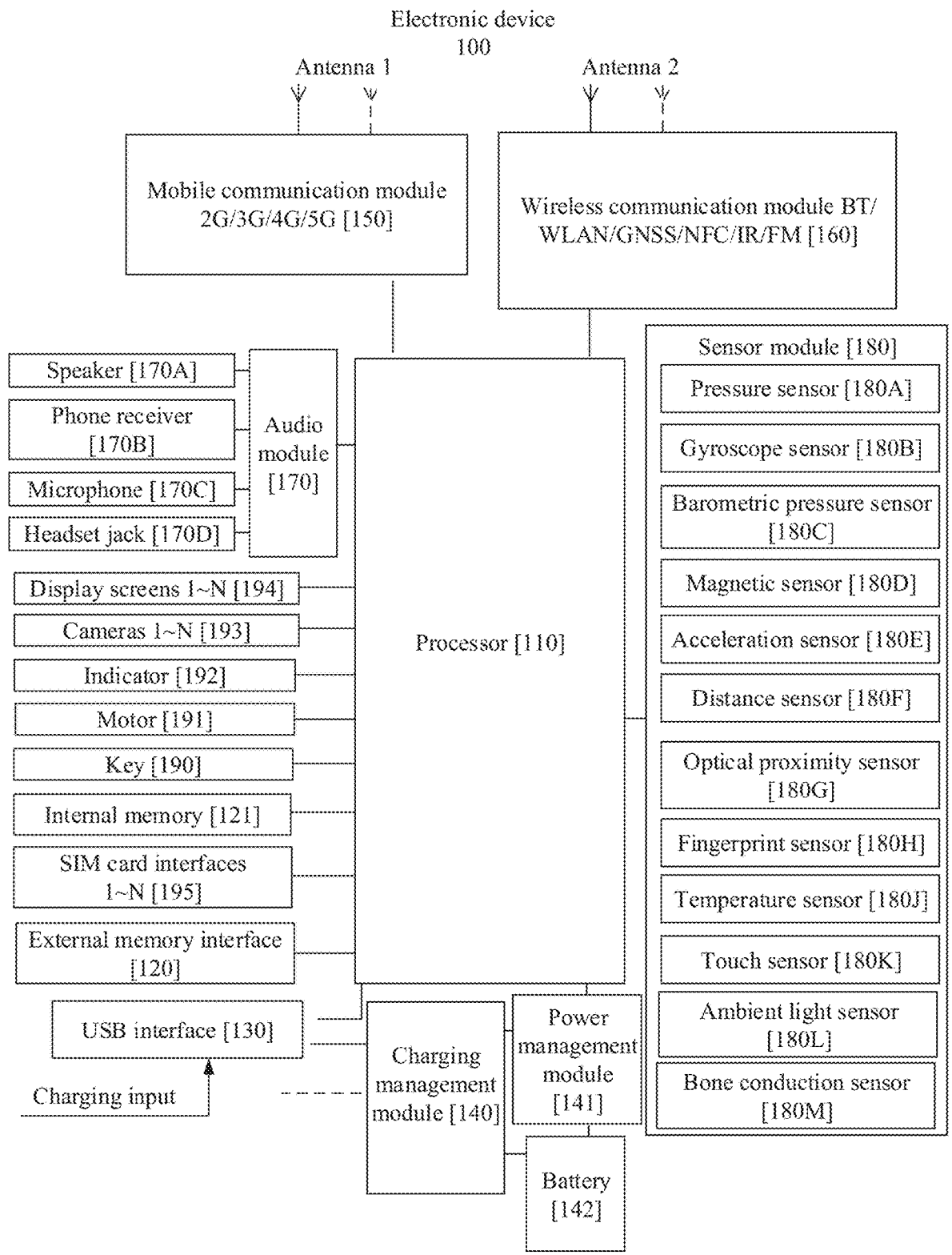
FIG. 3 is a schematic diagram of a structure of a terminal device 100.

FIG. 3 is a schematic diagram of a structure of a terminal device 100. The terminal device 100 may include a processor 110, an external memory interface 120, an internal memory 121, a universal serial bus (USB) interface 130, a charging management module 140, a power management module 141, a battery 142, an antenna 1, an antenna 2, a mobile communication module 150, a wireless communication module 160, an audio module 170, a speaker 170A, a phone receiver 170B, a microphone 170C, a headset jack 170D, a sensor module 180, a key 190, a motor 191, an indicator 192, a camera 193, a display screen 194, a subscriber identity module (SIM) card interface 195, and the like. The sensor module 180 may include a pressure sensor 180A, a gyroscope sensor 180B, a barometric pressure sensor 180C, a magnetic sensor 180D, an acceleration sensor 180E, a distance sensor 180F, an optical proximity sensor 180G, a fingerprint sensor 180H, a temperature sensor 180J, a touch sensor 180K, an ambient light sensor 180L, a bone conduction sensor 180M, and the like.

It may be understood that the structure shown in this embodiment of this application does not constitute a specific limitation on the terminal device 100. In some other embodiments of this application, the terminal device 100 may include more or fewer components than those shown in the figure, or some components may be combined, or some components may be split, or components may be arranged in different manners. The components shown in the figure may be implemented by hardware, software, or a combination of software and hardware.

The processor 110 may include one or more processing units. For example, the processor 110 may include an application processor (AP), a modem processor, a graphics processing unit (GPU), an image signal processor (ISP), a controller, a video codec, a digital signal processor (DSP), a baseband processor, and/or a neural-network processing unit (NPU). Different processing units may be independent components, or may be integrated into one or more processors.

The controller may generate an operation control signal based on an instruction operation code and a timing signal, to complete control of instruction fetching and instruction execution.

The processor 110 may be further provided with a memory for storing instructions and data. In some embodiments, the memory in the processor 110 is a cache. The memory may store instructions or data just used or cyclically used by the processor 110. If the processor 110 needs to use the instructions or the data again, the processor 110 may call the instructions or the data from the memory, to avoid repeated access and reduce waiting time of the processor 110. This improves system efficiency.

In some embodiments, the processor 110 may include one or more interfaces. The interface may include an inter-integrated circuit (I2C) interface, an inter-integrated circuit sound (I2S) interface, a pulse code modulation (PCM) interface, a universal asynchronous receiver/transmitter (UART) interface, a mobile industry processor interface (MIPI), a general-purpose input/output (GPIO) interface, a subscriber identity module (SIM) interface, a universal serial bus (USB) port, and/or the like.

It may be understood that an interface connection relationship between the modules illustrated in this embodiment of this application is merely an example for description, and does not constitute a limitation on a structure of the terminal device 100. In some other embodiments of this application, the terminal device 100 may alternatively use an interface connection manner different from that in the foregoing embodiment, or use a combination of a plurality of interface connection manners.

The terminal device 100 implements a display function by using the GPU, the display screen 194, the application processor, and the like. The GPU is an image processing microprocessor and is connected to the display screen 194 and the application processor. The GPU is configured to perform mathematical and geometric calculations to render graphics. The processor 110 may include one or more GPUs, and the GPU executes program instructions to generate or change display information.

The display screen 194 is configured to display an image, a video, or the like. The display screen 194 includes a display panel. The display panel may be a liquid crystal display (LCD), an organic light-emitting diode (OLED), an active-matrix organic light emitting diode (AMOLED), a flex light-emitting diode (FLED), a Miniled, a MicroLed, a Micro-oLed, a quantum dot light emitting diode (QLED), or the like. In some embodiments, the terminal device 100 may include one or N display screens 194, where N is a positive integer greater than 1.

The terminal device 100 may implement a photographing function by using the ISP, the camera 193, the video codec, the GPU, the display screen 194, the application processor, and the like.

The ISP is configured to process data fed back by the camera 193. For example, during photographing, a shutter is open, and light is transmitted to a photosensitive element of the camera through a lens. An optical signal is converted into an electrical signal. The photosensitive element of the camera transfers the electrical signal to the ISP for processing, so that the ISP converts the electrical signal into an image visible to naked eyes. The ISP may further perform algorithm optimization on noise, brightness, and a skin tone of the image. The ISP may further optimize parameters such as exposure and a color temperature of a photographing scene. In some embodiments, the ISP may be disposed in the camera 193.

The camera 193 is configured to capture a still image or a video. An optical image of an object is generated by the lens and projected onto the photosensitive element. The photosensitive element may be a charge coupled device (CCD) or a complementary metal-oxide-semiconductor (CMOS) phototransistor. The photosensitive element converts an optical signal into an electrical signal, and then transmits the electrical signal to the ISP, so that the ISP converts the electrical signal into a digital image signal. The ISP outputs the digital image signal to the DSP for processing. The DSP converts the digital image signal into an image signal in a standard form, for example, RGB or YUV. In some embodiments, the terminal device 100 may include one or N cameras 193, where N is a positive integer greater than 1.

The digital signal processor is configured to process digital signals, including not only digital image signals but also other digital signals. For example, when the terminal device 100 selects a frequency, the digital signal processor is configured to perform Fourier transform or the like on energy of the frequency.

The video codec is configured to compress or decompress a digital video. The terminal device 100 may support one or more types of video codecs. Therefore, the terminal device 100 may play or record videos in a plurality of encoding formats such as moving picture experts group (MPEG) 1, MPEG 2, MPEG 3, and MPEG 4.

The NPU is a neural-network (NN) computing processor and performs fast processing on input information by referring to a structure of a biological neural network, for example, by referring to a mode of transmission between neurons in a human brain; and may further continuously perform self-learning. Applications such as intelligent cognition, for example, image recognition, face recognition, speech recognition, and text understanding, of the terminal device 100 can be implemented by using the NPU.

The gyroscope sensor 180B may be configured to determine a motion posture of the terminal device 100. In some embodiments, angular velocities of the terminal device 100 around three axes (namely, x, y, and z axes) may be determined by using the gyroscope sensor 180B. The gyroscope sensor 180B may be configured to implement image stabilization during photographing. For example, when a shutter is pressed, the gyroscope sensor 180B detects an angle at which the terminal device 100 jitters, and calculates, based on the angle, a distance for which a lens module needs to compensate, so that the lens cancels the jitter of the terminal device 100 through a reverse motion, thereby implementing image stabilization. The gyroscope sensor 180B may be further used in a navigation scenario and a somatic game scenario.

Angle change data is collected based on the gyroscope sensor 180B. Angle data is collected based on the gyroscope sensor 180B.

The acceleration sensor 180E may detect acceleration values of the terminal device 100 in all directions (generally along three axes). When the terminal device 100 is still, magnitude and a direction of gravity may be detected. The acceleration sensor 180E may be further configured to recognize a posture of the terminal device, and be applied to screen switching between a landscape mode and a portrait mode, a pedometer, or another application.

Acceleration change data is collected based on the acceleration sensor 180E. The terminal device determines posture change information of the terminal device based on the acceleration change data collected by the acceleration sensor 180E.

The terminal device determines a screen orientation based on the angle data collected by the gyroscope sensor 180B.

The terminal device determines the posture change information of the terminal device based on the angle change data collected by the gyroscope sensor 180B, or the terminal device determines the posture change information of the terminal device based on the acceleration change data collected by the acceleration sensor 180E, or the terminal device determines the posture change information of the terminal device based on the angle change data collected by the gyroscope sensor 180B and the acceleration change data collected by the acceleration sensor 180E.

The optical proximity sensor 180G may include, for example, a light-emitting diode (LED) and an optical detector such as a photodiode. The light-emitting diode may be an infrared emitting diode. The terminal device 100 emits infrared light outward by using the light-emitting diode. The terminal device 100 uses the photodiode to detect infrared reflected light from a nearby object. When sufficient reflected light is detected, it may be determined that there is an object near the terminal device 100. When insufficient reflected light is detected, the terminal device 100 may determine that there is no object near the terminal device 100. The terminal device 100 may detect, by using the optical proximity sensor 180G, that a user holds the terminal device 100 close to an ear to make a call, to automatically turn off a screen for power saving. The optical proximity sensor 180G may also be used in a leather case mode or a pocket mode to automatically unlock or lock a screen.

The optical proximity sensor 180G collects proximity light data. The terminal device determines proximity light information based on the proximity light data collected by the optical sensor 180G.

The ambient light sensor 180L is configured to sense brightness of ambient light. The terminal device 100 may adaptively adjust brightness of the display screen 194 based on the sensed brightness of the ambient light. The ambient light sensor 180L may also be configured to automatically adjust white balance during photographing. The ambient light sensor 180L may further cooperate with the optical proximity sensor 180G to detect whether the terminal device 100 is in a pocket to prevent an accidental touch.

The ambient light sensor 180L collects ambient light data. The terminal device determines ambient light information based on the ambient light data collected by the ambient light sensor 180L.

A software system of the terminal device 100 may use a layered architecture, an event driven architecture, a microkernel architecture, a microservice architecture, or a cloud architecture. In embodiments of this application, an Android system of the layered architecture is used as an example to illustrate the software structure of the terminal device 100.

Figure 4:
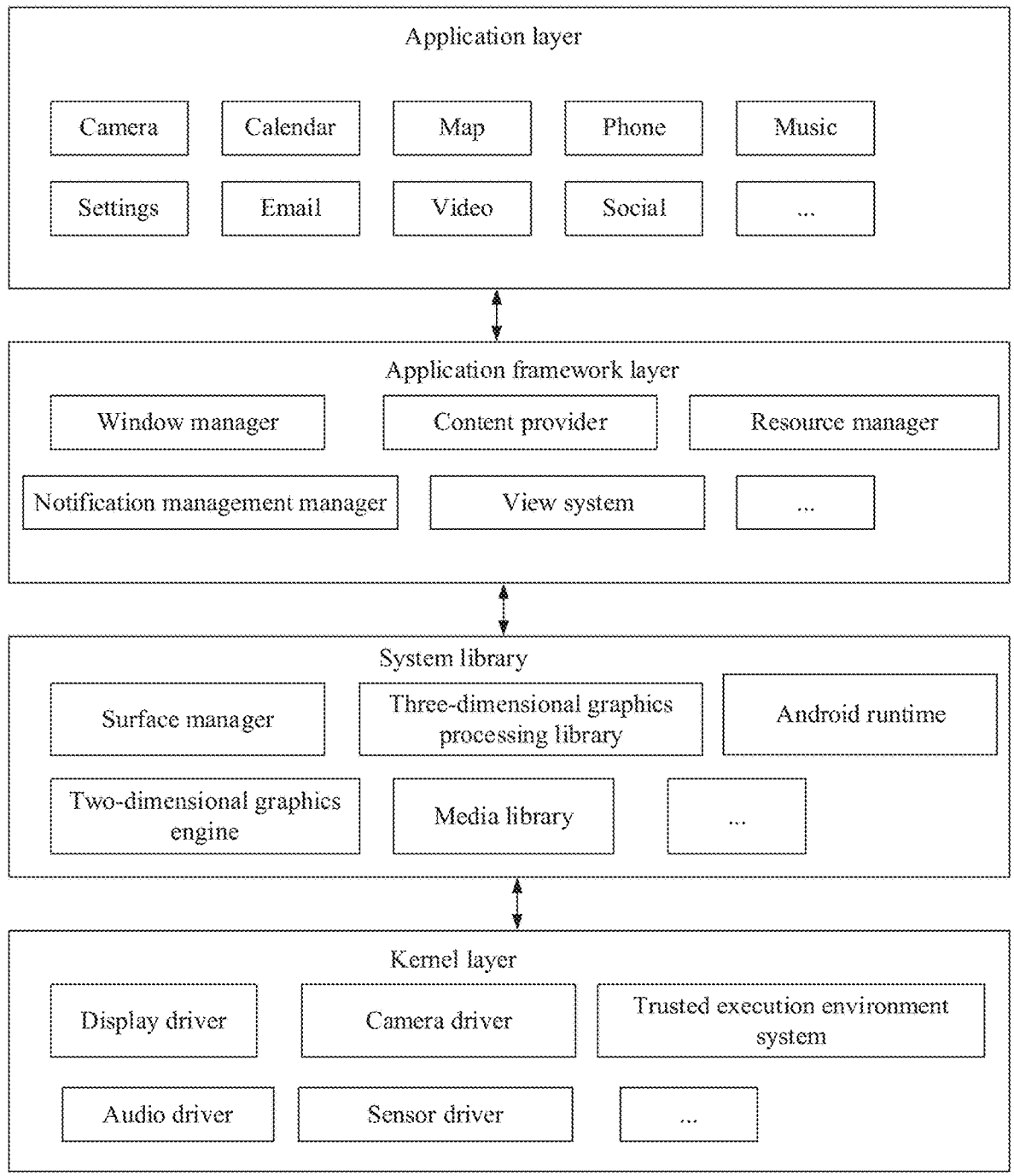
FIG. 4 is a block diagram of a software structure of a terminal device 100 according to an embodiment of this application.

FIG. 4 is a block diagram of a software structure of a terminal device 100 according to an embodiment of this application.

In the layered architecture, software is divided into several layers. Each layer has a clear role and function. The layers communicate with each other through software interfaces. In some embodiments, the Android system is divided into four layers from top to bottom: an application layer, an application framework layer, an Android runtime and system library, and a kernel layer.

The application layer may include a series of application packages.

As shown in FIG. 4, the application package may include applications such as Camera, Calendar, Phone, Map, Phone, Music, Settings, Email, Video, and Social.

The application framework layer provides an application programming interface (API) and a programming framework for the applications at the application layer. The application framework layer includes some predefined functions.

As shown in FIG. 4, the application framework layer may include a window manager, a content provider, a resource manager, a view system, a notification manager, and the like.

The window manager is configured to manage a window program. The window manager may obtain a size of a display screen, determine whether there is a status bar, lock the screen, touch the screen, drag the screen, take a screenshot, and the like.

The content provider is configured to store and obtain data and make the data accessible to the application. The data may include a video, an image, audio, made and answered calls, a browse history, a bookmark, an address book, and the like.

The view system includes visual controls such as a control for displaying a text and a control for displaying an image. The view system may be configured to build an application. A display interface may include one or more views. For example, a display interface including an SMS message notification icon may include a view for displaying a text and a view for displaying an image.

The resource manager provides various resources such as a localized string, an icon, an image, a layout file, and a video file for the application.

The notification manager enables the application to display notification information in a status bar, and may be configured to convey a notification type message. The displayed notification information may automatically disappear after a short pause and require no user interaction. For example, the notification manager is configured to notify download completion, a message reminder, and the like. The notification manager may alternatively be a notification that appears in a top status bar of the system in a form of a graph or a scroll bar text, for example, a notification of an application running in the background or a notification that appears on the screen in a form of a dialog window. For example, text information is prompted in the status bar, a prompt tone is made, the terminal device vibrates, and an indicator lamp flashes.

The Android runtime includes a core library and a virtual machine. The Android runtime is responsible for scheduling and management of the Android system.

The core library includes two parts: functional functions to be called by a java language and a core library of Android.

The application layer and the application framework layer run on the virtual machine. The virtual machine executes java files at the application layer and the application framework layer as binary files. The virtual machine is configured to implement functions such as object lifecycle management, stack management, thread management, security and exception management, and garbage collection.

The kernel layer is a layer between hardware and software. The kernel layer includes at least a display driver, a camera driver, an audio driver, and a sensor driver.

With reference to a scenario in which an application starts or interface switching occurs in the application, the following describes an example of a working procedure of software and hardware of the terminal device 100.

A two-dimensional code recognition operation process and a process of displaying an interface in the two-dimensional code recognition process provided in embodiments of this application are described in detail below with reference to the accompanying drawings. It should be noted that in embodiments of this application, "when . . ." may be an instantaneous occurrence time of a case, or may be a period of time after occurrence of a case, and this is not specifically limited in embodiments of this application.

Figure 5:
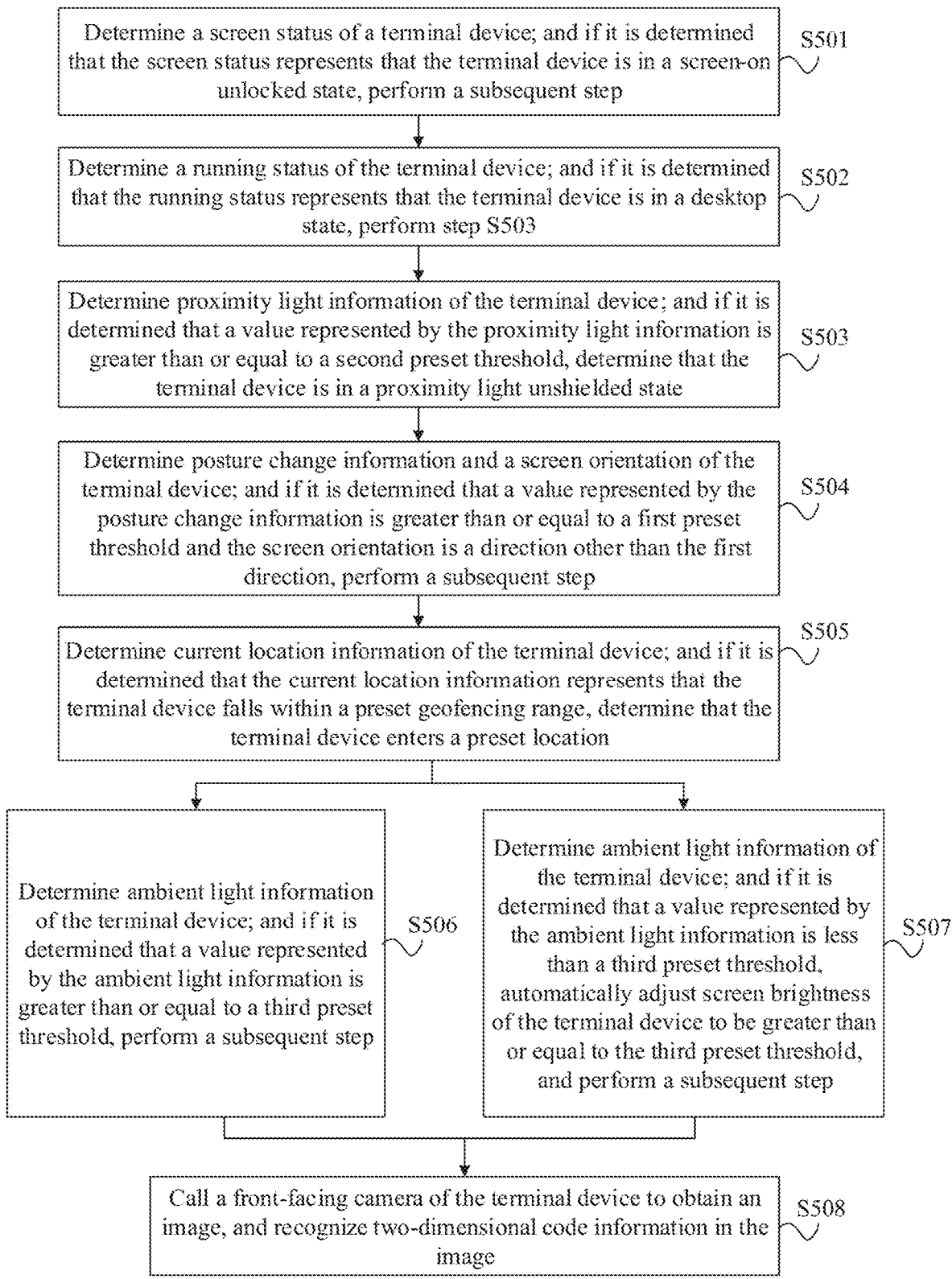
FIG. 5 is a schematic flowchart of a two-dimensional code recognition method according to an embodiment of this application.

FIG. 5 is a schematic flowchart of a two-dimensional code recognition method according to an embodiment of this application. As shown in FIG. 5, the method may include the following steps.

S501: Determine a screen status of a terminal device; and if it is determined that the screen status represents that the terminal device is in a screen-on unlocked state, perform a subsequent step.

For example, this embodiment is executed by the terminal device, a processor in the terminal device, an apparatus disposed in the terminal device, or an electronic device. This is not limited. This embodiment is described by using the terminal device as an execution body.

In a possible implementation, the terminal device may determine the screen status when running a first application. The first application may be any application, including a desktop application. For example, the first application may be a video application, in other words, the first terminal device is playing a video, or may be a reading application.

The terminal device periodically obtains the screen status of the terminal device based on an application ("app") level. The terminal device determines, based on the screen status, whether the terminal device is in the screen-on unlocked state. For example, the terminal device may obtain a screen parameter by using a software interface. Because the screen parameter indicates that the terminal device is in a blank screen state, a screen-on locked state, or the screen-on unlocked state, the terminal device may obtain the screen status based on the obtained screen parameter.

If the terminal device determines that the screen status represents that the terminal device is in the screen-on unlocked state, the terminal device performs a subsequent step; otherwise, the terminal device performs step S501 again after an interval of preset time. Therefore, when the terminal device determines that the terminal device is in the blank screen state or the screen-on locked state, the terminal device does not trigger a front-facing camera to capture an image, so that a meaningless triggering action is avoided. The terminal device performs a subsequent action only when the terminal device determines that the terminal device is in the screen-on unlocked state, and calls, based on a subsequent determining process, the front-facing camera to capture an image.

S502: Determine a running status of the terminal device; and if it is determined that the running status represents that the terminal device is in a desktop state, perform step S503.

For example, if the terminal device determines that the screen status represents that the terminal device is in the screen-on unlocked state, the terminal device needs to obtain a current running status of the terminal device. The terminal device needs to determine whether the running status of the terminal device is the desktop state. Being in the desktop state means that the terminal device currently runs the desktop application, and there are no other applications in the foreground.

For example, the terminal device may obtain a running parameter by using the software interface. Because the running parameter indicates that the terminal device is in the desktop state or an application running state, the terminal device may determine, based on the running parameter, whether the terminal device is in the desktop state.

If the terminal device determines that the running status of the terminal device represents that the terminal device is in the desktop state, the terminal device performs a subsequent step; otherwise, the terminal device performs step S501 again after an interval of preset time. If another application is interrupted to call the front-facing camera when the terminal device runs the another application in the foreground, running of the another application may be abnormal. The terminal device performs a subsequent action only when determining that the terminal device is in the desktop state, and calls, based on a subsequent determining process, the front-facing camera to capture an image, so that another application or the terminal device is prevented from being abnormal if running of the another application is directly interrupted when the terminal device runs the another application in the foreground.

Step S502 is an optional step. After step S501, if it is determined that the screen status represents that the terminal device is in the screen-on unlocked state, step S503 may be performed. Alternatively, after step S502, if it is determined that the running status represents that the terminal device is in the desktop state, step S503 may be performed.

S503: Determine proximity light information of the terminal device; and if it is determined that a value represented by the proximity light information is greater than or equal to a second preset threshold, determine that the terminal device is in a proximity light unshielded state.

For example, in step S503, the terminal device obtains the proximity light information, and determines, based on the proximity light information, whether the terminal device is in the proximity light unshielded state. If the terminal device determines that the terminal device is in the proximity light unshielded state, the terminal device performs a subsequent step; otherwise, the terminal device performs step S501 again.

For example, an optical proximity sensor is disposed in the terminal device, and the optical proximity sensor may obtain proximity light data of the terminal device. The terminal device obtains, at a sensorhub level of a service execution environment (SEE), the proximity light data collected by the optical proximity sensor. Then the terminal device obtains proximity light information based on proximity light data at a current moment. The proximity light information represents a proximity light value of the terminal device at the current moment. If the terminal device determines that a value represented by the proximity light information is greater than or equal to the second preset threshold, the terminal device determines that the terminal device is in the proximity light unshielded state; or if the terminal device determines that a value represented by the proximity light information is less than the second preset threshold, the terminal device determines that the terminal device is in a proximity light shielded state.

The terminal device becomes moderately spaced from a two-dimensional code based on "proximity light unshielded". An excessively short distance between the terminal device and the two-dimensional code easily causes a code scanning failure. A code scanning success rate can be increased based on the condition.

Step S503 is an optional step. After step S501, if it is determined that the screen status represents that the terminal device is in the screen-on unlocked state, step S504 may be performed. Alternatively, after step S502, if it is determined that the running status represents that the terminal device is in the desktop state, step S504 may be performed. Alternatively, after step S503, if it is determined that the terminal device is in the proximity light unshielded state, step S504 may be performed.

S504: Determine posture change information and a screen orientation of the terminal device; and if it is determined that a value represented by the posture change information is greater than or equal to a first preset threshold and the screen orientation is a direction other than the first direction, perform a subsequent step.

The first direction is a positive direction of a z-axis of a world coordinate system.

For example, the "determining posture change information of the terminal device" in step S504 includes: obtaining acceleration change data collected by an acceleration sensor in the terminal device within a preset time period, and/or obtaining angle change data collected by a gyroscope sensor in the terminal device within the preset time period; and determining the posture change information based on the acceleration change data and/or the angle change data.

For example, the "determining a screen orientation of the terminal device" in step S504 includes: obtaining angle data collected by a gyroscope sensor in the terminal device at a current moment; and determining the screen orientation of the terminal device based on the angle data.

For example, after step S501, step S502, or step S503, the terminal device obtains the posture change information and the screen orientation of the terminal device. The posture change information includes acceleration change data and/or angle change data.

The acceleration sensor and the gyroscope sensor are disposed in the terminal device. The acceleration sensor in the terminal device collects the acceleration change data within the preset time period, and the gyroscope sensor in the terminal device collects the angle change data within the preset time period. The preset time period is a time period before the current moment. The terminal device determines the posture change information of the terminal device based on the acceleration change data and/or the angle change data. For example, the terminal device performs posture calculation based on the acceleration change data and/or the angle change data to obtain the posture change information of the terminal device. The posture change information represents a posture change angle of the terminal device, or the posture change information represents a rotation change angle of the terminal device.

In addition, the gyroscope sensor in the terminal device collects the angle data at the current moment, and the terminal device may directly determine the screen orientation of the terminal device based on an angle indicated by the angle data. For example, the gyroscope sensor collects xyz-axis data at the current moment. The terminal device obtains the xyz-axis data collected by the gyroscope sensor, and then the terminal device determines, based on the xyz-axis data, whether the screen orientation of the terminal device is not the positive direction of the z-axis of the world coordinate system, in other words, determines whether the screen orientation of the terminal device is not upward.

In this embodiment, that the screen orientation of the terminal device is "upward" means that a screen of the terminal device faces "the positive direction of the z-axis of the world coordinate system". The first direction is the positive direction of the z-axis of the world coordinate system.

That the screen orientation of the terminal device is "downward" means that the screen of the terminal device faces "a negative direction of the z-axis of the world coordinate system". A second direction is the negative direction of the z-axis of the world coordinate system.

Based on the foregoing principle, the terminal device determines, based on the fact that the value represented by the determined posture change information is greater than or equal to the first preset threshold, that the terminal device is turned over. It can be learned that a user holding the terminal device turns a wrist to turn over the screen of the terminal device. In addition, the terminal device determines that the screen orientation is a direction other than the first direction, and determines that the screen orientation of the terminal device is not upward. Then the terminal device determines to perform a subsequent step.

Therefore, in this embodiment, the terminal device determines that the terminal device is turned over and the screen orientation of the terminal device is not upward, and further, calls the front-facing camera of the terminal device to capture an image, and recognizes a two-dimensional code in the image. Therefore, the terminal device can be triggered to recognize the two-dimensional code, without requiring a plurality of times of human-computer interaction between the user and the terminal device, so that a quantity of operations of the user is reduced, and two-dimensional code recognition efficiency is improved, thereby improving user experience.

For example, the posture change information obtained by the terminal device includes the acceleration change data and the angle change data. In addition, the terminal device obtains angle data at the current moment.

In this case, if the terminal device determines that the screen orientation is a direction other than the first direction, and the first direction is the positive direction of the z-axis of the world coordinate system, it can be learned that the screen orientation is not upward, and the terminal device performs a subsequent step; otherwise, the terminal device performs step S501 again.

Then, if the terminal device determines that a value represented by the acceleration change data is greater than or equal to a first preset threshold corresponding to the acceleration change data, and determines that a value represented by the angle change data is greater than or equal to a first preset threshold corresponding to the angle change data, the terminal device determines that the user holding the terminal device turns a wrist, and performs a subsequent step; otherwise, the terminal device performs step S501 again.

If the terminal device determines that the screen orientation is not upward and the user holding the terminal device turns a wrist, the terminal device determines that the front-facing camera of the terminal device needs to be called.

Alternatively, for example, the posture change information obtained by the terminal device includes the acceleration change data and angle data.

In this case, if the terminal device determines that the screen orientation is a direction other than the first direction, and the first direction is the positive direction of the z-axis of the world coordinate system, it can be learned that the screen orientation is not upward, and the terminal device performs a subsequent step; otherwise, the terminal device performs step S501 again.

Then, if the terminal device determines that a value represented by the acceleration change data is greater than or equal to a first preset threshold corresponding to the acceleration change data, the terminal device determines that the user holding the terminal device turns a wrist, and performs a subsequent step; otherwise, the terminal device performs step S501 again.

If the terminal device determines that the screen orientation is not upward and the user holding the terminal device turns a wrist, the terminal device determines that the front-facing camera of the terminal device needs to be called.

Alternatively, for example, the posture change information obtained by the terminal device includes the angle change data and angle data.

In this case, if the terminal device determines that the screen orientation is a direction other than the first direction, and the first direction is the positive direction of the z-axis of the world coordinate system, it can be learned that the screen orientation is not upward, and the terminal device performs a subsequent step; otherwise, the terminal device performs step S501 again after an interval of preset time.

Then, if the terminal device determines that a value represented by the angle change data is greater than or equal to a first preset threshold corresponding to the angle change data, the terminal device determines that the user holding the terminal device turns a wrist, and performs a subsequent step; otherwise, the terminal device performs step S501 again after an interval of preset time.

If the terminal device determines that the screen orientation is not upward and the user holding the terminal device turns a wrist, the terminal device determines that the front-facing camera of the terminal device needs to be called.

The terminal device obtains the angle data at the current moment based on the gyroscope sensor at the sensorhub level of the SEE environment. The terminal device obtains the acceleration change data within the preset time period based on the acceleration sensor at the sensorhub level of the SEE environment. The terminal device obtains the angle change data within the preset time period based on the gyroscope sensor at the sensorhub level of the SEE environment.

S505: Determine current location information of the terminal device; and if it is determined that the current location information represents that the terminal device falls within a preset geofencing range, determine that the terminal device enters a preset location.

For example, the terminal device may further obtain the current location information of the terminal device. The terminal device detects, based on the current location information, whether the terminal device falls within the preset geofencing range. If it is determined that the terminal device falls within the preset geofencing range, the terminal device determines that the terminal device enters the preset location, and performs a subsequent step; or if it is determined that the terminal device falls beyond the preset geofencing range, the terminal device performs step S501 again.

Step S505 is an optional step. After step S505, if it is determined that the terminal device enters the preset location, step S506 may be performed. Alternatively, step S505 does not need to be performed. After step S504, if it is determined that the value represented by the posture change information is greater than or equal to the first preset threshold and the screen orientation is a direction other than the first direction, step S506 is performed.

S506: Determine ambient light information of the terminal device; and if it is determined that a value represented by the ambient light information is greater than or equal to a third preset threshold, perform a subsequent step.

For example, the terminal device may further determine the ambient light information of the terminal device.

For example, an ambient light sensor is disposed in the terminal device, and the ambient light sensor may obtain ambient light data of the terminal device. The terminal device obtains, at the sensorhub level of the service execution environment (SEE), the ambient light data collected by the ambient light sensor. Then the terminal device obtains ambient light information based on ambient light data at a current moment. The ambient light information represents an ambient light value of the terminal device at the current moment.

Then the terminal device determines whether a value represented by the ambient light information is greater than or equal to the third preset threshold. If the terminal device determines that the value represented by the ambient light information is greater than or equal to the third preset threshold, the terminal device determines that an environment in which the terminal device is located is not a relatively dark environment, to ensure that the front-facing camera of the terminal device can capture a clear image, and the terminal device performs a subsequent step; or if the terminal device determines that the value represented by the ambient light information is less than the third preset threshold, the terminal device performs step S501 again.

For example, the third preset threshold is 10 lux.

The terminal device determines whether the value represented by the ambient light information of the terminal device is greater than or equal to the third preset threshold, and further, when determining that the value represented by the ambient light information is greater than or equal to the third preset threshold, the terminal device performs subsequent processes of calling the front-facing camera to capture an image and recognizing a two-dimensional code in the image. Only when the value represented by the ambient light information is greater than or equal to the third preset threshold, can it be ensured that the environment in which the terminal device is located is not a relatively dark environment and the front-facing camera of the terminal device can capture a clear image.

Step S506 is an optional step. After step S506, if it is determined that the value represented by the ambient light information is greater than or equal to the third preset threshold, step S508 may be performed. Alternatively, step S506 does not need to be performed. After step S505, if it is determined that the terminal device enters the preset location, step S508 is performed. Alternatively, steps S505 and S506 do not need to be performed. After step S504, if it is determined that the value represented by the posture change information is greater than or equal to the first preset threshold and the screen orientation is a direction other than the first direction, step S508 is performed.

S507: Determine ambient light information of the terminal device; and if it is determined that a value represented by the ambient light information is less than a third preset threshold, automatically adjust screen brightness of the terminal device to be greater than or equal to the third preset threshold, and perform a subsequent step.

For example, if the terminal device determines that the value represented by the ambient light information is less than the third preset threshold, the terminal device determines that the terminal device may automatically increase the screen brightness of the terminal device to increase ambient light for the terminal device. In this case, the terminal device may increase the screen brightness of the terminal device to brightness greater than or equal to the third preset threshold. Then a subsequent step is performed.

Therefore, when determining that the value represented by the ambient light information is less than the third preset threshold, the terminal device automatically increases the screen brightness of the terminal device to provide stronger ambient light brightness for the terminal device and enhance an illumination condition, so that it is further ensured that the front-facing camera of the terminal device can capture a clear image, and then code scanning is implemented.

Step S507 is an optional step. After step S507, if it is determined that the value represented by the ambient light information is greater than or equal to the third preset threshold, step S508 may be performed. Alternatively, step S507 does not need to be performed. After step S505, if it is determined that the terminal device enters the preset location, step S508 is performed. Alternatively, steps S505, S506, and S507 do not need to be performed. After step S504, if it is determined that the value represented by the posture change information is greater than or equal to the first preset threshold and the screen orientation is a direction other than the first direction, step S508 is performed.

For example, an execution sequence of the foregoing steps S501-S507 is not limited.

S508: Call the front-facing camera of the terminal device to obtain an image, and recognize two-dimensional code information in the image.

For example, after the foregoing steps, the terminal device calls the front-facing camera of the terminal device to obtain an image. The terminal device recognizes two-dimensional code information in the image after obtaining the image.

After step S507, the terminal device may start to perform the steps from step S501 again.

Figure 6A:
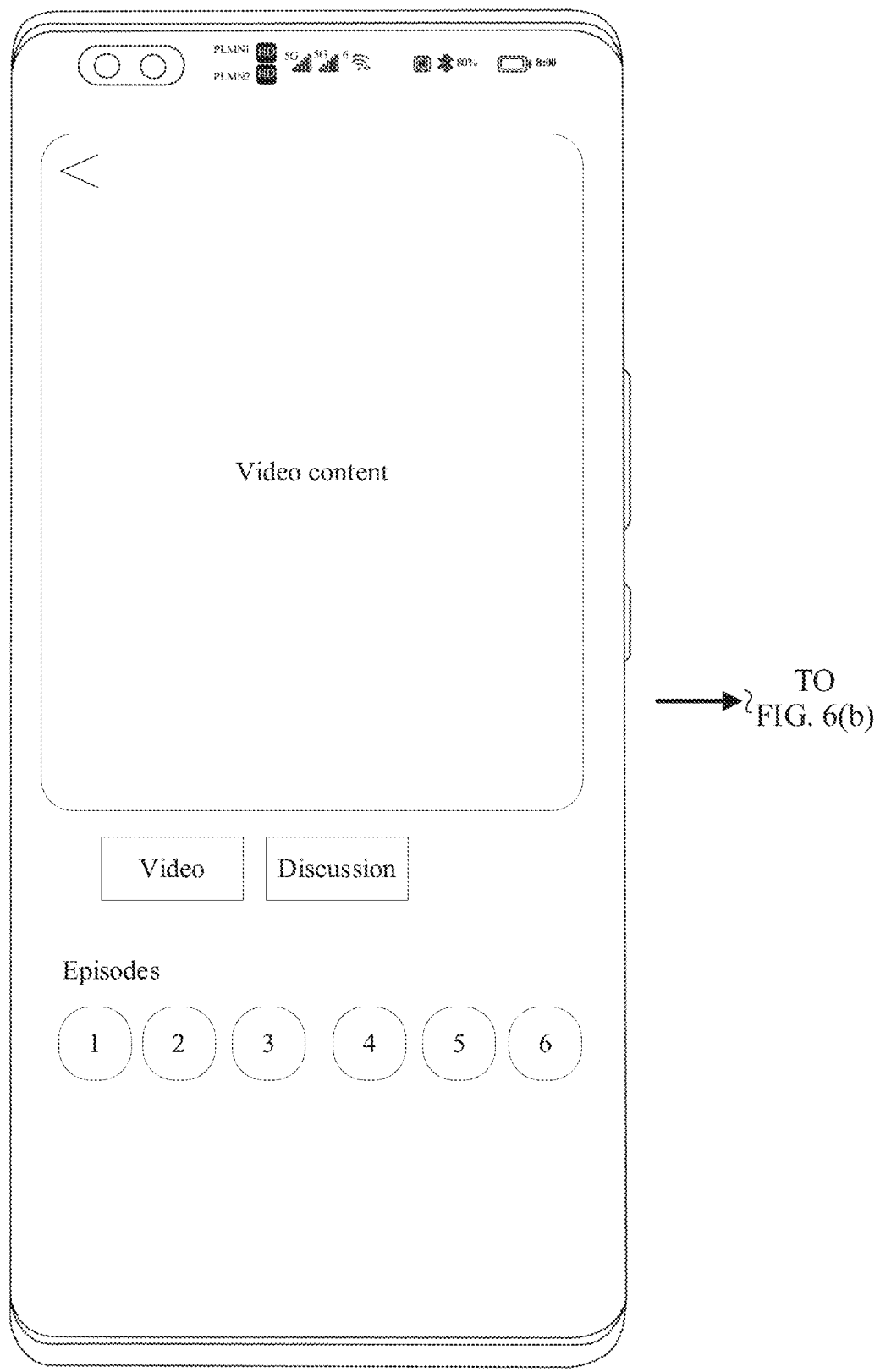
FIG. 6(a), FIG. 6(b), FIG. 6(c), and FIG. 6(d) are a schematic diagram 1 of an interface of a two-dimensional code recognition method according to an embodiment of this application.
Figures 6A, 6B, 6C:
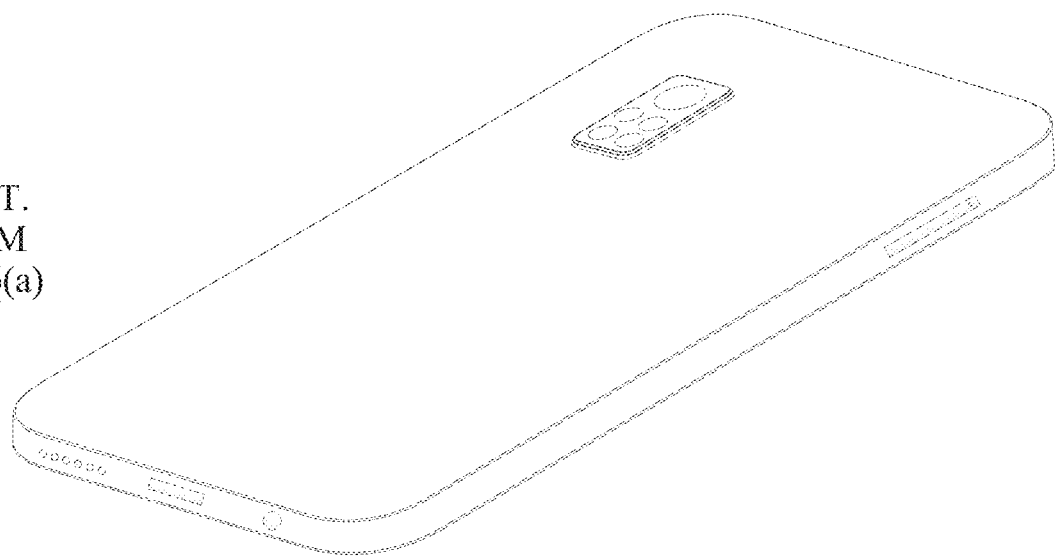
Figure 6C:
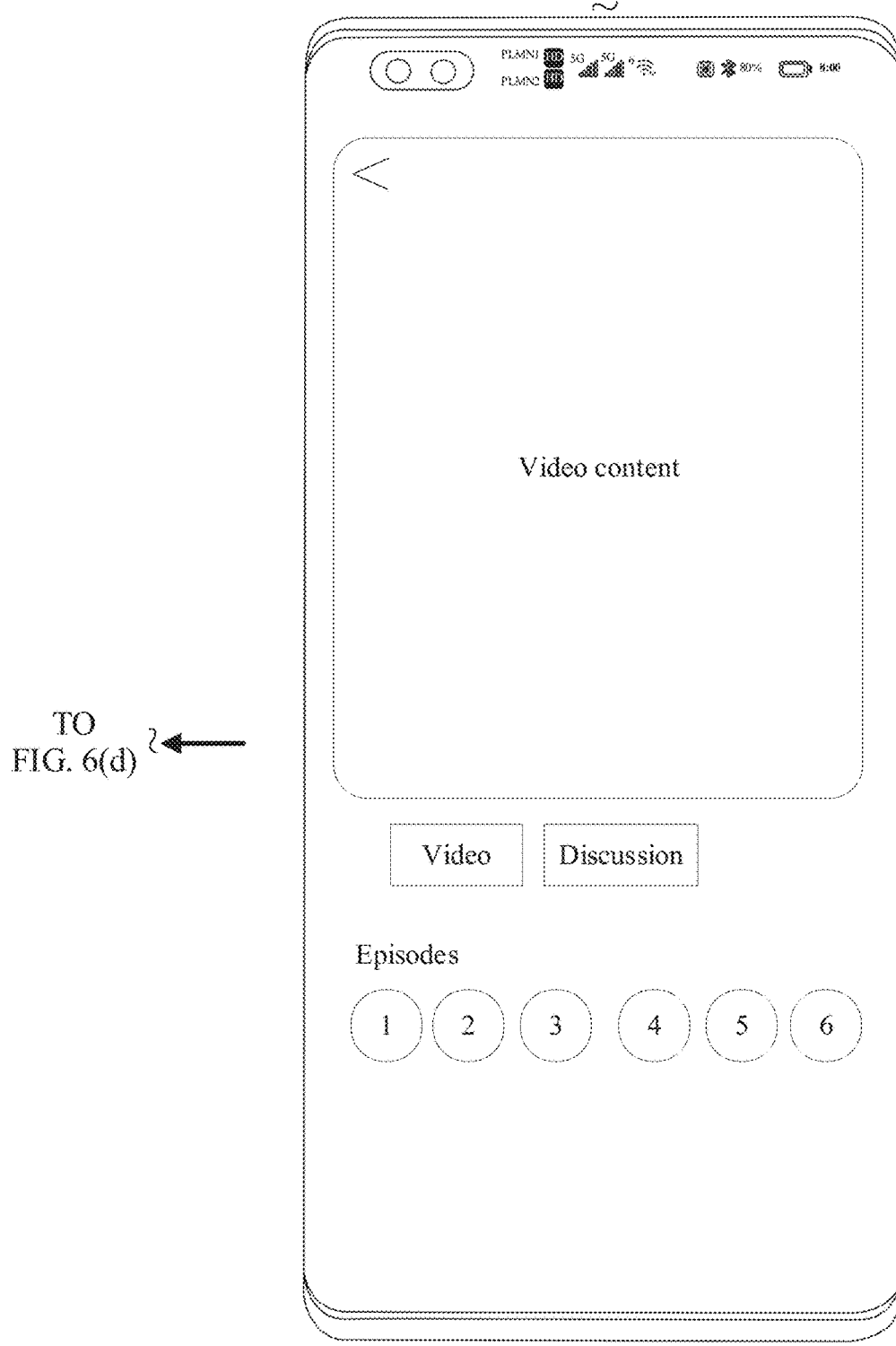
Figure 6D:
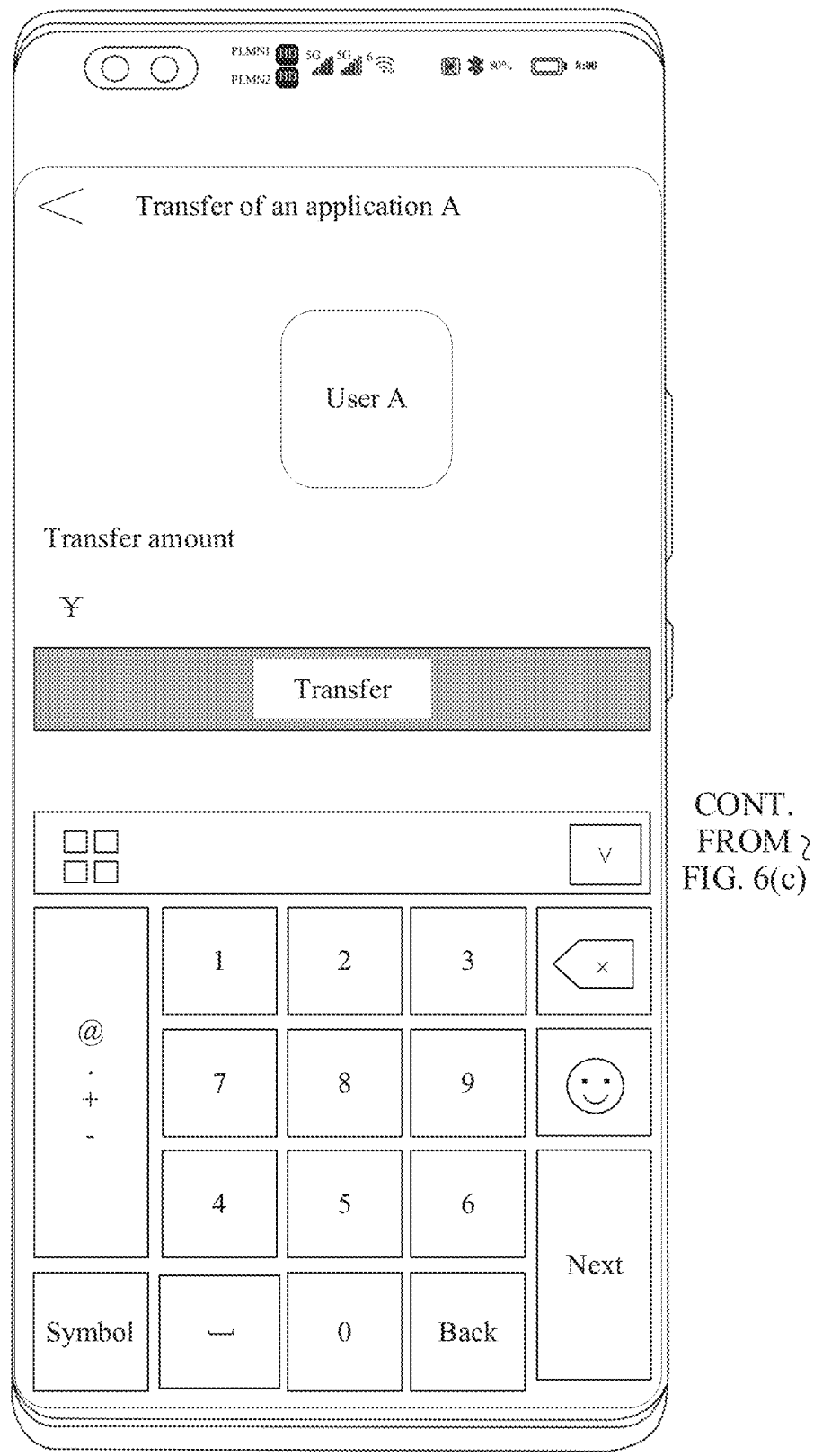

For example, FIG. 6(a), FIG. 6(b), FIG. 6(c), and FIG. 6(d) are a schematic diagram 1 of an interface of a two-dimensional code recognition method according to an embodiment of this application. As shown in FIG. 6(a), the terminal device is running another application, for example, the terminal device is running a video application. In this case, the screen orientation of the terminal device is upward ("upward" means the positive direction of the z-axis of the world coordinate system). As shown in FIG. 6(b), the user holding the terminal device turns a wrist, and the user turns the screen of the terminal device downward (the negative direction of the z-axis of the world coordinate system). Further, in the manner provided in this embodiment, if it is determined that the terminal device is in the screen-on unlocked state, the terminal device is in the proximity light unshielded state (an unnecessary condition), the screen orientation is not upward, a wrist is turned, the terminal device falls within the preset geofencing range (an unnecessary condition), and the value represented by the ambient light information is greater than or equal to the third preset threshold (an unnecessary condition), the terminal device turns on the front-facing camera to capture an image, and recognizes a two-dimensional code. Then, as shown in FIG. 6(c), the terminal device does not change the interface in FIG. 6(a), and still displays an interface of the application that the terminal device is running, but the terminal device calls the front-facing camera of the terminal device in the background to obtain an image, and recognizes two-dimensional code information in the image in the background. Then, after the terminal device recognizes the two-dimensional code information, as shown in FIG. 6(d), the terminal device directly calls an interface corresponding to the two-dimensional code information, for example, displays a transfer interface of an application A.

FIG. 6(d) is only an example of the interface corresponding to the two-dimensional code information. The application interface corresponding to the two-dimensional code information may include an interface of a WeChat application, for example, a WeChat payment interface or a WeChat applet interface (for example, a health code interface or an ordering interface), an interface of an Alipay application, for example, an Alipay payment interface or an Alipay applet interface (for example, a health code interface or an ordering interface), an interface of a conference application, an interface for connecting to wifi, a package pickup interface, or the like.

Figure 7A:
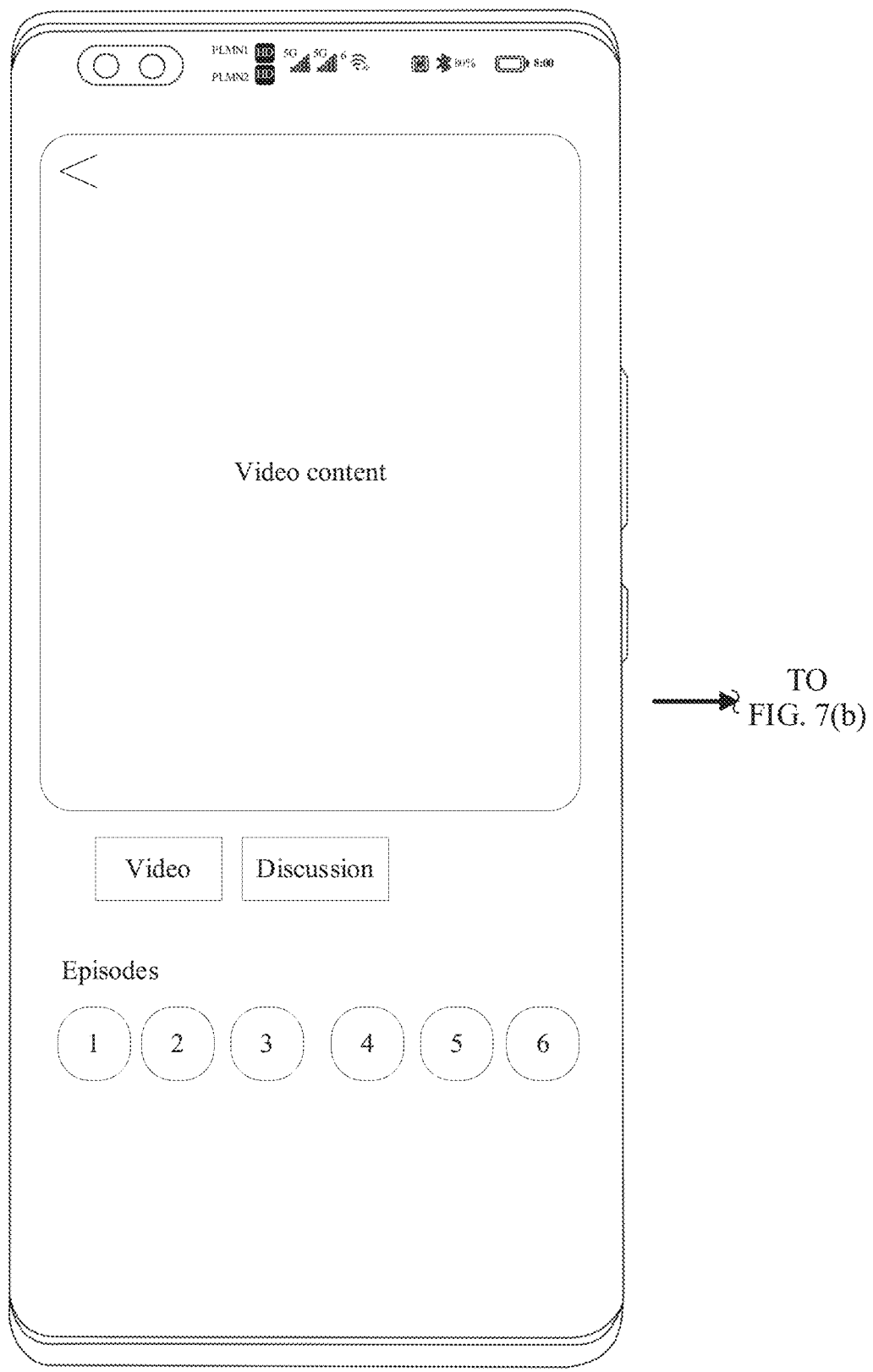
FIG. 7(a), FIG. 7(b), FIG. 7(c), and FIG. 7(d) are a schematic diagram 2 of an interface of a two-dimensional code recognition method according to an embodiment of this application.
Figures 7A, 7B, 7C:
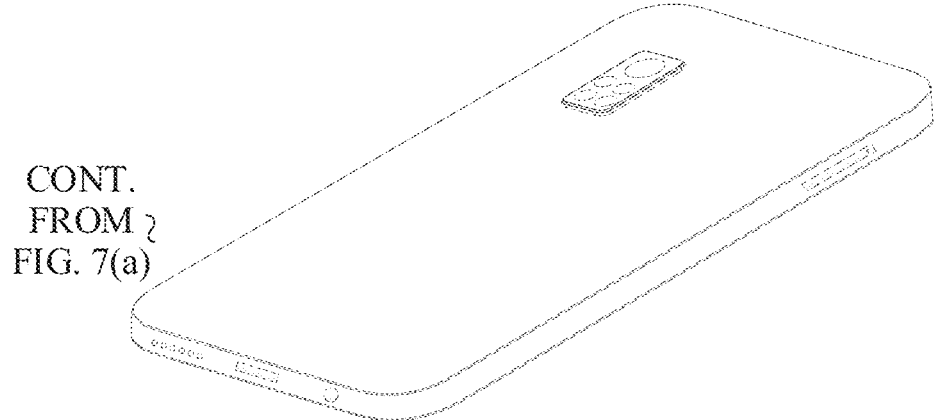
Figure 7C:
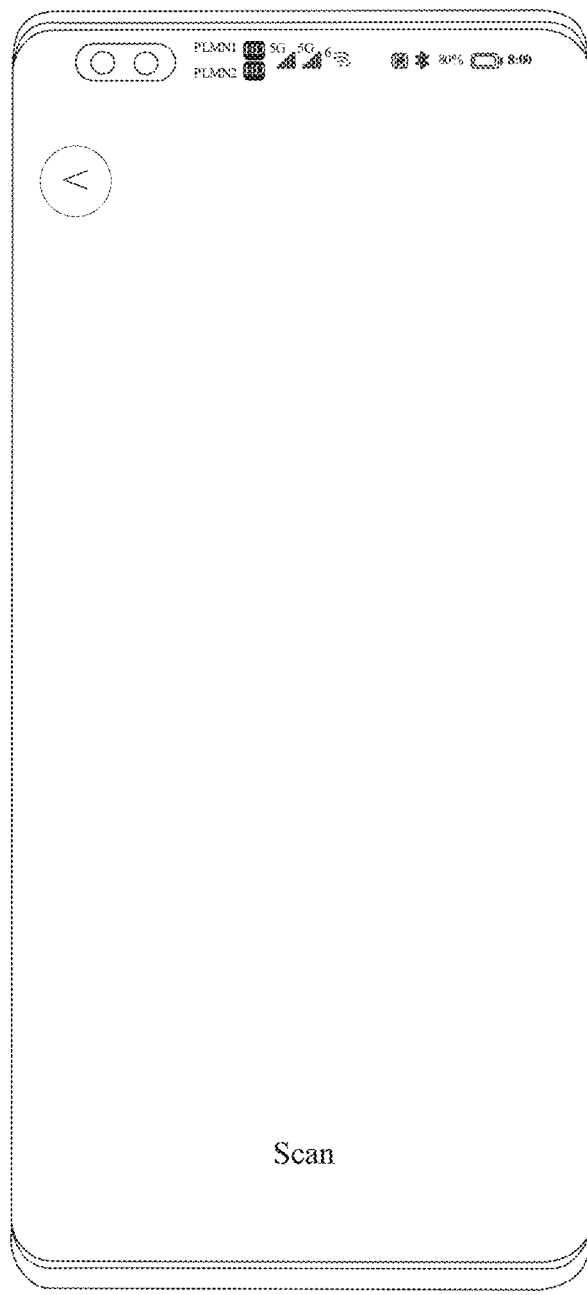
Figure 7D:
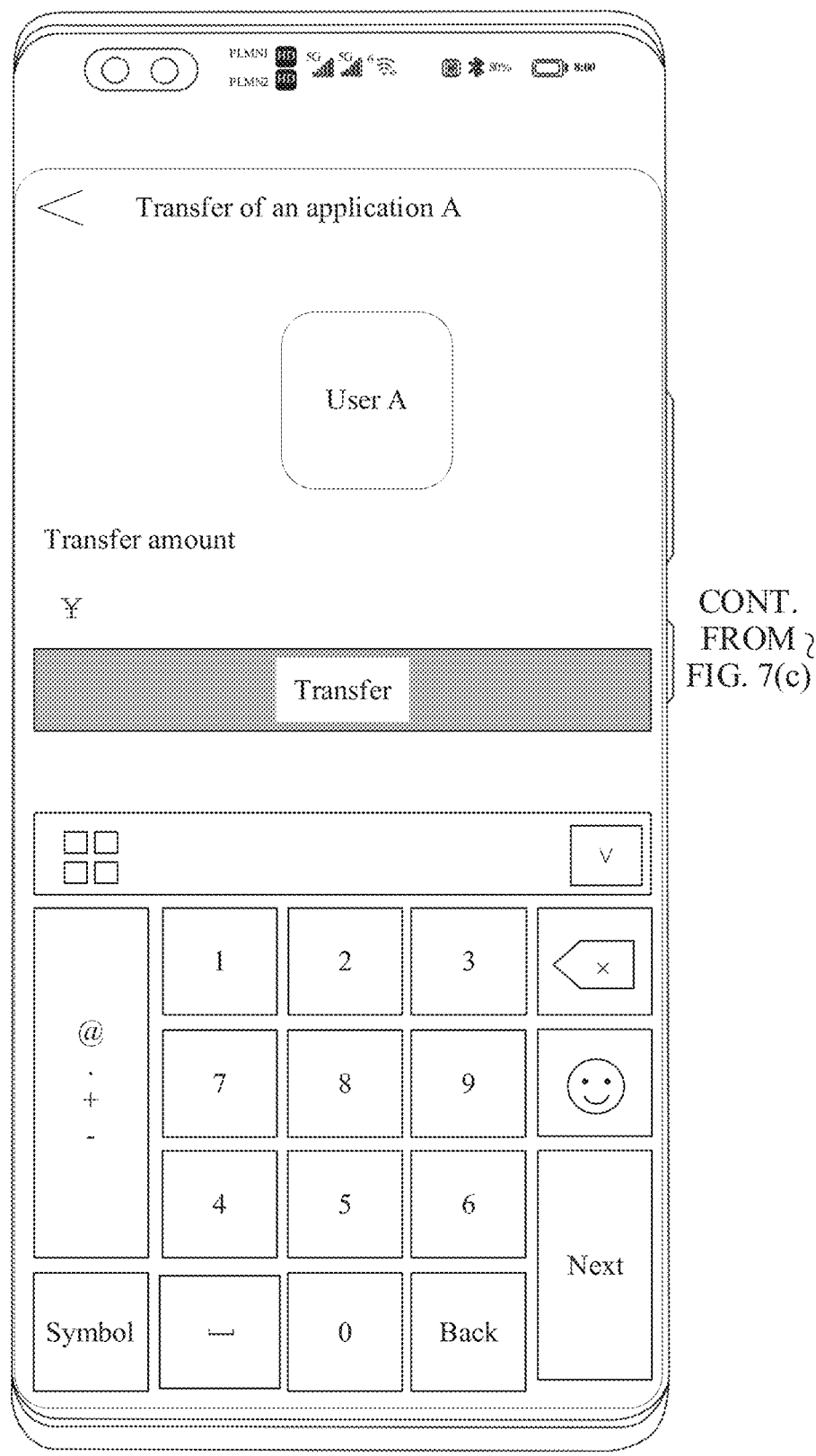

For example, FIG. 7(a), FIG. 7(b), FIG. 7(c), and FIG. 7(d) are a schematic diagram 2 of an interface of a two-dimensional code recognition method according to an embodiment of this application. As shown in FIG. 7(a), the terminal device is running another application, for example, the terminal device is running a video application. In this case, the screen orientation of the terminal device is upward ("upward" means the positive direction of the z-axis of the world coordinate system). As shown in FIG. 7(b), the user holding the terminal device turns a wrist, and the user turns the screen of the terminal device downward (the negative direction of the z-axis of the world coordinate system). Further, in the manner provided in this embodiment, if it is determined that the terminal device is in the screen-on unlocked state, the terminal device is in the proximity light unshielded state (an unnecessary condition), the screen orientation is not upward, a wrist is turned, the terminal device falls within the preset geofencing range (an unnecessary condition), and the value represented by the ambient light information is greater than or equal to the third preset threshold (an unnecessary condition), the terminal device turns on the front-facing camera to capture an image, and recognizes a two-dimensional code. As shown in FIG. 7(c), the terminal device calls the front-facing camera of the terminal device to obtain an image, and recognizes two-dimensional code information in the image, and the terminal device may display a code scanning interface. Then, after the terminal device recognizes the two-dimensional code information, as shown in FIG. 7(d), the terminal device directly calls an interface corresponding to the two-dimensional code information, for example, displays a transfer interface of an application A.

Figure 8A:
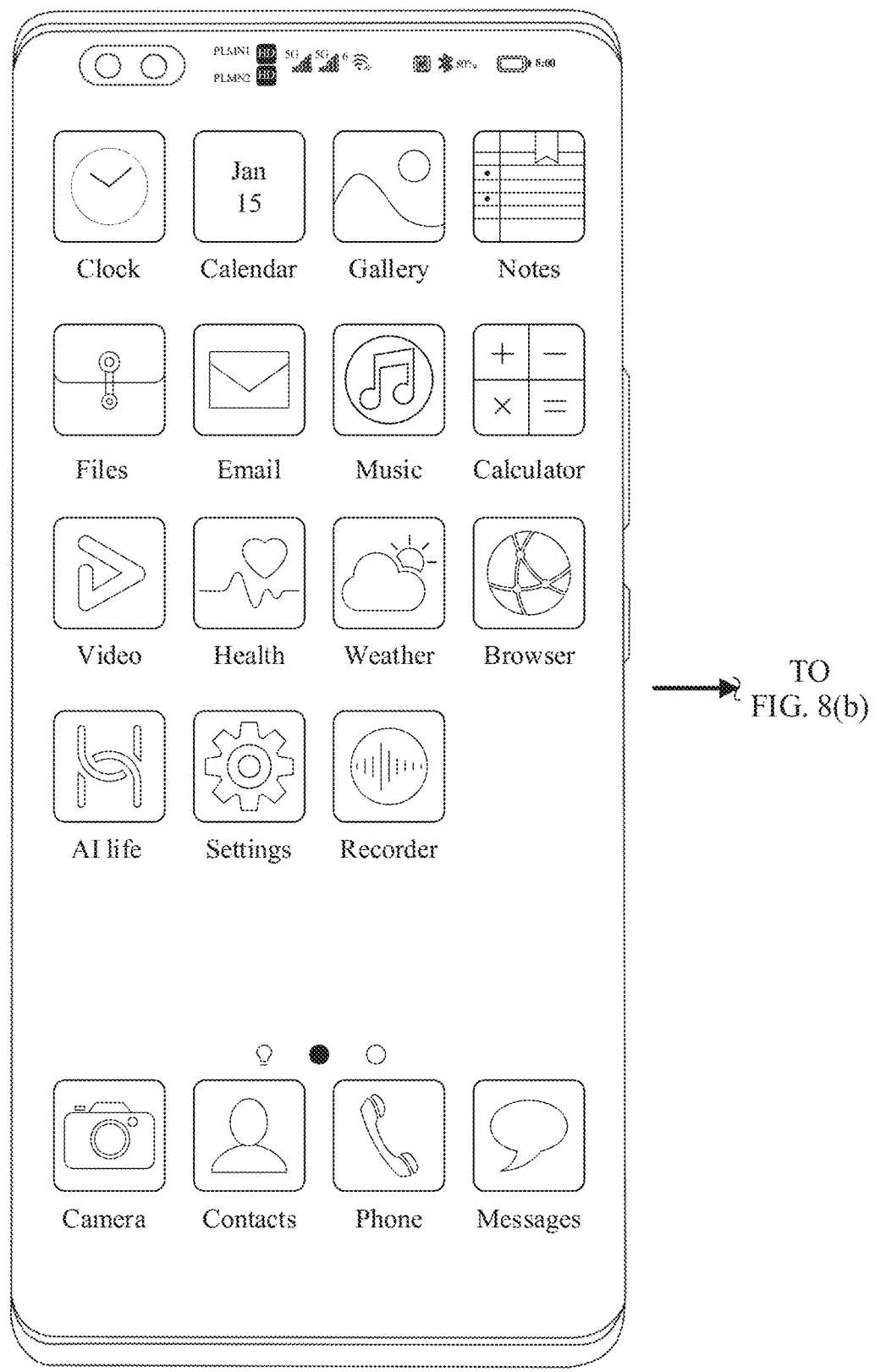
FIG. 8(a), FIG. 8(b), FIG. 8(c), and FIG. 8(d) are a schematic diagram 3 of an interface of a two-dimensional code recognition method according to an embodiment of this application.
Figures 8A, 8B, 8C:
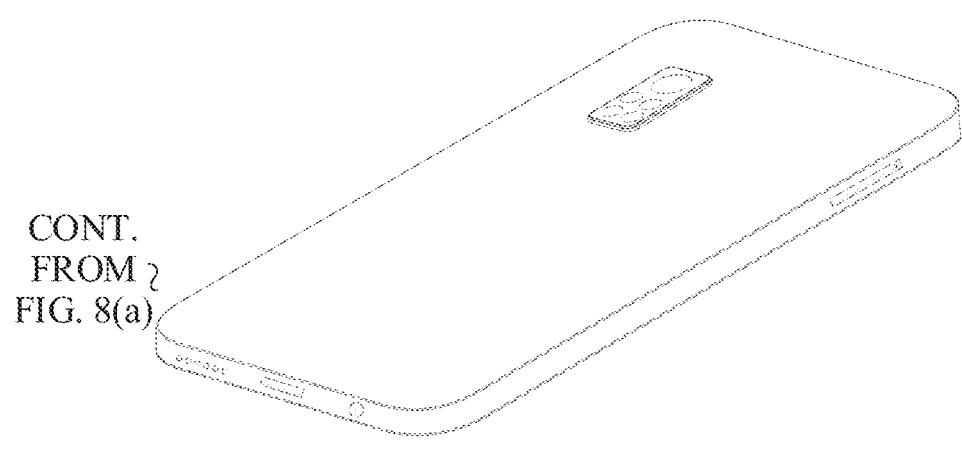
Figure 8C:
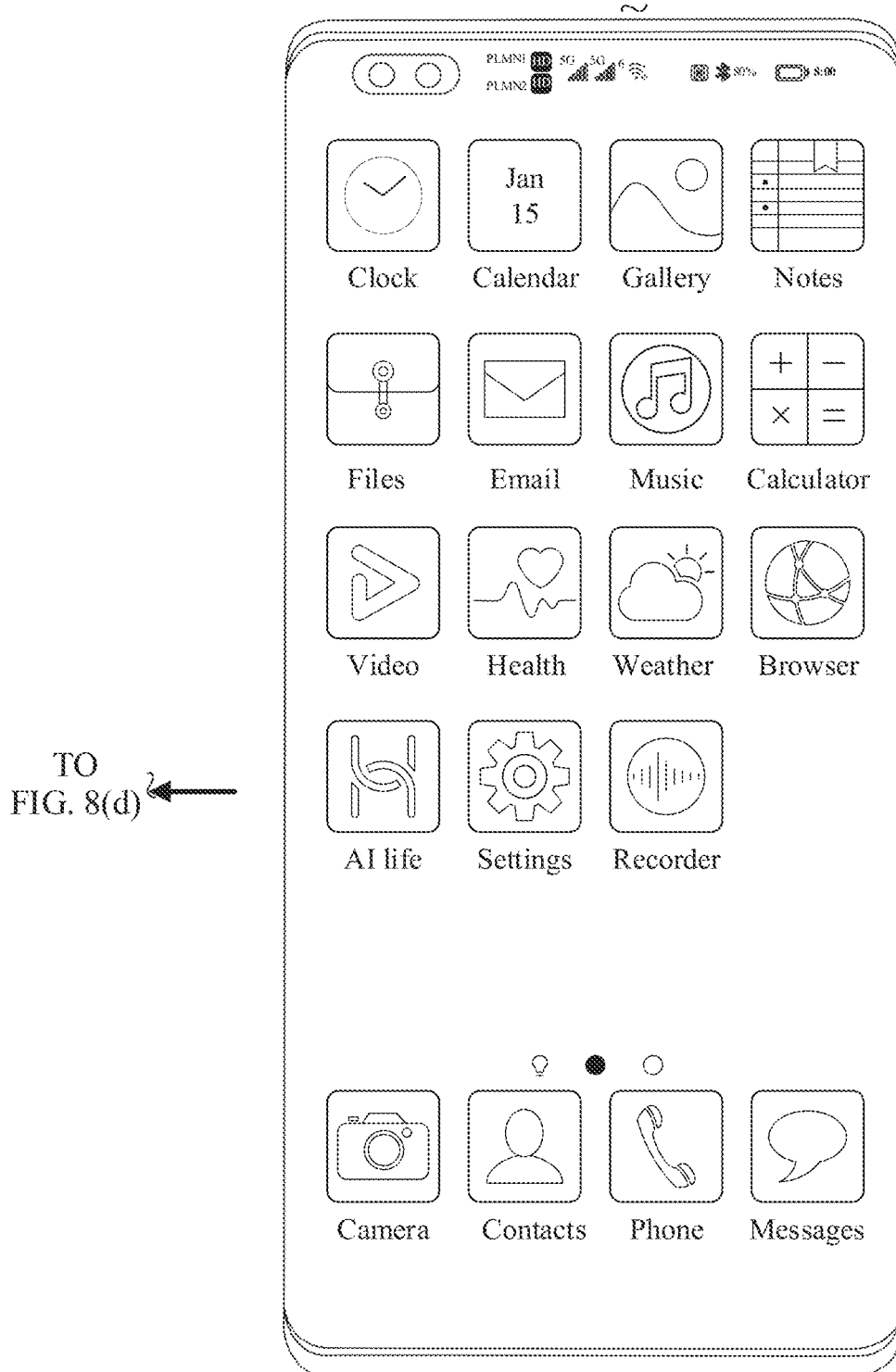
Figure 8D:
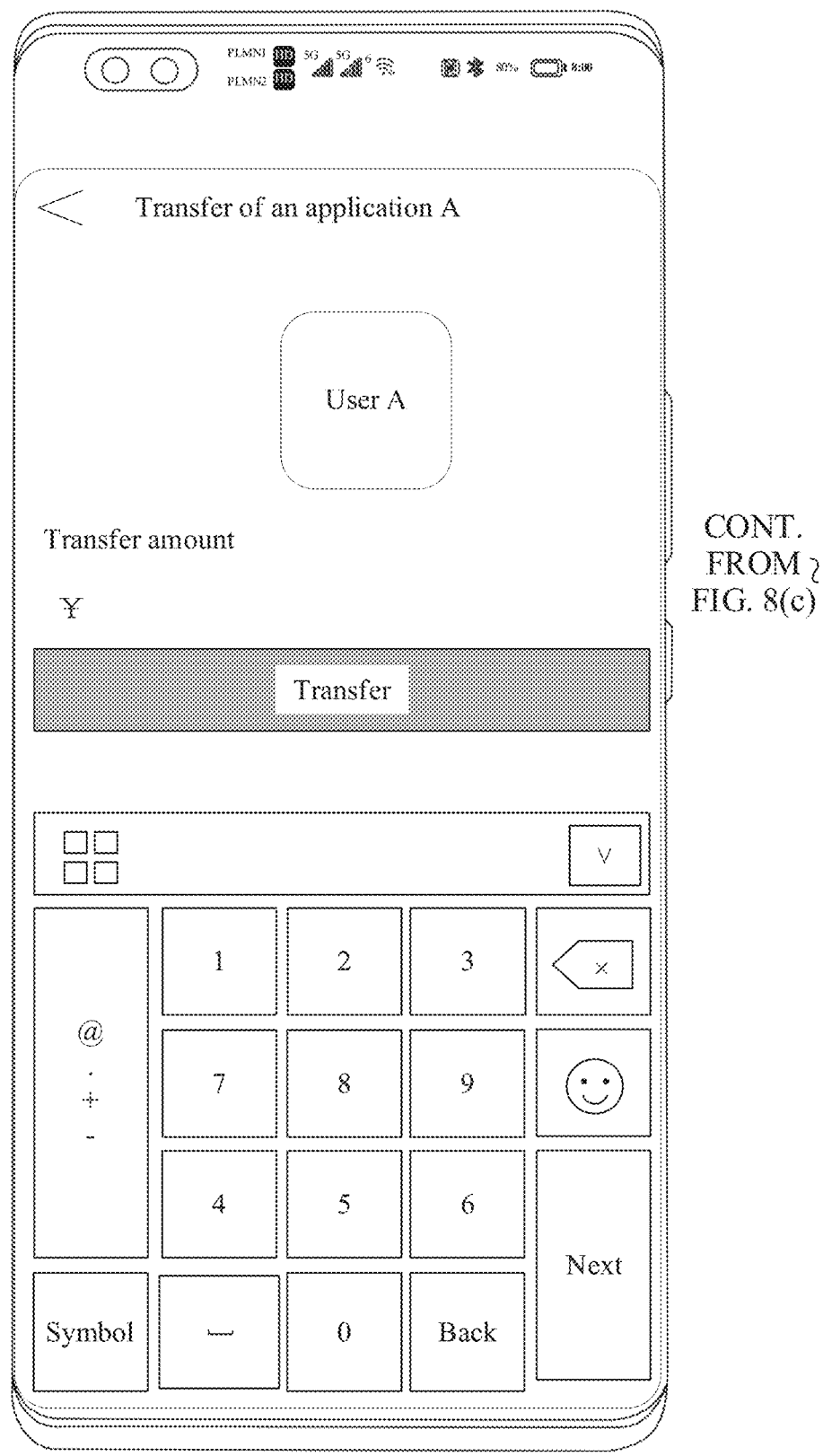

For example, FIG. 8(a), FIG. 8(b), FIG. 8(c), and FIG. 8(d) are a schematic diagram 3 of an interface of a two-dimensional code recognition method according to an embodiment of this application. As shown in FIG. 8(a), the terminal device is in the desktop state, in other words, the terminal device does not run an application in the foreground. In this case, the screen orientation of the terminal device is upward ("upward" means the positive direction of the z-axis of the world coordinate system). As shown in FIG. 8(b), the user holding the terminal device turns a wrist, and the user turns the screen of the terminal device downward (the negative direction of the z-axis of the world coordinate system). Further, in the manner provided in this embodiment, if it is determined that the terminal device is in the screen-on unlocked state, the terminal device is in the desktop state, the terminal device is in the proximity light unshielded state (an unnecessary condition), the screen orientation is not upward, a wrist is turned, the terminal device falls within the preset geofencing range (an unnecessary condition), and the value represented by the ambient light information is greater than or equal to the third preset threshold (an unnecessary condition), the terminal device turns on the front-facing camera to capture an image, and recognizes a two-dimensional code. Then, as shown in FIG. 8(c), the terminal device does not change the interface in FIG. 8(a), and still displays a desktop of the terminal device, but the terminal device calls the front-facing camera of the terminal device in the background to obtain an image, and recognizes two-dimensional code information in the image in the background. Then, after the terminal device recognizes the two-dimensional code information, as shown in FIG. 8(d), the terminal device directly calls an interface corresponding to the two-dimensional code information, for example, displays a transfer interface of an application A.

Figure 9A:
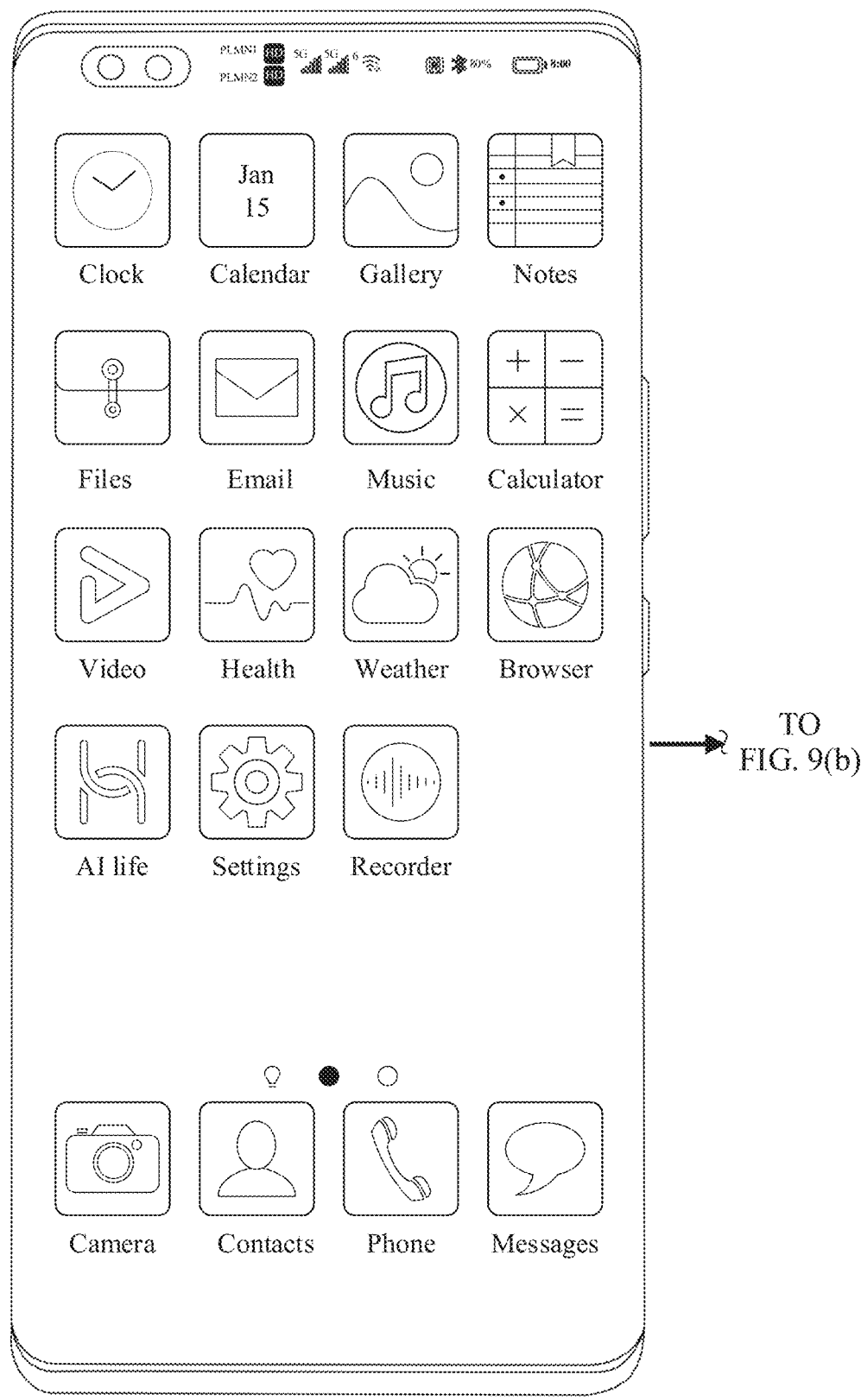
FIG. 9(a), FIG. 9(b), FIG. 9(c), and FIG. 9(d) are a schematic diagram 4 of an interface of a two-dimensional code recognition method according to an embodiment of this application.
Figures 9A, 9B, 9C:
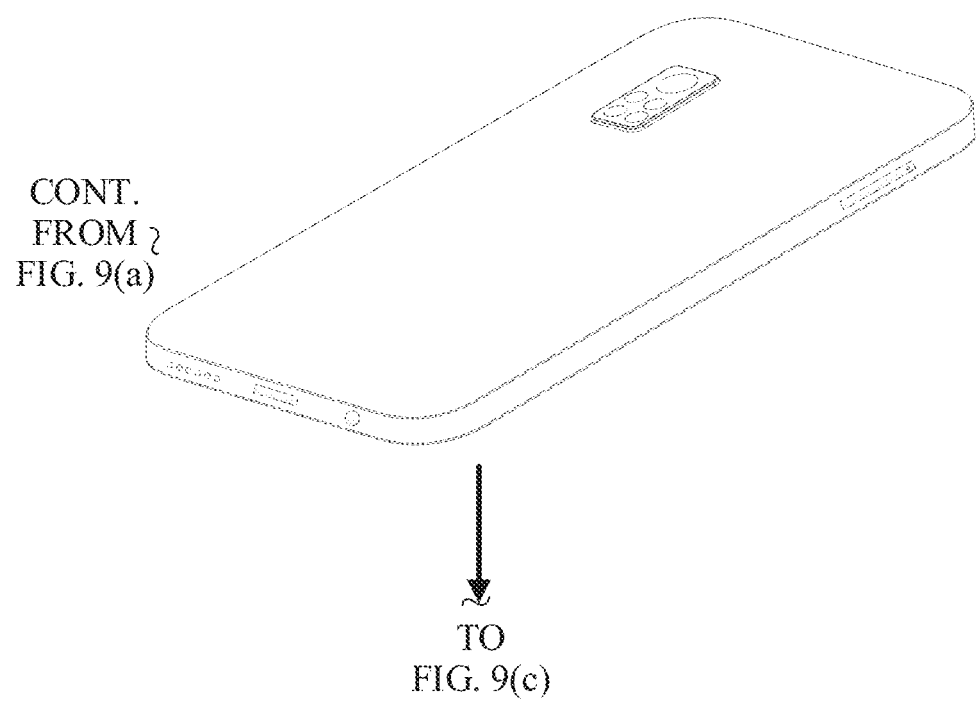
Figure 9C:
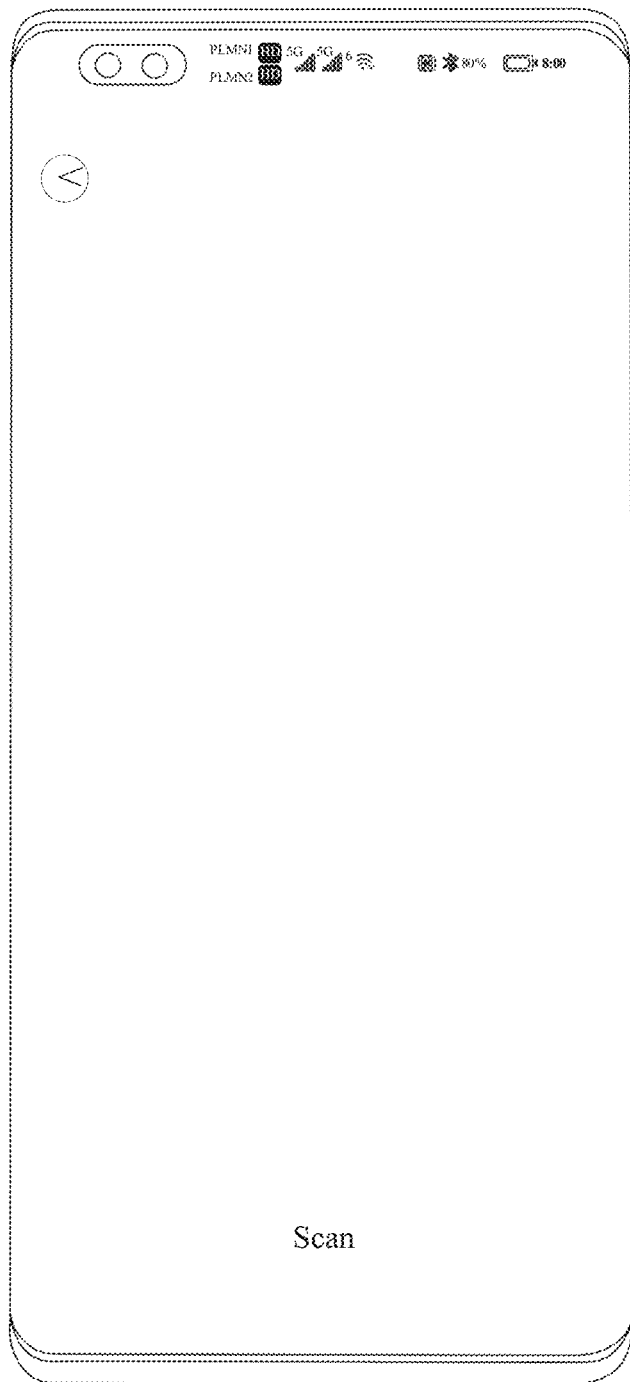
Figure 9D:
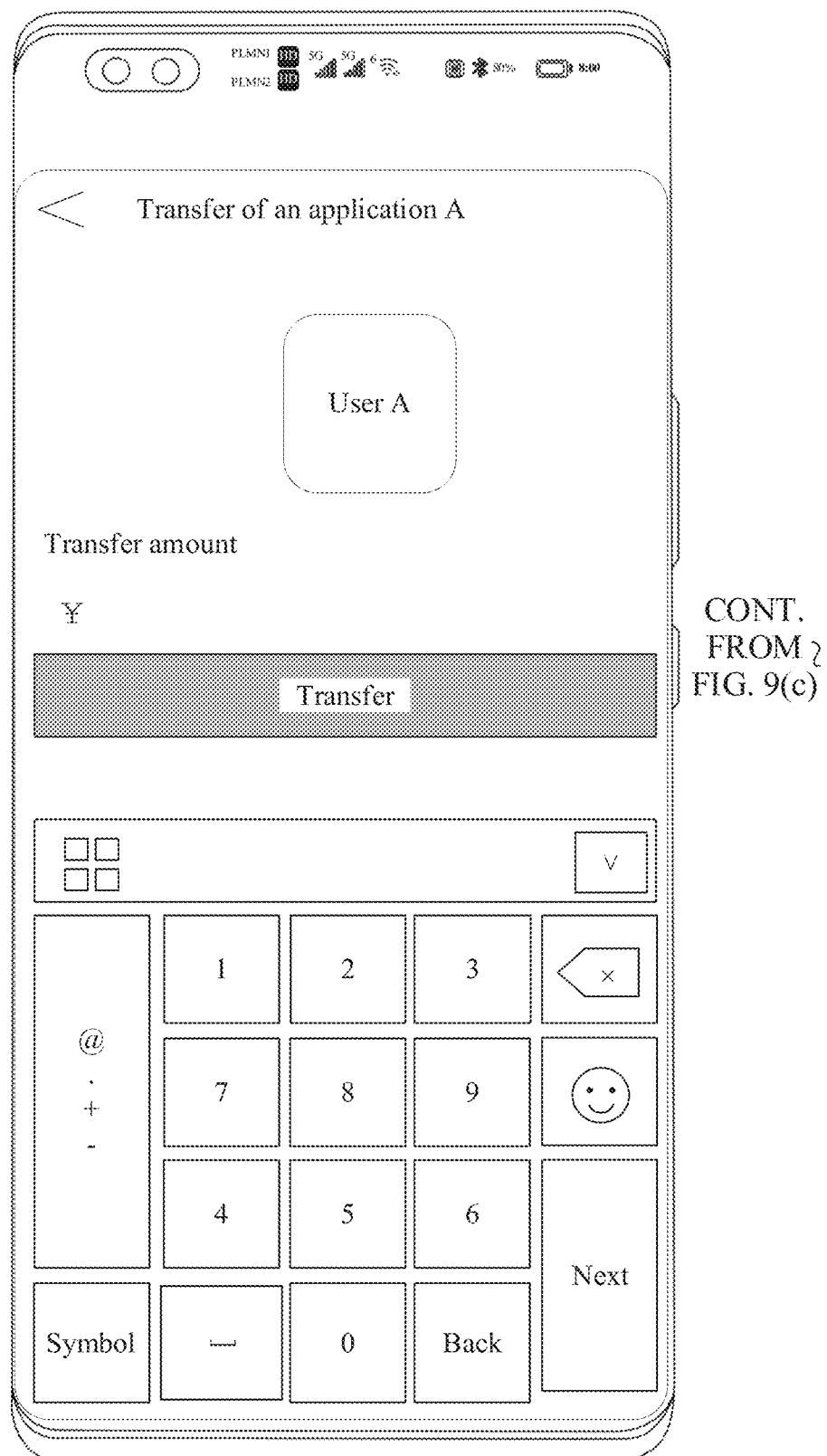

For example, FIG. 9(a), FIG. 9(b), FIG. 9(c), and FIG. 9(d) are a schematic diagram 4 of an interface of a two-dimensional code recognition method according to an embodiment of this application. As shown in FIG. 9(a), the terminal device is in the desktop state, in other words, the terminal device does not run an application in the foreground. In this case, the screen orientation of the terminal device is upward ("upward" means the positive direction of the z-axis of the world coordinate system). As shown in FIG. 9(b), the user holding the terminal device turns a wrist, and the user turns the screen of the terminal device downward (the negative direction of the z-axis of the world coordinate system). Further, in the manner provided in this embodiment, if it is determined that the terminal device is in the screen-on unlocked state, the terminal device is in the desktop state, the terminal device is in the proximity light unshielded state (an unnecessary condition), the screen orientation is not upward, a wrist is turned, the terminal device falls within the preset geofencing range (an unnecessary condition), and the value represented by the ambient light information is greater than or equal to the third preset threshold (an unnecessary condition), the terminal device turns on the front-facing camera to capture an image, and recognizes a two-dimensional code. As shown in FIG. 9(c), the terminal device calls the front-facing camera of the terminal device to obtain an image, and recognizes two-dimensional code information in the image, and the terminal device may display a code scanning interface. Then, after the terminal device recognizes the two-dimensional code information, as shown in FIG. 9(d), the terminal device directly calls an interface corresponding to the two-dimensional code information, for example, displays a transfer interface of an application A.

In this embodiment, if it is determined that the terminal device is in the screen-on unlocked state, the terminal device is in the desktop state (an unnecessary condition), the terminal device is in the proximity light unshielded state (an unnecessary condition), the screen orientation is not upward, a wrist is turned, the terminal device falls within the preset geofencing range (an unnecessary condition), and the value represented by the ambient light information is greater than or equal to the third preset threshold (an unnecessary condition), the terminal device turns on the front-facing camera to capture an image, and recognizes a two-dimensional code. In this way, it is directly determined, based on the running status and posture information of the terminal device, to call the front-facing camera to capture an image, and two-dimensional code information is recognized. The terminal device can be triggered to scan a two-dimensional code, without requiring the user to perform a series of touch operations on the terminal device, so that two-dimensional code recognition time is reduced, and two-dimensional code recognition efficiency is improved.

Figure 10A:
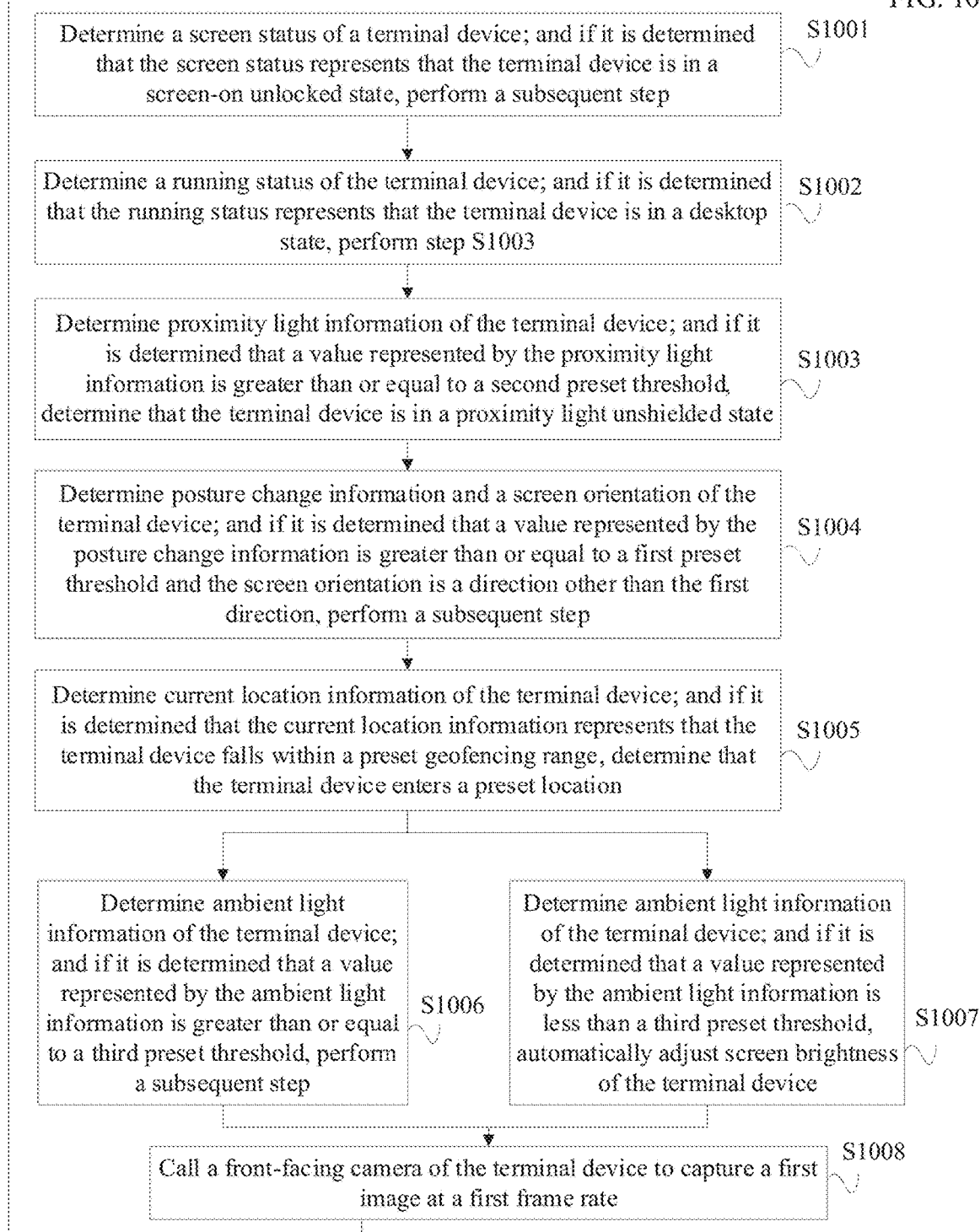
FIG. 10A and FIG. 10B are a schematic flowchart of another two-dimensional code recognition method according to an embodiment of this application.
Figure 10B:
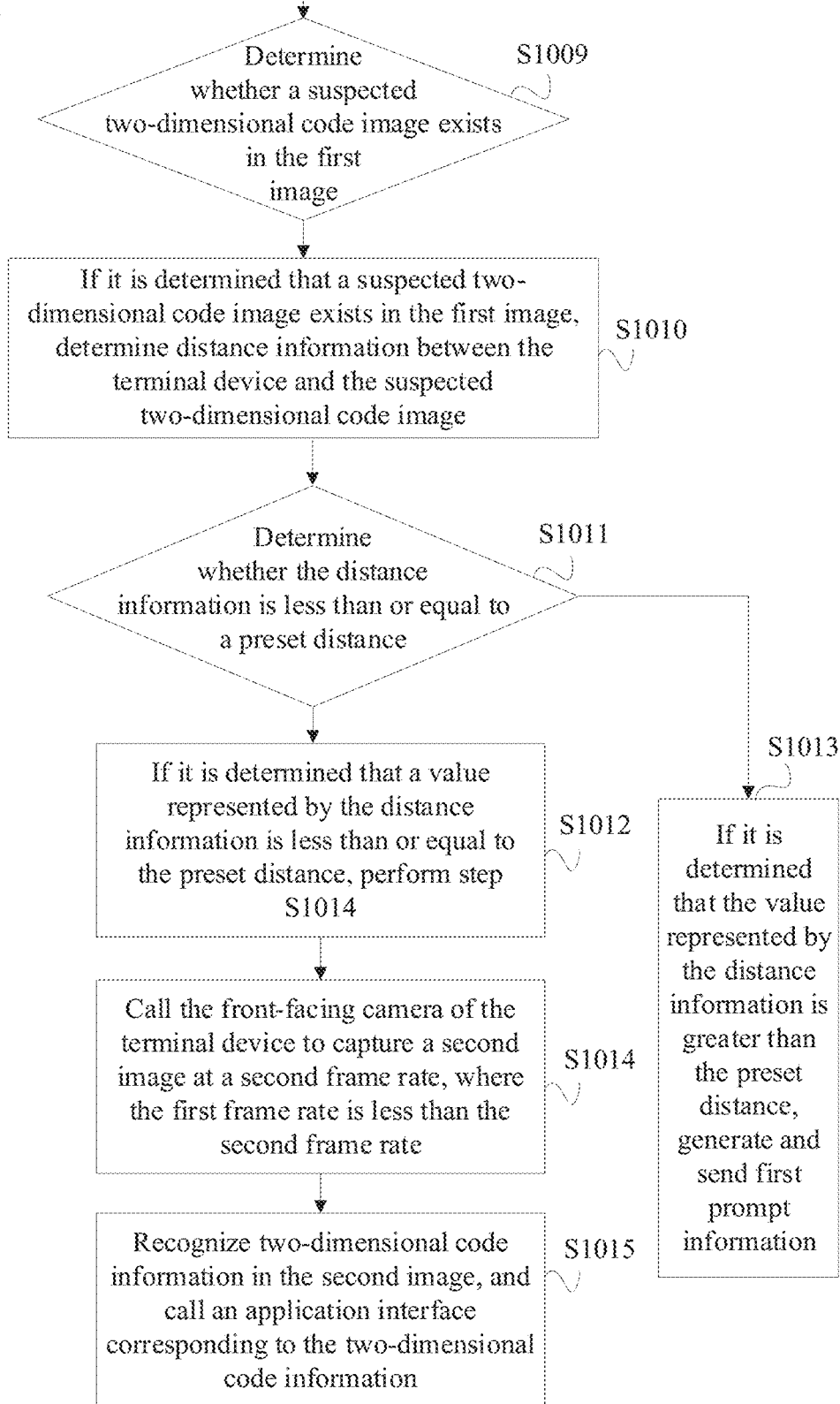

FIG. 10A and FIG. 10B are a schematic flowchart of another two-dimensional code recognition method according to an embodiment of this application. As shown in FIG. 10A and FIG. 10B, the method may include the following steps.

S1001: Determine a screen status of a terminal device; and if it is determined that the screen status represents that the terminal device is in a screen-on unlocked state, perform a subsequent step.

For example, this embodiment is executed by the terminal device, a processor in the terminal device, or an apparatus disposed in the terminal device. This is not limited. This embodiment is described by using the terminal device as an execution body.

S1002: Determine a running status of the terminal device; and if it is determined that the running status represents that the terminal device is in a desktop state, perform step S1003.

For example, step S1002 is an optional step.

S1003: Determine proximity light information of the terminal device; and if it is determined that a value represented by the proximity light information is greater than or equal to a second preset threshold, determine that the terminal device is in a proximity light unshielded state.

For example, step S1003 is an optional step.

S1004: Determine posture change information and a screen orientation of the terminal device; and if it is determined that a value represented by the posture change information is greater than or equal to a first preset threshold and the screen orientation is a direction other than the first direction, perform a subsequent step.

The first direction is a positive direction of a z-axis of a world coordinate system.

S1005: Determine current location information of the terminal device; and if it is determined that the current location information represents that the terminal device falls within a preset geofencing range, determine that the terminal device enters a preset location.

For example, step S1005 is an optional step.

S1006: Determine ambient light information of the terminal device; and if it is determined that a value represented by the ambient light information is greater than or equal to a third preset threshold, perform a subsequent step.

For example, step S1006 is an optional step.

S1007: Determine ambient light information of the terminal device; and if it is determined that a value represented by the ambient light information is less than a third preset threshold, automatically adjust screen brightness of the terminal device to be greater than or equal to the third preset threshold, and perform a subsequent step.

For steps S1001-S1007, refer to the foregoing steps S501-S507. Details are not described again.

S1008: Call a front-facing camera of the terminal device to capture a first image at a first frame rate.

For example, the terminal device calls the front-facing camera. In addition, to reduce power consumption, the terminal device calls a low-power consumption driver to capture the first image at the first frame rate. The first frame rate is less than a second frame rate; or the first frame rate may be set to be less than a preset frame rate threshold. A frame rate refers to a quantity of transmitted frames per second (FPS).

Therefore, the terminal device captures the first image at a low frame rate by using the front-facing camera. Resolution of the first image captured by the terminal device is first resolution. The first resolution is less than second resolution, and the captured first image is a low-resolution image.

When the terminal device captures the first image at a low frame rate, power consumption of the terminal device is relatively small, so that the power consumption of the device can be reduced.

S1009: Determine whether a suspected two-dimensional code image exists in the first image.

For example, a neural network classification model (namely, a first-level model) is deployed in the terminal device. The terminal device performs classification recognition on the first image based on the neural network classification model to obtain a first recognition result. The first recognition result represents whether a target in the first image is a two-dimensional code. In other words, the first recognition result represents whether a suspected two-dimensional code image exists in the first image.

If the terminal device determines that a suspected two-dimensional code image exists in the first image, the terminal device performs a subsequent step; otherwise, the terminal device performs step S1101 again after an interval of preset time.

The neural network classification model is obtained by performing training based on a first training set. The first training set includes a plurality of first training images, and the first training images are images in which two-dimensional codes are marked.

S1010: If it is determined that a suspected two-dimensional code image exists in the first image, determine distance information between the terminal device and the suspected two-dimensional code image.

For example, if the terminal device determines that a suspected two-dimensional code image exists in the first image, the terminal device may measure distance information between the terminal device and the suspected two-dimensional code image in the first image based on a time of flight ("tof") technology. If the terminal device determines that no suspected two-dimensional code image exists in the first image, the terminal device performs step S1001 again after an interval of preset time.

S1011: Determine whether the distance information is less than or equal to a preset distance.

S1012: If it is determined that a value represented by the distance information is less than or equal to the preset distance, perform step S1014.

For example, if the terminal device determines that the distance information between the terminal device and the suspected two-dimensional code image in the first image is less than or equal to the preset distance, the terminal device determines that the terminal device is relatively close to the suspected two-dimensional code image, and then performs step S1014.

S1013: If it is determined that the value represented by the distance information is greater than the preset distance, generate and send first prompt information, where the first prompt information is used to prompt that the front-facing camera of the terminal device needs to approach the suspected two-dimensional code image.

For example, if the terminal device determines that the distance information between the terminal device and the suspected two-dimensional code image in the first image is greater than the preset distance, the terminal device determines that the terminal device is relatively far from the suspected two-dimensional code image. The terminal device needs to prompt a user to make the front-facing camera of the terminal device approach the suspected two-dimensional code image, and the terminal device may generate and send the first prompt information. The first prompt information includes one or more of the following: a voice prompt, a vibration prompt, and a light prompt.

For example, the preset distance is a value range, and the value range is 15 centimeters to 40 centimeters. A field of view (FOV) of the camera in this application is 100.

S1014: Call the front-facing camera of the terminal device to capture a second image at the second frame rate, where the first frame rate is less than the second frame rate.

For example, after step S1012, or if it is determined that a suspected two-dimensional code image exists in the first image, step S1014 is performed. The terminal device calls the front-facing camera of the terminal device to capture the second image at the second frame rate. The second frame rate is greater than the first frame rate; or the second frame rate may be set to be greater than or equal to the preset frame rate threshold.

Therefore, the terminal device captures the second image at a higher frame rate by using the front-facing camera. Resolution of the second image captured by the terminal device is second resolution. The second resolution is greater than the first resolution, and the captured second image is a high-resolution image.

In this step, the terminal device enables a high-power consumption driving algorithm to capture an image stream, and if no two-dimensional code has been recognized, the terminal device continuously captures the image stream for a maximum of five seconds.

After the terminal device determines that a suspected two-dimensional code image exists in the first image, or after step S1012, the terminal device captures the second image at a high frame rate by using the front-facing camera, so that a clear second image can be obtained, and further, a two-dimensional code in the second image can be effectively and accurately recognized.

S1015: Recognize two-dimensional code information in the second image, and call an application interface corresponding to the two-dimensional code information.

For example, the terminal device recognizes the two-dimensional code information in the second image to obtain a second recognition result, and the second recognition result represents whether the two-dimensional code information is obtained. If it is determined that the second recognition result represents that the two-dimensional code information is obtained, the terminal device pulls up the application interface corresponding to the two-dimensional code information based on a Deeplink technology. The terminal device may send third prompt information. The third prompt information represents that the application interface corresponding to the two-dimensional code information has been automatically pulled up. If it is determined that the second recognition result represents that the two-dimensional code information is not obtained, step S1001 is performed again after an interval of preset time.

The terminal device first performs target detection on the second image based on a two-dimensional code recognition algorithm (namely, a second-level model), then amplifies the second image in a super resolution manner (based on a neural network), and then performs two-dimensional code decoding to obtain the second recognition result. The two-dimensional code decoding includes the following process:

extracting a two-dimensional code area image and recognizing the two-dimensional code area image to obtain the second recognition result.

The two-dimensional code recognition algorithm is obtained by performing training based on a second training set. The second training set includes a plurality of second training images, and the second training images are high-frame rate images in which two-dimensional codes are marked.

For example, for a two-dimensional code of an official account, the terminal device obtains a link after recognizing the second image. The terminal device may display an article of the official account in an application based on the link.

For example, the recognizing two-dimensional code information in the image includes: recognizing the two-dimensional code information to obtain and display a plurality of two-dimensional code images; and in response to a confirmation instruction, calling an application interface corresponding to a two-dimensional code image indicated by the confirmation instruction. The confirmation instruction is used to indicate a two-dimensional code image selected by the user. For example, if a plurality of two-dimensional code images are obtained after the second image is recognized, the terminal device separately recognizes a plurality of two-dimensional codes (for example, recognizes locations of the two-dimensional codes in the second image), and generates and displays a screenshot. The terminal device frames the plurality of two-dimensional code images in the screenshot, and provides interaction buttons. In addition, the terminal device generates second prompt information. The second prompt information represents and prompts, for example, through a voice, vibration, or light, the user to select a two-dimensional code. Then the user selects one of the two-dimensional code images, and further, the terminal device determines the two-dimensional code image selected by the user. In this process, the two-dimensional code has been decoded first, and provided that the user taps one of the two-dimensional code images, the terminal device can pull up an application interface corresponding to the two-dimensional code image.

After step S1015, the terminal device may start to perform the steps from step S1001 again.

Figure 11A:
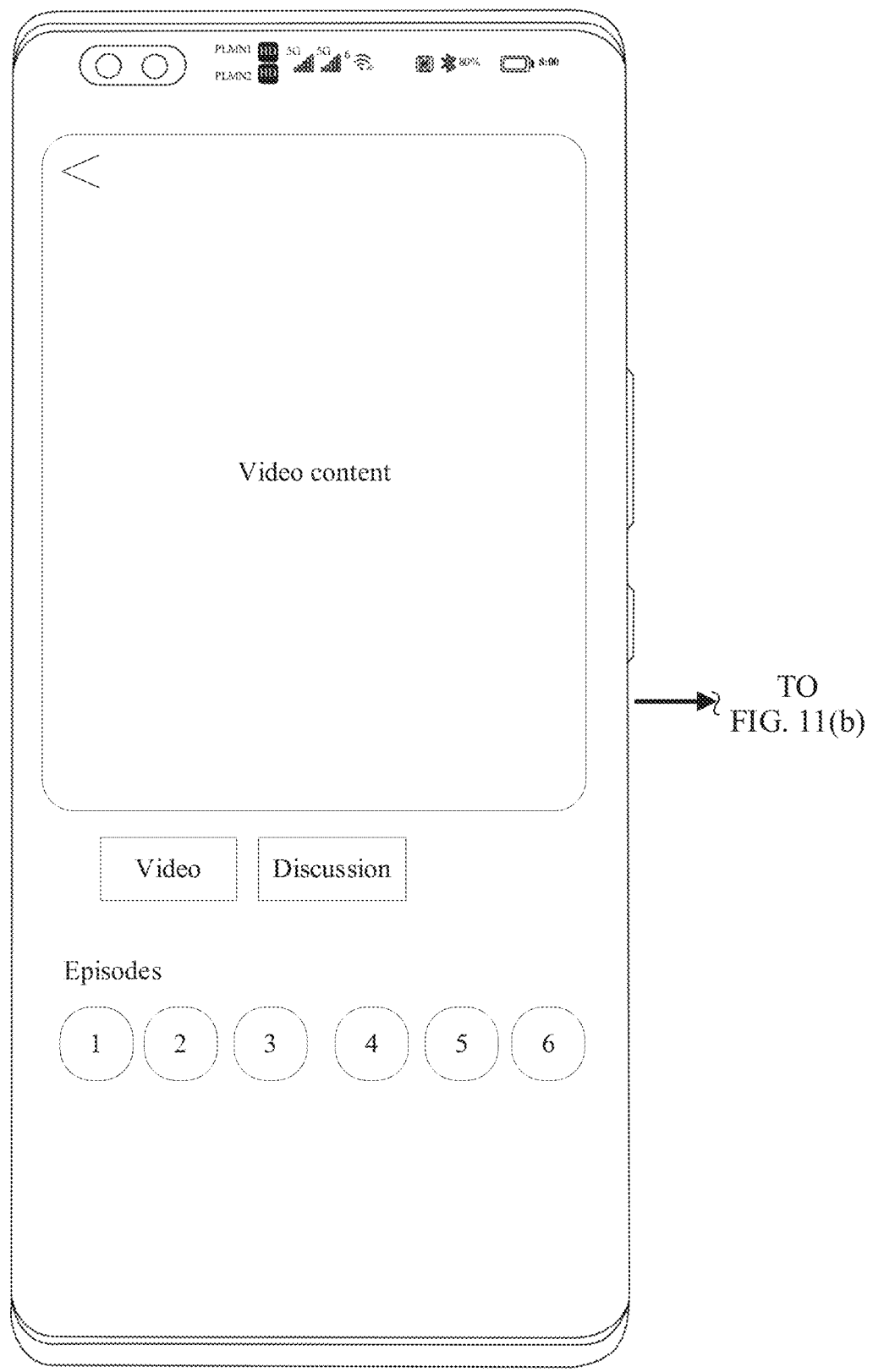
FIG. 11(a), FIG. 11(b), FIG. 11(c), FIG. 11(d), FIG. 11(e), and FIG. 11(f) are a schematic diagram 1 of an interface of another two-dimensional code recognition method according to an embodiment of this application.
Figure 11B:
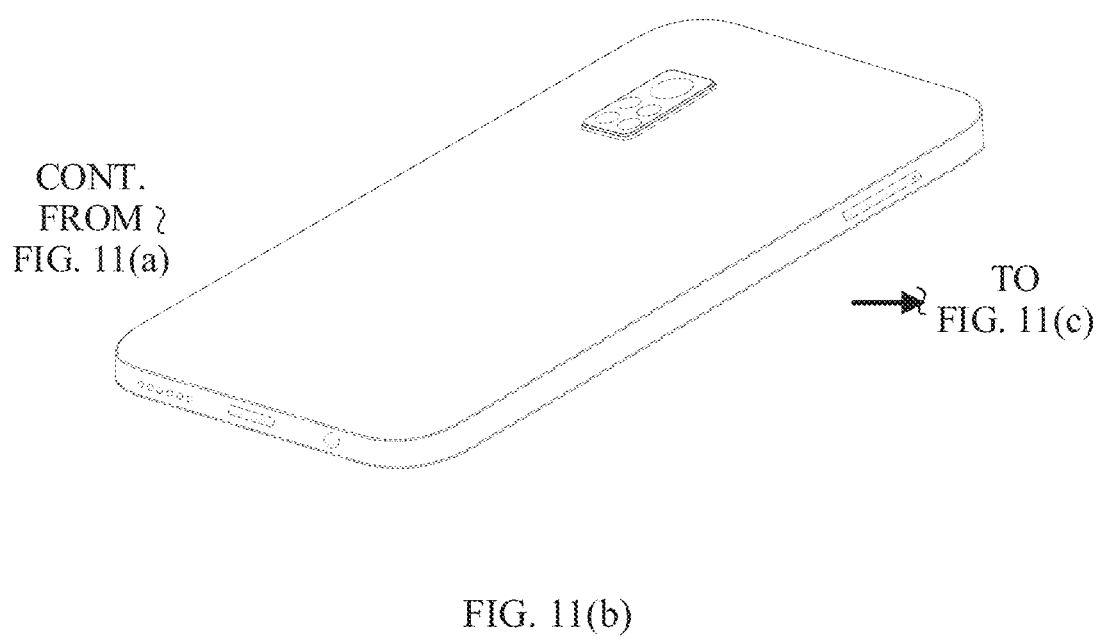
Figure 11C:
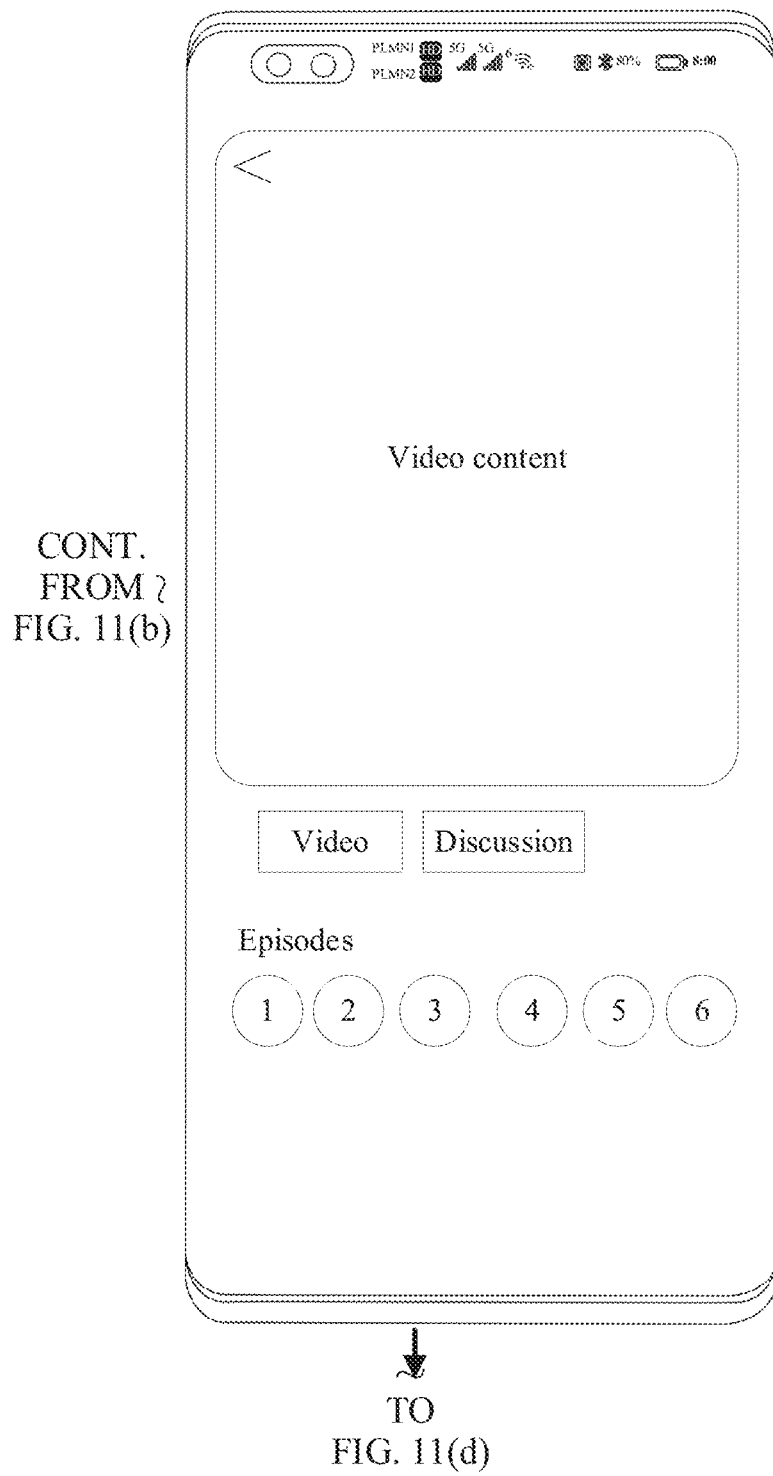
Figure 11D:
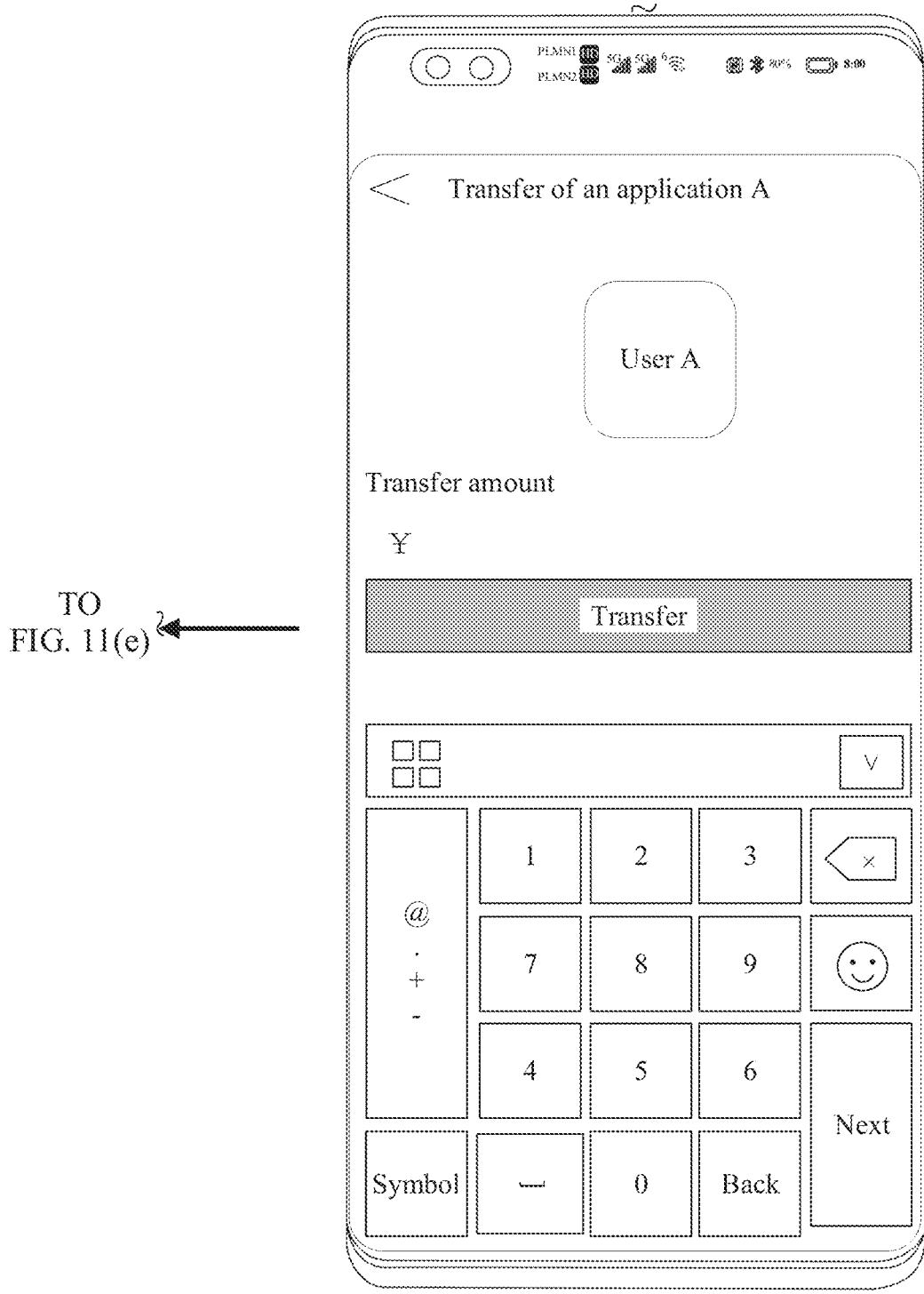
Figure 11E:
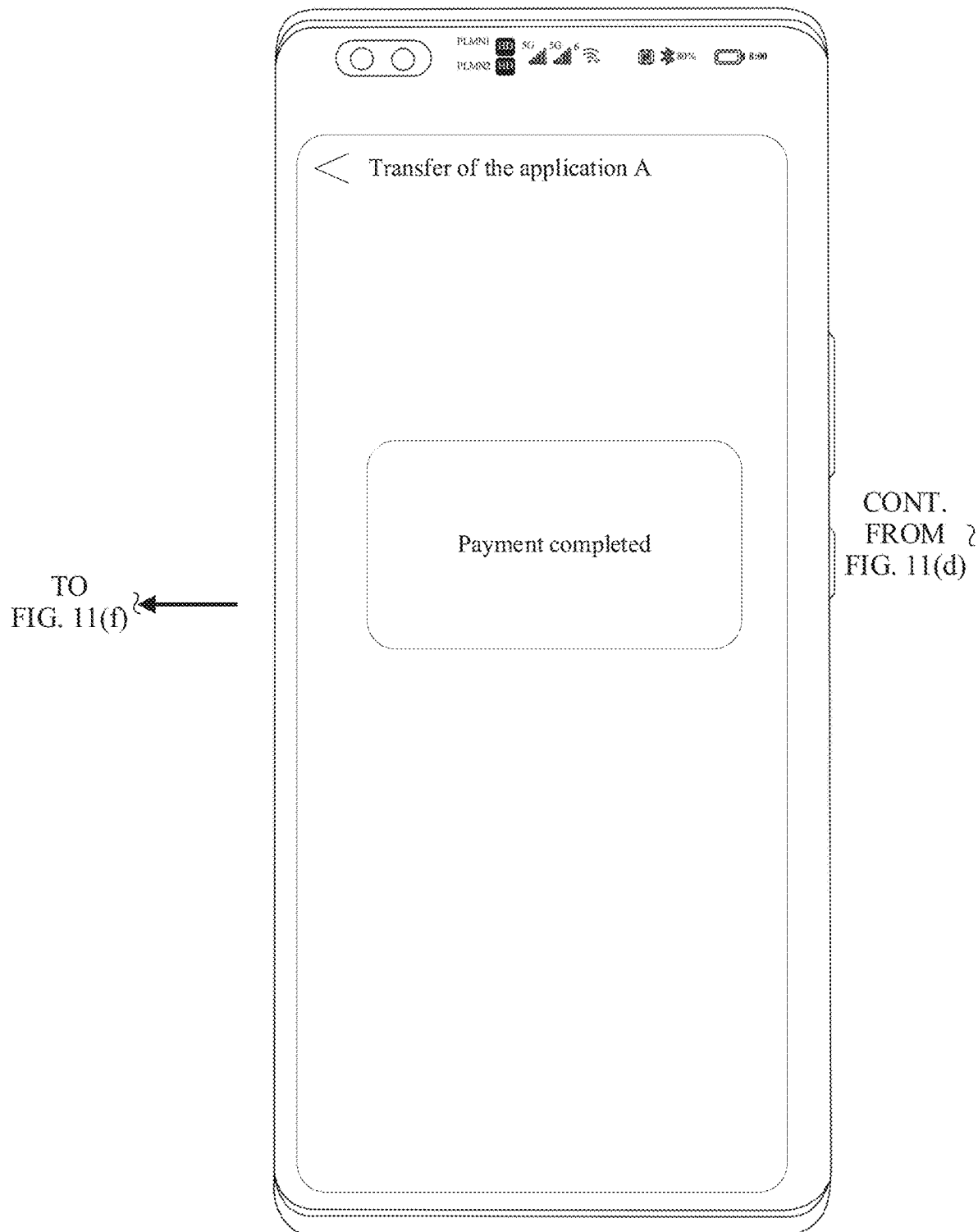
Figure 11F:
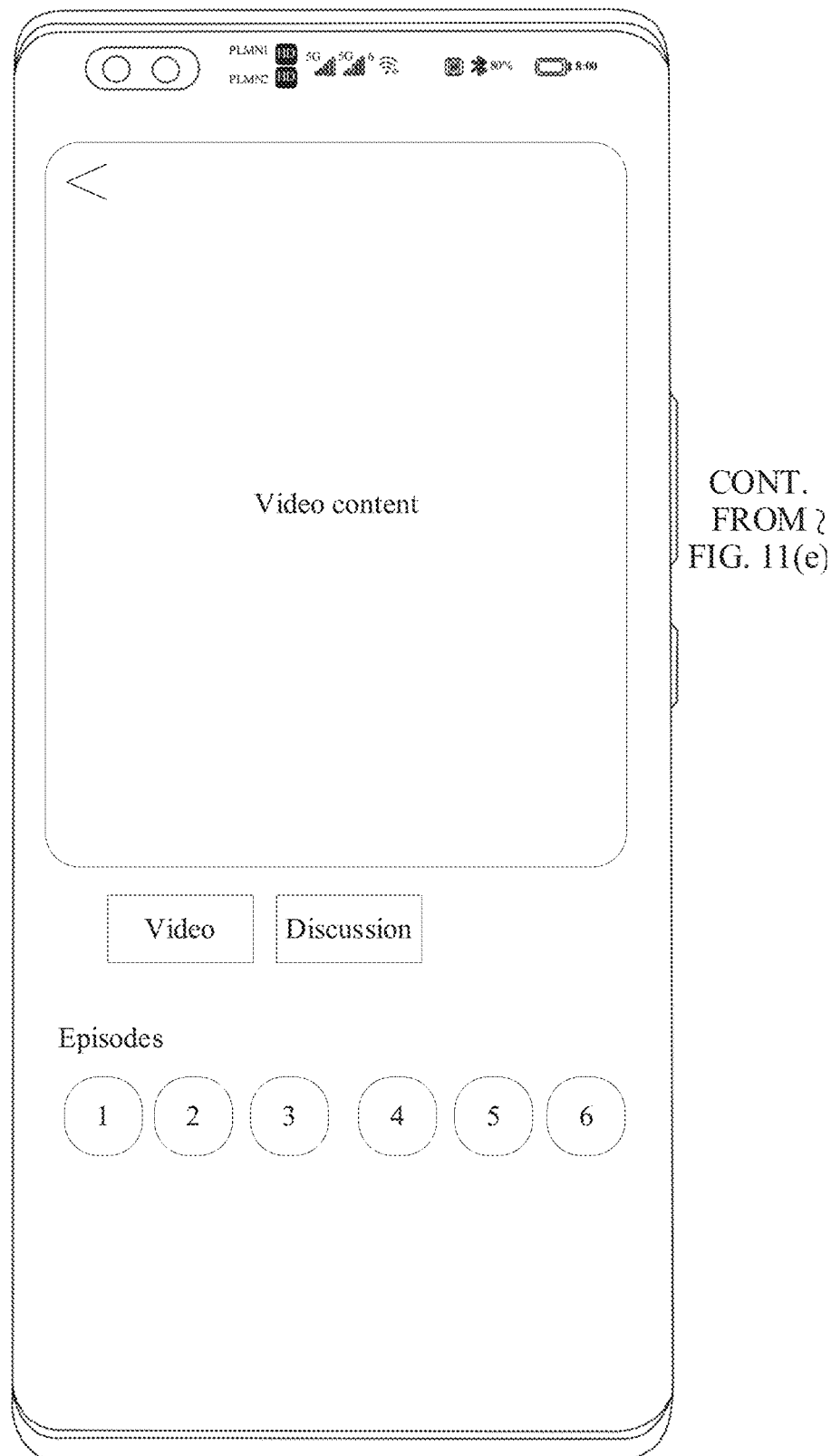

For example, FIG. 11(a), FIG. 11(b), FIG. 11(c), FIG. 11(d), FIG. 11(e), and FIG. 11(f) are a schematic diagram 1 of an interface of another two-dimensional code recognition method according to an embodiment of this application. As shown in FIG. 11(a), the terminal device is running another application, for example, the terminal device is running a video application. In this case, the screen orientation of the terminal device is upward ("upward" means the positive direction of the z-axis of the world coordinate system). As shown in FIG. 11(b), the user holding the terminal device turns a wrist, and the user turns a screen of the terminal device downward (a negative direction of the z-axis of the world coordinate system). Further, in the manner provided in this embodiment, if it is determined that the terminal device is in the screen-on unlocked state, the terminal device is in the proximity light unshielded state (an unnecessary condition), the screen orientation is not upward, a wrist is turned, the terminal device falls within a preset geofencing range (an unnecessary condition), and the value represented by the ambient light information is greater than or equal to the third preset threshold (an unnecessary condition), the terminal device turns on the front-facing camera to capture an image, and recognizes a two-dimensional code. Then, as shown in FIG. 11(c), the terminal device does not change the interface in FIG. 11(a), and still displays an interface of the application that the terminal device is running, but the terminal device calls the front-facing camera of the terminal device in the background to obtain an image. In the manner in this embodiment, the terminal device sequentially captures a low-frame rate image and a high-frame rate image in the background, and recognizes a two-dimensional code. Then, after the terminal device recognizes two-dimensional code information, as shown in FIG. 11(d), the terminal device directly calls an interface corresponding to the two-dimensional code information, for example, displays a transfer interface of an application A. As shown in FIG. 11(e), the terminal device displays a prompt "Payment completed" after the terminal device determines that processing of a transfer task of the application A is completed. As shown in FIG. 11(f), after determining a task, the terminal device automatically closes the application that is pulled up, and the terminal device displays the initially running video application.

Figure 12A:
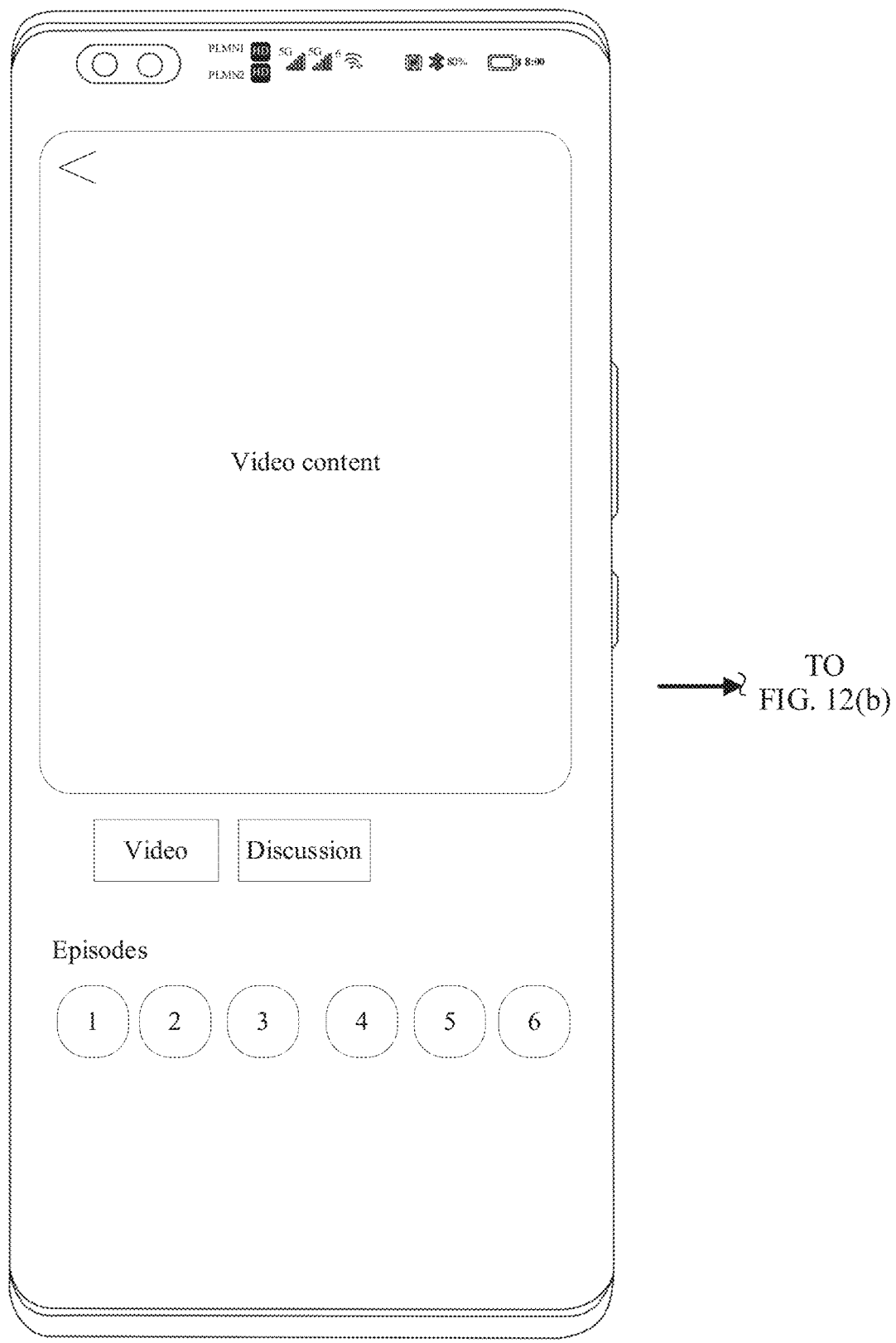
FIG. 12(a), FIG. 12(b), FIG. 12(c), FIG. 12(d), FIG. 12(e), and FIG. 12(f) are a schematic diagram 2 of an interface of a two-dimensional code recognition method according to an embodiment of this application.
Figure 12B:
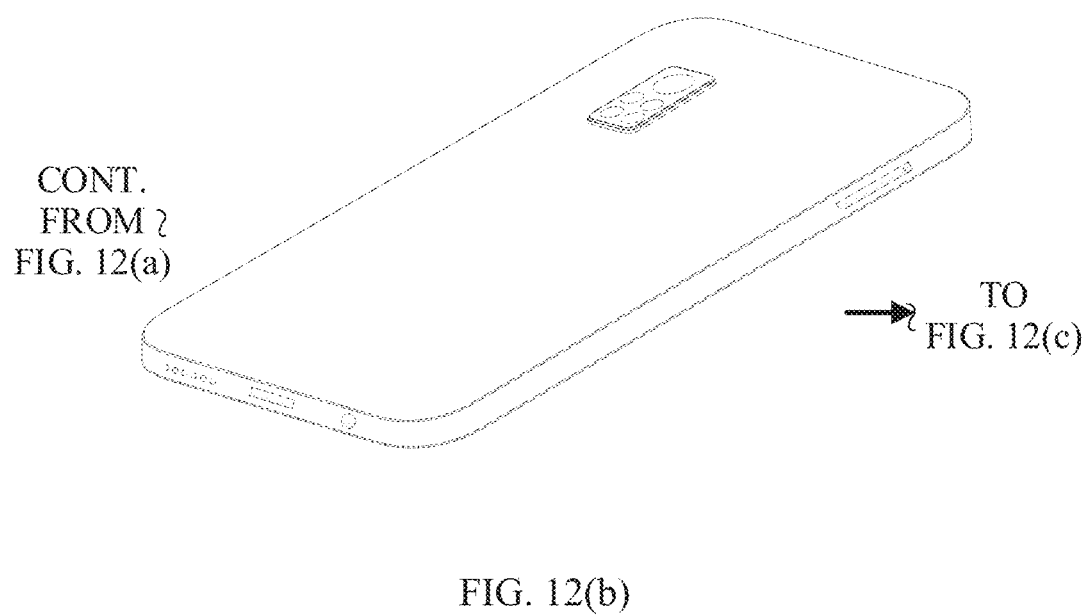
Figure 12C:
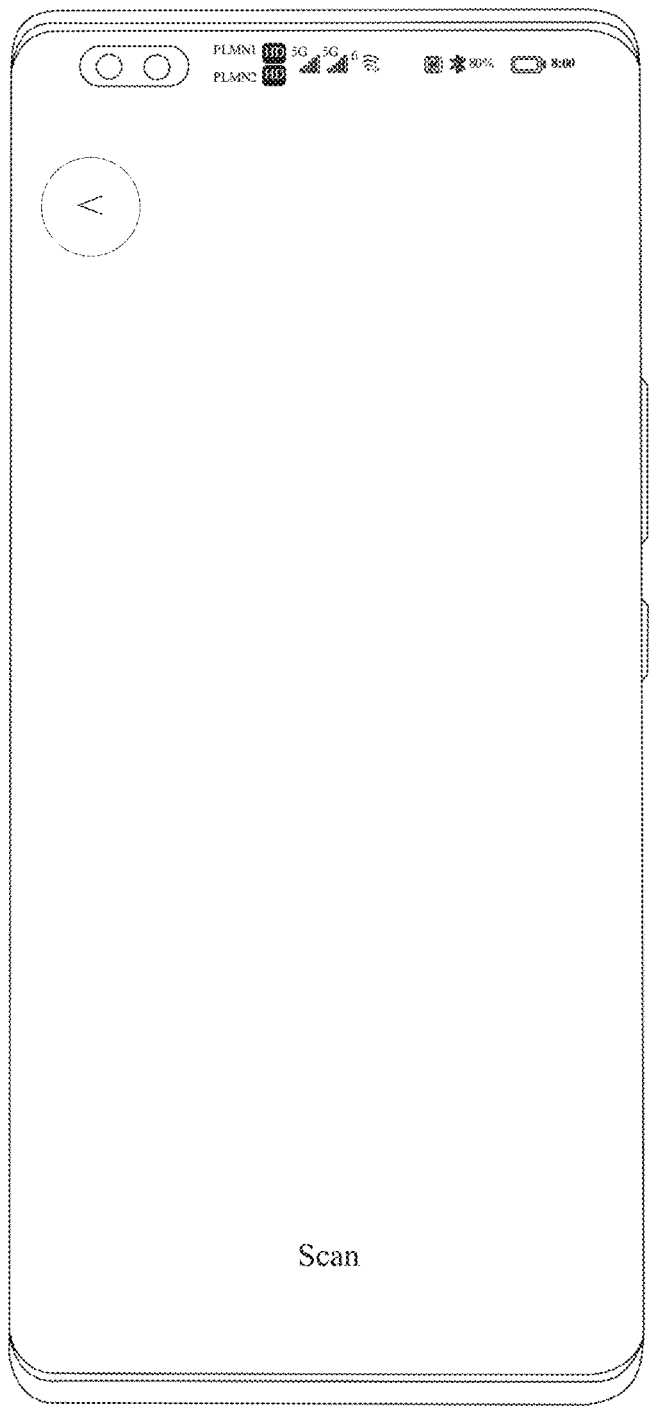
Figure 12D:
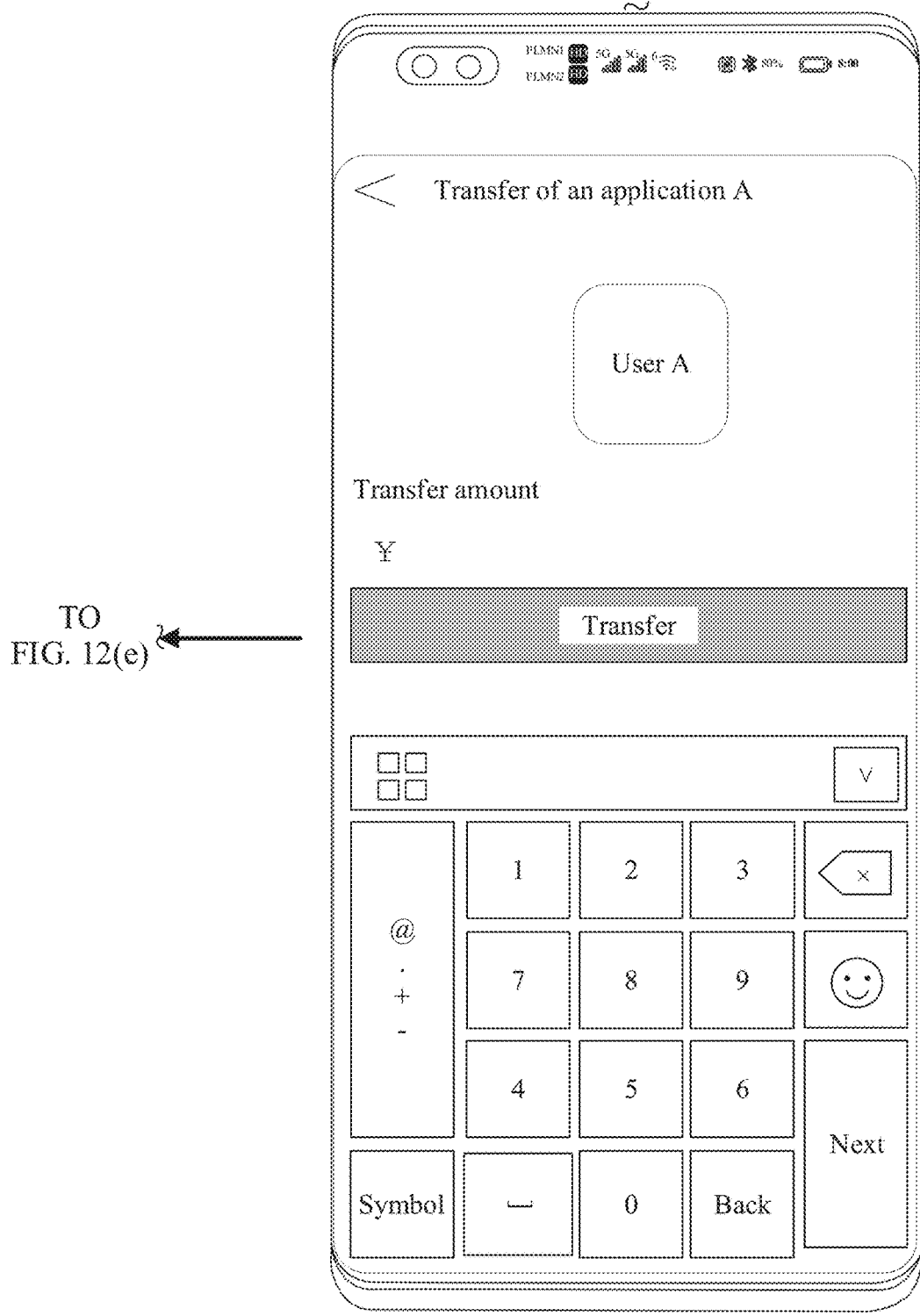
Figure 12E:
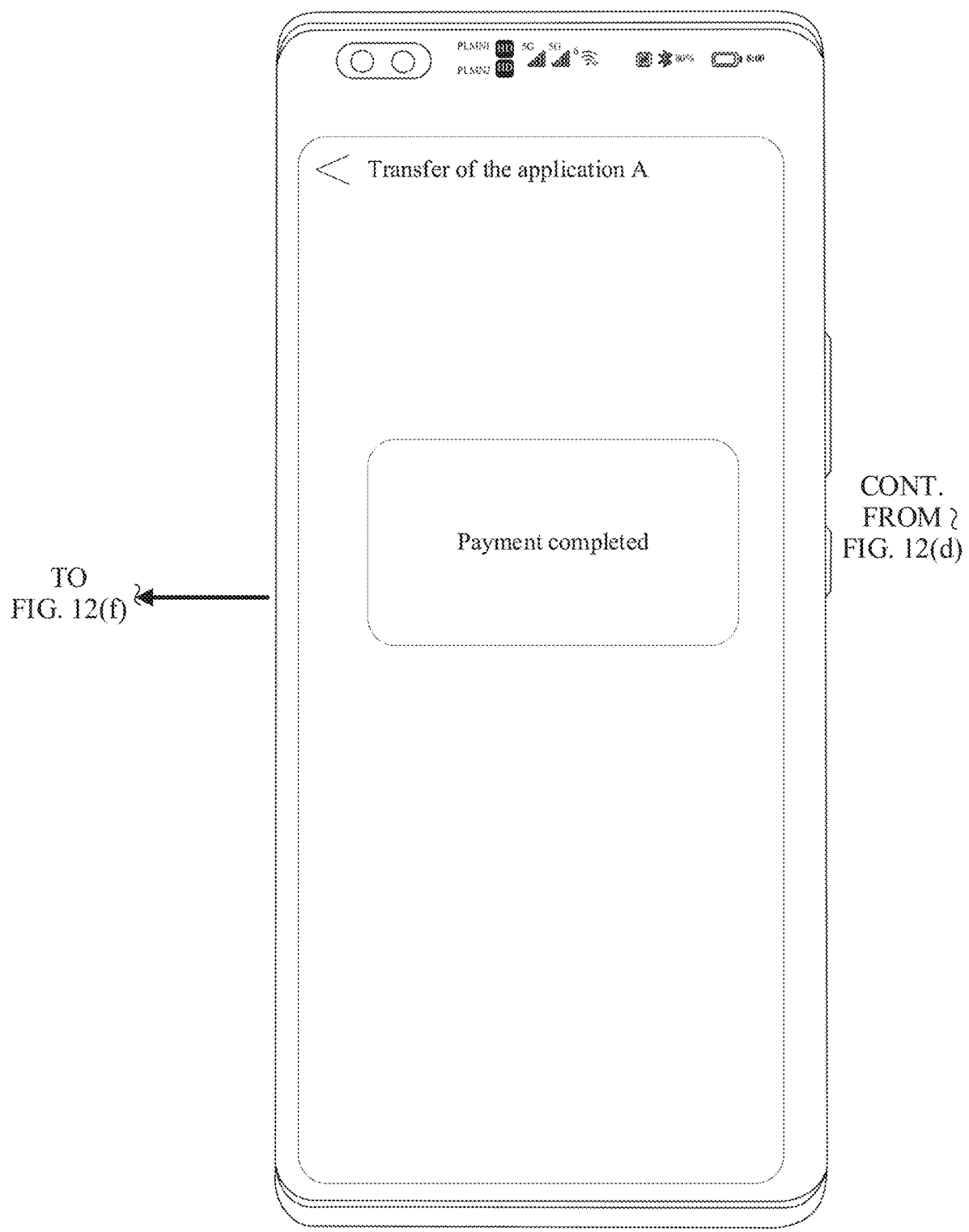
Figure 12F:
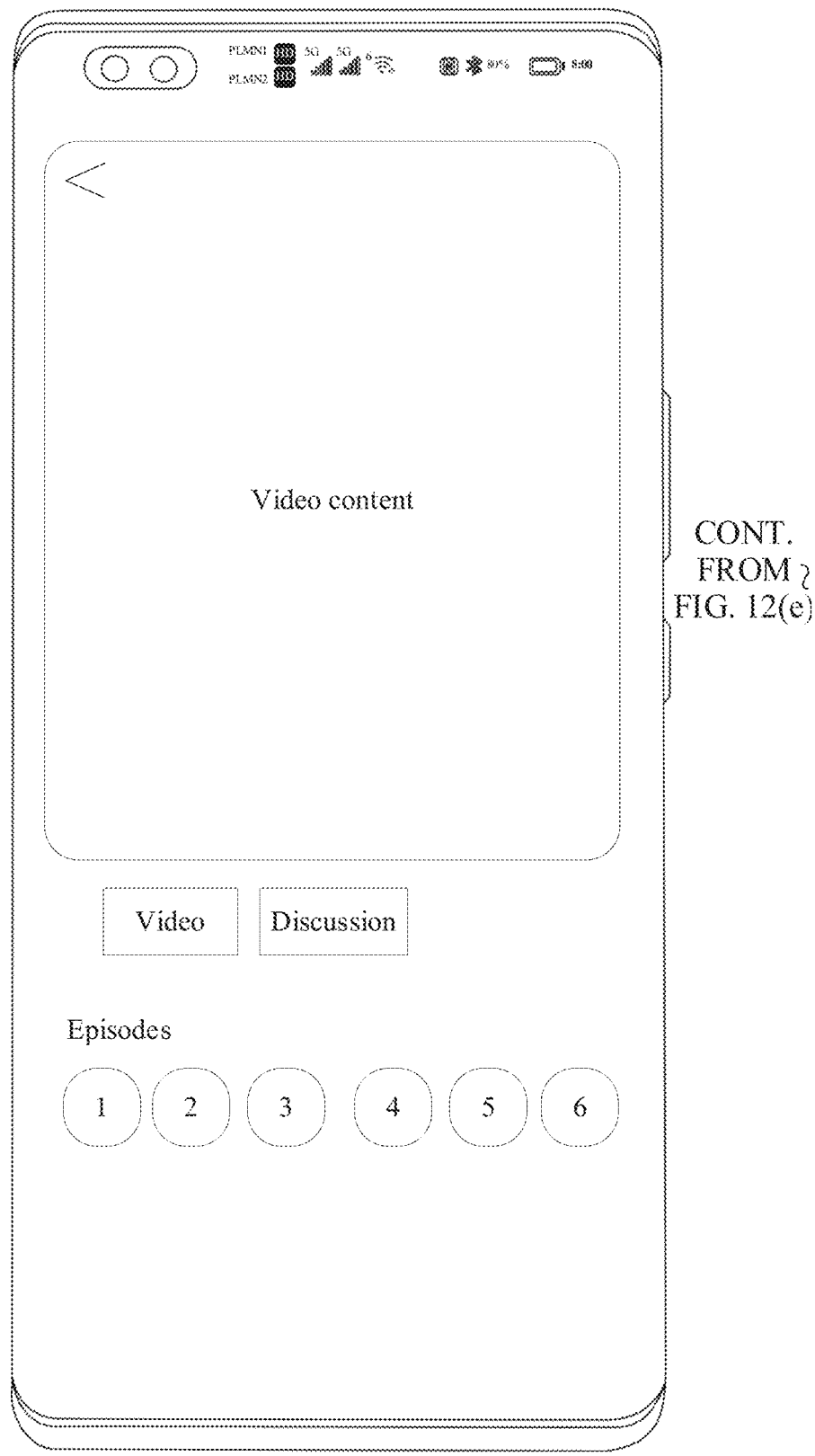

For example, FIG. 12(a), FIG. 12(b), FIG. 12(c), FIG. 12(d), FIG. 12(e), and FIG. 12(f) are a schematic diagram 2 of an interface of a two-dimensional code recognition method according to an embodiment of this application. As shown in FIG. 12(a), the terminal device is running another application, for example, the terminal device is running a video application. In this case, the screen orientation of the terminal device is upward ("upward" means the positive direction of the z-axis of the world coordinate system). As shown in FIG. 12(b), the user holding the terminal device turns a wrist, and the user turns a screen of the terminal device downward (a negative direction of the z-axis of the world coordinate system). Further, in the manner provided in this embodiment, if it is determined that the terminal device is in the screen-on unlocked state, the terminal device is in the proximity light unshielded state (an unnecessary condition), the screen orientation is not upward, a wrist is turned, the terminal device falls within a preset geofencing range (an unnecessary condition), and the value represented by the ambient light information is greater than or equal to the third preset threshold (an unnecessary condition), the terminal device turns on the front-facing camera to capture an image, and recognizes a two-dimensional code. As shown in FIG. 12(c), the terminal device calls the front-facing camera of the terminal device to obtain an image. In the manner in this embodiment, the terminal device sequentially captures a low-frame rate image and a high-frame rate image in the background, and recognizes a two-dimensional code. The terminal device may display a code scanning interface. Then, after the terminal device recognizes two-dimensional code information, as shown in FIG. 12(d), the terminal device directly calls an interface corresponding to the two-dimensional code information, for example, displays a transfer interface of an application A. As shown in FIG. 12(e), the terminal device displays a prompt "Payment completed" after the terminal device determines that processing of a transfer task of the application A is completed. As shown in FIG. 12(f), after determining a task, the terminal device automatically closes the application that is pulled up, and the terminal device displays the initially running video application.

Figure 13A:
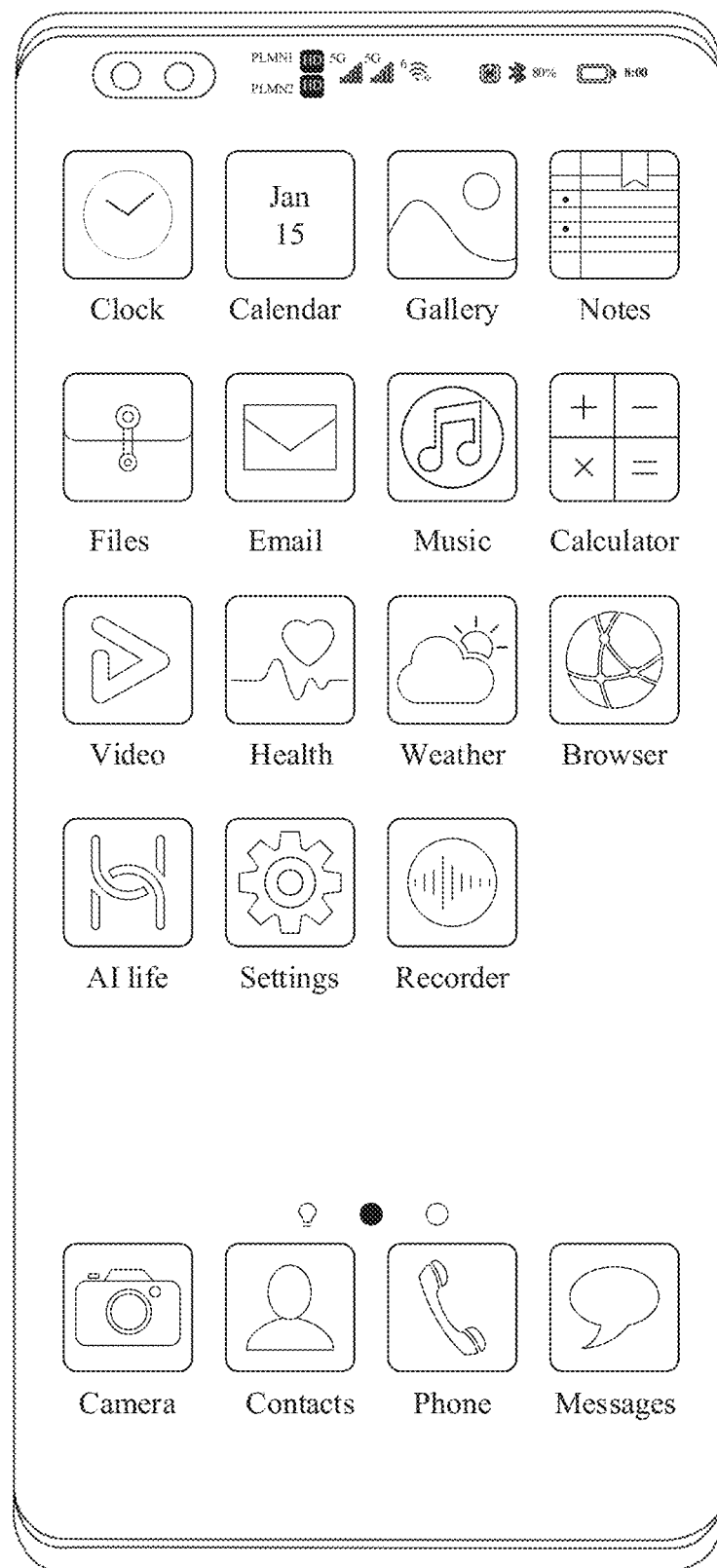
FIG. 13(a), FIG. 13(b), FIG. 13(c), FIG. 13(d), FIG. 13(e), and FIG. 13(f) are a schematic diagram 3 of an interface of another two-dimensional code recognition method according to an embodiment of this application.
Figures 13A, 13B, 13C:
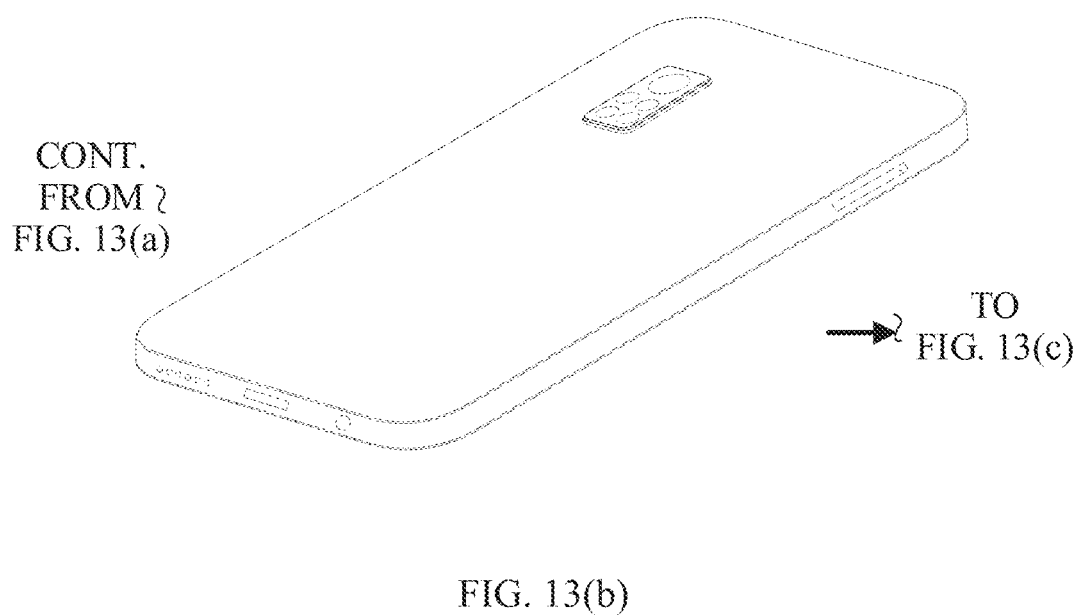
Figure 13C:
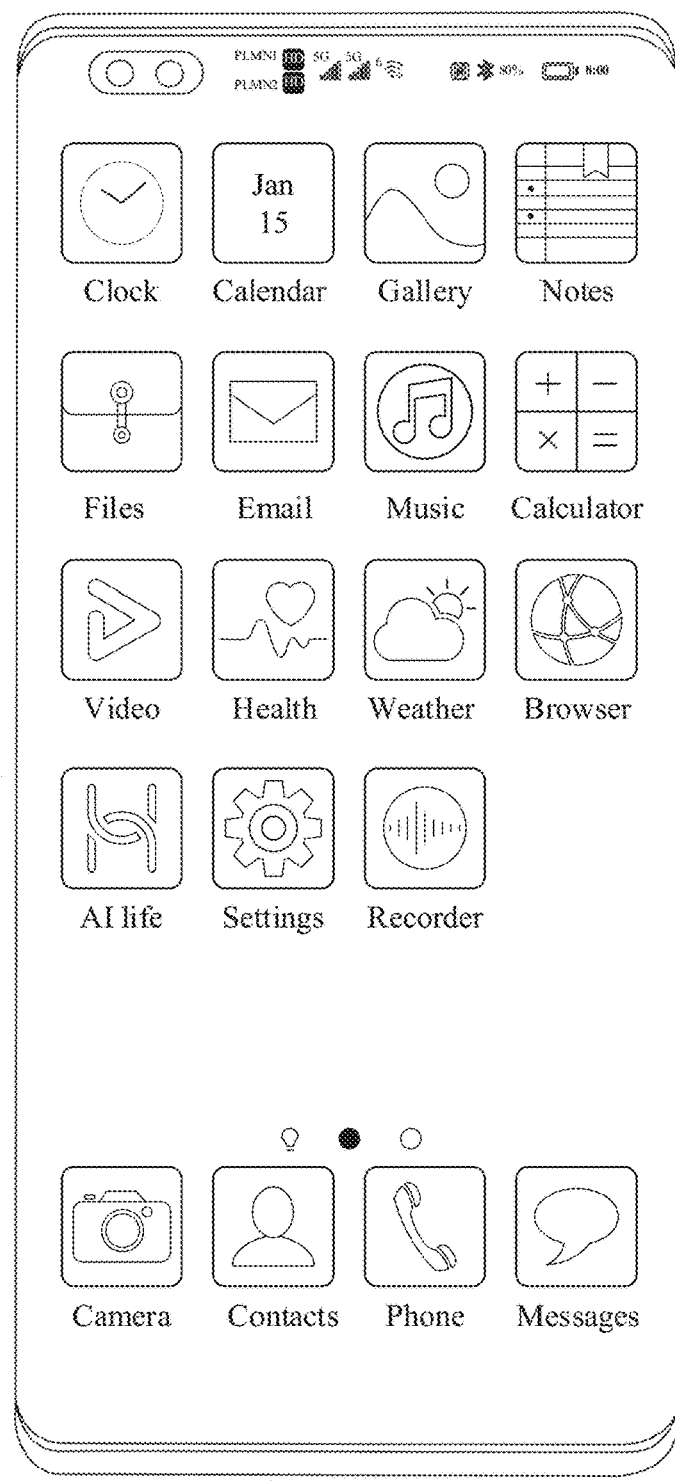
Figure 13D:
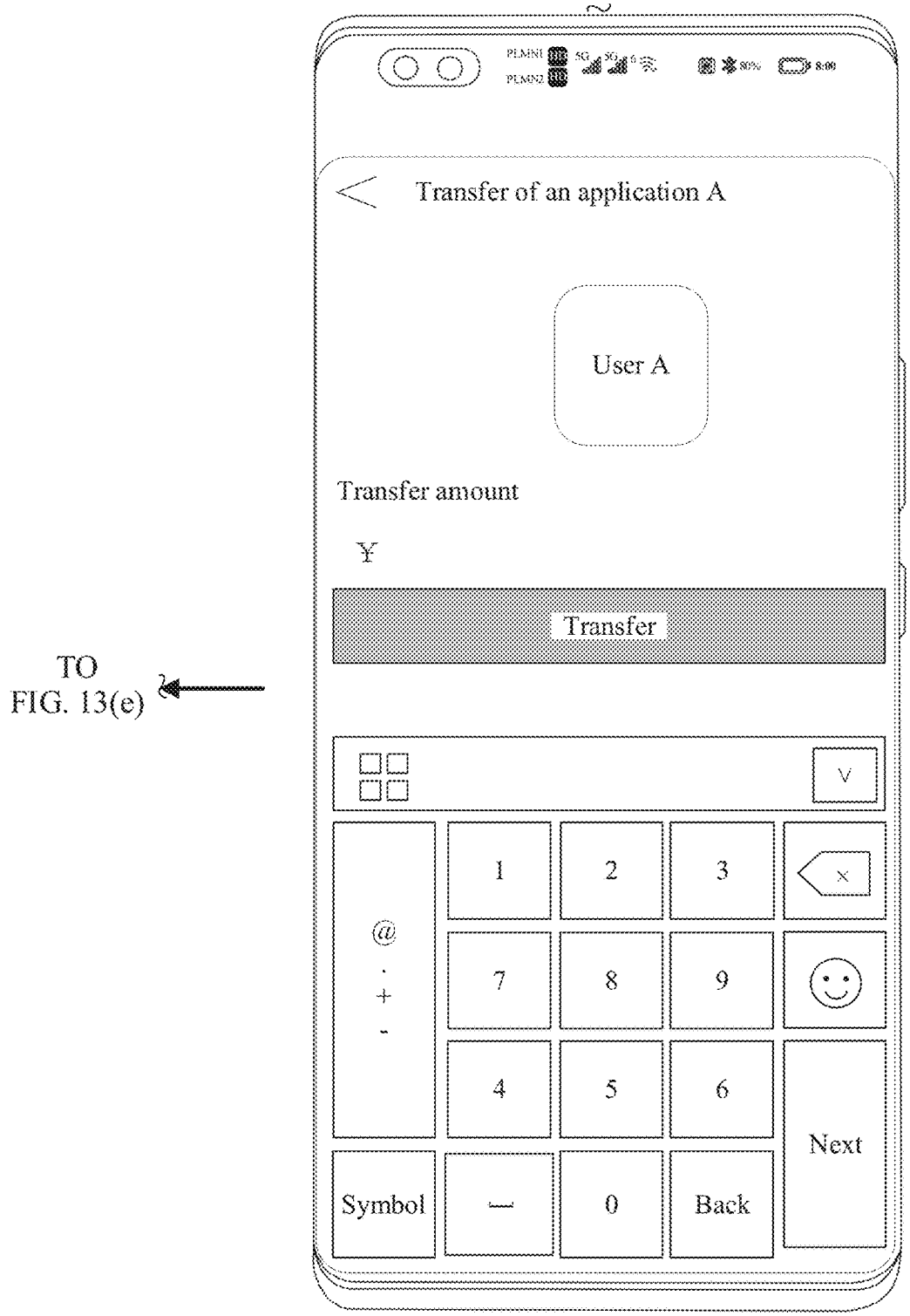
Figure 13E:
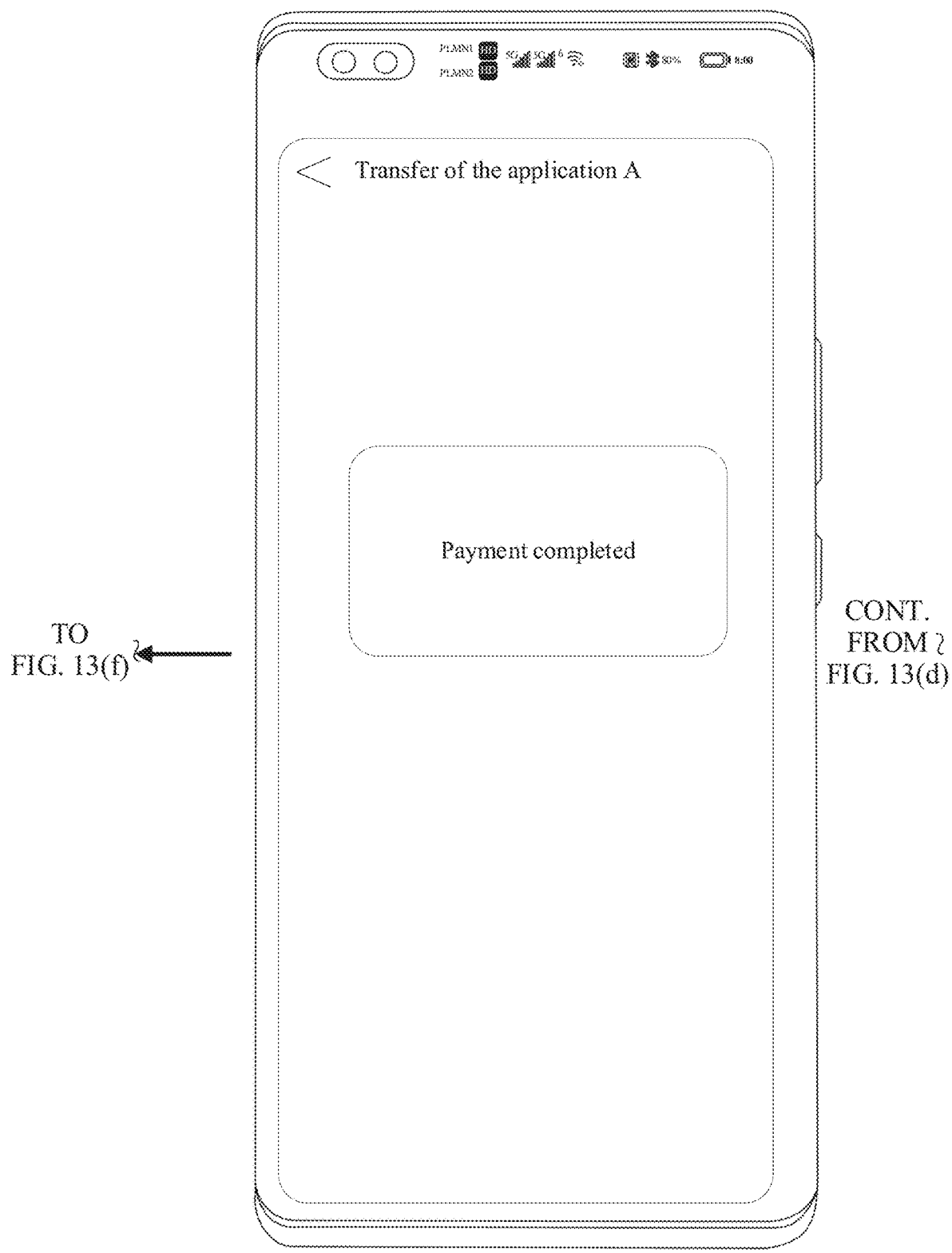
Figure 13F:
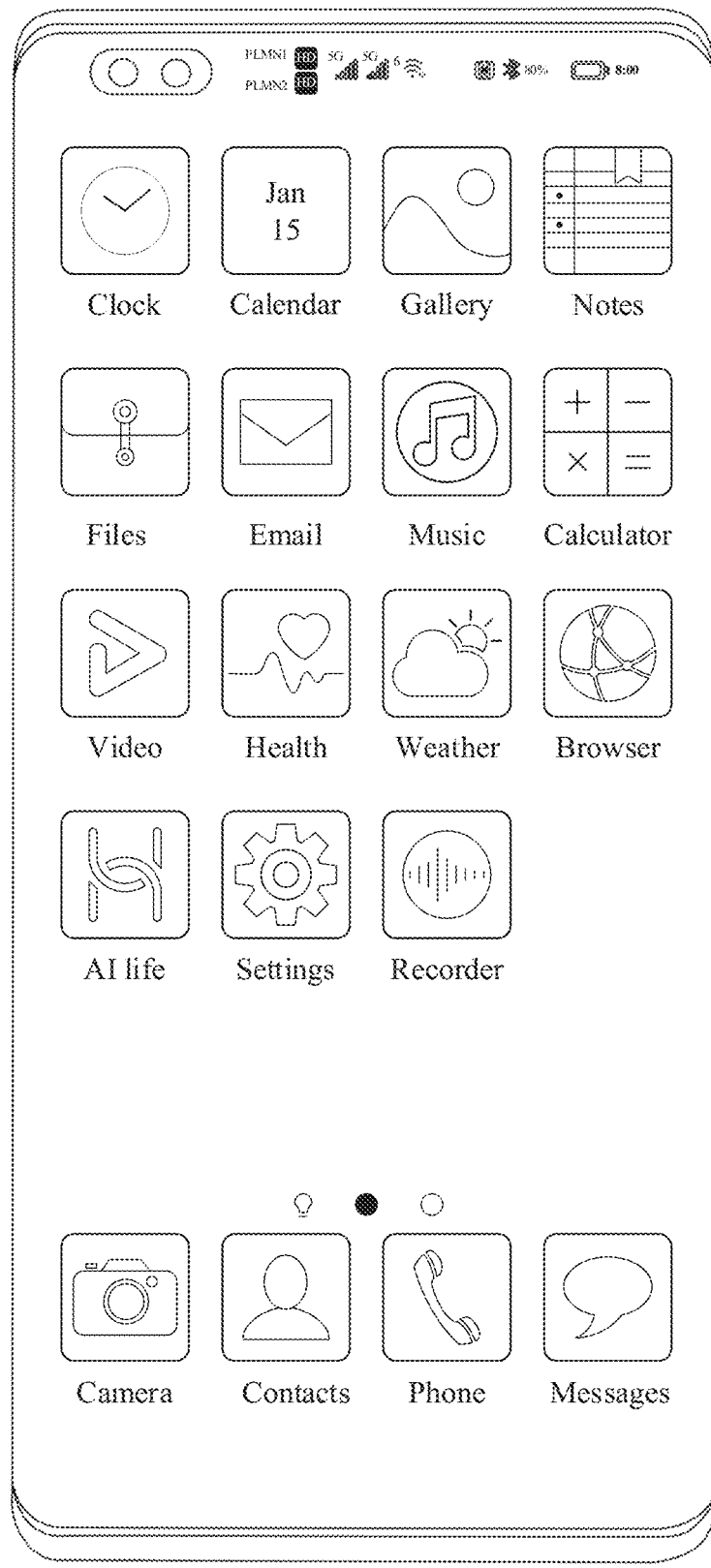
Figure 14A:
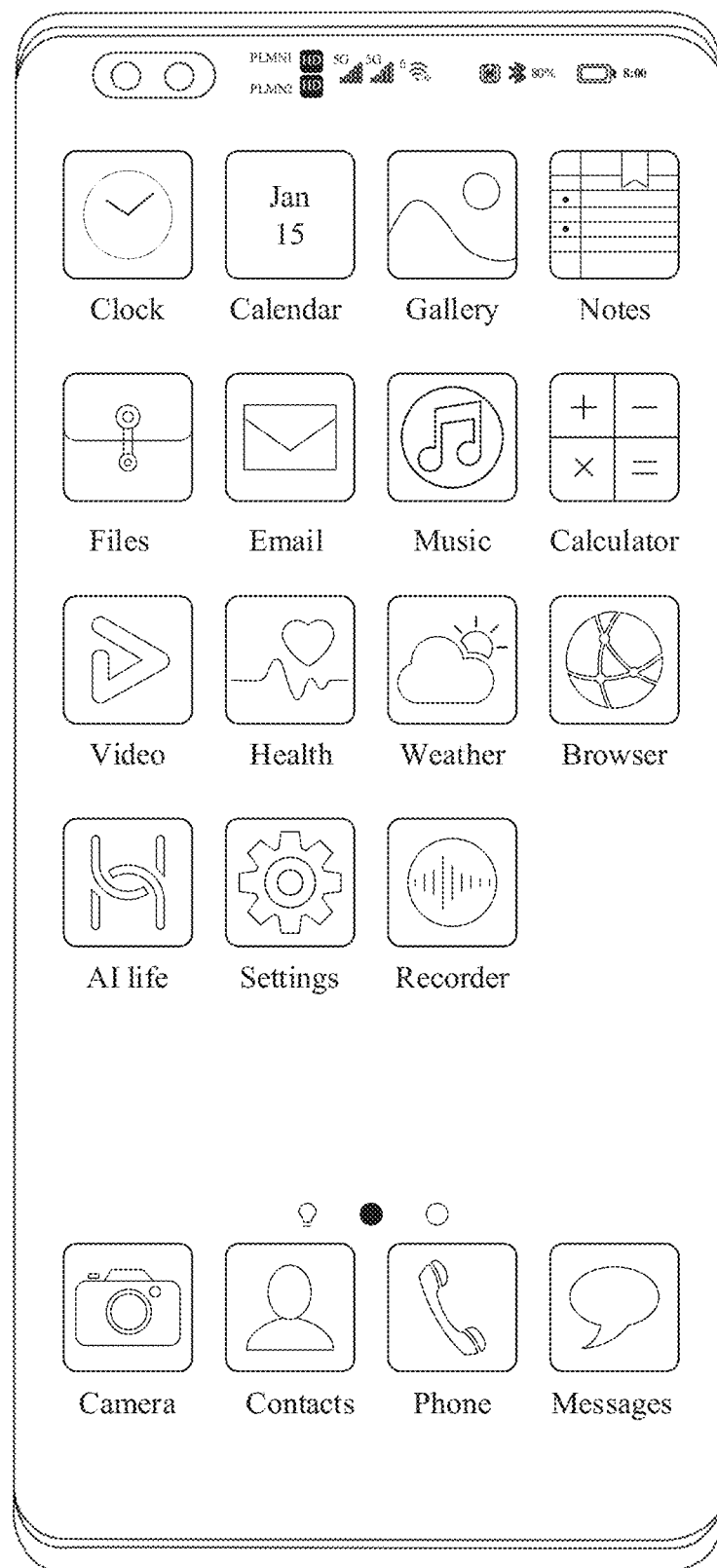
FIG. 14(a), FIG. 14(b), FIG. 14(c), FIG. 14(d), FIG. 14(e), and FIG. 14(f) are a schematic diagram 4 of an interface of another two-dimensional code recognition method according to an embodiment of this application.
Figure 14B:
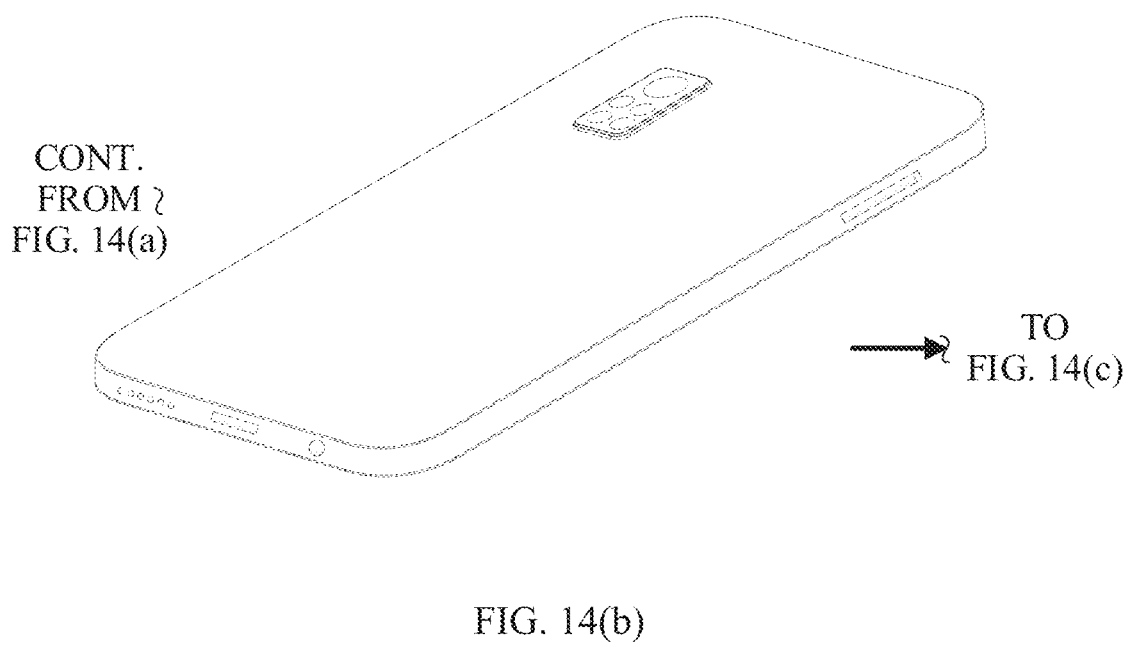
Figure 14C:
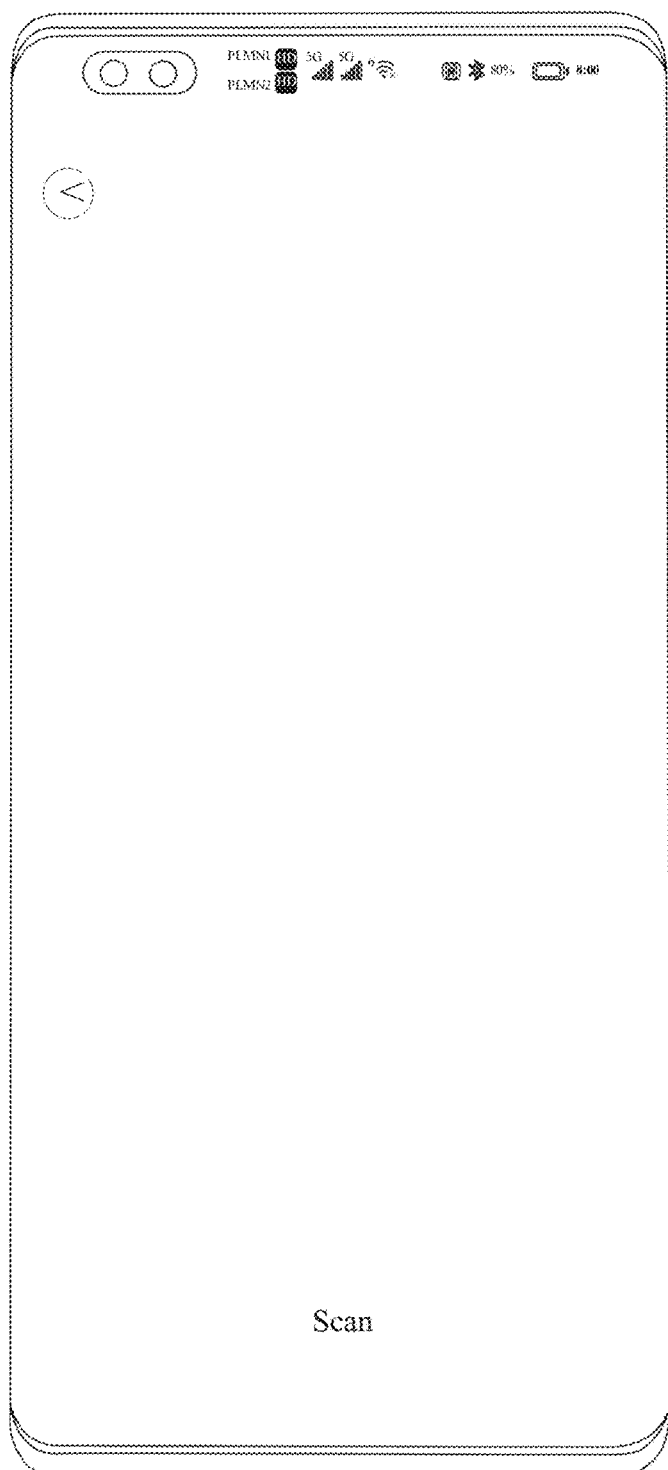
Figure 14D:
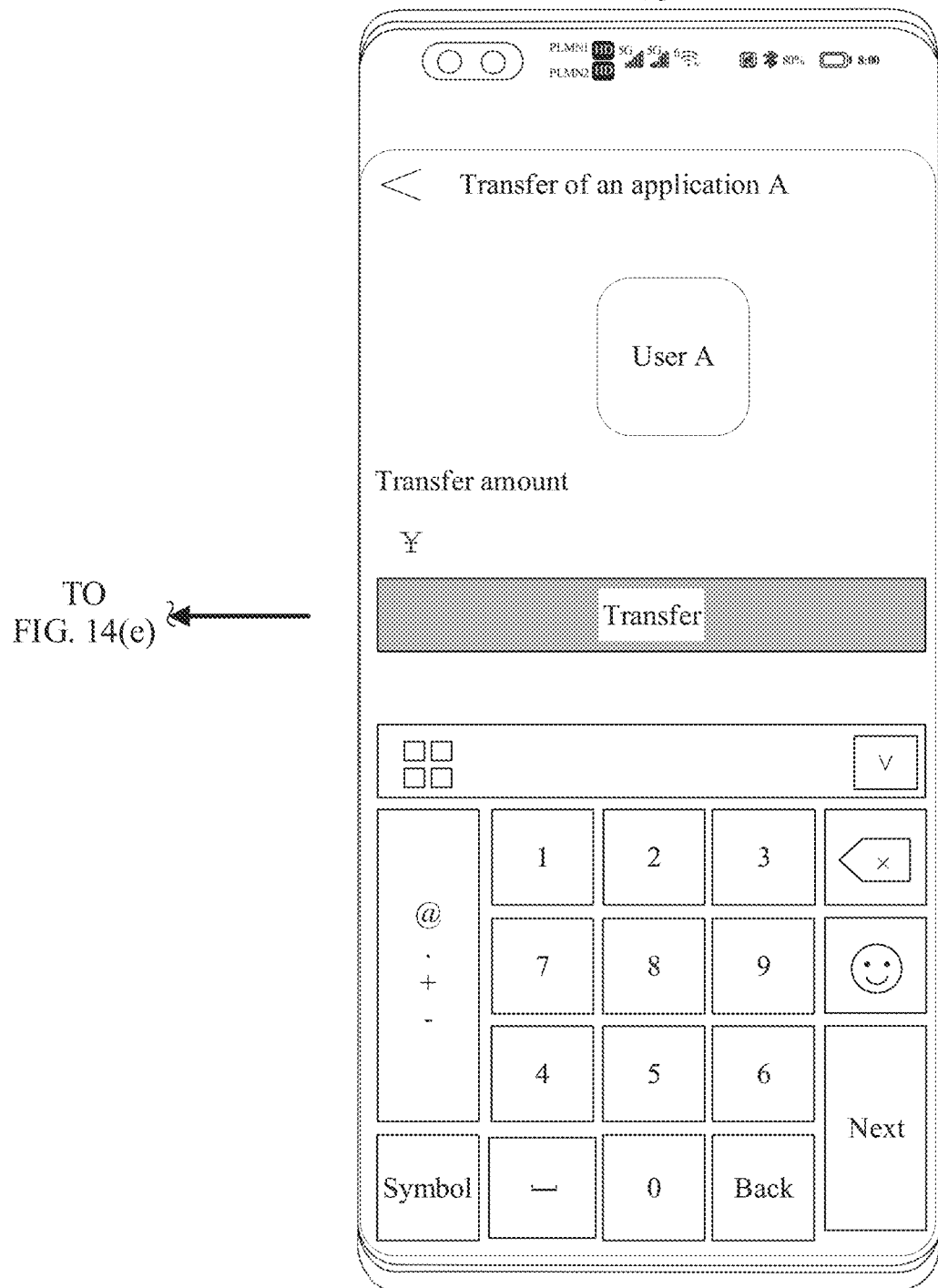
Figure 14E:
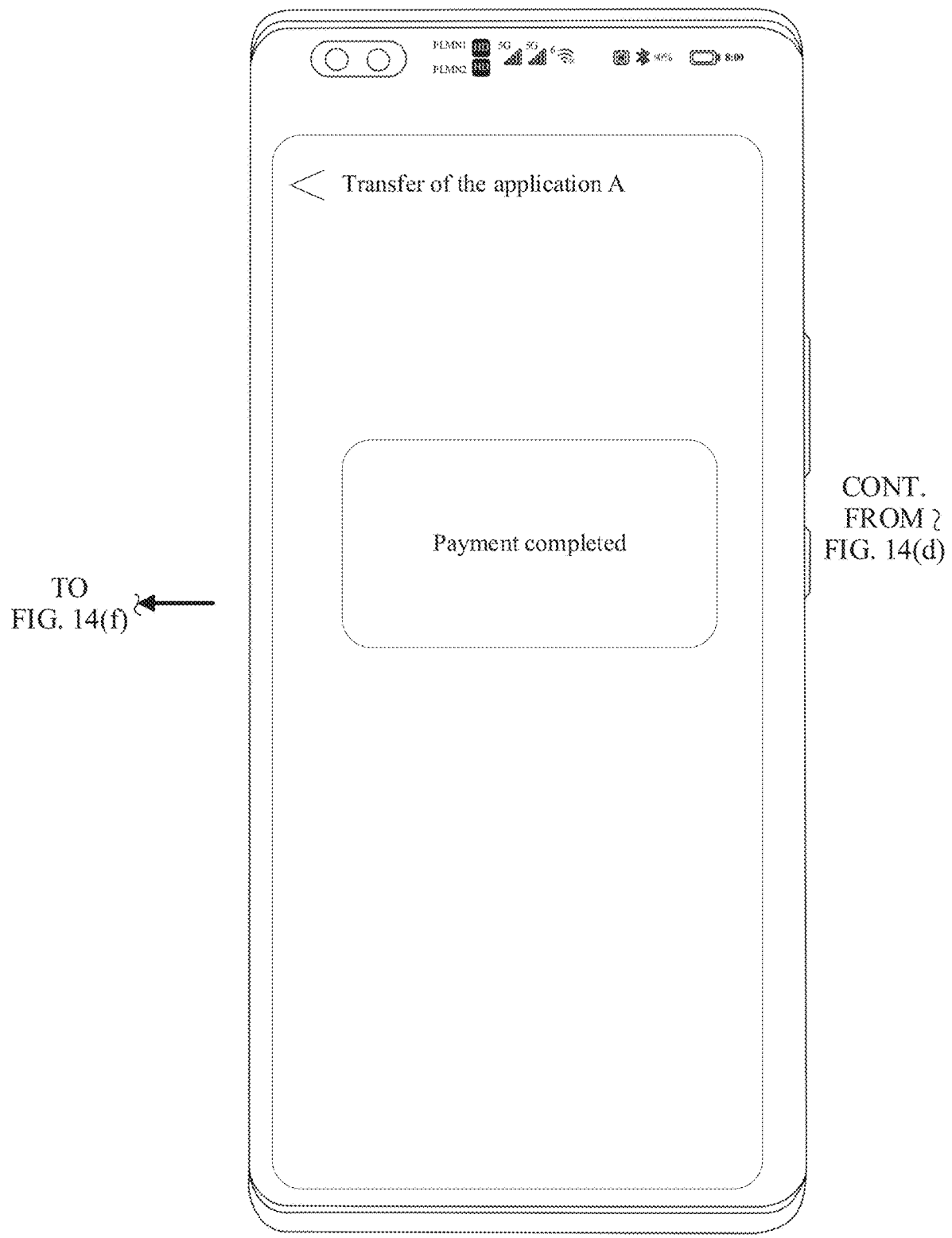
Figure 14F:
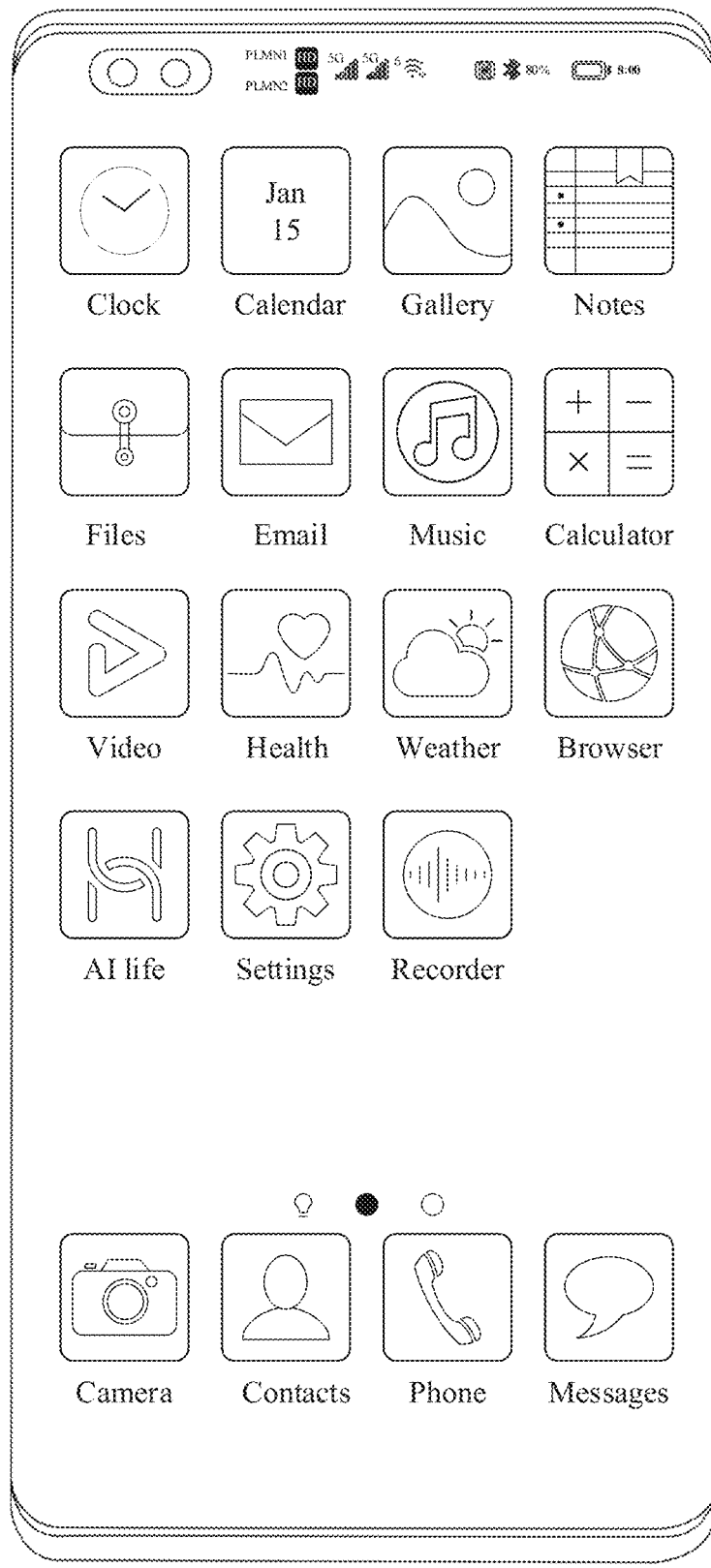

For example, FIG. 13(a), FIG. 13(b), FIG. 13(c), FIG. 13(d), FIG. 13(e), and FIG. 13(f) are a schematic diagram 3 of an interface of another two-dimensional code recognition method according to an embodiment of this application. As shown in FIG. 13(a), the terminal device is in the desktop state, in other words, the terminal device does not run an application in the foreground. In this case, the screen orientation of the terminal device is upward ("upward" means the positive direction of the z-axis of the world coordinate system). As shown in FIG. 13(*b*), the user holding the terminal device turns a wrist, and the user turns a screen of the terminal device downward (a negative direction of the z-axis of the world coordinate system). Further, in the manner provided in this embodiment, if it is determined that the terminal device is in the screen-on unlocked state, the terminal device is in the desktop state, the terminal device is in the proximity light unshielded state (an unnecessary condition), the screen orientation is not upward, a wrist is turned, the terminal device falls within a preset geofencing range (an unnecessary condition), and the value represented by the ambient light information is greater than or equal to the third preset threshold (an unnecessary condition), the terminal device turns on the front-facing camera to capture an image, and recognizes a two-dimensional code. As shown in FIG. 13(*c*), the terminal device does not change the interface in FIG. 13(*a*), and still displays a desktop of the terminal device, but the terminal device calls the front-facing camera of the terminal device in the background to obtain an image. In the manner in this embodiment, the terminal device sequentially captures a low-frame rate image and a high-frame rate image in the background, and recognizes a two-dimensional code. Then, after the terminal device recognizes two-dimensional code information, as shown in FIG. 13(*d*), the terminal device directly calls an interface corresponding to the two-dimensional code information, for example, displays a transfer interface of an application A. As shown in FIG. 13(*e*), the terminal device displays a prompt "Payment completed" after the terminal device determines that processing of a transfer task of the application A is completed. As shown in FIG. 13(*f*), after determining a task, the terminal device automatically closes the application that is pulled up, and the terminal device returns to the initial desktop state.

For example, FIG. 14(*a*), FIG. 14(*b*), FIG. 14(*c*), FIG. 14(*d*), FIG. 14(*e*), and FIG. 14(*f*) are a schematic diagram 4 of an interface of another two-dimensional code recognition method according to an embodiment of this application. As shown in FIG. 14(*a*), the terminal device is in the desktop state, in other words, the terminal device does not run an application in the foreground. In this case, the screen orientation of the terminal device is upward ("upward" means the positive direction of the z-axis of the world coordinate system). As shown in FIG. 14(*b*), the user holding the terminal device turns a wrist, and the user turns a screen of the terminal device downward (a negative direction of the z-axis of the world coordinate system). Further, in the manner provided in this embodiment, if it is determined that the terminal device is in the screen-on unlocked state, the terminal device is in the desktop state, the terminal device is in the proximity light unshielded state (an unnecessary condition), the screen orientation is not upward, a wrist is turned, the terminal device falls within a preset geofencing range (an unnecessary condition), and the value represented by the ambient light information is greater than or equal to the third preset threshold (an unnecessary condition), the terminal device turns on the front-facing camera to capture an image, and recognizes a two-dimensional code. As shown in FIG. 14(*c*), the terminal device does not change the interface in FIG. 14(*a*), and the terminal device calls the front-facing camera of the terminal device in the background to obtain an image. In the manner in this embodiment, the terminal device sequentially captures a low-frame rate image and a high-frame rate image in the background, and recognizes a two-dimensional code. The terminal device may display a code scanning interface. Then, after the terminal device recognizes two-dimensional code information, as shown in FIG. 14(*d*), the terminal device directly calls an interface corresponding to the two-dimensional code information, for example, displays a transfer interface of an application A. As shown in FIG. 14(*e*), the terminal device displays a prompt "Payment completed" after the terminal device determines that processing of a transfer task of the application A is completed. As shown in FIG. 14(*f*), after determining a task, the terminal device automatically closes the application that is pulled up, and the terminal device returns to the initial desktop state.

In this embodiment, based on the previous embodiment, the terminal device first captures a low-frame rate image based on the front-facing camera. If the terminal device determines that no suspected two-dimensional code image exists in the low-frame rate image, the terminal device does not need to recognize a two-dimensional code, so that resources of the terminal device are reduced, and power consumption of the terminal device is reduced. If the terminal device determines that a suspected two-dimensional code image exists in the low-frame rate image, the terminal device captures a high-frame rate image based on the front-facing camera, recognizes a two-dimensional code in the high-frame rate image, and further pulls up an application interface corresponding to the two-dimensional code. In addition, if the terminal device recognizes that the high-frame rate image includes a plurality of two-dimensional codes, an interactive manner may be provided for the user to select a two-dimensional code that needs to be processed.

Figure 15:
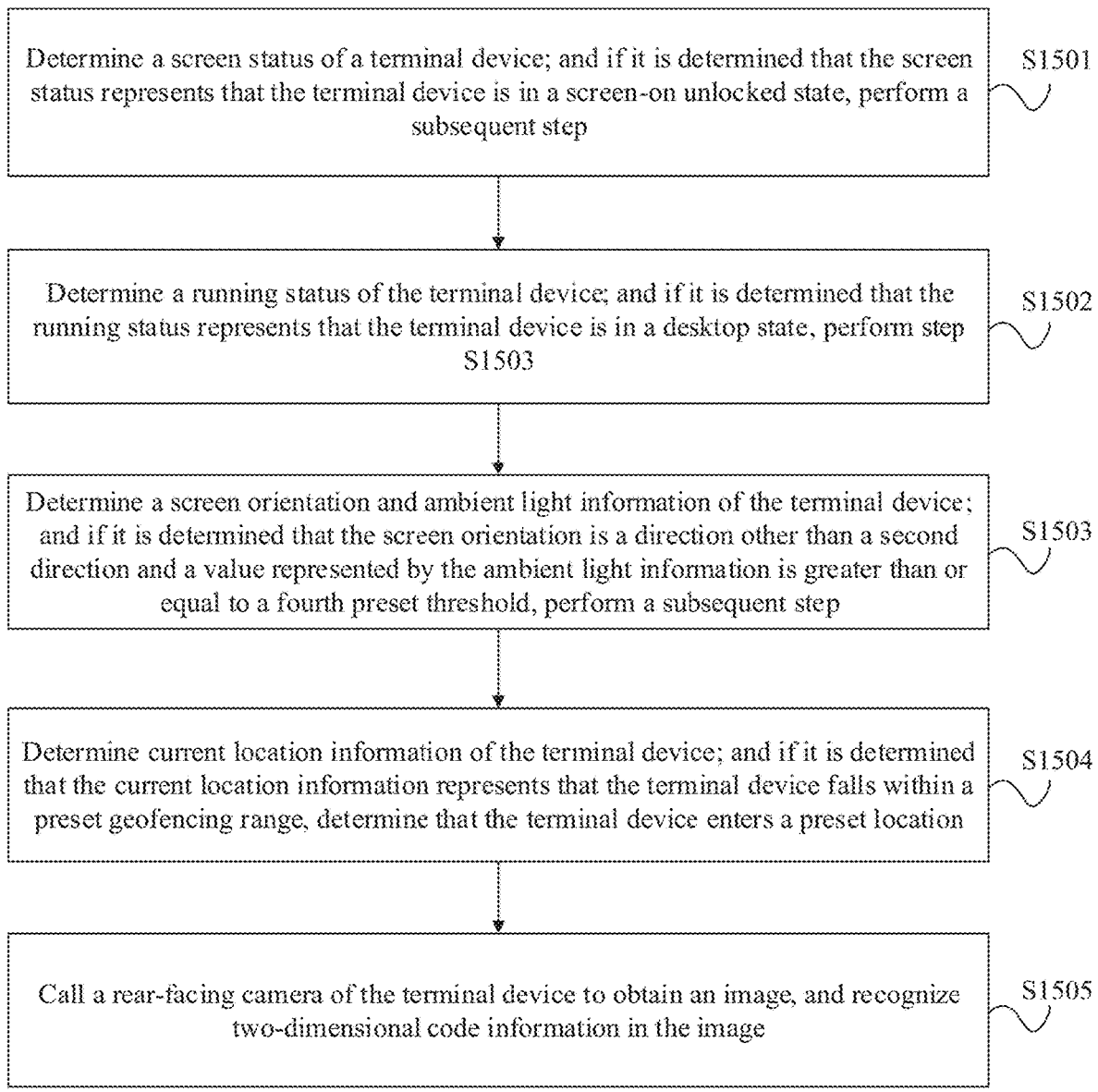
FIG. 15 is a schematic flowchart of still another two-dimensional code recognition method according to an embodiment of this application.

FIG. 15 is a schematic flowchart of still another two-dimensional code recognition method according to an embodiment of this application. As shown in FIG. 15, the method may include the following steps.

S1501: Determine a screen status of a terminal device; and if it is determined that the screen status represents that the terminal device is in a screen-on unlocked state, perform a subsequent step.

For example, this embodiment is executed by the terminal device, a processor in the terminal device, an apparatus disposed in the terminal device, or an electronic device. This is not limited. This embodiment is described by using the terminal device as an execution body.

The terminal device periodically obtains the screen status of the terminal device based on an application ("app") level. The terminal device determines, based on the screen status, whether the terminal device is in the screen-on unlocked state. For example, the terminal device may obtain a screen parameter by using a software interface. Because the screen parameter indicates that the terminal device is in a blank screen state, a screen-on locked state, or the screen-on unlocked state, the terminal device may obtain the screen status based on the obtained screen parameter.

If the terminal device determines that the screen status represents that the terminal device is in the screen-on unlocked state, the terminal device performs a subsequent step; otherwise, the terminal device performs step S1501 again after an interval of preset time. Therefore, when the terminal device determines that the terminal device is in the blank screen state or the screen-on locked state, the terminal device does not trigger a rear-facing camera to capture an image, so that a meaningless triggering action is avoided. The terminal device performs a subsequent action only when the terminal device determines that the terminal device is in the screen-on unlocked state, and calls, based on a subsequent determining process, the rear-facing camera to capture an image.

S1502: Determine a running status of the terminal device; and if it is determined that the running status represents that the terminal device is in a desktop state, perform step S1503.

For example, if the terminal device determines that the screen status represents that the terminal device is in the screen-on unlocked state, the terminal device needs to obtain a current running status of the terminal device. The terminal device needs to determine whether the running status of the terminal device is the desktop state. Being in the desktop state means that the terminal device currently runs a desktop application, and there are no other applications in the foreground.

For example, the terminal device may obtain a running parameter by using the software interface. Because the running parameter indicates that the terminal device is in the desktop state or an application running state, the terminal device may determine, based on the running parameter, whether the terminal device is in the desktop state.

If the terminal device determines that the running status of the terminal device represents that the terminal device is in the desktop state, the terminal device performs a subsequent step; otherwise, the terminal device performs step S1501 again after an interval of preset time. If another application is interrupted to call the rear-facing camera when the terminal device runs the another application in the foreground, running of the another application may be abnormal. The terminal device performs a subsequent action only when determining that the terminal device is in the desktop state, and calls, based on a subsequent determining process, the rear-facing camera to capture an image, so that another application or the terminal device is prevented from being abnormal if running of the another application is directly interrupted when the terminal device runs the another application in the foreground.

Step S1502 is an optional step. After step S1501, if it is determined that the screen status represents that the terminal device is in the screen-on unlocked state, step S1503 may be performed. Alternatively, after step S1502, if it is determined that the running status represents that the terminal device is in the desktop state, step S1503 may be performed.

S1503: Determine a screen orientation and ambient light information of the terminal device; and if it is determined that the screen orientation is a direction other than a second direction and a value represented by the ambient light information is greater than or equal to a fourth preset threshold, perform a subsequent step.

The second direction is a negative direction of a z-axis of a world coordinate system.

For example, after step S1501, step S1502, or step S1503, the terminal device obtains the screen orientation and the ambient light information of the terminal device.

A gyroscope sensor is disposed in the terminal device. The gyroscope sensor in the terminal device collects angle data at a current moment, and the terminal device may directly determine the screen orientation of the terminal device based on an angle indicated by the angle data. For example, the gyroscope sensor collects xyz-axis data at the current moment. The terminal device obtains the xyz-axis data collected by the gyroscope sensor, and then the terminal device determines, based on the xyz-axis data, whether the screen orientation of the terminal device is not the negative direction of the z-axis of the world coordinate system, in other words, determines whether the screen orientation of the terminal device is not downward.

In this embodiment, that the screen orientation of the terminal device is "upward" means that a screen of the terminal device faces "a positive direction of the z-axis of the world coordinate system". A first direction is the positive direction of the z-axis of the world coordinate system.

That the screen orientation of the terminal device is "downward" means that the screen of the terminal device faces "the negative direction of the z-axis of the world coordinate system". The second direction is the negative direction of the z-axis of the world coordinate system.

An ambient light sensor is disposed in the terminal device, and the ambient light sensor may obtain ambient light data of the terminal device. The terminal device obtains, at a sensorhub level of a service execution environment (SEE), the ambient light data collected by the ambient light sensor. Then the terminal device obtains ambient light information based on ambient light data at a current moment. The ambient light information represents an ambient light value of the terminal device at the current moment. Then the terminal device determines whether a value represented by the ambient light information is greater than or equal to a third preset threshold. If the terminal device determines that the value represented by the ambient light information is greater than or equal to the third preset threshold, the terminal device determines that an environment in which the terminal device is located is not a relatively dark environment, to ensure that the rear-facing camera of the terminal device can capture a clear image, and the terminal device performs a subsequent step; or if the terminal device determines that the value represented by the ambient light information is less than the third preset threshold, the terminal device determines that an environment in which the terminal device is located is not a relatively dark environment.

For example, the third preset threshold is 10 lux.

Based on the foregoing principle, the terminal device determines that the screen orientation is a direction other than the second direction, and determines that the screen orientation of the terminal device is not downward. In addition, the terminal device determines that the value represented by the ambient light information is greater than or equal to the fourth preset threshold, and determines that the environment in which the terminal device is located is not a dark environment, and then the terminal device determines to perform a subsequent step. Otherwise, step S1501 is performed again.

Therefore, in this embodiment, the terminal device determines that the environment in which the terminal device is located is not a dark environment and the screen orientation of the terminal device is not downward, and further, calls the rear-facing camera of the terminal device to capture an image, and recognizes a two-dimensional code in the image. Therefore, the terminal device can be triggered to recognize the two-dimensional code, without requiring a plurality of times of human-computer interaction between a user and the terminal device, so that a quantity of operations of the user is reduced, and two-dimensional code recognition efficiency is improved, thereby improving user experience.

S1504: Determine current location information of the terminal device; and if it is determined that the current location information represents that the terminal device falls within a preset geofencing range, determine that the terminal device enters a preset location.

For example, step S1104 is an optional step.

The terminal device may further obtain the current location information of the terminal device. The terminal device detects, based on the current location information, whether the terminal device falls within the preset geofencing range. If it is determined that the terminal device falls within the preset geofencing range, the terminal device determines that the terminal device enters the preset location, and performs a subsequent step; or if it is determined that the terminal device falls beyond the preset geofencing range, the terminal device performs step S1101 again.

Step S1504 is an optional step. After step S1504, if it is determined that the terminal device enters the preset location, step S1505 may be performed. Alternatively, step S1504 does not need to be performed. After step S1503, if it is determined that the screen orientation is a direction other than the second direction, and the value represented by the ambient light information is greater than or equal to the fourth preset threshold, step S1505 is performed.

For example, an execution sequence of the foregoing steps S1501-S1504 is not limited.

S1505: Call the rear-facing camera of the terminal device to obtain an image, and recognize two-dimensional code information in the image.

For example, after the foregoing steps, the terminal device calls the rear-facing camera of the terminal device to obtain an image. The terminal device recognizes two-dimensional code information in the image after obtaining the image.

After step S1505, the terminal device may start to perform the steps from step S1501 again.

Figure 16A:
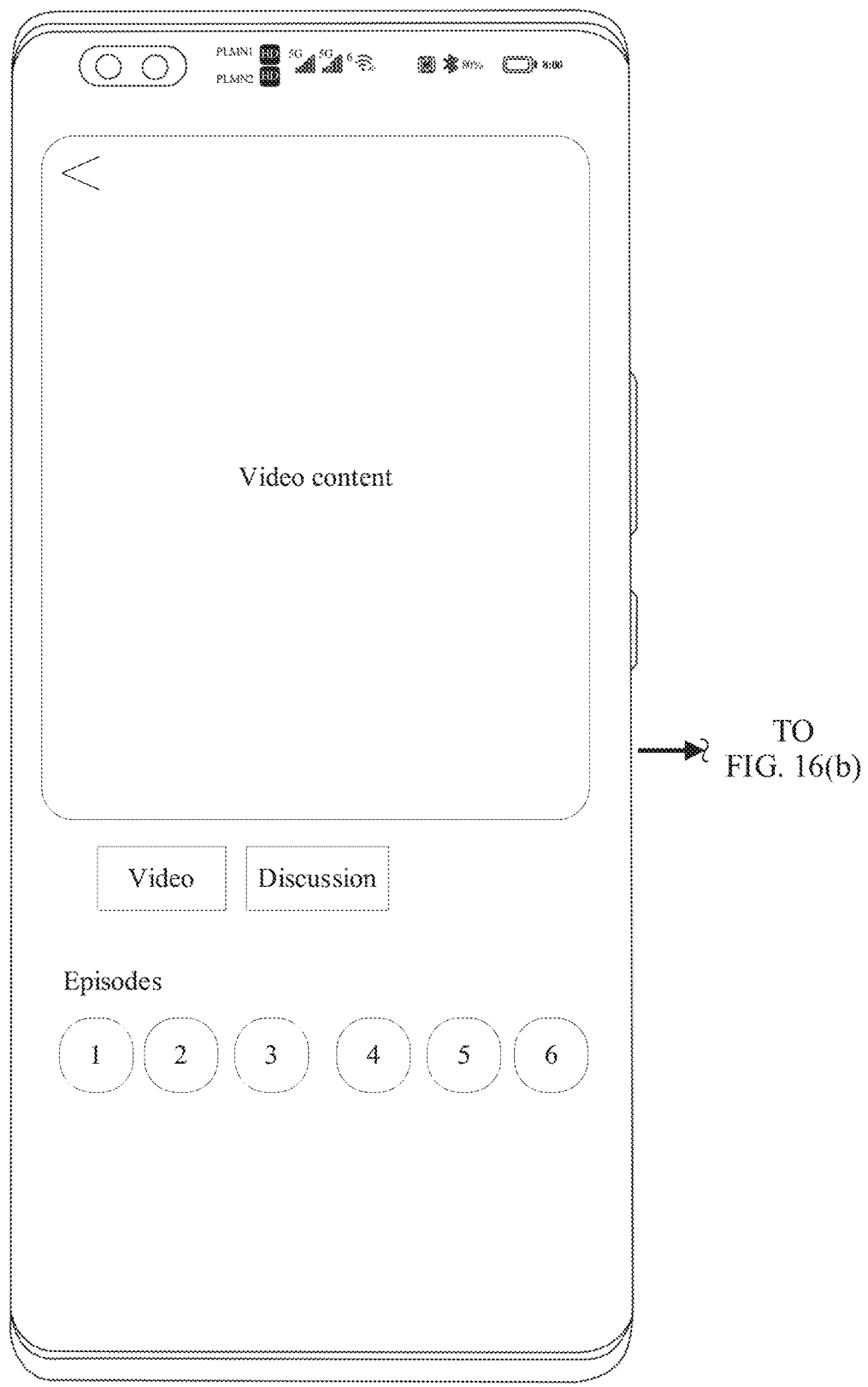
FIG. 16(a), FIG. 16(b), FIG. 16(c), and FIG. 16(d) are a schematic diagram 1 of an interface of still another two-dimensional code recognition method according to an embodiment of this application.
Figure 16B:
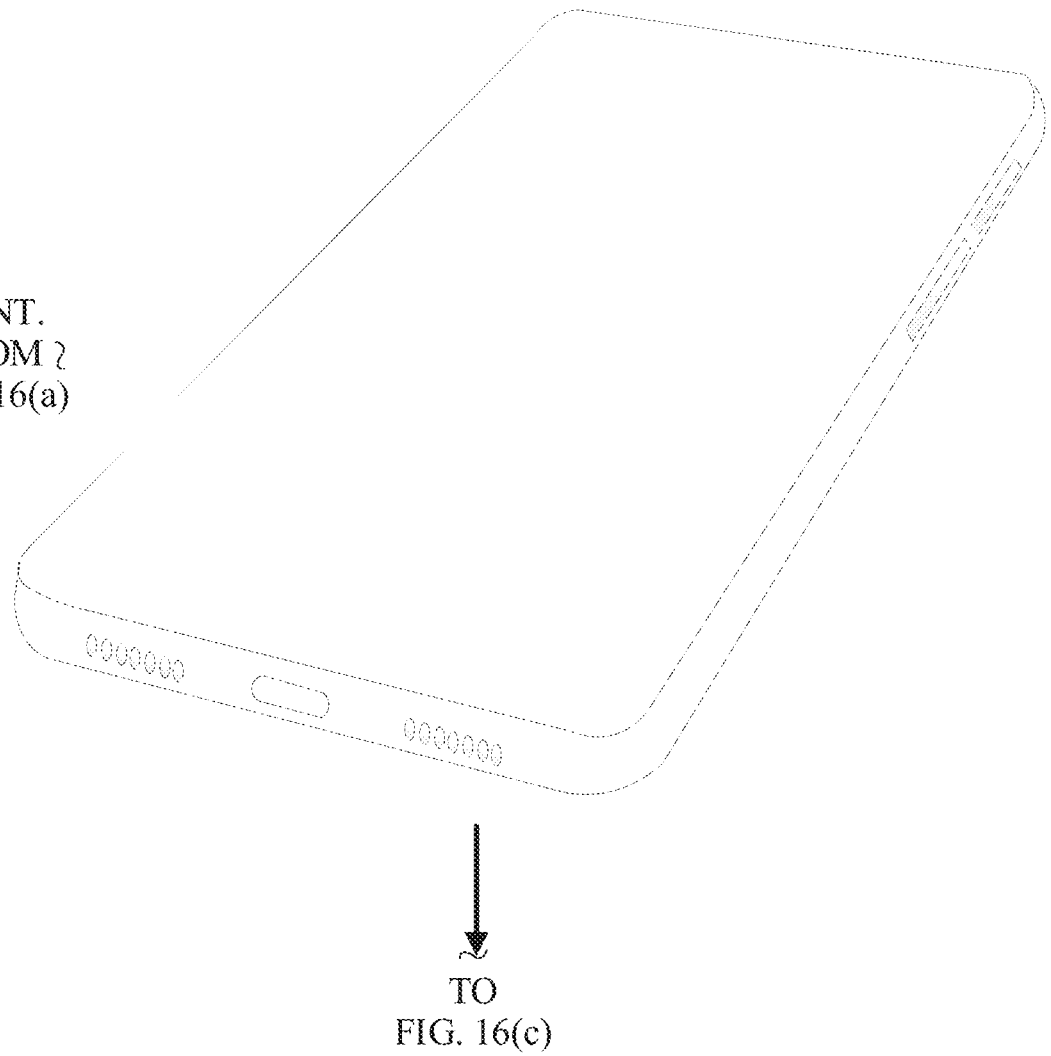

For example, FIG. 16(a), FIG. 16(b), FIG. 16(c), and FIG. 16(d) are a schematic diagram 1 of an interface of still another two-dimensional code recognition method according to an embodiment of this application. As shown in FIG. 16(a), the terminal device is running another application, for example, the terminal device is running a video application. As shown in FIG. 16(b), the user holding the terminal device puts the rear-facing camera of the terminal device toward a desktop. In this case, the screen of the terminal device faces upward (the positive direction of the z-axis of the world coordinate system). Further, in the manner provided in this embodiment, if it is determined that the terminal device is in the screen-on unlocked state, the screen orientation is not downward, the value represented by the ambient light information is greater than or equal to the fourth preset threshold, and the terminal device falls within the preset geofencing range (an unnecessary condition), the terminal device turns on the rear-facing camera to capture an image, and recognizes a two-dimensional code.

Figure 16C:
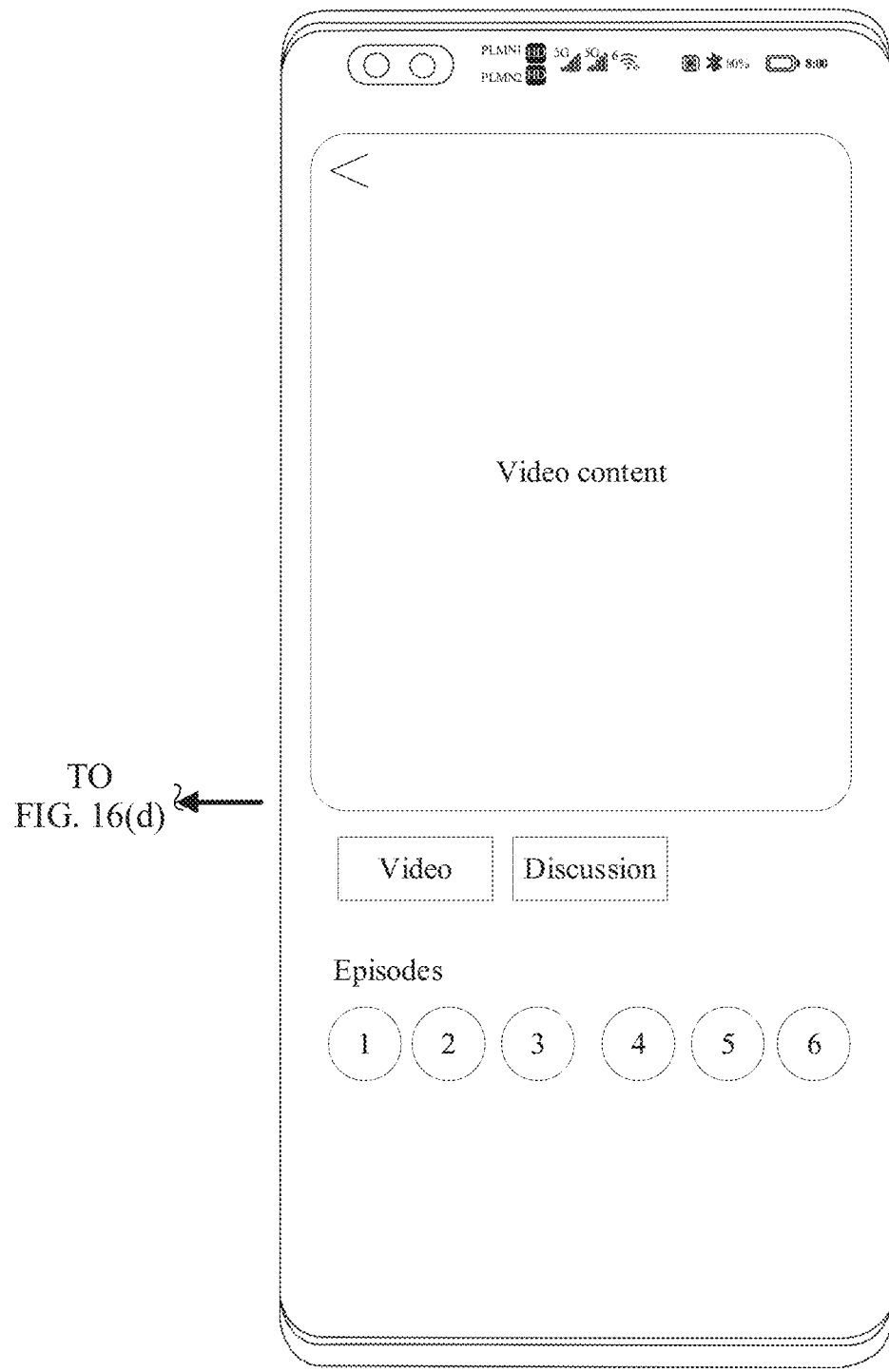
Figure 16D:
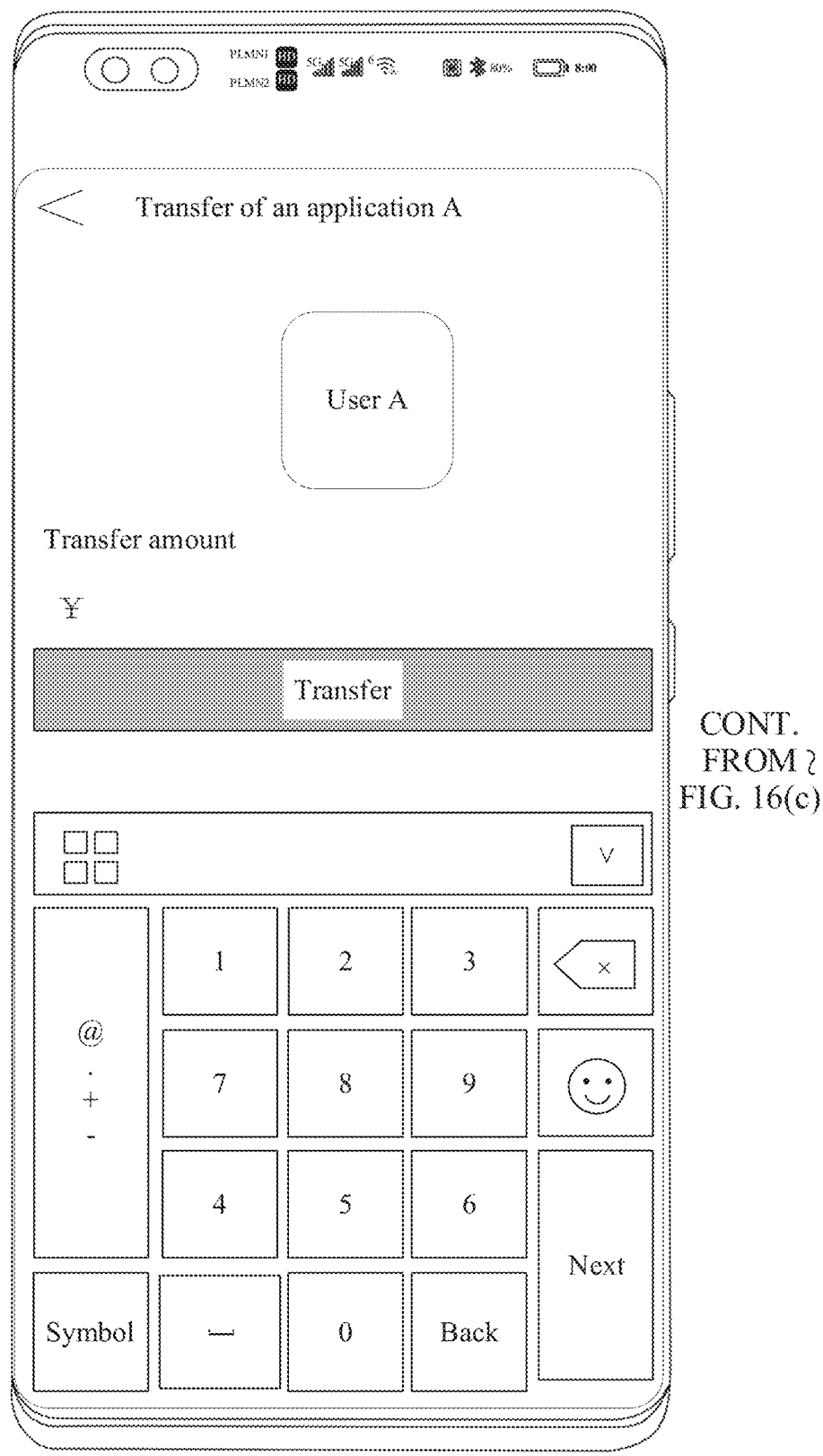

Then, as shown in FIG. 16(c), the terminal device does not change the interface in FIG. 16(a), and still displays an interface of the application that the terminal device is running, but the terminal device calls the rear-facing camera of the terminal device in the background to obtain an image, and recognizes two-dimensional code information in the image in the background. Then, after the terminal device recognizes the two-dimensional code information, as shown in FIG. 16(d), the terminal device directly calls an interface corresponding to the two-dimensional code information, for example, displays a transfer interface of an application A.

Alternatively, after FIG. 16(b) is shown, the terminal device calls a front-facing camera of the terminal device to obtain an image, and recognizes two-dimensional code information in the image, and the terminal device may display a code scanning interface. Then, after the terminal device recognizes the two-dimensional code information, the terminal device directly calls an interface corresponding to the two-dimensional code information, for example, displays a transfer interface of an application A. This is not displayed in FIG. 16(a), FIG. 16(b), FIG. 16(c), and FIG. 16(d).

Figure 17A:
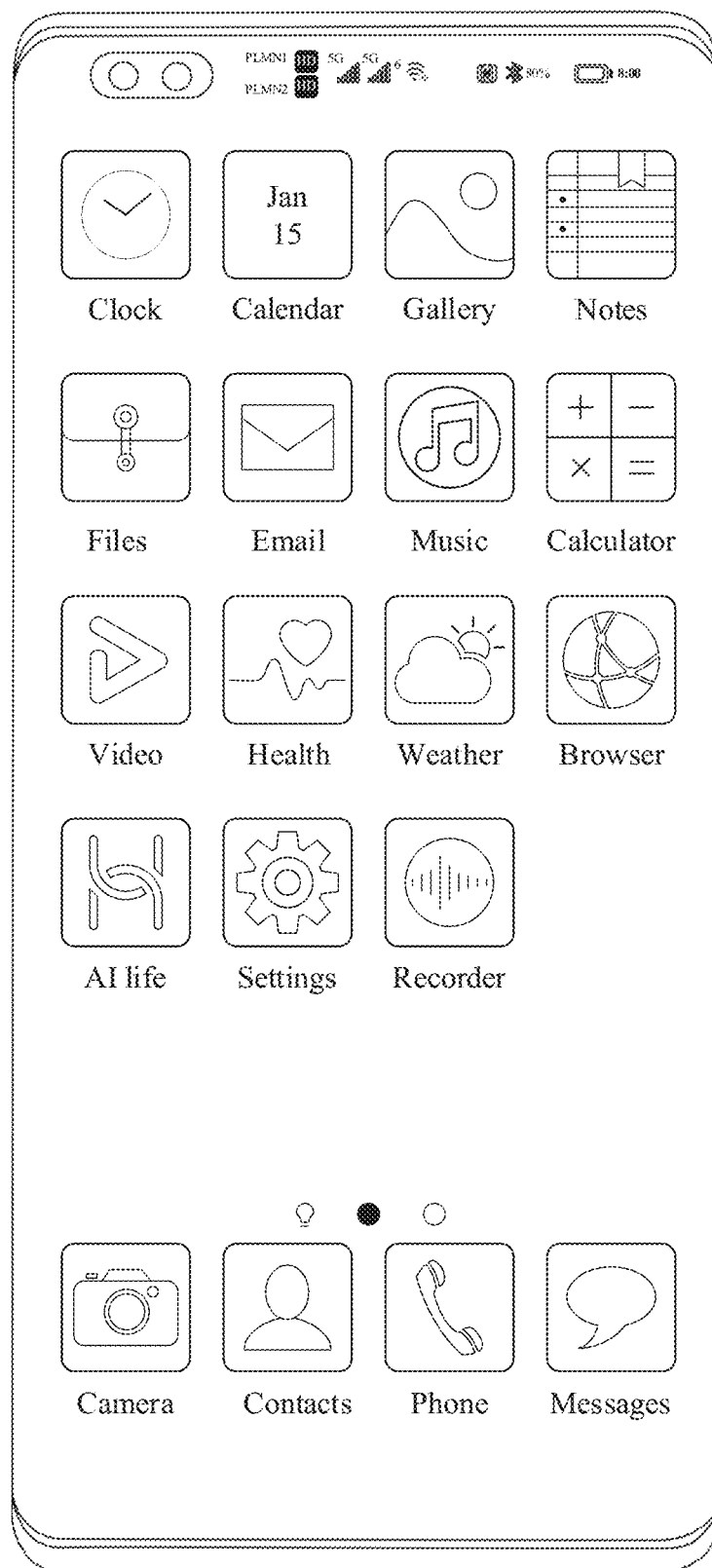
FIG. 17(a), FIG. 17(b), FIG. 17(c), and FIG. 17(d) are a schematic diagram 2 of an interface of still another two-dimensional code recognition method according to an embodiment of this application.
Figure 17B:
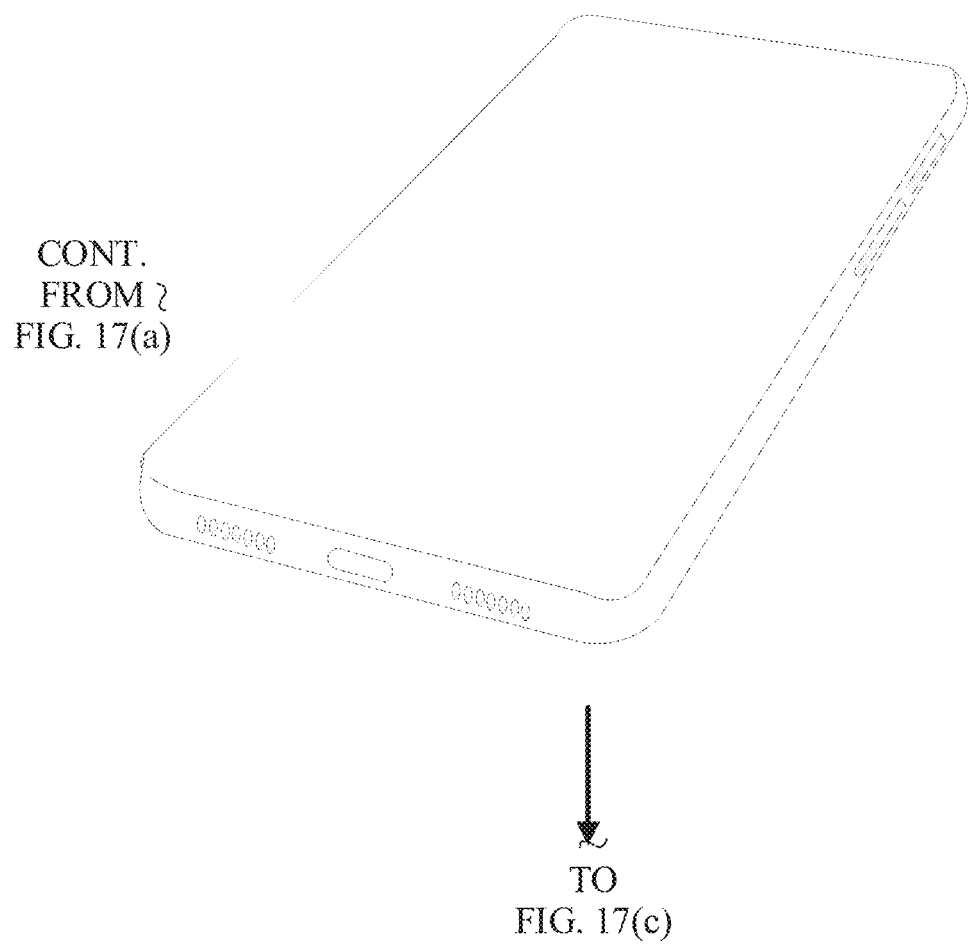

For example, FIG. 17(a), FIG. 17(b), FIG. 17(c), and FIG. 17(d) are a schematic diagram 2 of an interface of still another two-dimensional code recognition method according to an embodiment of this application. As shown in FIG. 17(a), the terminal device is in the desktop state, in other words, the terminal device does not run an application in the foreground. As shown in FIG. 17(b), the user holding the terminal device puts the rear-facing camera of the terminal device toward a desktop. In this case, the screen of the terminal device faces upward (the positive direction of the z-axis of the world coordinate system). Further, in the manner provided in this embodiment, if it is determined that the terminal device is in the screen-on unlocked state, the terminal device is in the desktop state, the screen orientation is not downward, the value represented by the ambient light information is greater than or equal to the fourth preset threshold, and the terminal device falls within the preset geofencing range (an unnecessary condition), the terminal device turns on the rear-facing camera to capture an image, and recognizes a two-dimensional code.

Figure 17C:
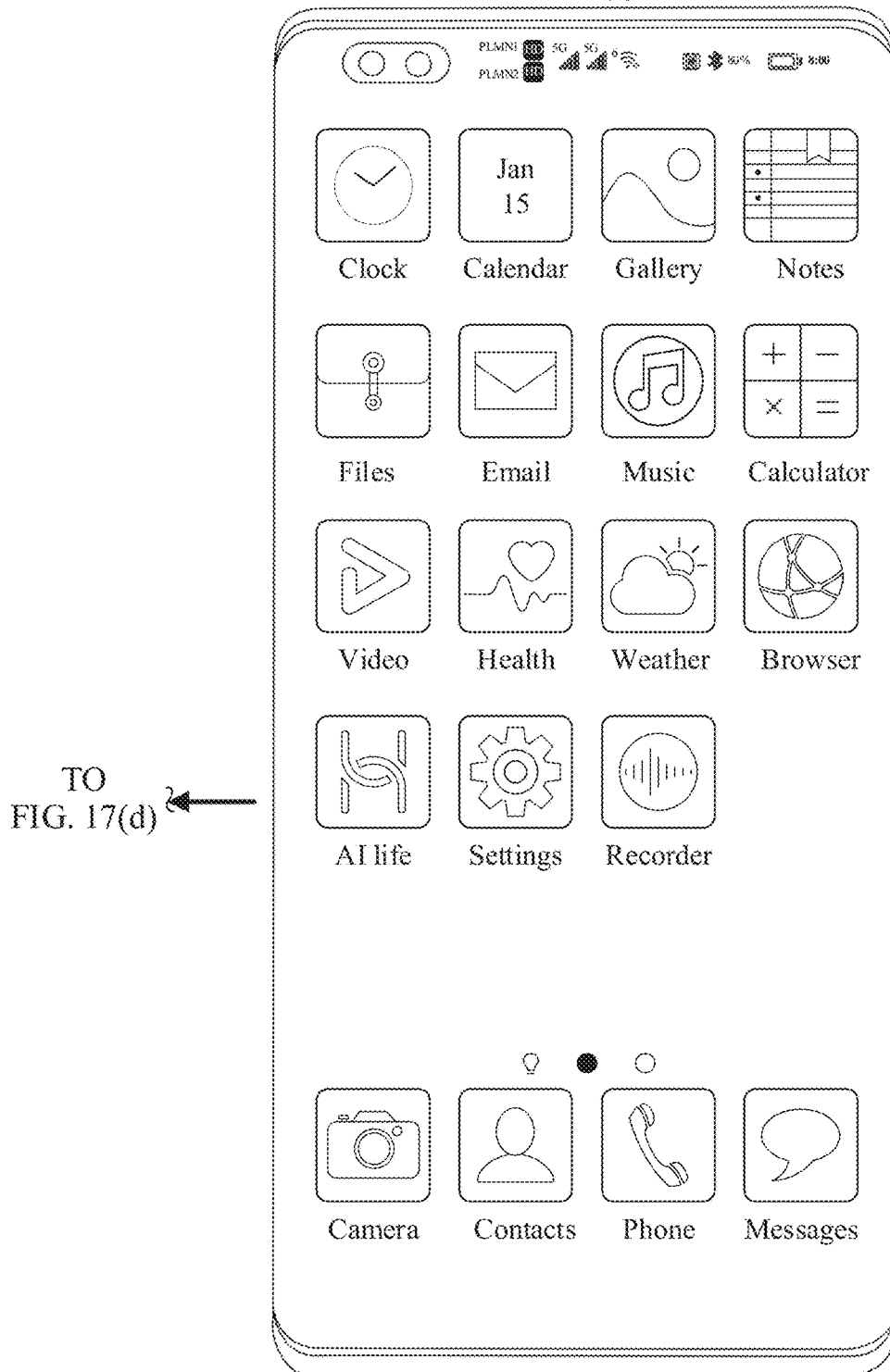
Figure 17D:
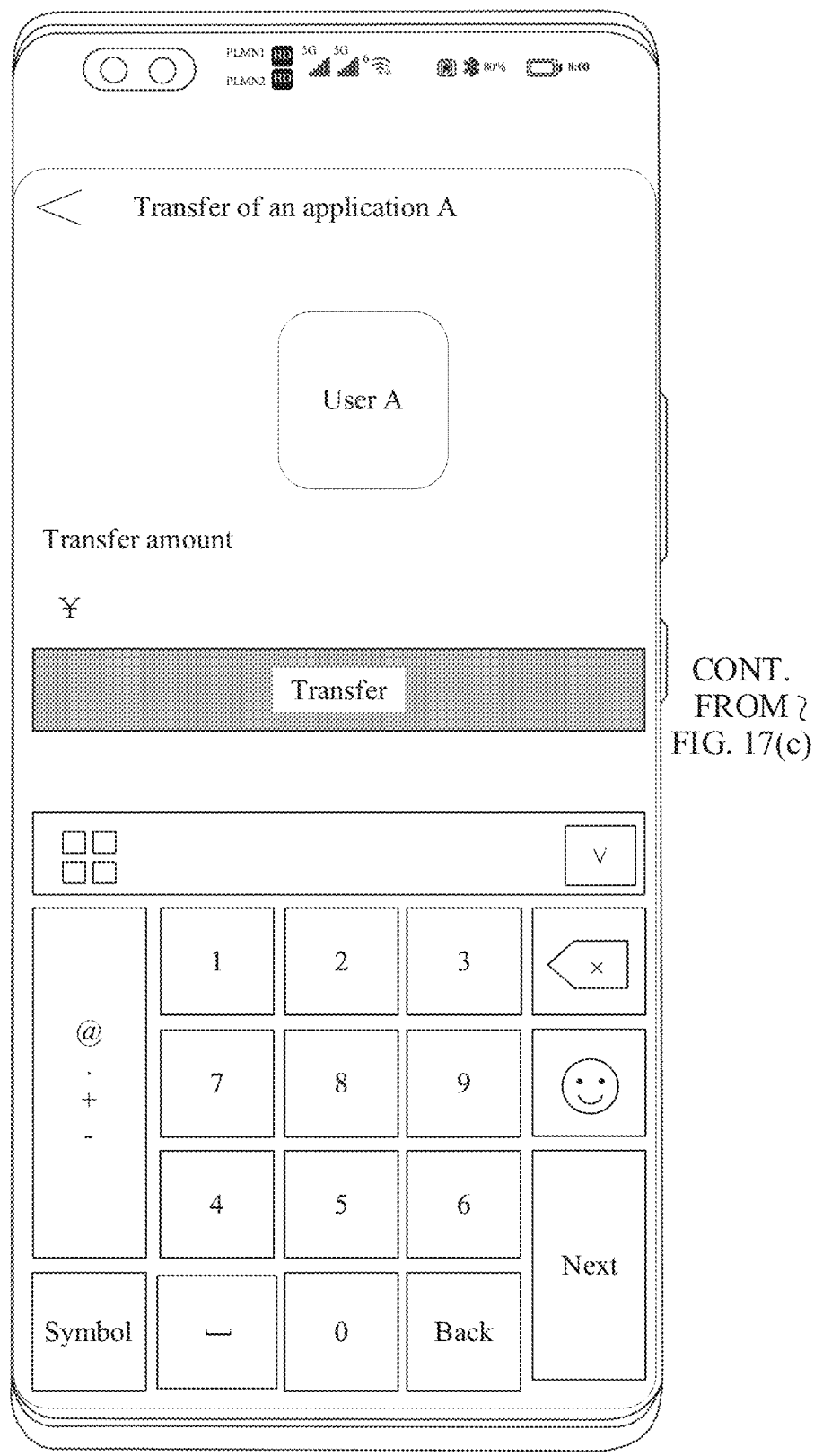

Then, as shown in FIG. 17(c), the terminal device does not change the interface in FIG. 17(a), and still displays a desktop, but the terminal device calls the rear-facing camera of the terminal device in the background to obtain an image, and recognizes two-dimensional code information in the image in the background. Then, after the terminal device recognizes the two-dimensional code information, as shown in FIG. 17(d), the terminal device directly calls an interface corresponding to the two-dimensional code information, for example, displays a transfer interface of an application A.

Alternatively, after FIG. 17(b) is shown, the terminal device calls a front-facing camera of the terminal device to obtain an image, and recognizes two-dimensional code information in the image, and the terminal device may display a code scanning interface. Then, after the terminal device recognizes the two-dimensional code information, the terminal device directly calls an interface corresponding to the two-dimensional code information, for example, displays a transfer interface of an application A. This is not displayed in FIG. 17(a), FIG. 17(b), FIG. 17(c), and FIG. 17(d).

Figure 18A:
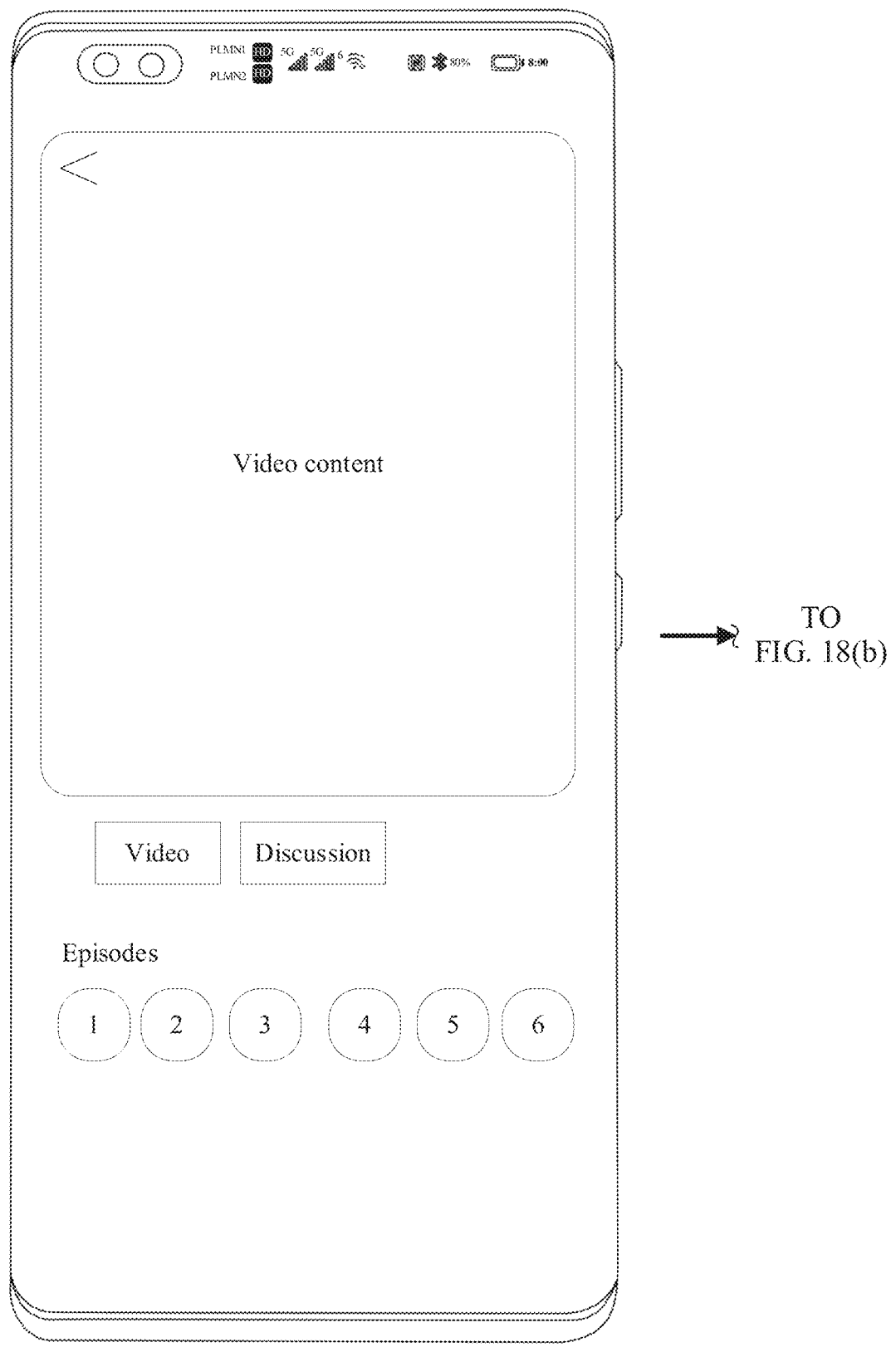
FIG. 18(a), FIG. 18(b), FIG. 18(c), and FIG. 18(d) are a schematic diagram 3 of an interface of still another two-dimensional code recognition method according to an embodiment of this application.
Figure 18B:
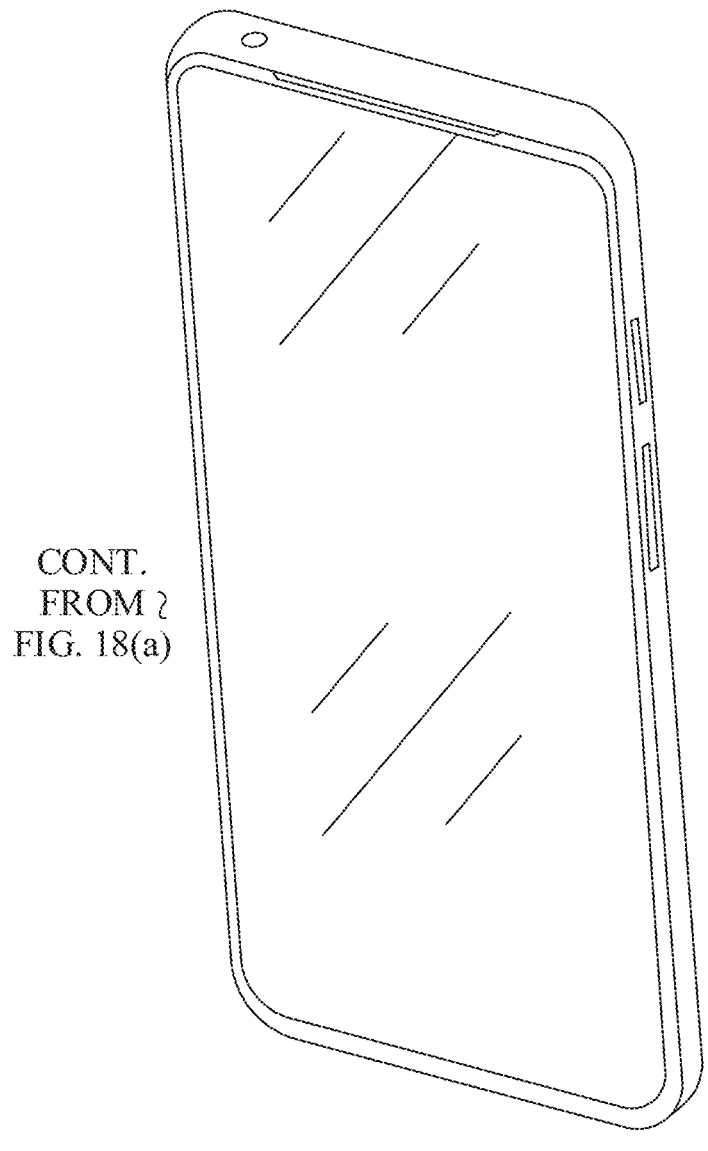

For example, FIG. 18(a), FIG. 18(b), FIG. 18(c), and FIG. 18(d) are a schematic diagram 3 of an interface of still another two-dimensional code recognition method according to an embodiment of this application. As shown in FIG. 18(a), the terminal device is running another application, for example, the terminal device is running a video application. As shown in FIG. 18(b), the user holding the terminal device puts the rear-facing camera of the terminal device toward a wall. In this case, the screen of the terminal device does not face downward ("downward" is the negative direction of the z-axis of the world coordinate system). Further, in the manner provided in this embodiment, if it is determined that the terminal device is in the screen-on unlocked state, the screen orientation is not downward, the value represented by the ambient light information is greater than or equal to the fourth preset threshold, and the terminal device falls within the preset geofencing range (an unnecessary condition), the terminal device turns on the rear-facing camera to capture an image, and recognizes a two-dimensional code.

Figure 18C:
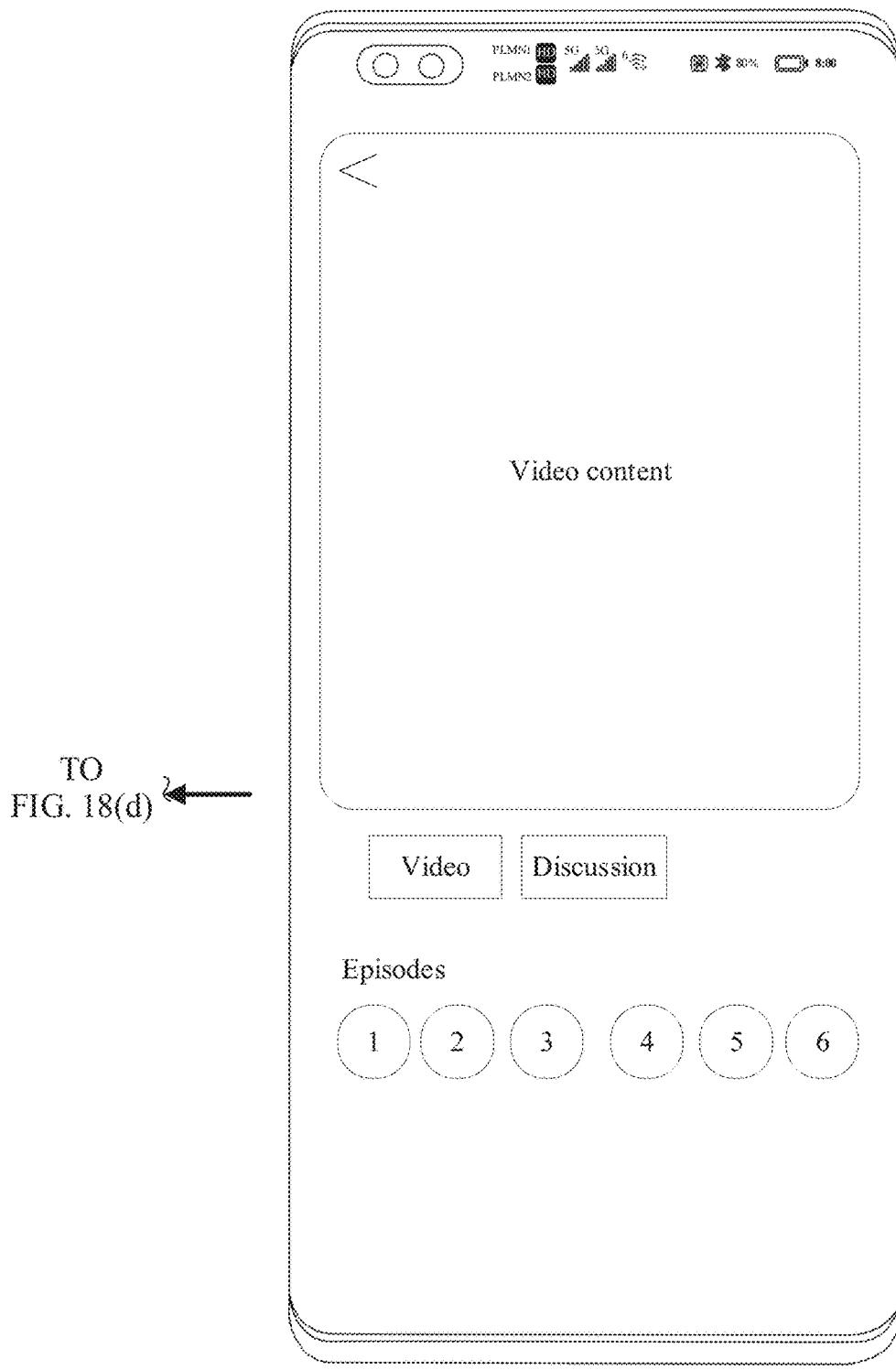
Figure 18D:
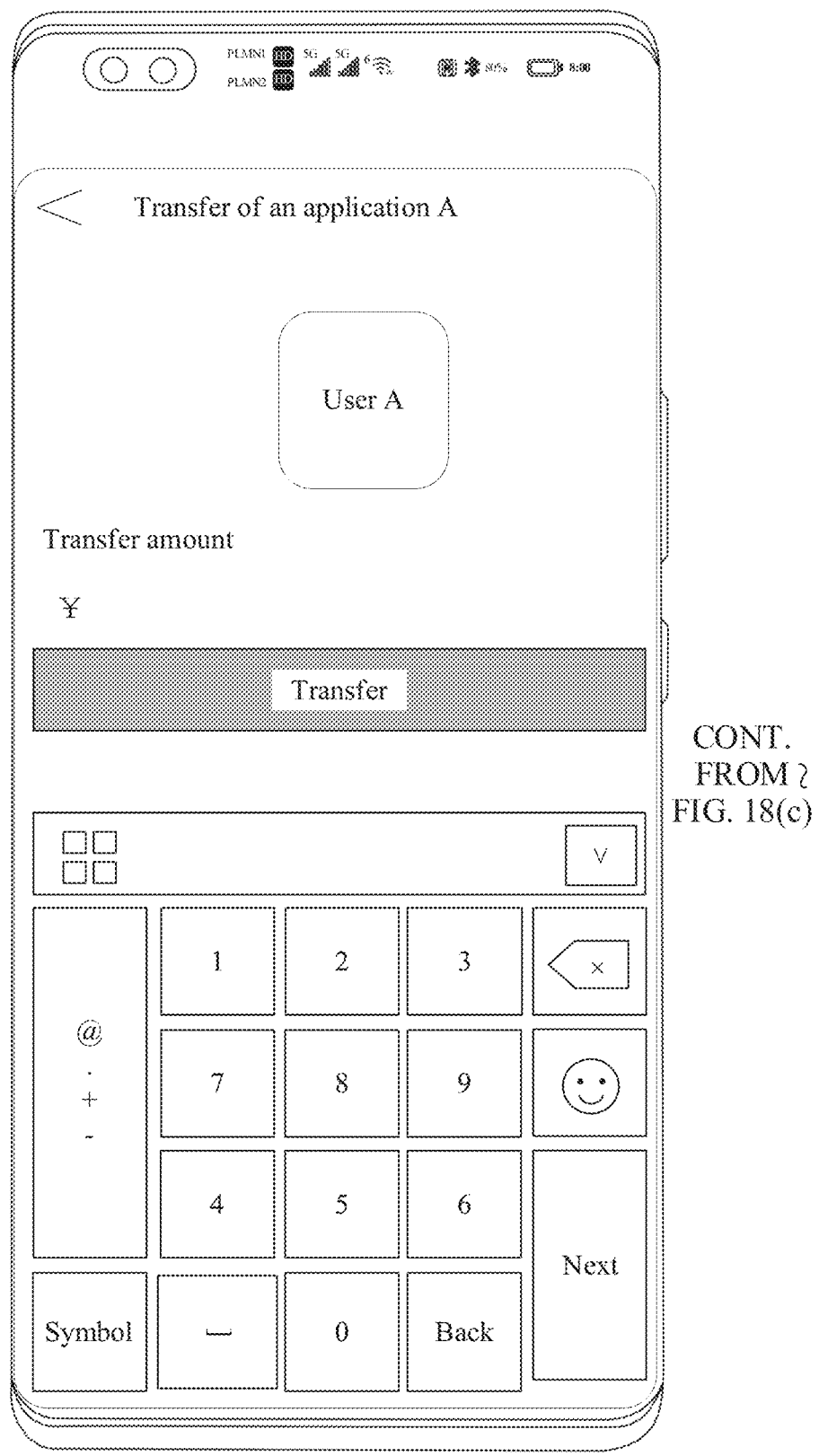
Figure 19A:
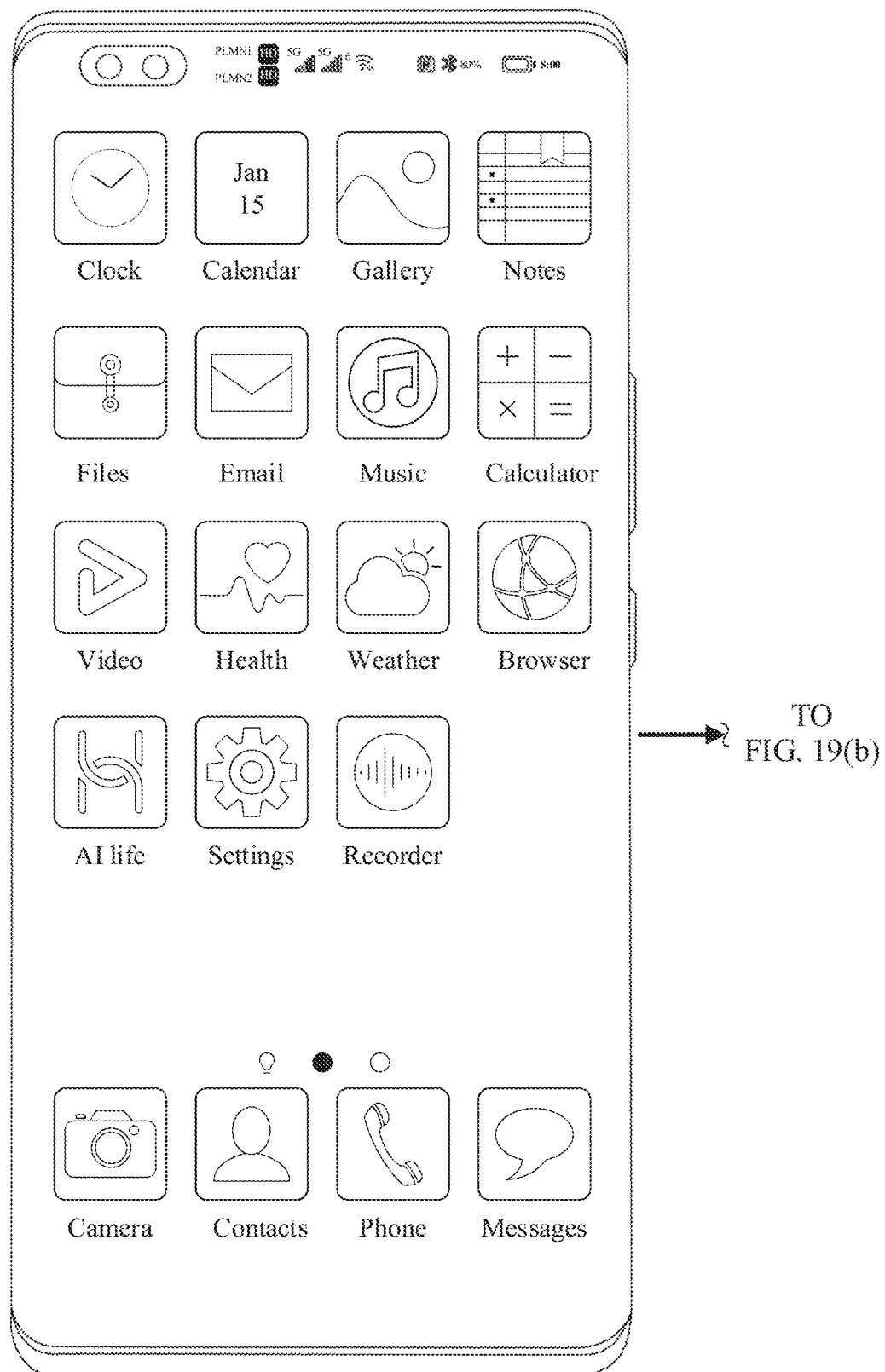
FIG. 19(a), FIG. 19(b), FIG. 19(c), and FIG. 19(d) are a schematic diagram 4 of an interface of still another two-dimensional code recognition method according to an embodiment of this application.
Figure 19B:
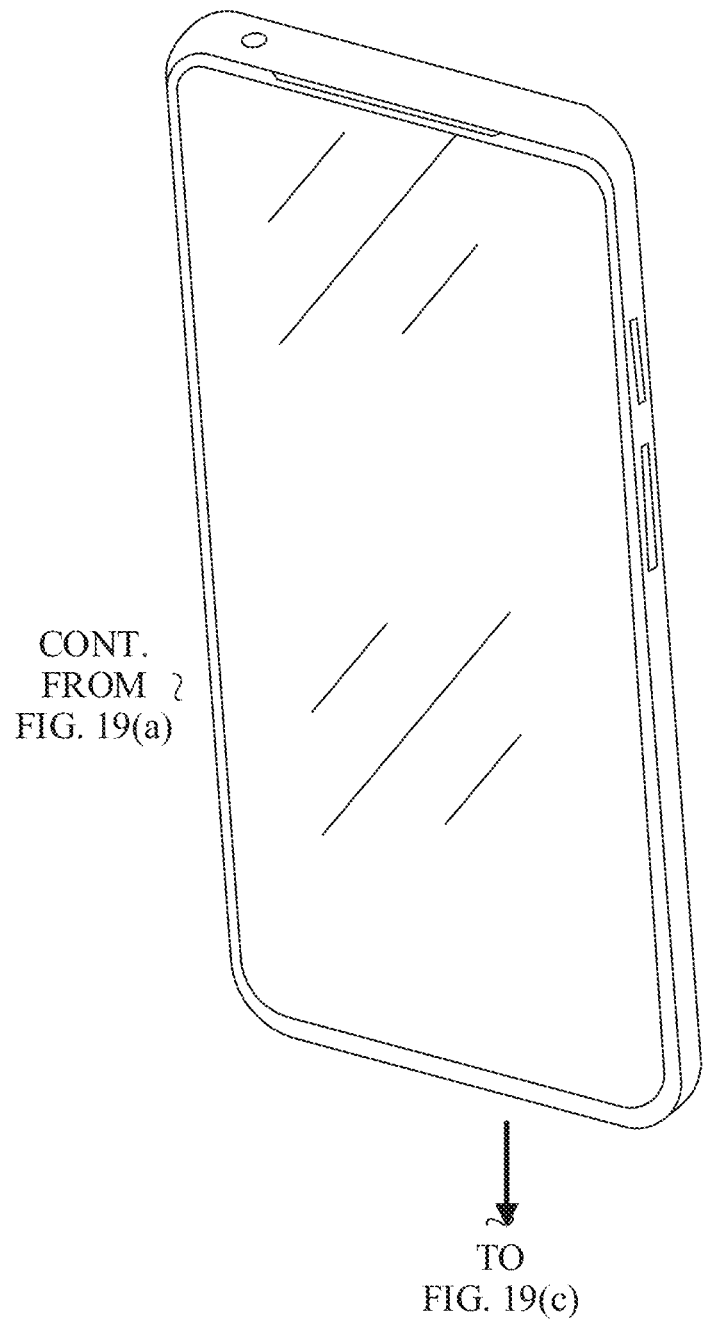
Figure 19C:
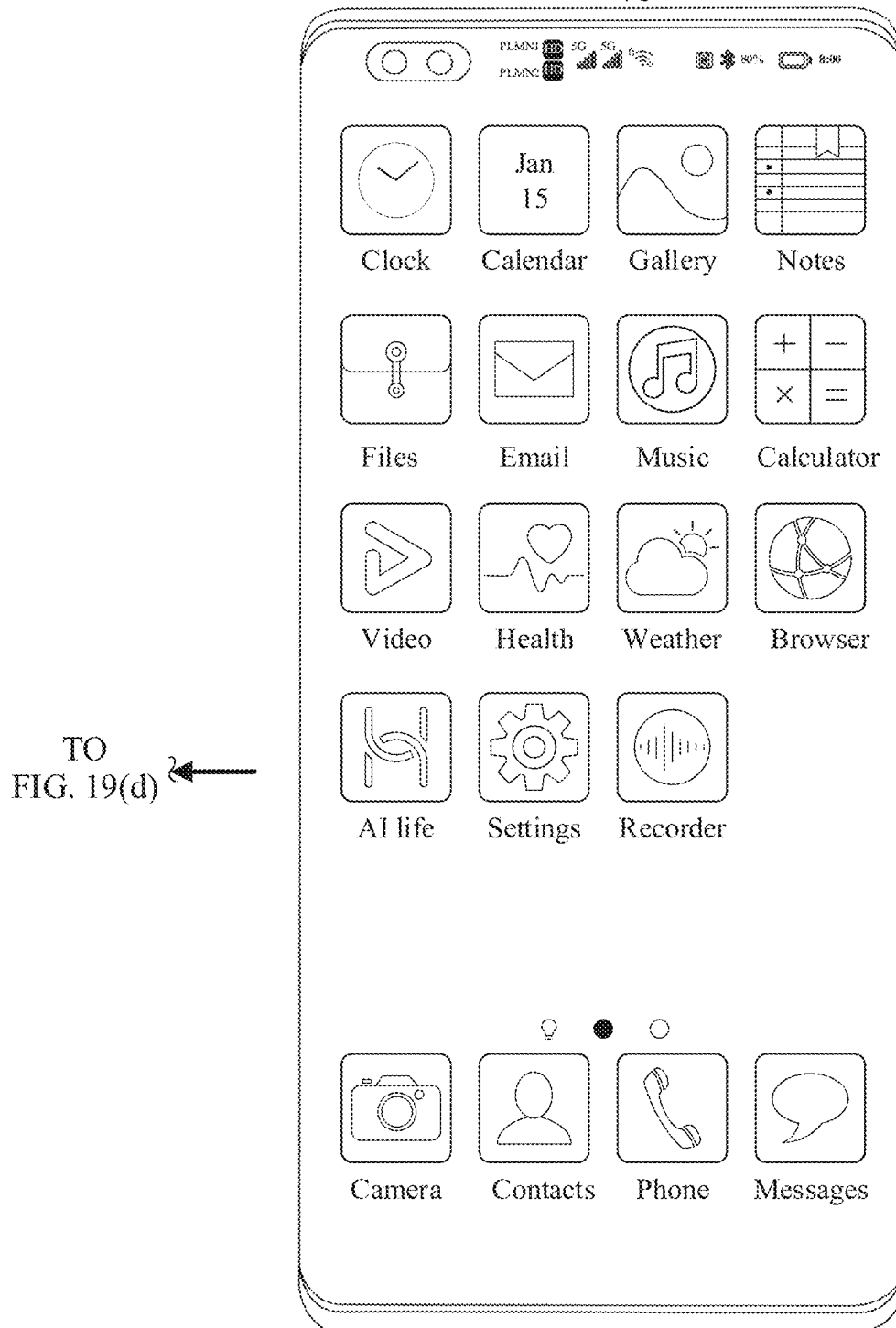
Figure 19D:
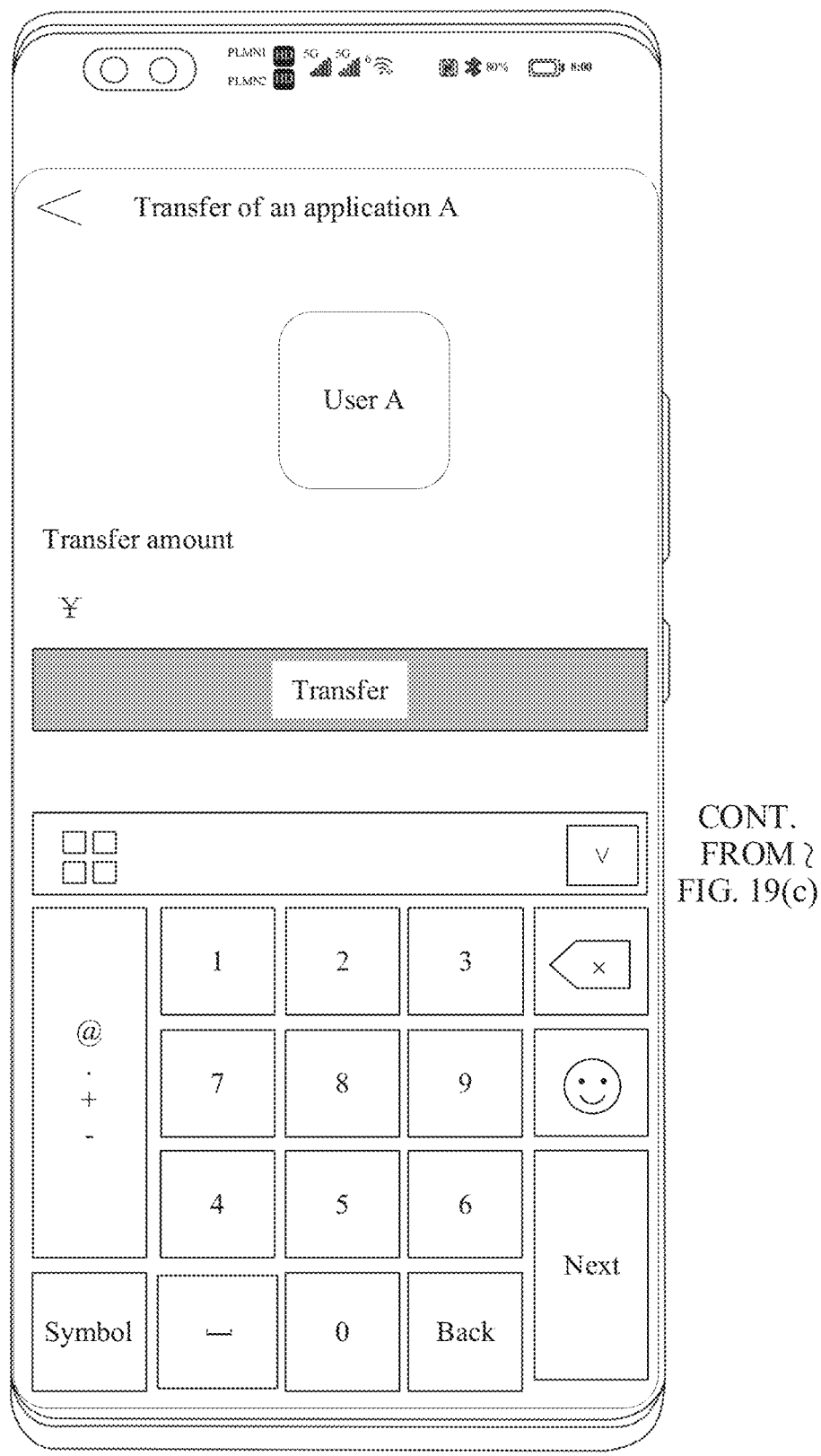

Then, as shown in FIG. 18(c), the terminal device does not change the interface in FIG. 18(a), and still displays an interface of the application that the terminal device is running, but the terminal device calls the rear-facing camera of the terminal device in the background to obtain an image, and recognizes two-dimensional code information in the image in the background. Then, after the terminal device recognizes the two-dimensional code information, as shown in FIG. 18(d), the terminal device directly calls an interface corresponding to the two-dimensional code information, for example, displays a transfer interface of an application A.

Alternatively, after FIG. 18(*b*) is shown, the terminal device calls a front-facing camera of the terminal device to obtain an image, and recognizes two-dimensional code information in the image, and the terminal device may display a code scanning interface. Then, after the terminal device recognizes the two-dimensional code information, the terminal device directly calls an interface corresponding to the two-dimensional code information, for example, displays a transfer interface of an application A. This is not displayed in FIG. 18(*a*), FIG. 18(*b*), FIG. 18(*c*), and FIG. 18(*d*).

For example, FIG. 19(*a*), FIG. 19(*b*), FIG. 19(*c*), and FIG. 19(*d*) are a schematic diagram 4 of an interface of still another two-dimensional code recognition method according to an embodiment of this application. As shown in FIG. 19(*a*), the terminal device is in the desktop state, in other words, the terminal device does not run an application in the foreground. As shown in FIG. 19(*b*), the user holding the terminal device puts the rear-facing camera of the terminal device toward a wall. In this case, the screen of the terminal device does not face downward ("downward" is the negative direction of the z-axis of the world coordinate system). Further, in the manner provided in this embodiment, if it is determined that the terminal device is in the screen-on unlocked state, the terminal device is in the desktop state, the screen orientation is not downward, the value represented by the ambient light information is greater than or equal to the fourth preset threshold, and the terminal device falls within the preset geofencing range (an unnecessary condition), the terminal device turns on the rear-facing camera to capture an image, and recognizes a two-dimensional code.

Then, as shown in FIG. 19(*c*), the terminal device does not change the interface in FIG. 19(*a*), and still displays a desktop, but the terminal device calls the rear-facing camera of the terminal device in the background to obtain an image, and recognizes two-dimensional code information in the image in the background. Then, after the terminal device recognizes the two-dimensional code information, as shown in FIG. 19(*d*), the terminal device directly calls an interface corresponding to the two-dimensional code information, for example, displays a transfer interface of an application A.

Alternatively, after FIG. 19(*b*) is shown, the terminal device calls a front-facing camera of the terminal device to obtain an image, and recognizes two-dimensional code information in the image, and the terminal device may display a code scanning interface. Then, after the terminal device recognizes the two-dimensional code information, the terminal device directly calls an interface corresponding to the two-dimensional code information, for example, displays a transfer interface of an application A. This is not displayed in FIG. 19(*a*), FIG. 19(*b*), FIG. 19(*c*), and FIG. 19(*d*).

In this embodiment, if it is determined that the terminal device is in the screen-on unlocked state, the terminal device is in the desktop state, the screen orientation is not downward, the value represented by the ambient light information is greater than or equal to the fourth preset threshold, and the terminal device falls within the preset geofencing range (an unnecessary condition), the terminal device turns on the rear-facing camera to capture an image, and recognizes a two-dimensional code. In this way, it is directly determined, based on the running status, posture information, and ambient light of the terminal device, to call the rear-facing camera to capture an image, and two-dimensional code information is recognized. The terminal device can be triggered to scan a two-dimensional code, without requiring the user to perform a series of touch operations on the terminal device, so that two-dimensional code recognition time is reduced, and two-dimensional code recognition efficiency is improved.

Figure 20A:
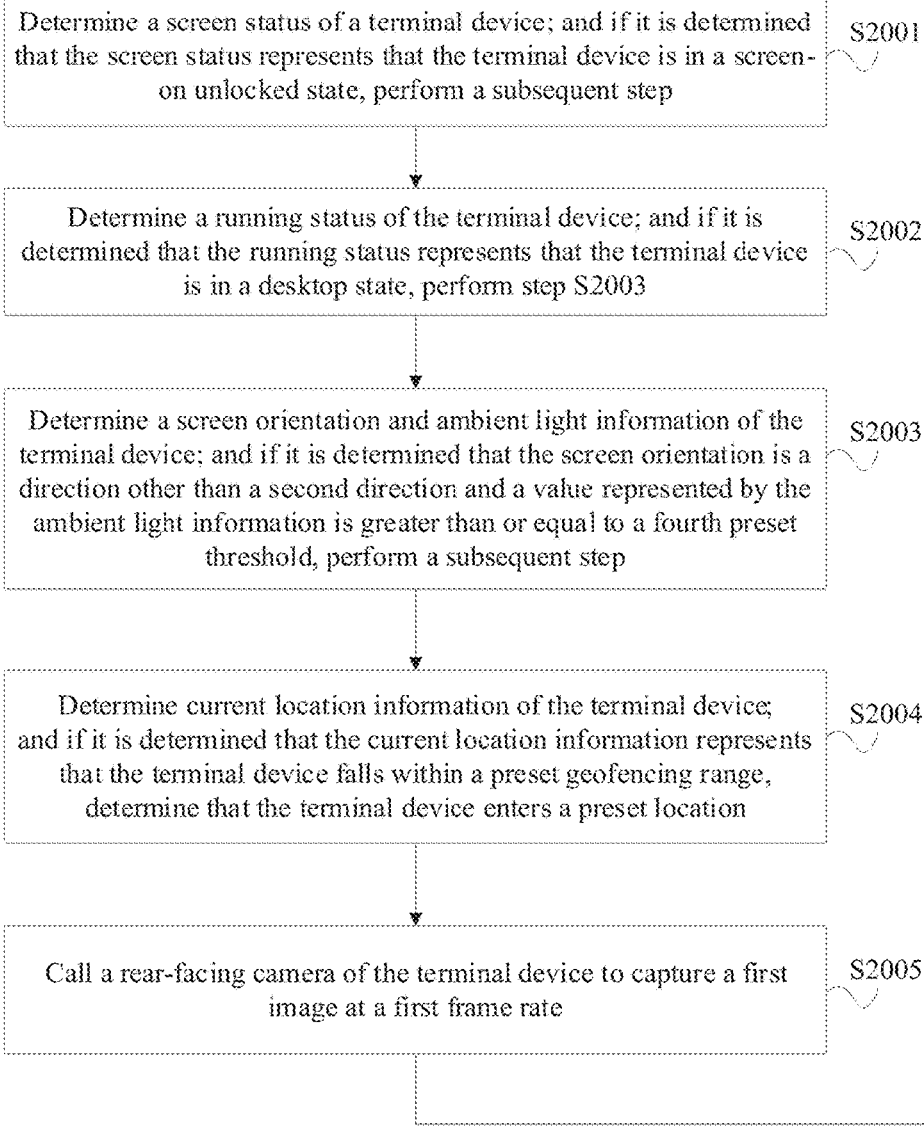
FIG. 20A and FIG. 20B are a schematic flowchart of yet another two-dimensional code recognition method according to an embodiment of this application.
Figure 20B:
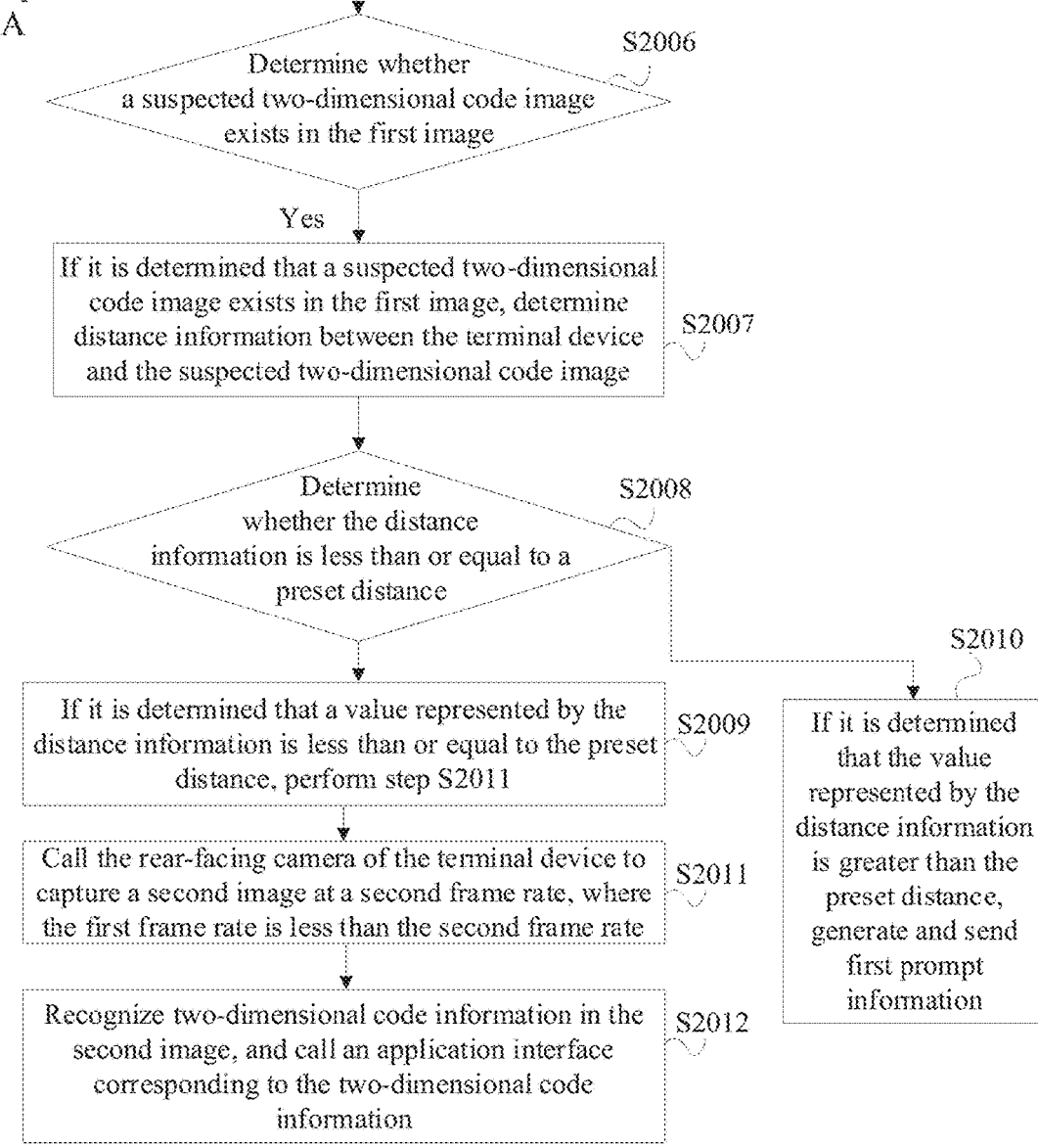

FIG. 20A and FIG. 20B are a schematic flowchart of yet another two-dimensional code recognition method according to an embodiment of this application. As shown in FIG. 20A and FIG. 20B, the method may include the following steps.

S2001: Determine a screen status of a terminal device; and if it is determined that the screen status represents that the terminal device is in a screen-on unlocked state, perform a subsequent step.

For example, this embodiment is executed by the terminal device, a processor in the terminal device, or an apparatus disposed in the terminal device. This is not limited. This embodiment is described by using the terminal device as an execution body.

S2002: Determine a running status of the terminal device; and if it is determined that the running status represents that the terminal device is in a desktop state, perform step S2003.

For example, step S2002 is an optional step.

S2003: Determine a screen orientation and ambient light information of the terminal device; and if it is determined that the screen orientation is a direction other than a second direction and a value represented by the ambient light information is greater than or equal to a fourth preset threshold, perform a subsequent step.

The second direction is a negative direction of a z-axis of a world coordinate system.

S2004: Determine current location information of the terminal device; and if it is determined that the current location information represents that the terminal device falls within a preset geofencing range, determine that the terminal device enters a preset location.

For example, step S2004 is an optional step.

For example, an execution sequence of the foregoing steps S2001-S2004 is not limited.

For steps S2001-S2004, refer to the foregoing steps S1501-S1504. Details are not described again.

S2005: Call a rear-facing camera of the terminal device to capture a first image at a first frame rate.

For example, the terminal device calls the rear-facing camera. In addition, to reduce power consumption, the terminal device calls a low-power consumption driver to capture the first image at the first frame rate. The first frame rate is less than a second frame rate; or the first frame rate may be set to be less than a preset frame rate threshold. A frame rate refers to a quantity of transmitted frames per second (FPS).

Therefore, the terminal device captures the first image at a low frame rate by using the rear-facing camera. Resolution of the first image captured by the terminal device is first resolution. The first resolution is less than second resolution, and the captured first image is a low-resolution image.

When the terminal device captures the first image at a low frame rate, power consumption of the terminal device is relatively small, so that the power consumption of the device can be reduced.

S2006: Determine whether a suspected two-dimensional code image exists in the first image.

For example, a neural network classification model (namely, a first-level model) is deployed in the terminal device. The terminal device performs classification recognition on the first image based on the neural network classification model to obtain a first recognition result. The first recognition result represents whether a target in the first image is a two-dimensional code. In other words, the first recognition result represents whether a suspected two-dimensional code image exists in the first image.

If the terminal device determines that a suspected two-dimensional code image exists in the first image, the terminal device performs a subsequent step; otherwise, the terminal device performs step S2001 again after an interval of preset time.

The neural network classification model is obtained by performing training based on a first training set. The first training set includes a plurality of first training images, and the first training images are images in which two-dimensional codes are marked.

S2007: If it is determined that a suspected two-dimensional code image exists in the first image, determine distance information between the terminal device and the suspected two-dimensional code image.

For example, if the terminal device determines that a suspected two-dimensional code image exists in the first image, the terminal device may measure distance information between the terminal device and the suspected two-dimensional code image in the first image based on a time of flight ("tof") technology. If the terminal device determines that no suspected two-dimensional code image exists in the first image, the terminal device performs step S2001 again after an interval of preset time.

S2008: Determine whether the distance information is less than or equal to a preset distance.

S2009: If it is determined that a value represented by the distance information is less than or equal to the preset distance, perform step S2011.

For example, if the terminal device determines that the distance information between the terminal device and the suspected two-dimensional code image in the first image is less than or equal to the preset distance, the terminal device determines that the terminal device is relatively close to the suspected two-dimensional code image, and then performs step S2011.

S2010: If it is determined that the value represented by the distance information is greater than the preset distance, generate and send first prompt information, where the first prompt information is used to prompt that the rear-facing camera of the terminal device needs to approach the suspected two-dimensional code image.

For example, if the terminal device determines that the distance information between the terminal device and the suspected two-dimensional code image in the first image is greater than the preset distance, the terminal device determines that the terminal device is relatively far from the suspected two-dimensional code image. The terminal device needs to prompt a user to make the rear-facing camera of the terminal device approach the suspected two-dimensional code image, and the terminal device may generate and send the first prompt information. The first prompt information includes one or more of the following: a voice prompt, a vibration prompt, and a light prompt.

S2011: Call the rear-facing camera of the terminal device to capture a second image at the second frame rate, where the first frame rate is less than the second frame rate.

For example, after step S2009, or if it is determined that a suspected two-dimensional code image exists in the first image, step S2011 is performed. The terminal device calls the rear-facing camera of the terminal device to capture the second image at the second frame rate. The second frame rate is greater than the first frame rate; or the second frame rate may be set to be greater than or equal to the preset frame rate threshold.

Therefore, the terminal device captures the second image at a higher frame rate by using the rear-facing camera. Resolution of the second image captured by the terminal device is second resolution. The second resolution is greater than the first resolution, and the captured second image is a high-resolution image.

In this step, the terminal device enables a high-power consumption driving algorithm to capture an image stream, and if no two-dimensional code has been recognized, the terminal device continuously captures the image stream for a maximum of five seconds.

S2012: Recognize two-dimensional code information in the second image, and call an application interface corresponding to the two-dimensional code information.

For example, the terminal device recognizes the two-dimensional code information in the second image to obtain a second recognition result, and the second recognition result represents whether the two-dimensional code information is obtained. If it is determined that the second recognition result represents that the two-dimensional code information is obtained, the terminal device pulls up the application interface corresponding to the two-dimensional code information based on a Deeplink technology. The terminal device may send third prompt information. The third prompt information represents that the application interface corresponding to the two-dimensional code information has been automatically pulled up. If it is determined that the second recognition result represents that the two-dimensional code information is not obtained, step S2001 is performed again after an interval of preset time.

The terminal device first performs target detection on the second image based on a two-dimensional code recognition algorithm (namely, a second-level model), then amplifies the second image in a super resolution manner (based on a neural network), and then performs two-dimensional code decoding to obtain the second recognition result. The two-dimensional code decoding includes the following process: extracting a two-dimensional code area image and recognizing the two-dimensional code area image to obtain the second recognition result.

For example, for a two-dimensional code of an official account, the terminal device obtains a link after recognizing the second image. The terminal device may display an article of the official account in an application based on the link.

For example, the recognizing two-dimensional code information in the image includes: recognizing the two-dimensional code information to obtain and display a plurality of two-dimensional code images; and in response to a confirmation instruction, calling an application interface corresponding to a two-dimensional code image indicated by the confirmation instruction. The confirmation instruction is used to indicate a two-dimensional code image selected by the user.

For example, if a plurality of two-dimensional code images are obtained after the second image is recognized, the terminal device separately recognizes a plurality of two-dimensional codes (for example, recognizes locations of the two-dimensional codes in the second image), and generates and displays a screenshot. The terminal device frames the plurality of two-dimensional code images in the screenshot, and provides interaction buttons. In addition, the terminal device generates second prompt information. The second prompt information represents and prompts, for example, through a voice, vibration, or light, the user to select a two-dimensional code. Then the user selects one of the two-dimensional code images, and further, the terminal device determines the two-dimensional code image selected by the user. In this process, the two-dimensional code has been decoded first, and provided that the user taps one of the two-dimensional code images, the terminal device can pull up an application interface corresponding to the two-dimensional code image.

After step S2012, the terminal device may start to perform the steps from step S2001 again.

Figure 21A:
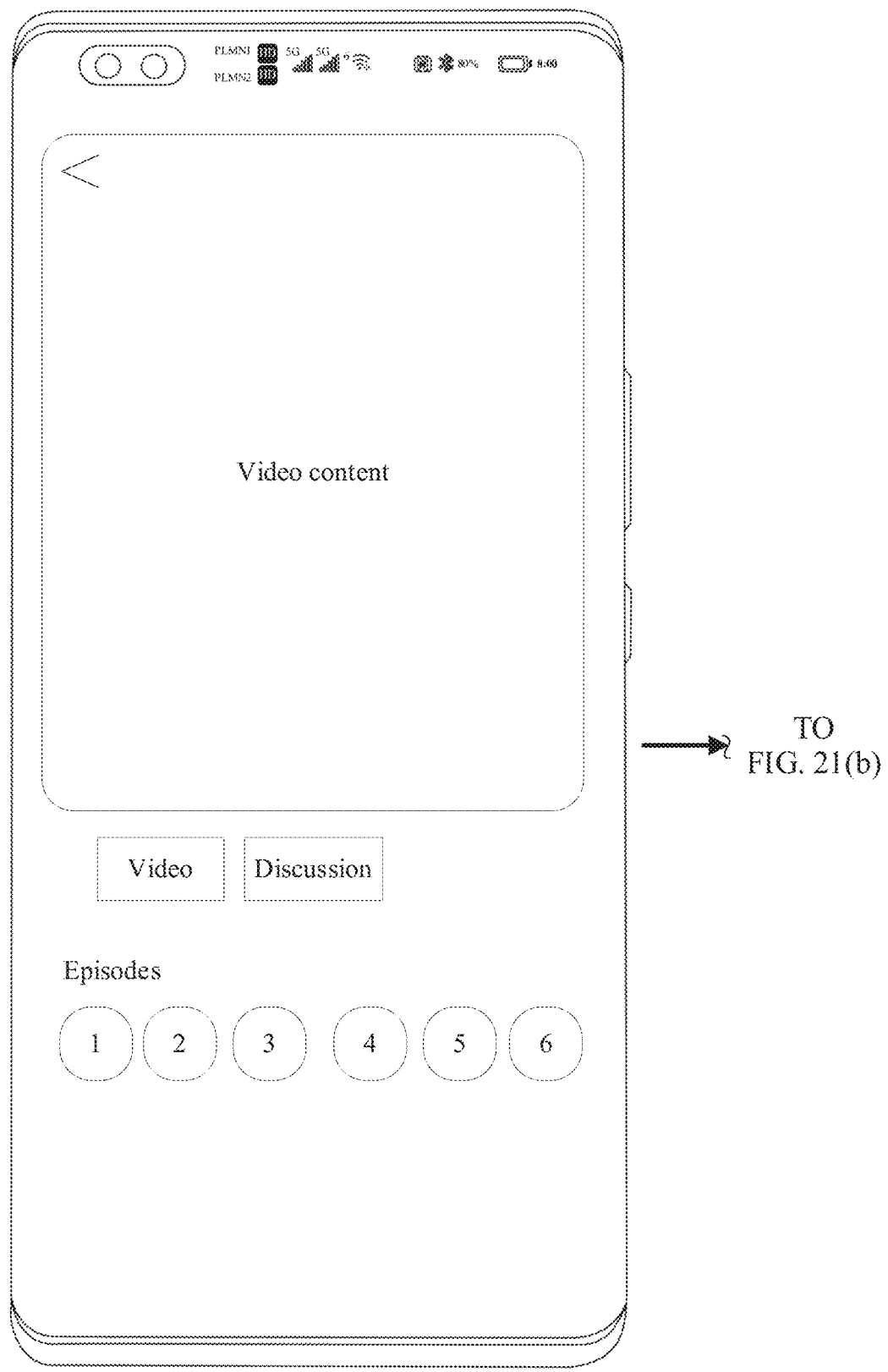
FIG. 21(a), FIG. 21(b), FIG. 21(c), FIG. 21(d), FIG. 21(e), and FIG. 21(f) are a schematic diagram 1 of an interface of yet another two-dimensional code recognition method according to an embodiment of this application.
Figure 21B:
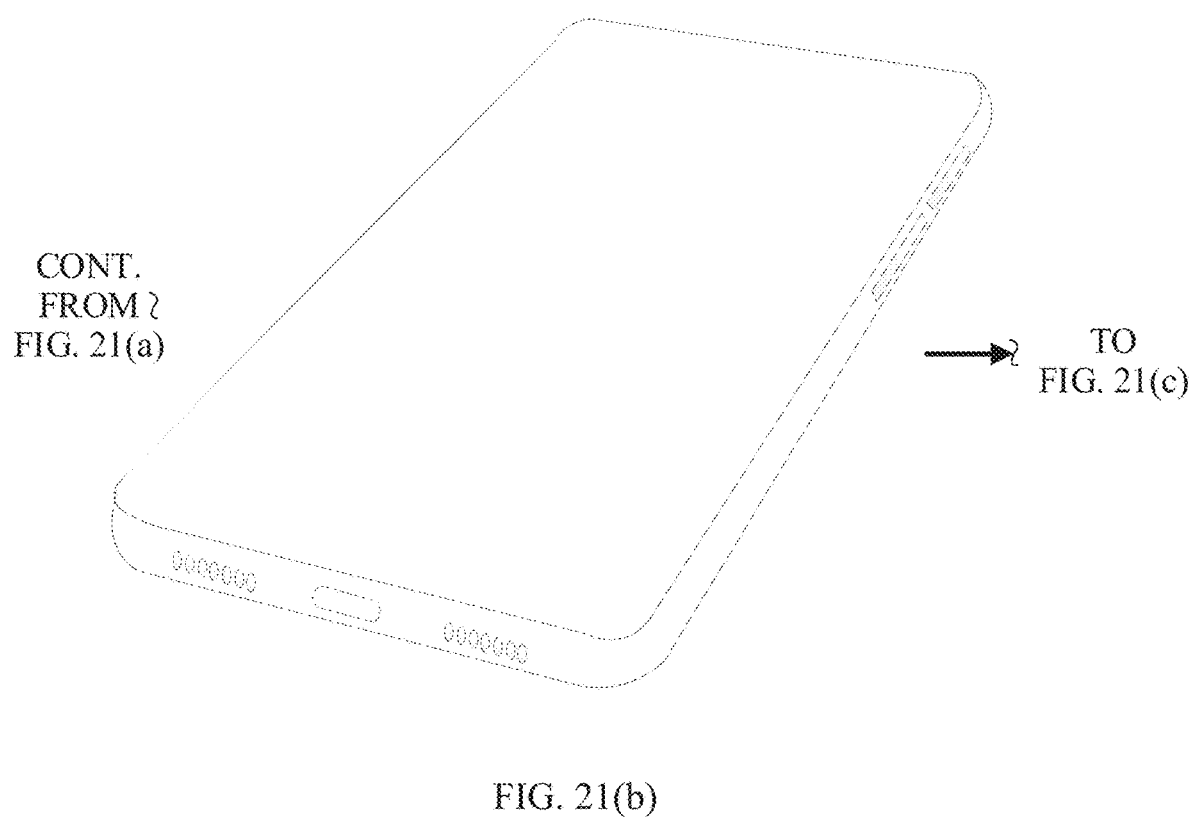
Figure 21C:
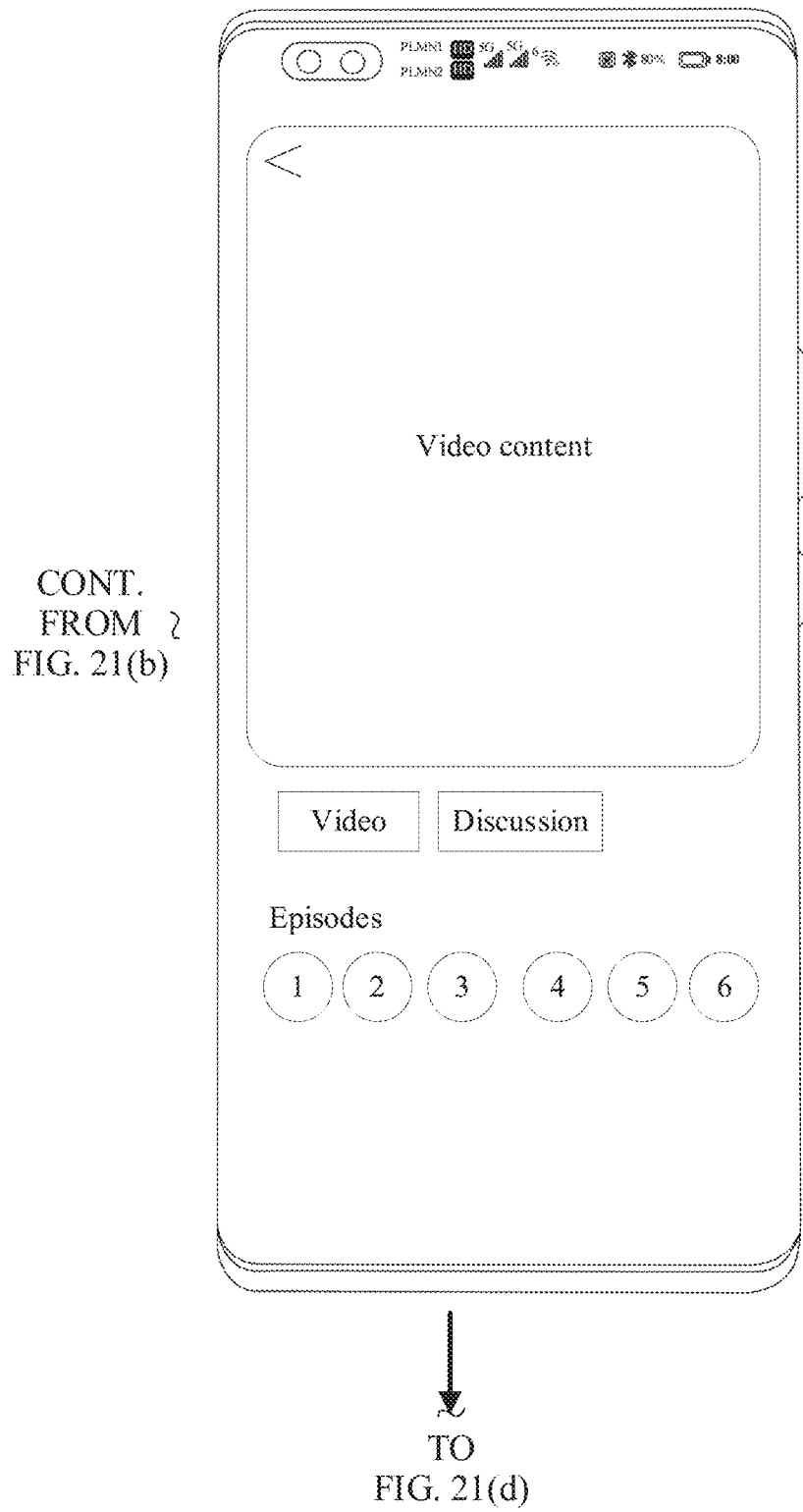
Figure 21D:
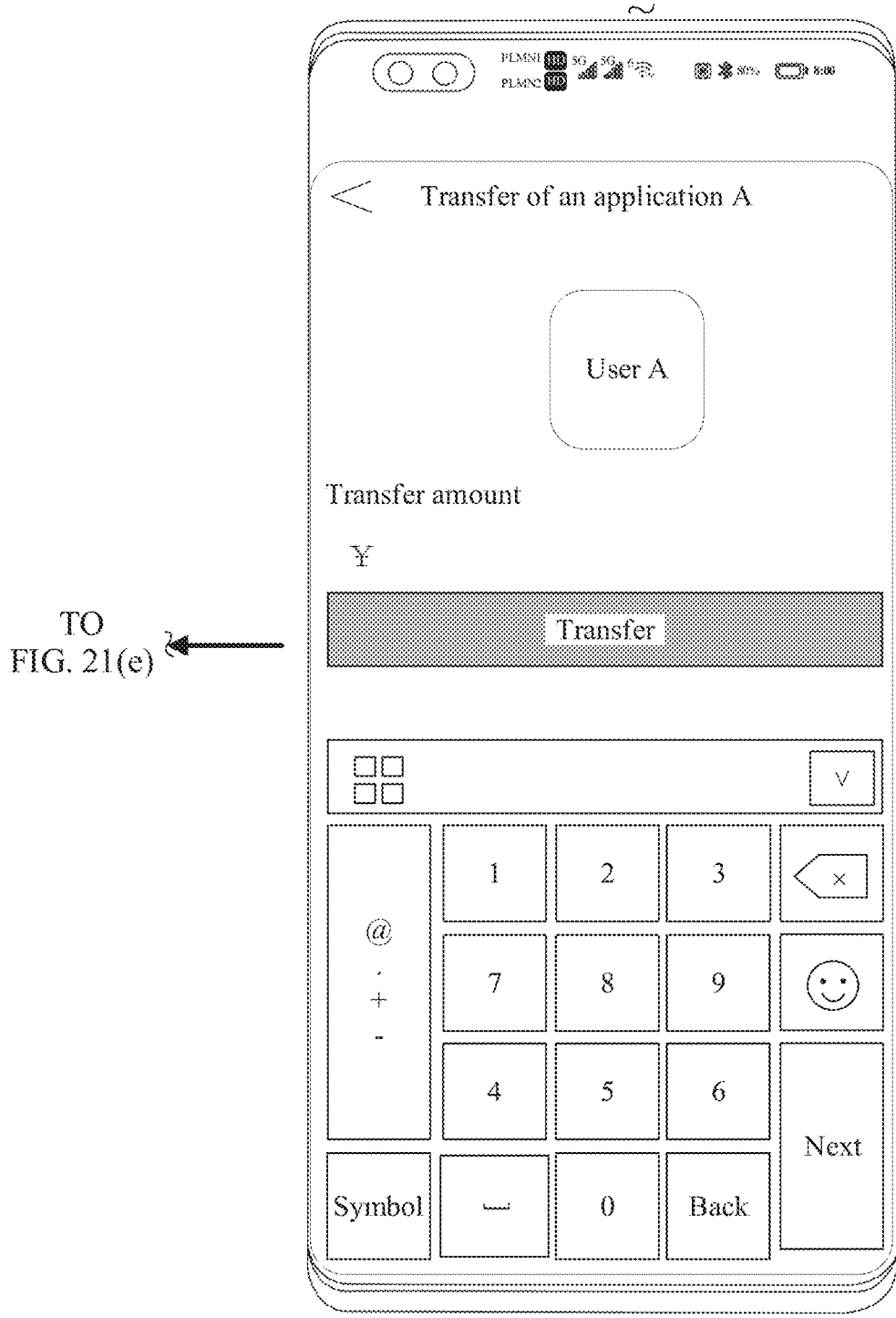
Figure 21E:
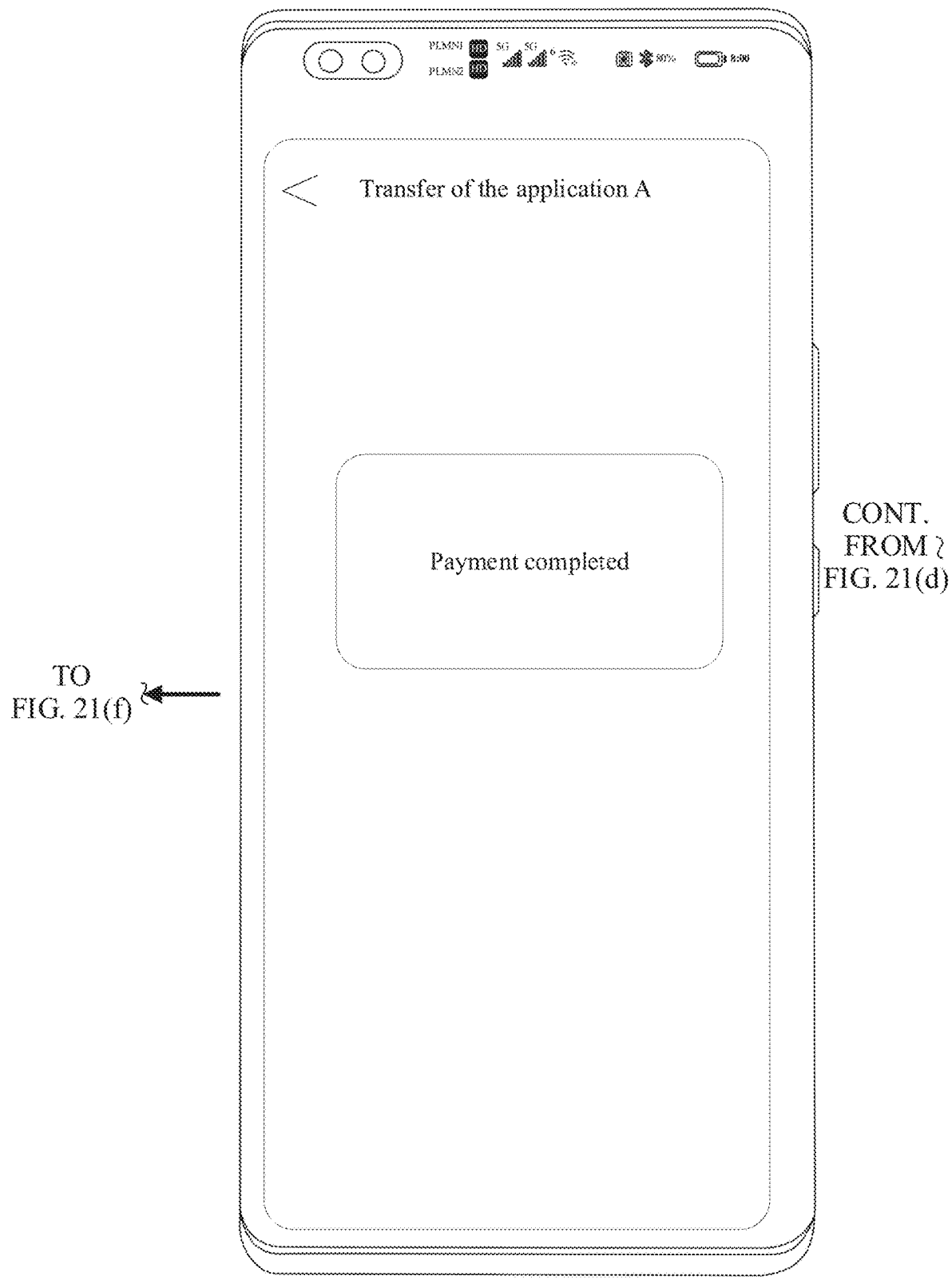
Figure 21F:
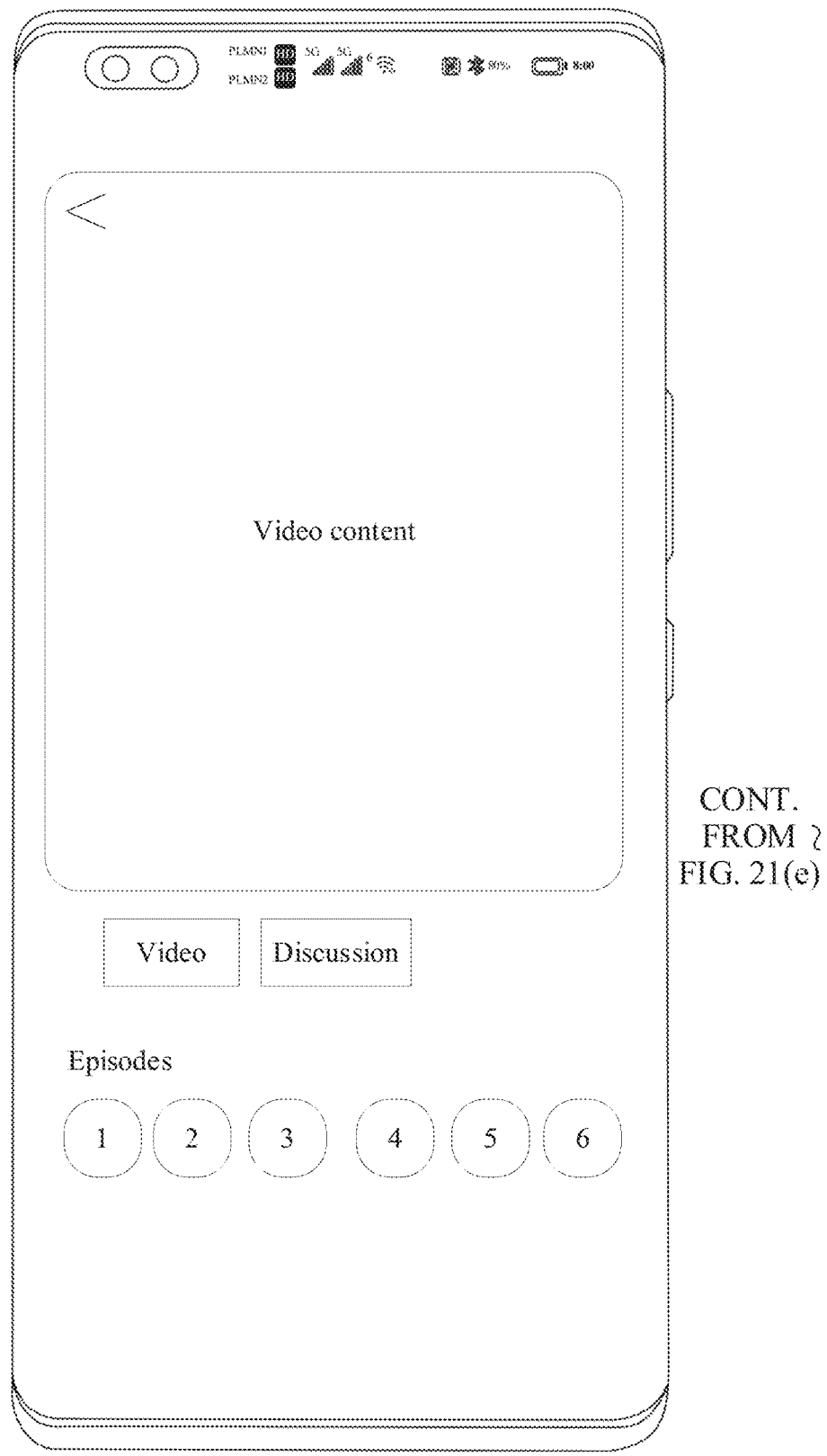

For example, FIG. 21(a), FIG. 21(b), FIG. 21(c), FIG. 21(d), FIG. 21(e), and FIG. 21(f) are a schematic diagram 1 of an interface of yet another two-dimensional code recognition method according to an embodiment of this application. As shown in FIG. 21(a), the terminal device is running another application, for example, the terminal device is running a video application. As shown in FIG. 21(b), the user holding the terminal device puts the rear-facing camera of the terminal device toward a desktop. In this case, a screen of the terminal device faces upward (a positive direction of the z-axis of the world coordinate system). Further, in the manner provided in this embodiment, if it is determined that the terminal device is in the screen-on unlocked state, the screen orientation is not downward, the value represented by the ambient light information is greater than or equal to the fourth preset threshold, and the terminal device falls within a preset geofencing range (an unnecessary condition), the terminal device turns on the rear-facing camera to capture an image, and recognizes a two-dimensional code. As shown in FIG. 21(c), the terminal device still displays an interface of the application that the terminal device is running, and the terminal device calls the rear-facing camera of the terminal device in the background to obtain an image, and recognizes two-dimensional code information in the image in the background. As shown in FIG. 21(c), the terminal device calls the rear-facing camera of the terminal device to obtain an image, and recognizes two-dimensional code information in the image. As shown in FIG. 21(d), in the manner in this embodiment, the terminal device sequentially captures a low-frame rate image and a high-frame rate image, recognizes a two-dimensional code, and pulls up an application interface. A transfer interface of an application A may be obtained. As shown in FIG. 21(e), the terminal device displays a prompt "Payment completed" after the terminal device determines that processing of a transfer task of the application A is completed. As shown in FIG. 21(f), after determining a task, the terminal device automatically closes the application that is pulled up, and the terminal device displays the initially running video application.

Figure 22A:
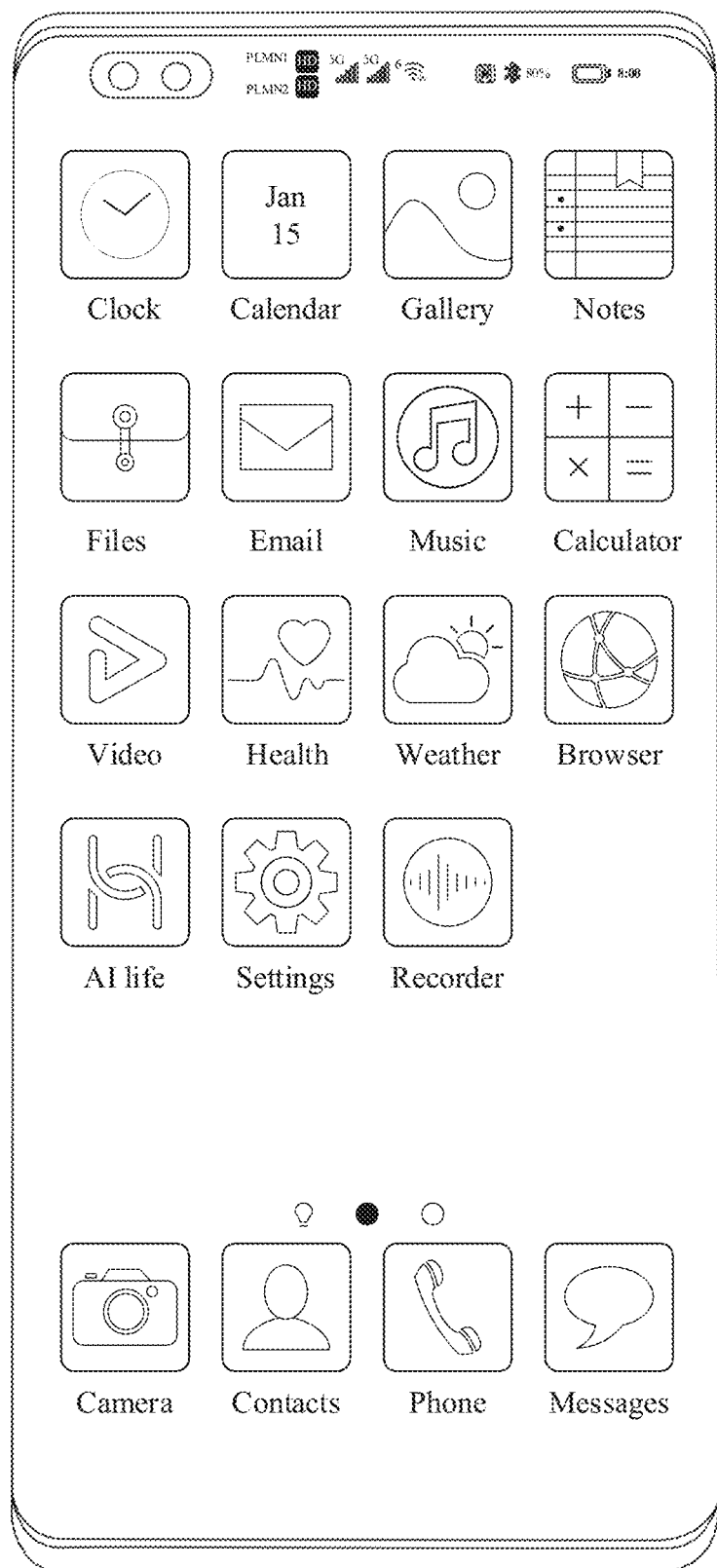
FIG. 22(a), FIG. 22(b), FIG. 22(c), FIG. 22(d), FIG. 22(e), and FIG. 22(f) are a schematic diagram 2 of an interface of yet another two-dimensional code recognition method according to an embodiment of this application.
Figure 22B:
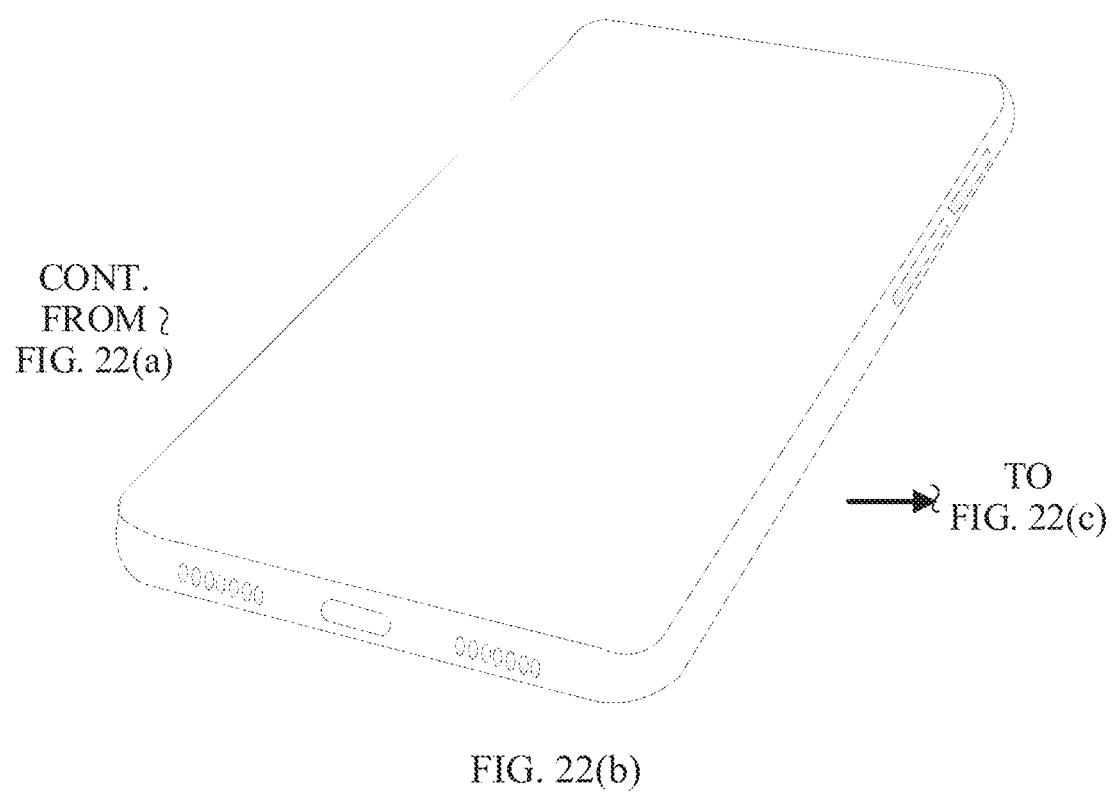
Figure 22C:
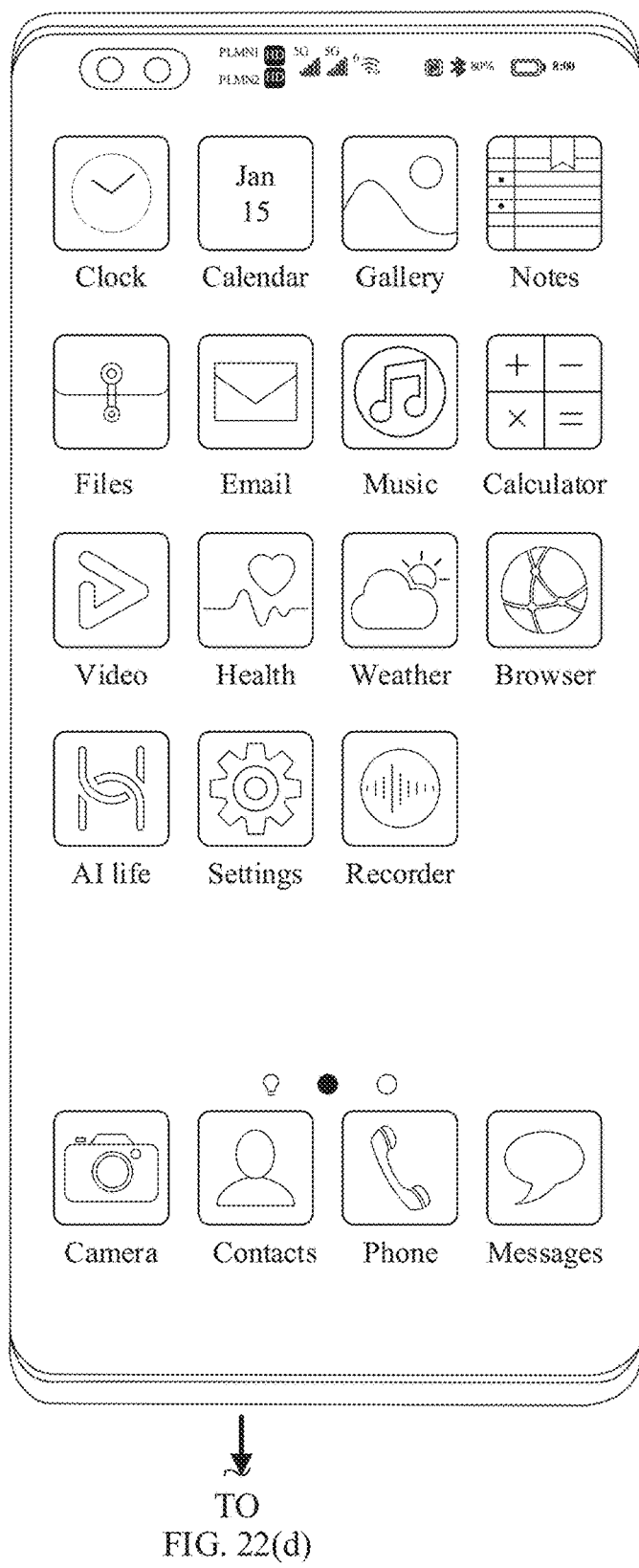
Figure 22D:
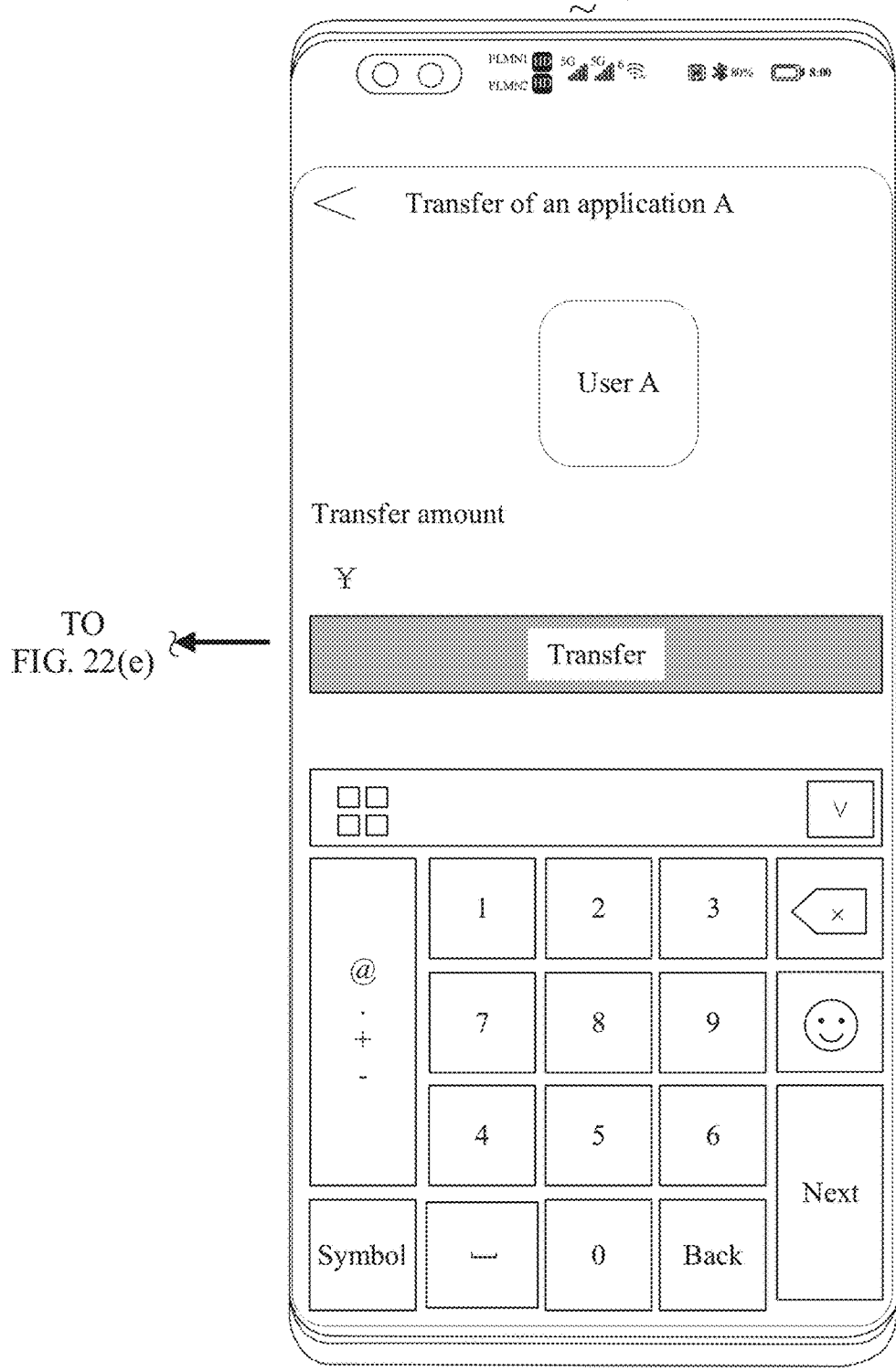
Figure 22E:
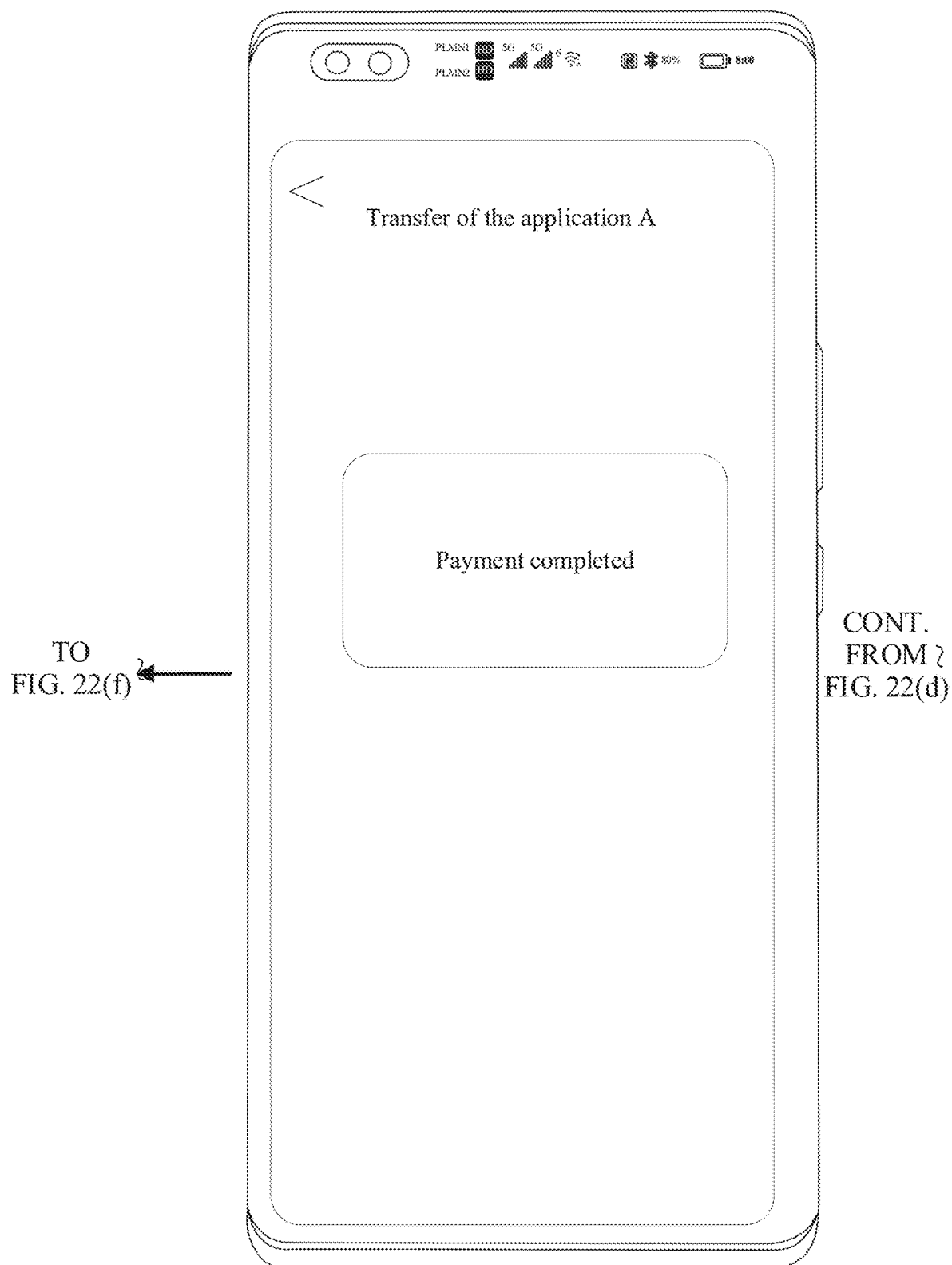
Figure 22F:
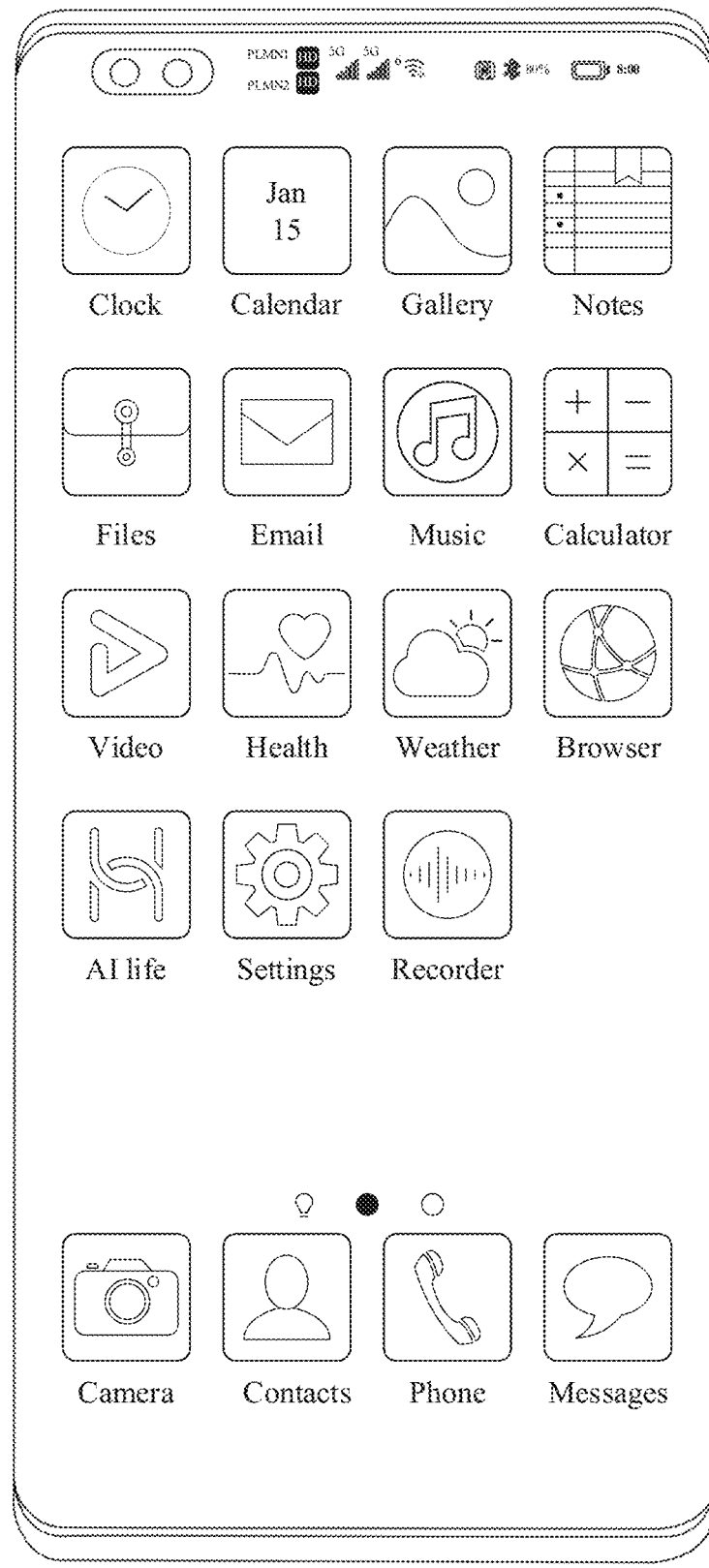

For example, FIG. 22(a), FIG. 22(b), FIG. 22(c), FIG. 22(d), FIG. 22(e), and FIG. 22(f) are a schematic diagram 2 of an interface of yet another two-dimensional code recognition method according to an embodiment of this application. As shown in FIG. 22(a), the terminal device is in the desktop state, in other words, the terminal device does not run an application in the foreground. As shown in FIG. 22(b), the user holding the terminal device puts the rear-facing camera of the terminal device toward a desktop. In this case, a screen of the terminal device faces upward (a positive direction of the z-axis of the world coordinate system). Further, in the manner provided in this embodiment, if it is determined that the terminal device is in the screen-on unlocked state, the terminal device is in the desktop state, the screen orientation is not downward, the value represented by the ambient light information is greater than or equal to the fourth preset threshold, and the terminal device falls within a preset geofencing range (an unnecessary condition), the terminal device turns on the rear-facing camera to capture an image, and recognizes a two-dimensional code. As shown in FIG. 22(c), the terminal device calls the rear-facing camera of the terminal device to obtain an image, and recognizes two-dimensional code information in the image. As shown in FIG. 22(c), the terminal device still displays the desktop, and the terminal device calls the rear-facing camera of the terminal device in the background to obtain an image, and recognizes two-dimensional code information in the image in the background. As shown in FIG. 22(d), in the manner in this embodiment, the terminal device sequentially captures a low-frame rate image and a high-frame rate image, recognizes a two-dimensional code, and pulls up an application interface. A transfer interface of an application A may be obtained. As shown in FIG. 22(e), the terminal device displays a prompt "Payment completed" after the terminal device determines that processing of a transfer task of the application A is completed. As shown in FIG. 22(f), after determining a task, the terminal device automatically closes the application that is pulled up, and the terminal device returns to the initial desktop state.

Figure 23A:
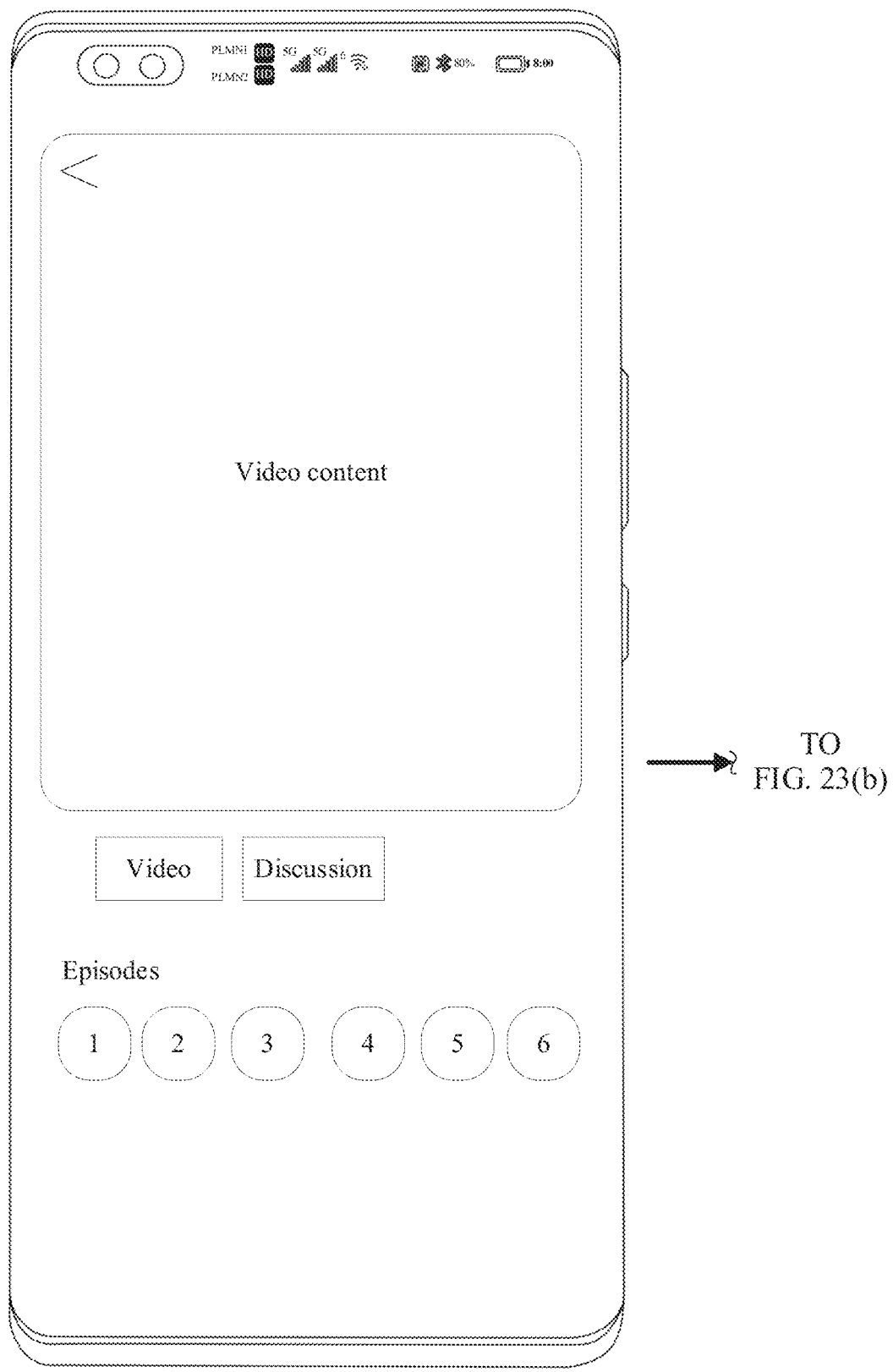
FIG. 23(a), FIG. 23(b), FIG. 23(c), FIG. 23(d), FIG. 23(e), and FIG. 23(f) are a schematic diagram 3 of an interface of yet another two-dimensional code recognition method according to an embodiment of this application.
Figure 23B:
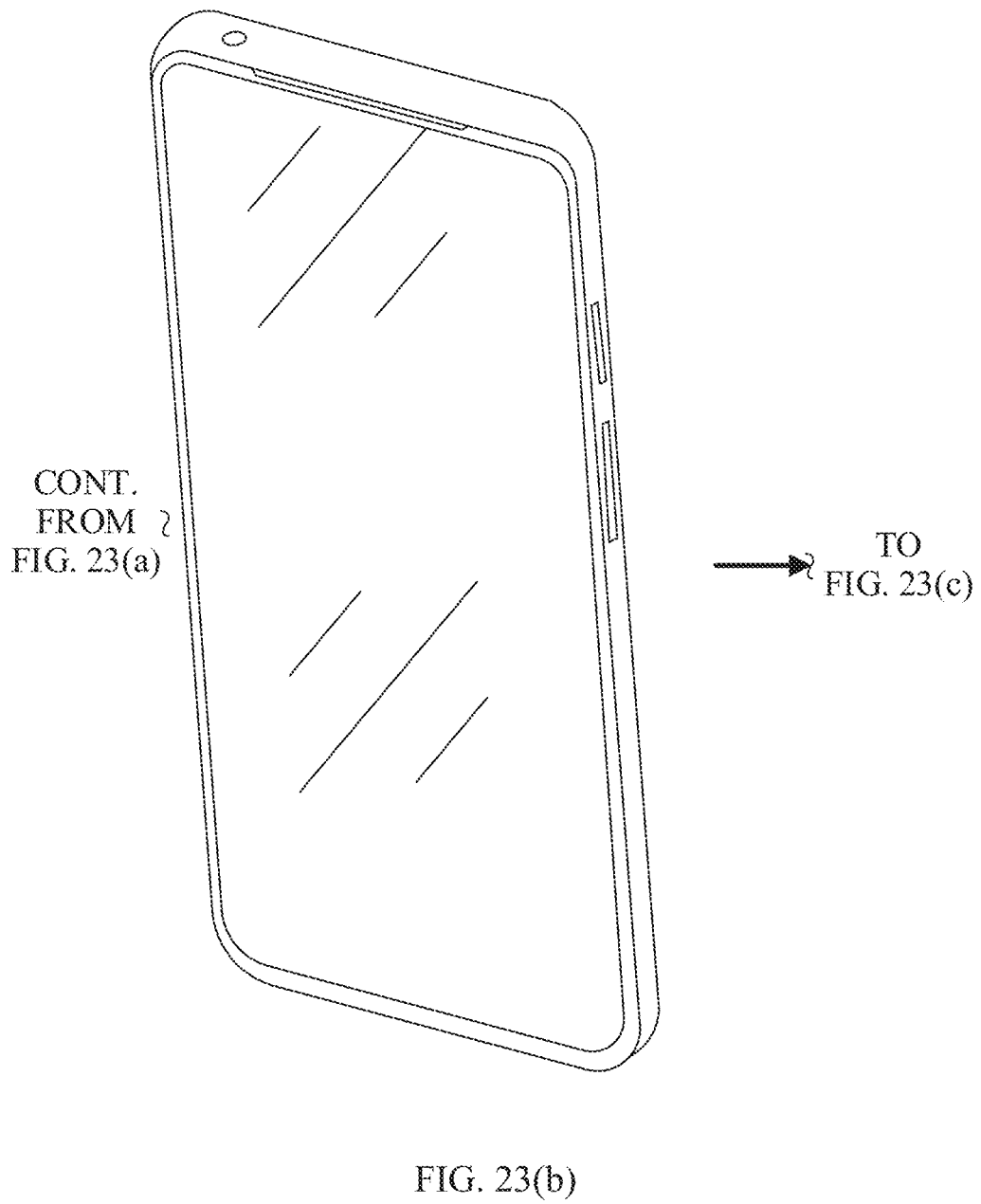
Figure 23C:
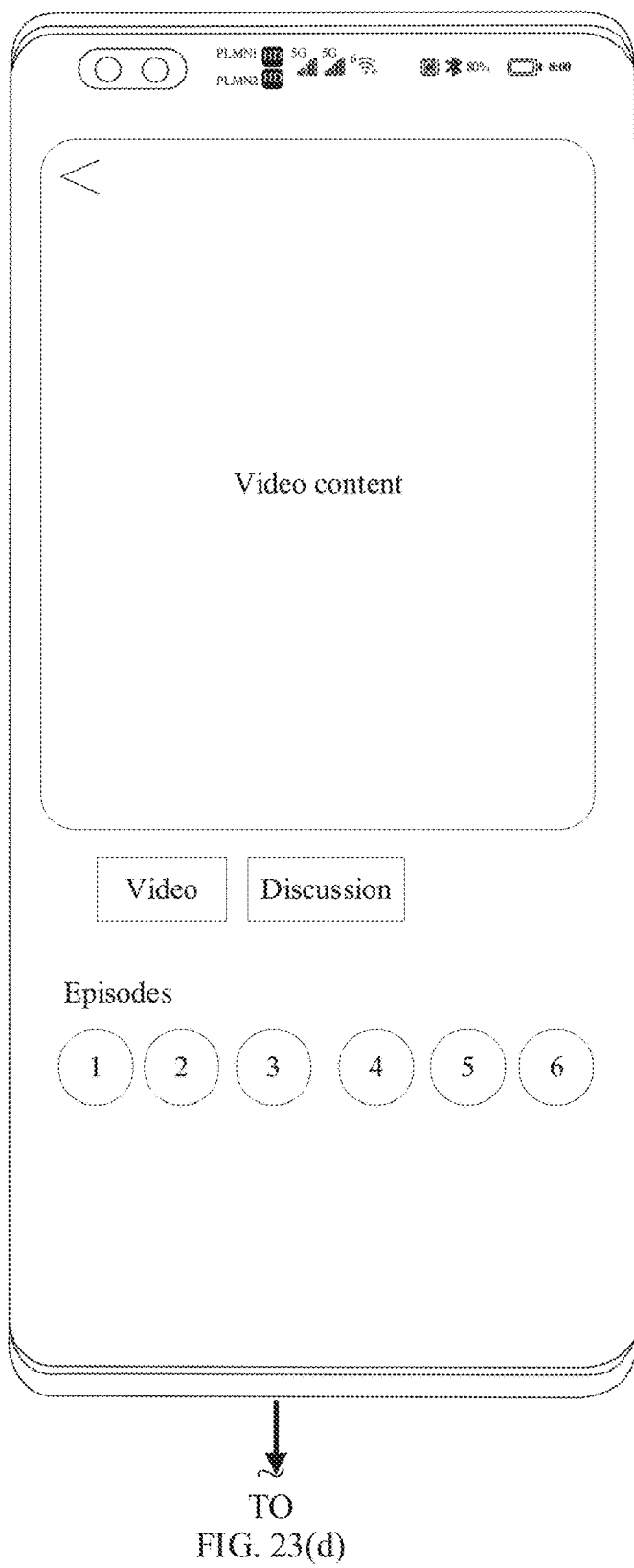
Figure 23D:
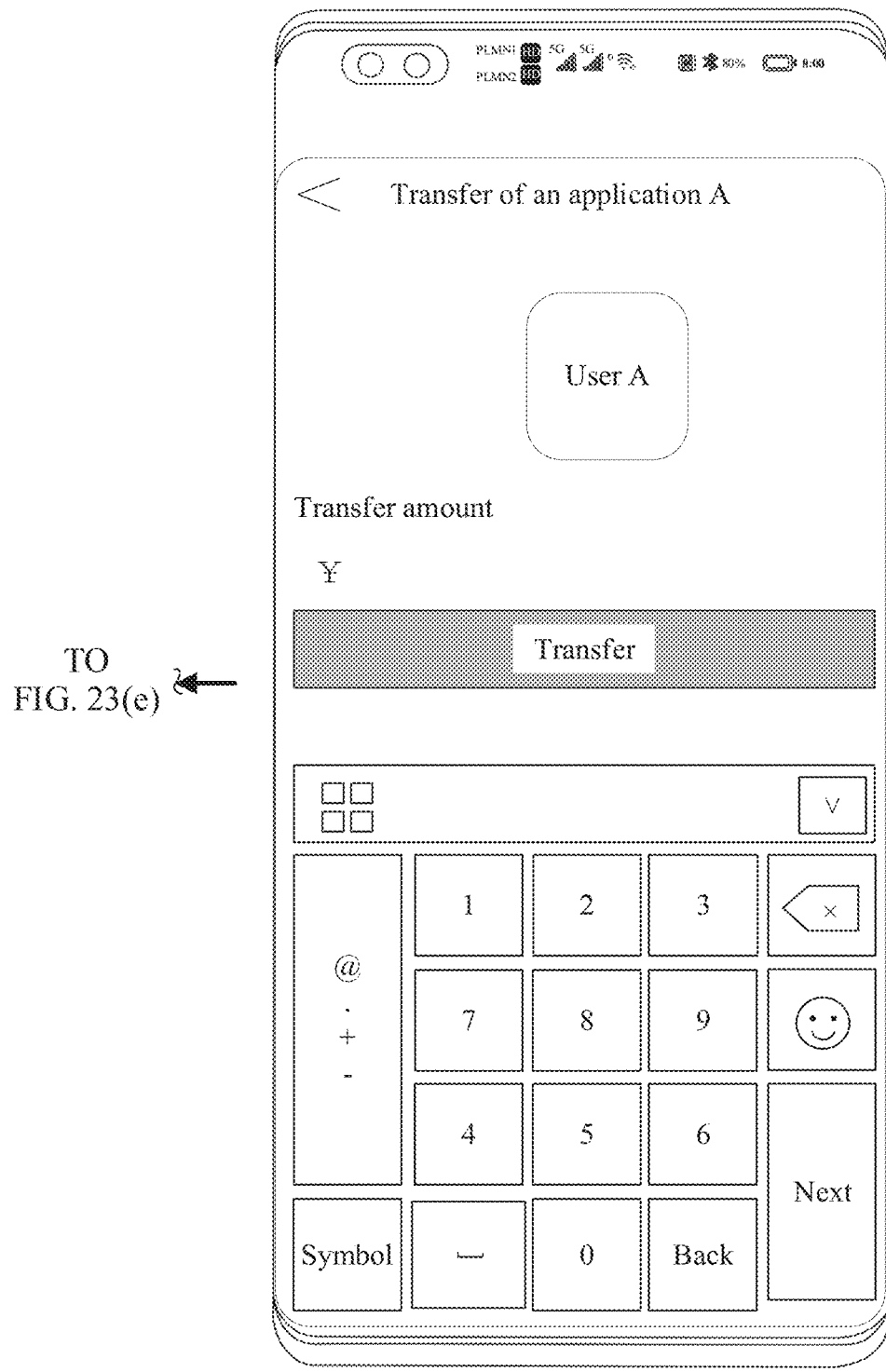
Figure 23E:
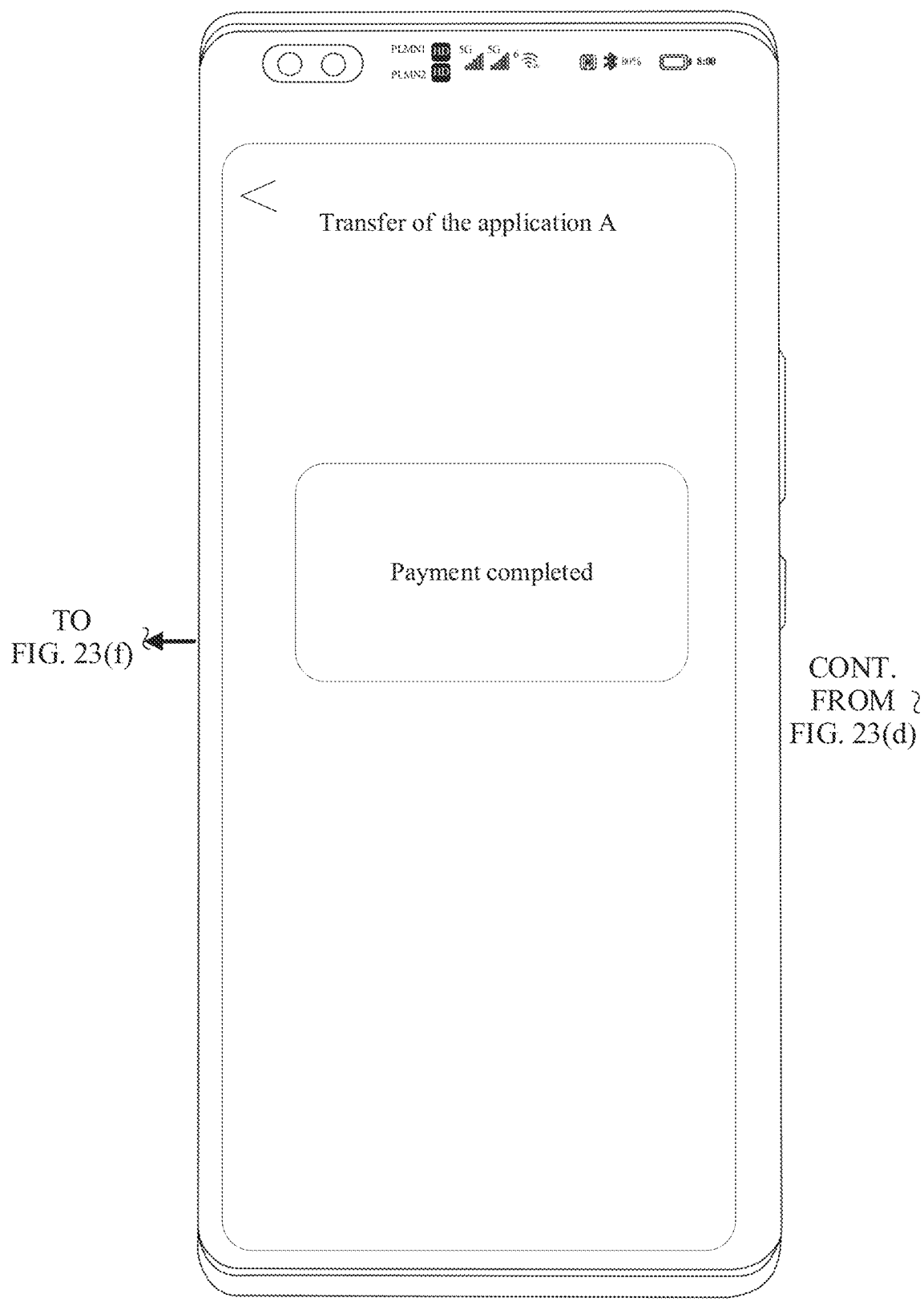
Figure 23F:
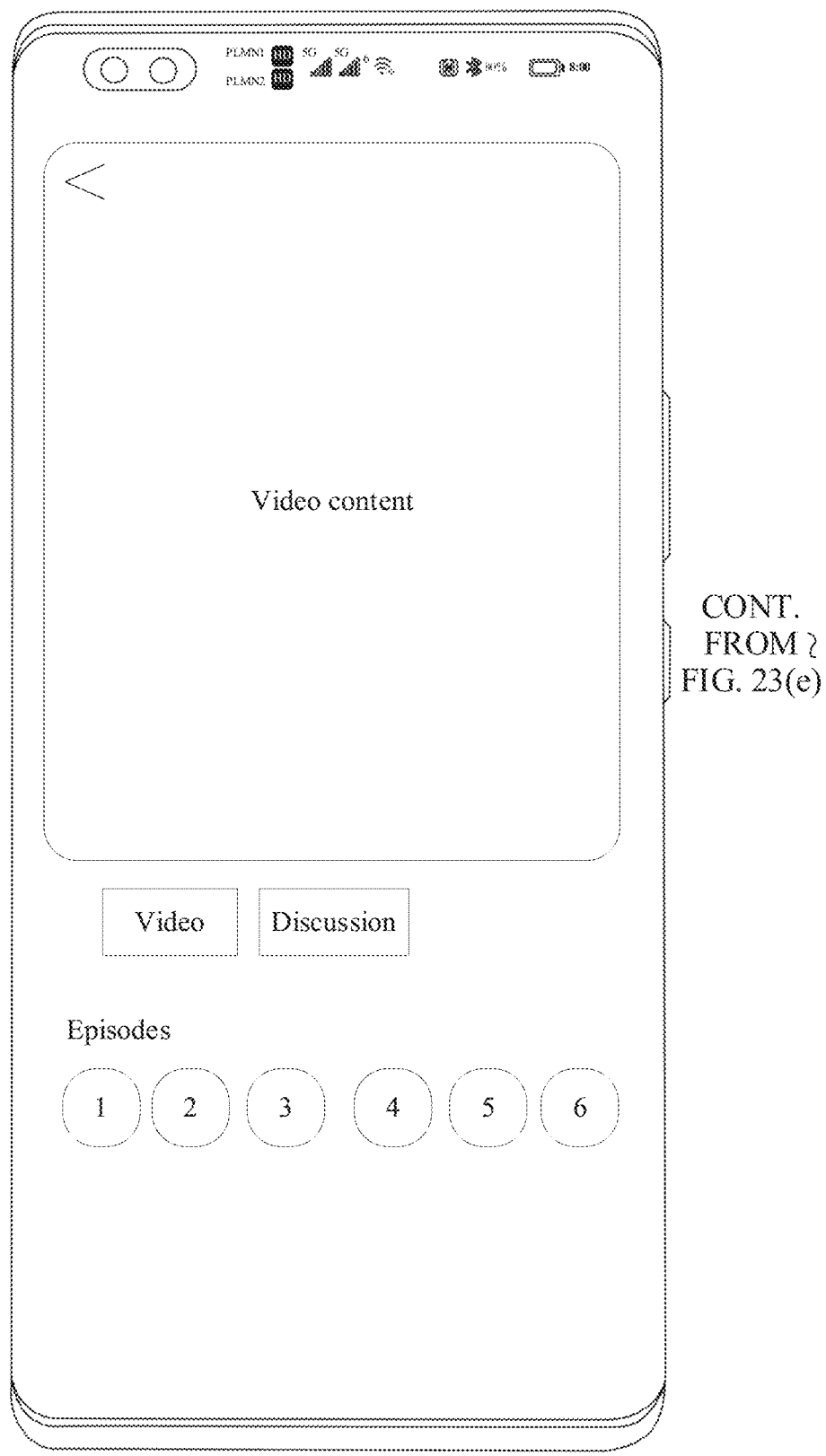

For example, FIG. 23(a), FIG. 23(b), FIG. 23(c), FIG. 23(d), FIG. 23(e), and FIG. 23(f) are a schematic diagram 3 of an interface of yet another two-dimensional code recognition method according to an embodiment of this application. As shown in FIG. 23(a), the terminal device is running another application, for example, the terminal device is running a video application. As shown in FIG. 23(b), the user holding the terminal device puts the rear-facing camera of the terminal device toward a wall. In this case, a screen of the terminal device does not face downward ("downward" is the negative direction of the z-axis of the world coordinate system). Further, in the manner provided in this embodiment, if it is determined that the terminal device is in the screen-on unlocked state, the screen orientation is not downward, the value represented by the ambient light information is greater than or equal to the fourth preset threshold, and the terminal device falls within a preset geofencing range (an unnecessary condition), the terminal device turns on the rear-facing camera to capture an image, and recognizes a two-dimensional code. As shown in FIG. 23(c), the terminal device still displays an interface of the application that the terminal device is running, and the terminal device calls the rear-facing camera of the terminal device in the background to obtain an image, and recognizes two-dimensional code information in the image in the background. As shown in FIG. 23(d), in the manner in this embodiment, the terminal device sequentially captures a low-frame rate image and a high-frame rate image, recognizes a two-dimensional code, and pulls up an application interface. A transfer interface of an application A may be obtained. As shown in FIG. 23(e), the terminal device displays a prompt "Payment completed" after the terminal device determines that processing of a transfer task of the application A is completed. As shown in FIG. 23(f), after determining a task, the terminal device automatically closes the application that is pulled up, and the terminal device displays the initially running video application.

Figure 24A:
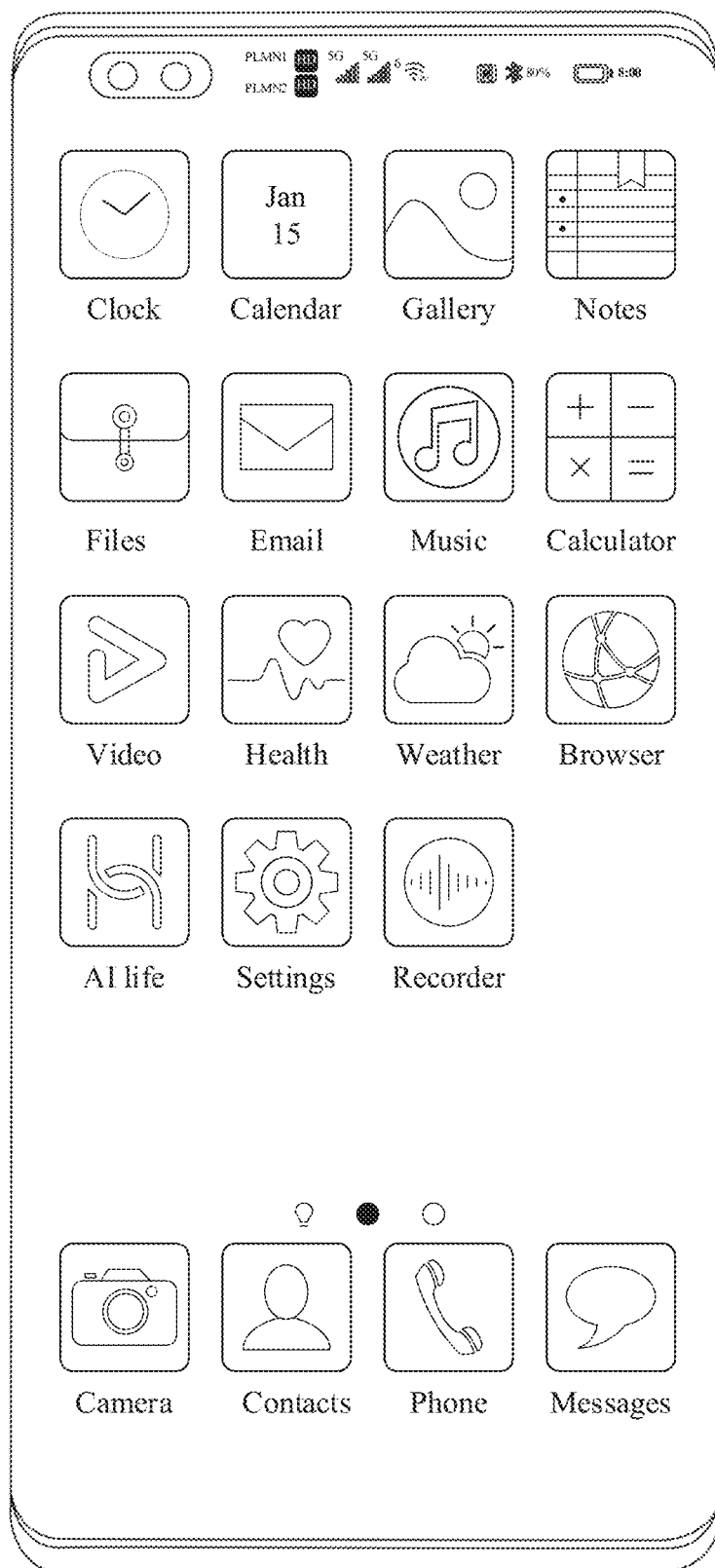
FIG. 24(a), FIG. 24(b), FIG. 24(c), FIG. 24(d), FIG. 24(e), and FIG. 24(f) are a schematic diagram 4 of an interface of yet another two-dimensional code recognition method according to an embodiment of this application.
Figure 24B:
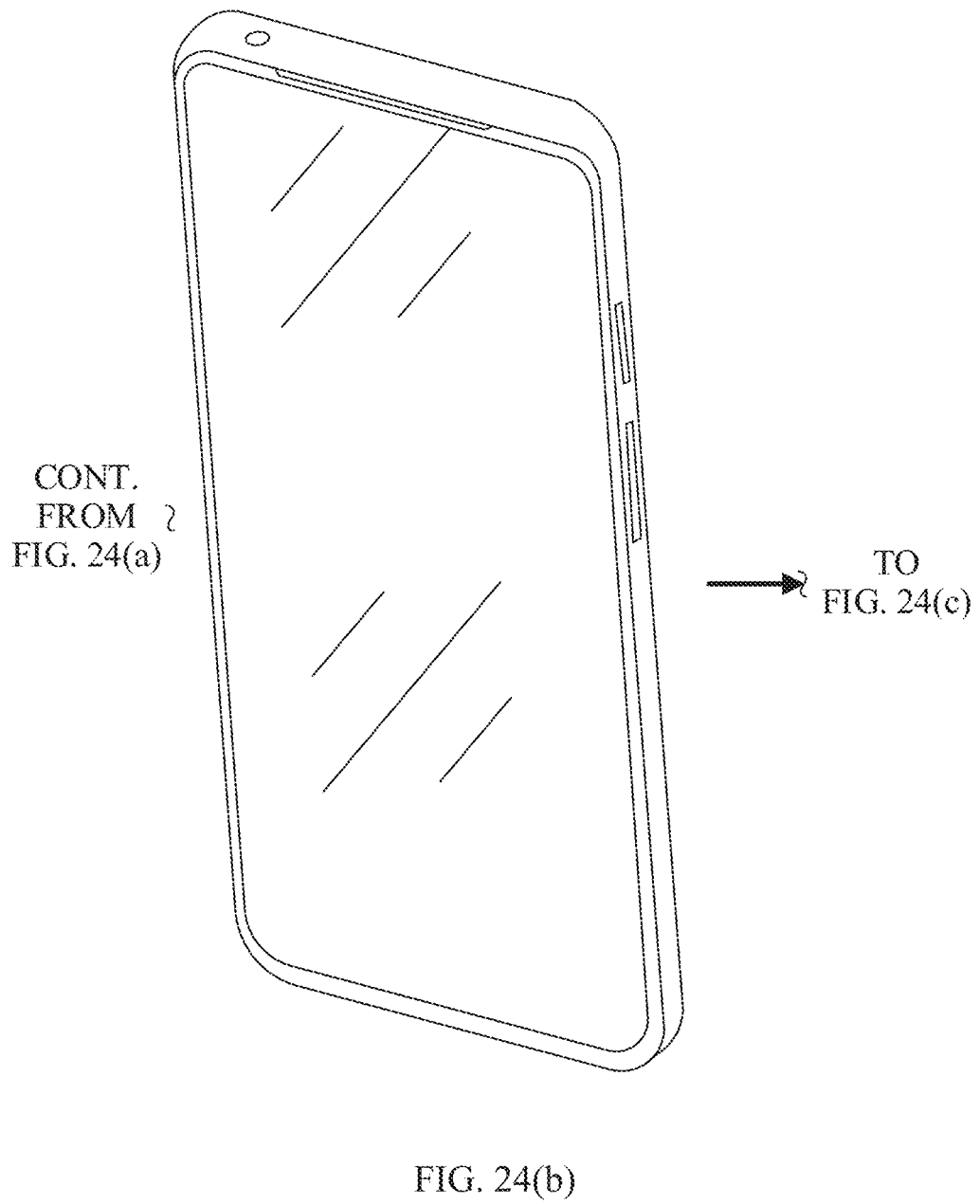
Figure 24C:
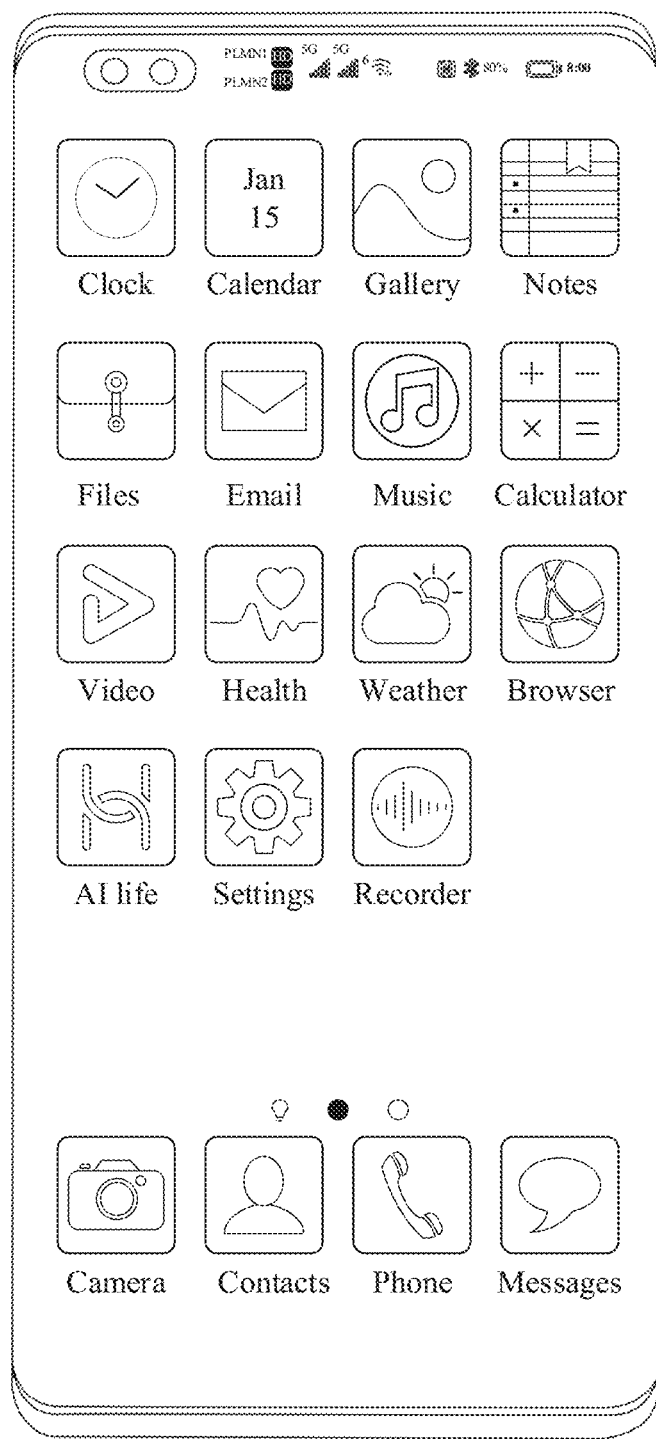
Figure 24D:
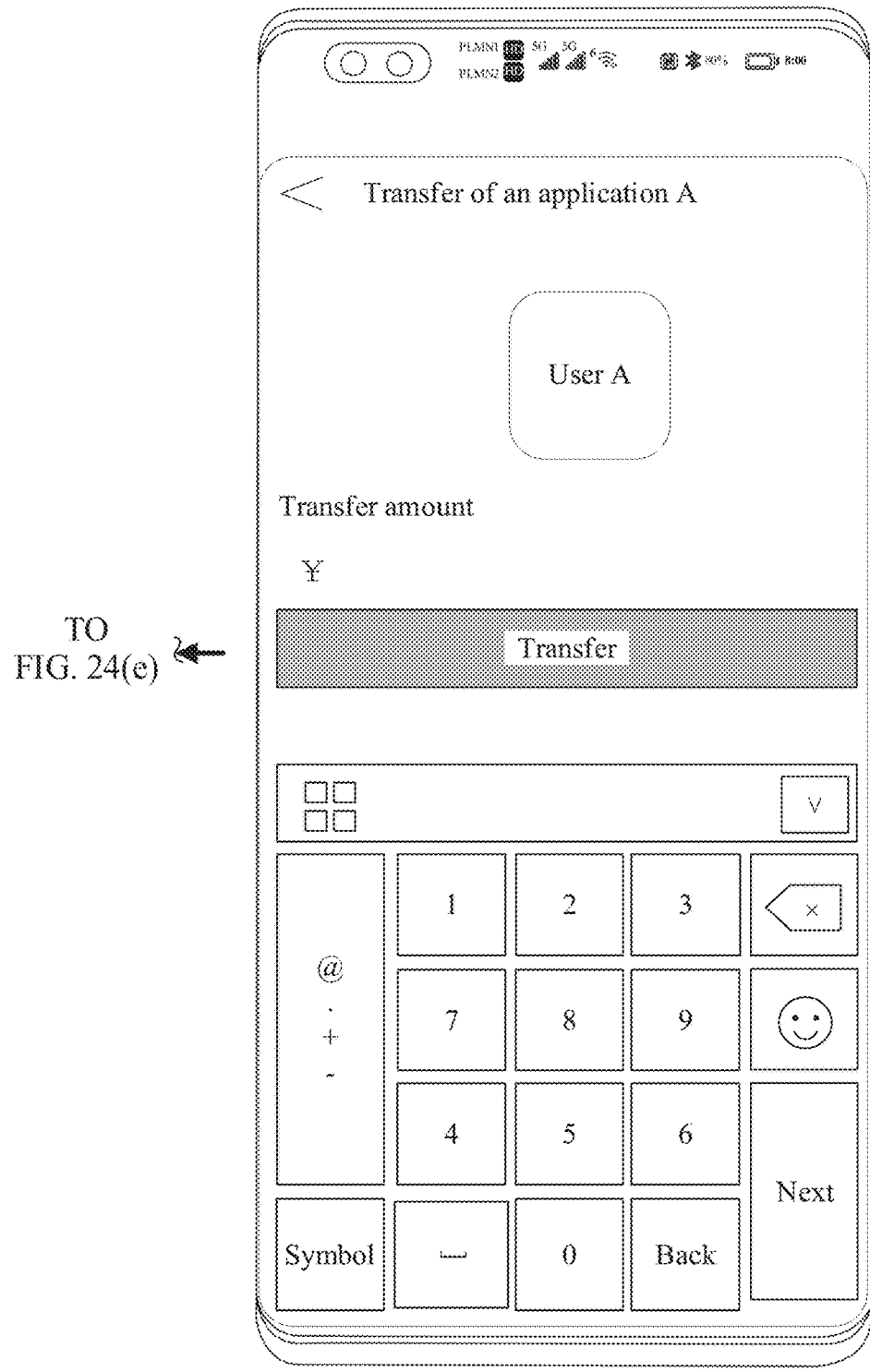
Figure 24E:
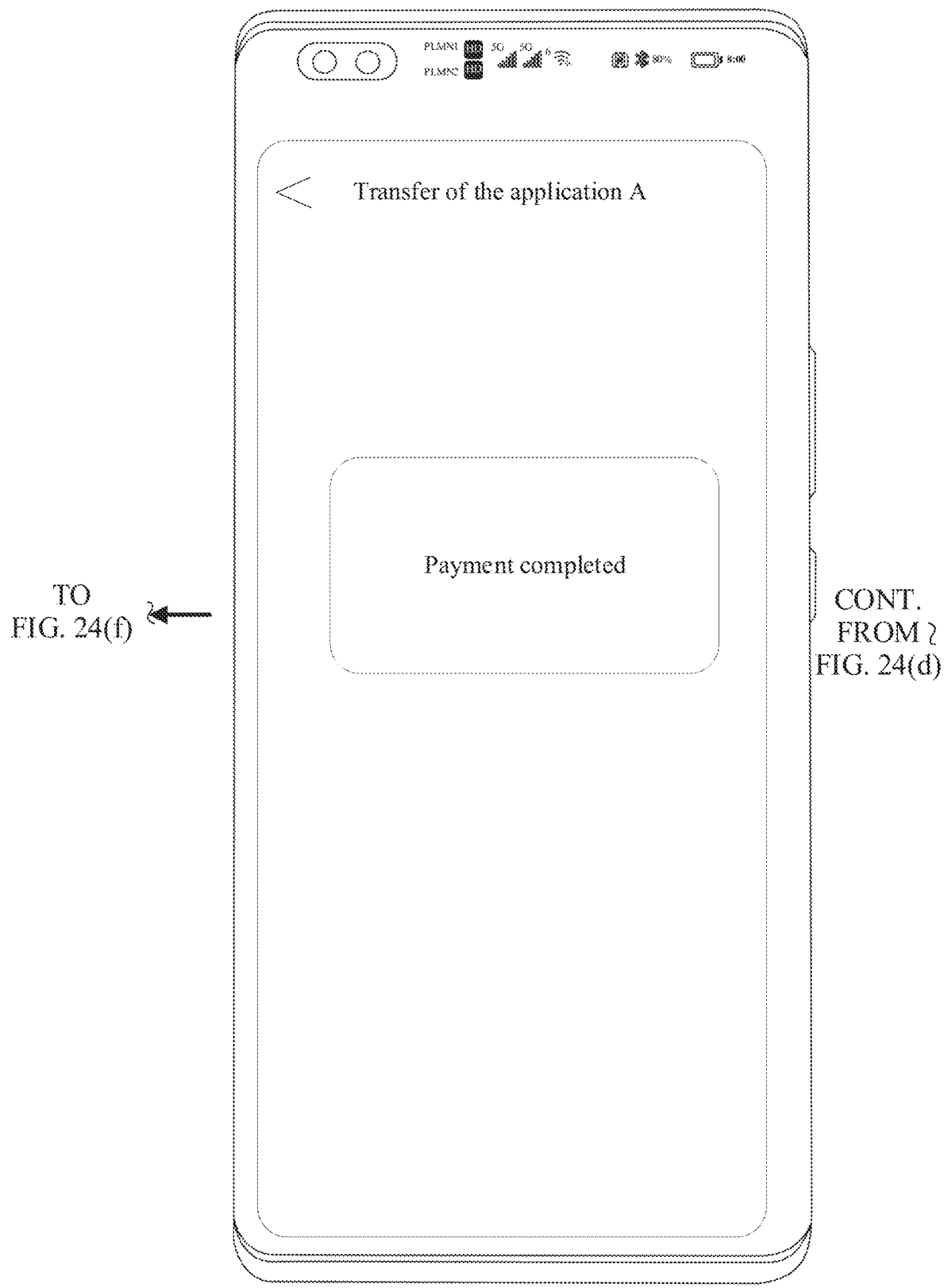
Figure 24F:
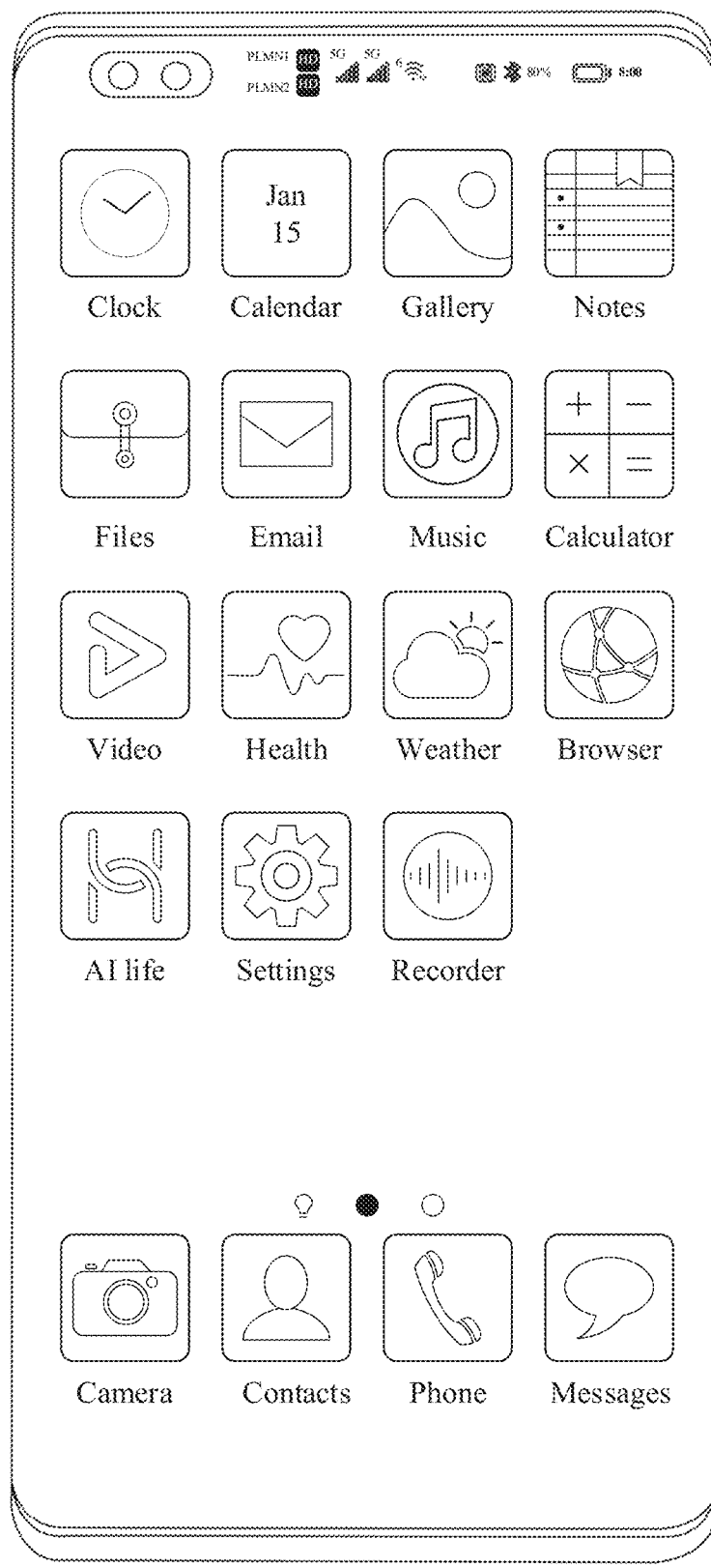

For example, FIG. 24(a), FIG. 24(b), FIG. 24(c), FIG. 24(d), FIG. 24(e), and FIG. 24(f) are a schematic diagram 4 of an interface of yet another two-dimensional code recognition method according to an embodiment of this application. As shown in FIG. 24(a), the terminal device is in the desktop state, in other words, the terminal device does not run an application in the foreground. As shown in FIG. 24(b), the user holding the terminal device puts the rear-facing camera of the terminal device toward a wall. In this case, a screen of the terminal device does not face downward ("downward" is the negative direction of the z-axis of the world coordinate system). Further, in the manner provided in this embodiment, if it is determined that the terminal device is in the screen-on unlocked state, the terminal device is in the desktop state, the screen orientation is not downward, the value represented by the ambient light information is greater than or equal to the fourth preset threshold, and the terminal device falls within a preset geofencing range (an unnecessary condition), the terminal device turns on the rear-facing camera to capture an image, and recognizes a two-dimensional code. As shown in FIG. 24(c), the terminal device calls the rear-facing camera of the terminal device to obtain an image, and recognizes two-dimensional code information in the image. As shown in FIG. 24(c), the terminal device still displays a desktop, and the terminal device calls the rear-facing camera of the terminal device in the background to obtain an image, and recognizes two-dimensional code information in the image in the background. As shown in FIG. 24(d), in the manner in this embodiment, the terminal device sequentially captures a low-frame rate image and a high-frame rate image, recognizes a two-dimensional code, and pulls up an application interface. A transfer interface of an application A may be obtained. As shown in FIG. 24(e), the terminal device displays a prompt "Payment completed" after the terminal device determines that processing of a transfer task of the application A is completed. As shown in FIG. 24(f), after determining a task, the terminal device automatically closes the application that is pulled up, and the terminal device returns to the initial desktop state.

Figure 25A:
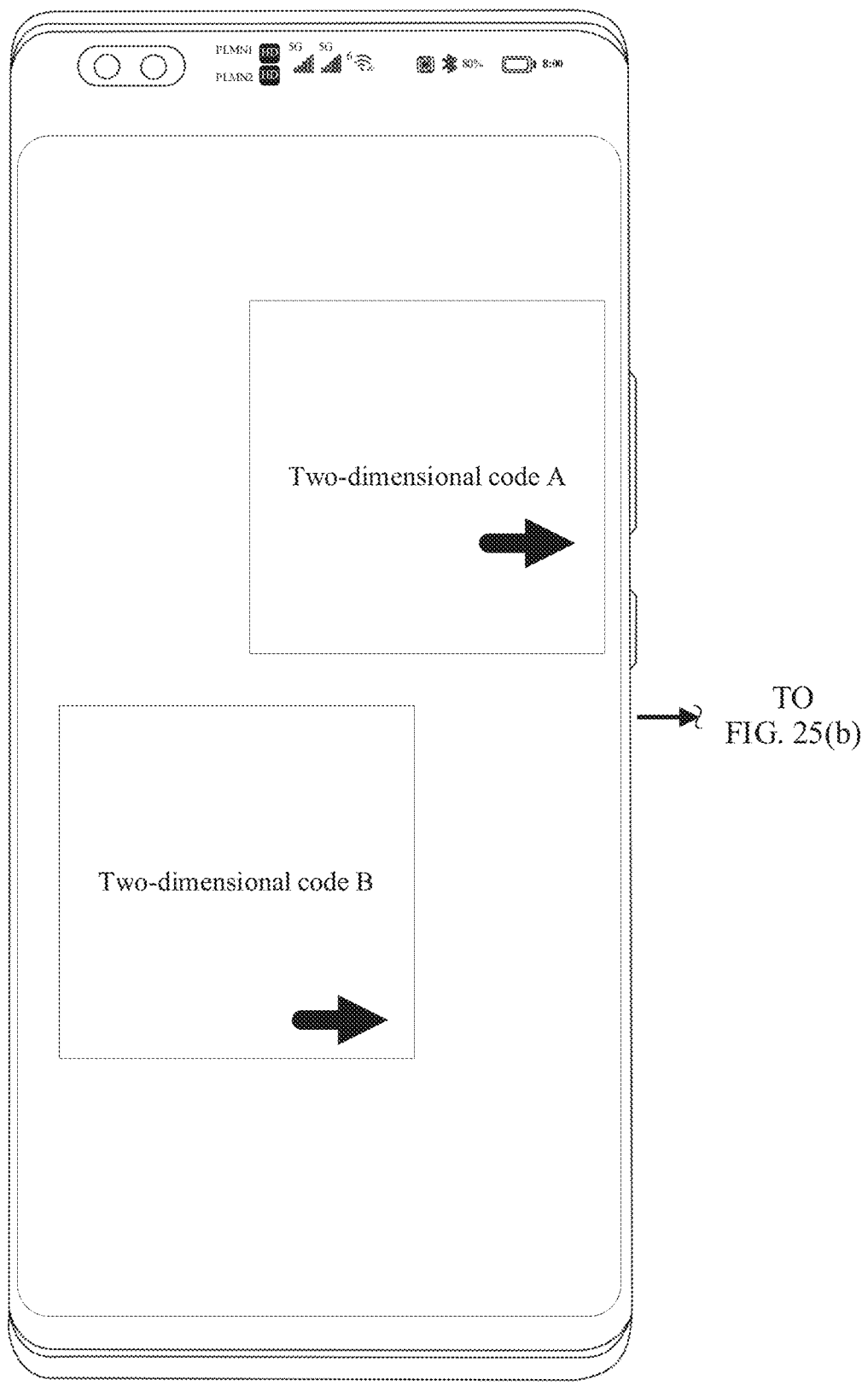
FIG. 25(a) and FIG. 25(b) are a schematic diagram of a two-dimensional code interface according to an embodiment of this application.
Figure 25B:
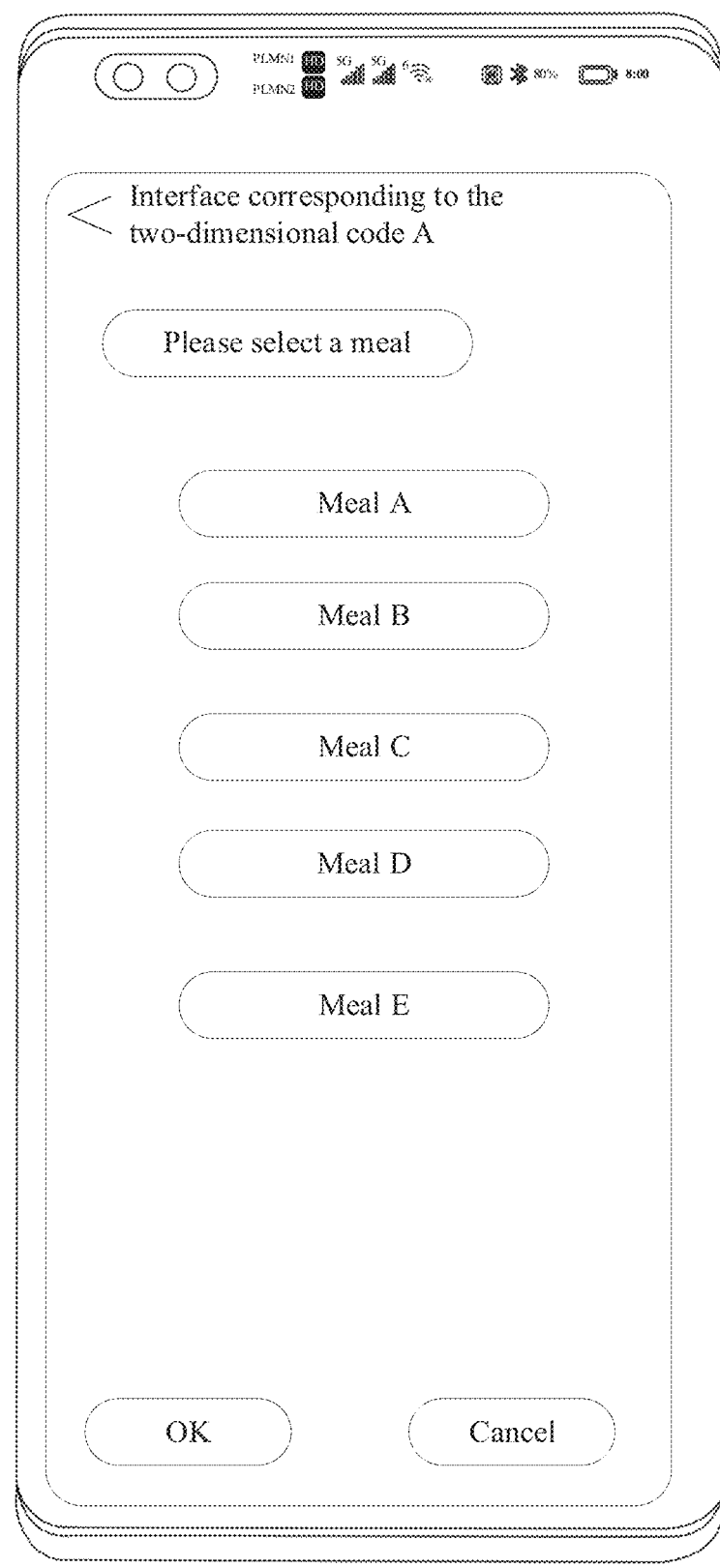

For example, FIG. 25(a) and FIG. 25(b) are a schematic diagram of a two-dimensional code interface according to an embodiment of this application. As shown in FIG. 25(a), the terminal device recognizes two-dimensional code information in a second image to obtain and display a two-dimensional code A and a two-dimensional code B. As shown in FIG. 25(b), the user touches a terminal device to select the two-dimensional code A. Further, the terminal device calls an application interface corresponding to the two-dimensional code image A. The terminal device displays an ordering interface. The ordering interface includes a plurality of meals such as a meal A, a meal B, a meal C, a meal D, and a meal E.

In this embodiment, based on the previous embodiment, the terminal device first captures a low-frame rate image based on the rear-facing camera. If the terminal device determines that no suspected two-dimensional code image exists in the low-frame rate image, the terminal device needs to recognize a two-dimensional code, so that resources of the terminal device are reduced, and power consumption of the terminal device is reduced. If the terminal device determines that a suspected two-dimensional code image exists in the low-frame rate image, the terminal device captures a high-frame rate image based on the rear-facing camera, recognizes a two-dimensional code in the high-frame rate image, and further pulls up an application interface corresponding to the two-dimensional code. In addition, if the terminal device recognizes that the high-frame rate image includes a plurality of two-dimensional codes, an interactive manner may be provided for the user to select a two-dimensional code that needs to be processed.

Figure 26:
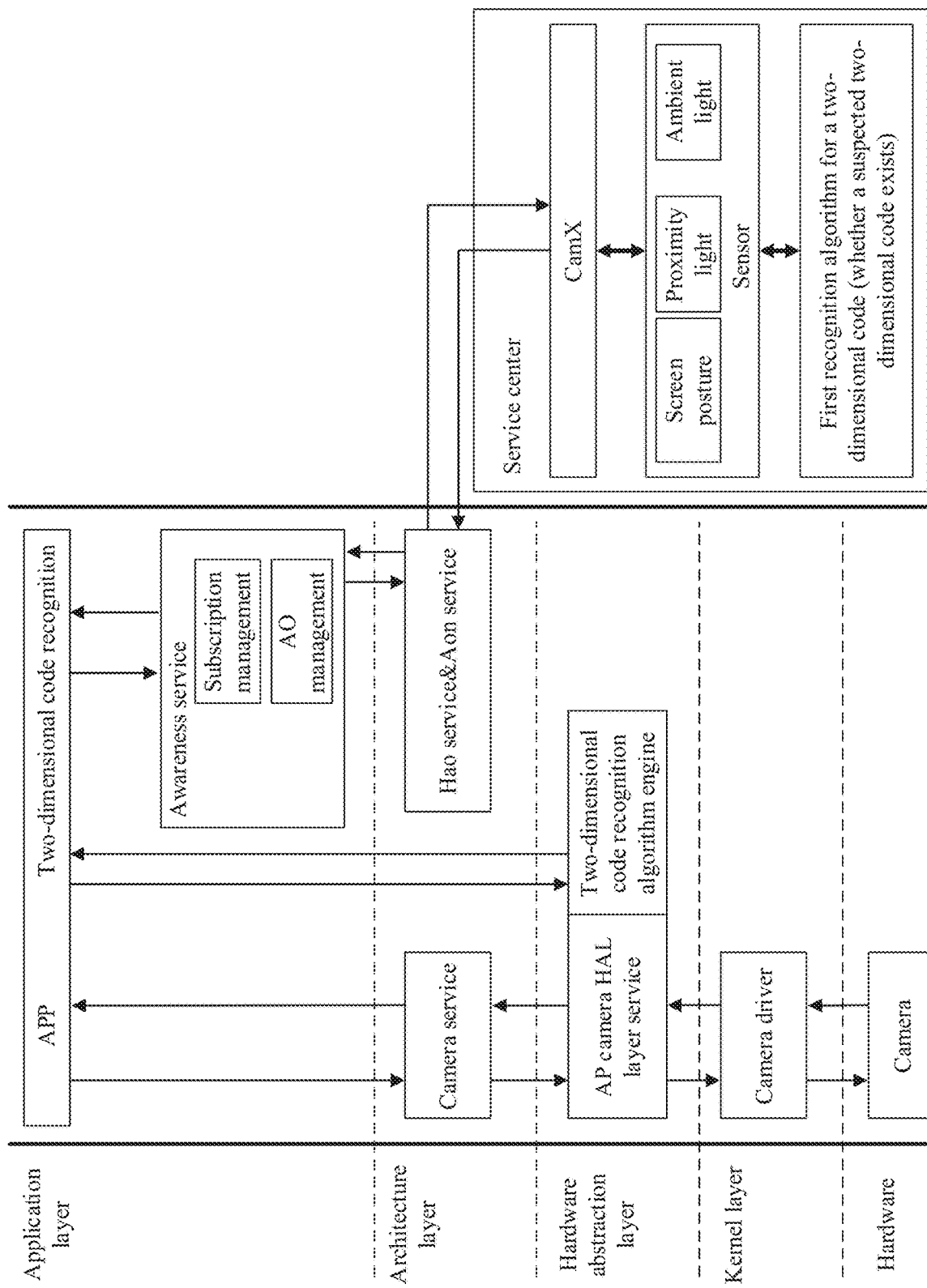
FIG. 26 is a schematic diagram of a software architecture of a two-dimensional code recognition method according to an embodiment of this application.

For example, FIG. 26 is a schematic diagram of a software architecture of a two-dimensional code recognition method according to an embodiment of this application. As shown in FIG. 26, each of the embodiments provided in this application can be adapted to the software architecture provided in FIG. 26. As shown in FIG. 26, an application layer, an architecture layer, a hardware abstraction layer, a kernel layer, and a service center are deployed in the terminal device, and hardware is disposed in the terminal device. The hardware includes a camera, and the camera includes a front-facing camera and/or a rear-facing camera.

At least one application ("app") and an awareness service are deployed in the application layer. The awareness service provides a subscription management service and an AO management service.

A camera service and Hao service&Aon service are deployed in the architecture layer.

An AP camera HAL layer service and a two-dimensional code recognition algorithm engine are deployed in the hardware abstraction layer.

A camera driver is deployed in the kernel layer.

The service center includes at least one sensor (an ambient light sensor, an optical proximity sensor, a gyroscope sensor, or an acceleration sensor). Ambient light is collected by using the ambient light sensor. Ambient light is collected by using the optical proximity sensor. A screen posture (namely, posture information) is collected by using the gyroscope sensor and the acceleration sensor. A first recognition algorithm for a two-dimensional code (for recognizing whether a suspected two-dimensional code exists) and CamX are deployed in the service center.

In the software architecture provided in FIG. 26, the posture information may be obtained by using the sensor in the service center. CamX, Hao service&Aon service, the application in the application layer, the camera service in the architecture layer, the AP camera HAL layer service in the hardware abstraction layer, and the low-power consumption camera driver in the kernel layer are sequentially used to call the camera to capture a low-frame rate image. The low-frame rate image is reversely transferred to the first recognition algorithm in the service center, and it is further recognized whether a suspected two-dimensional code exists in the low-frame rate image. If it is determined that a suspected two-dimensional code exists, CamX, Hao service&Aon service, the application in the application layer, the camera service in the architecture layer, the AP camera HAL layer service in the hardware abstraction layer, and the low-power consumption camera driver in the kernel layer are sequentially used to call the camera to capture a high-frame rate image. Then the high-frame rate image is transferred to the application in the application layer by sequentially using the AP camera HAL layer service in the hardware abstraction layer and the camera service in the architecture layer, to recognize a two-dimensional code in the high-frame rate image. In this case, the application may call the two-dimensional code recognition algorithm engine to recognize the two-dimensional code in the high-frame rate image.

The foregoing mainly describes the solutions provided in embodiments of this application from a perspective of the method. To implement the foregoing functions, the apparatus includes corresponding hardware structures and/or software modules for performing the functions. A person skilled in the art should be easily aware that, with reference to the method steps of the examples described in embodiments disclosed in this specification, this application can be implemented in a form of hardware or a combination of hardware and computer software. Whether a function is performed by hardware or computer software driving hardware depends on particular applications and design constraints of the technical solutions. A person skilled in the art may use different methods for specific applications to implement the described functions, but it should not be considered that the implementation goes beyond the scope of this application.

In embodiments of this application, the apparatus for the two-dimensional code recognition method may be divided into functional modules based on the foregoing method examples, for example, each functional module may be obtained through division for each corresponding function, or two or more functions may be integrated into one processing module. The integrated module may be implemented in a form of hardware or may be implemented in a form of a software functional module. It should be noted that module division in embodiments of this application is an example, and is merely logical function division. In actual implementation, there may be another division manner.

Figure 27:
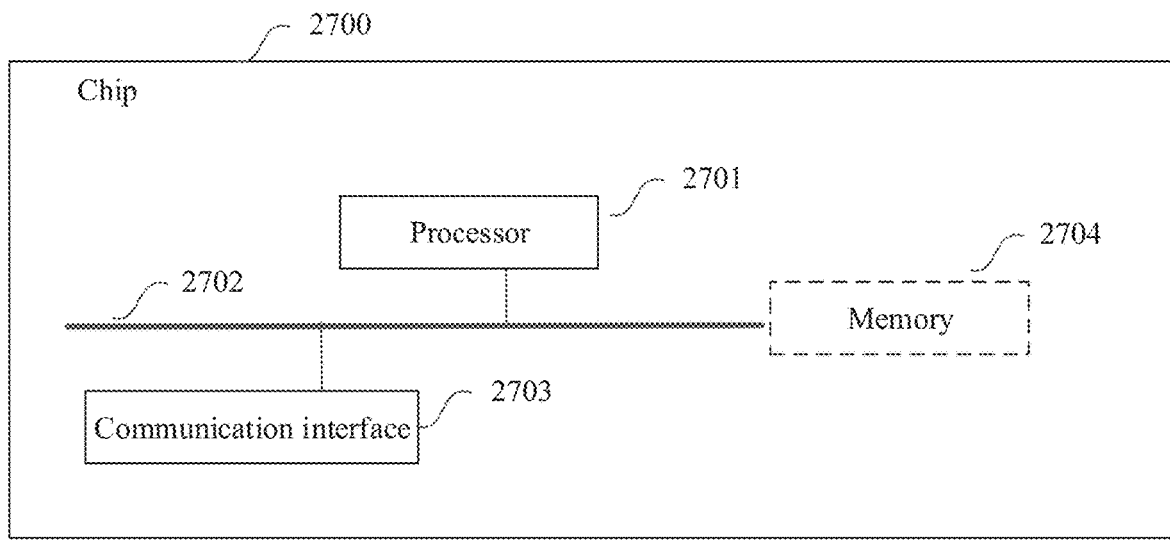
FIG. 27 is a schematic diagram of a structure of a chip according to an embodiment of this application.

FIG. 27 is a schematic diagram of a structure of a chip according to an embodiment of this application. As shown in FIG. 27, a chip 270 includes one or at least two (including two) processors 2701, a communication line 2702, a communication interface 2703, and a memory 2704.

In some implementations, the memory 2704 stores the following element: an executable module or a data structure, a subset thereof, or an extension set thereof.

The method described in embodiments of this application may be applied to the processor 2701 or implemented by the processor 2701. The processor 2701 may be an integrated circuit chip, and has a signal processing capability. In an implementation process, the steps in the method performed by the first device or the second device may be implemented by using an integrated logic circuit of hardware in the processor 2701 or by using instructions in a form of software. The processor 2701 may be a general-purpose processor (for example, a microprocessor or a conventional processor), a digital signal processor (DSP), an application specific integrated circuit (ASIC), a field-programmable gate array (FPGA) or another programmable logic device, a discrete gate, a transistor logic device, or a discrete hardware component. The processor 2701 may implement or perform the methods, steps, and logical block diagrams disclosed in embodiments of this application.

The steps of the method disclosed in embodiments of this application may be directly performed by a hardware decoding processor or by a combination of hardware and software modules in the decoding processor. The software module may be located in a mature storage medium in the art, for example, a random access memory, a read-only memory, a programmable read-only memory, or an electrically erasable programmable read-only memory (EEPROM). The storage medium is located in the memory 2704. The processor 2701 reads information in the memory 2704, and completes the steps of the foregoing method in combination with hardware of the processor 2701.

The processor 2701, the memory 2704, and the communication interface 2703 may communicate with each other by using the communication line 2702.

Figure 28:
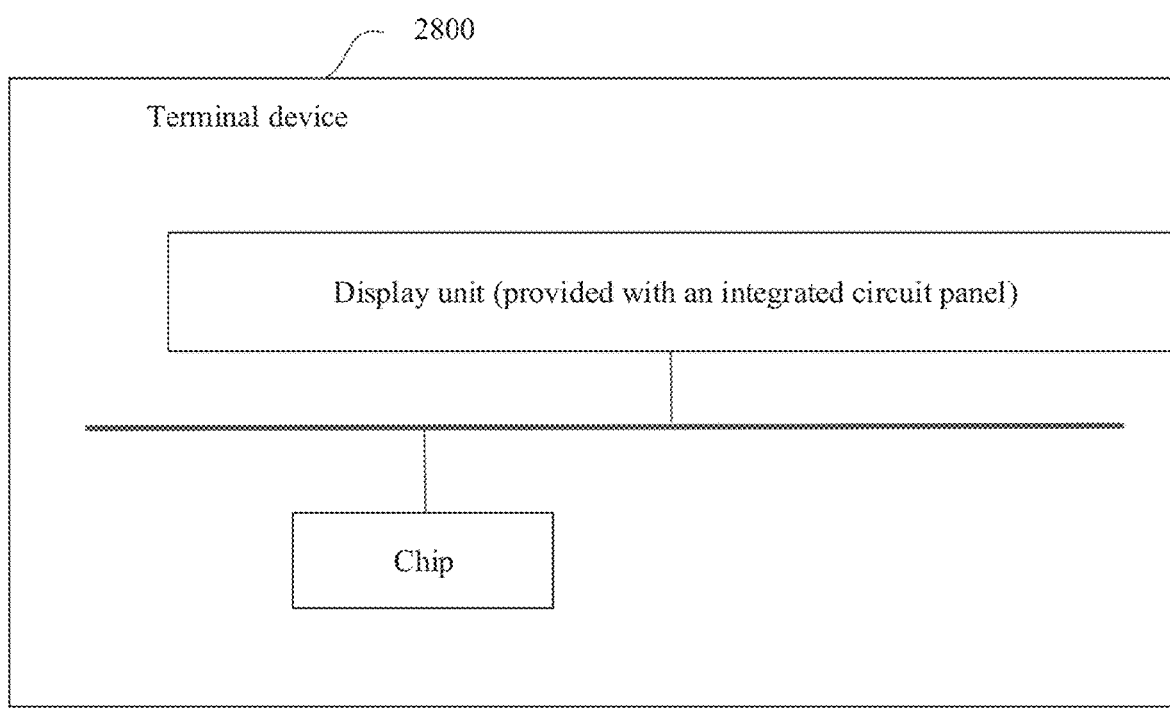
FIG. 28 is a schematic diagram of a structure of an electronic device according to an embodiment of this application.

FIG. 28 is a schematic diagram of a structure of an electronic device according to an embodiment of this application. As shown in FIG. 28, an electronic device 2800 includes the foregoing chip and a display unit. The display unit is configured to perform a display step in the method provided in the foregoing embodiment.

In the foregoing embodiments, the instructions stored in the memory for execution by the processor may be implemented in a form of a computer program product. The computer program product may be written in the memory in advance, or may be downloaded and installed in the memory in a form of software.

An embodiment of this application further provides a computer program product, including one or more computer instructions. When the computer program instructions are loaded and executed on a computer, all or some of the procedures or functions according to embodiments of this application are generated. The computer may be a general-purpose computer, a dedicated computer, a computer network, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired manner (for example, by using a coaxial cable, an optical fiber, or a digital subscriber line (DSL)) or in a wireless (for example, infrared, radio, or microwave) manner. The computer-readable storage medium may be any usable medium accessible by a computer, or a data storage device, for example, a server or a data center, integrating one or more usable media. For example, the usable medium may include a magnetic medium (for example, a floppy disk, a hard disk, or a magnetic tape), an optical medium (for example, a digital versatile disc (DVD)), or a semiconductor medium (for example, a solid state disk (SSD)).

An embodiment of this application further provides a computer-readable storage medium. The method described in the foregoing embodiments may be fully or partially implemented by software, hardware, firmware, or any combination thereof. The computer-readable medium may include a computer storage medium and a communication medium, and may further include any medium that can transmit a computer program from one place to another. The storage medium may be any target medium accessible by a computer.

In a possible design, the computer-readable medium may include a compact disc read-only memory (CD-ROM), a RAM, a ROM, an EEPROM, or another optical disc memory. The computer-readable medium may include a magnetic disc memory or another disk storage device. In addition, any connection line may also be appropriately referred to as a computer-readable medium. For example, if software is transmitted from a website, a server, or another remote source by using a coaxial cable, an optical fiber/cable, a twisted pair, a DSL, or wireless technologies (for example, infrared ray, radio, and microwave), the coaxial cable, the optical fiber/cable, the twisted pair, the DSL, or the wireless technologies such as infrared ray, radio, and microwave are included in a definition of the medium. For example, a disk and an optical disc used in this specification include a compact disc (CD), a laser disc, an optical disc, a digital versatile disc (DVD), a floppy disk, and a Blu-ray disc. The disk usually magnetically reproduces data, and the optical disc optically reproduces data by using a laser.

The foregoing combination should also be included in the scope of the computer-readable medium. The foregoing descriptions are merely specific implementations of this application, but are not intended to limit the protection scope of this application. Any change or replacement readily figured out by a person skilled in the art within the technical scope disclosed in this application shall fall within the protection scope of this application. Therefore, the protection scope of this application shall be subject to the protection scope of the claims.

What is claimed is:

1. A two-dimensional code recognition method, the method comprising:
   determining a screen status of a terminal device;
   determining proximity light information of the terminal device;

based on the screen status representing that the terminal device is in a screen-on unlocked state, determining posture change information and a screen orientation of the terminal device; and based on a value represented by the posture change information being greater than or equal to a first preset threshold and the screen orientation being a direction other than a first direction, calling a front-facing camera of the terminal device to obtain an image, recognizing two-dimensional code information in the image, and displaying an application interface corresponding to the two-dimensional code information;

wherein, before the determining the posture change information and the screen orientation of the terminal device, based on a value represented by the proximity light information being greater than or equal to a second preset threshold, determining that the terminal device is in a proximity light unshielded state; and wherein the first direction is a positive direction of a z-axis of a world coordinate system.

2. The method according to claim 1, wherein the determining the posture change information of the terminal device comprises:

obtaining acceleration change data collected by an acceleration sensor in the terminal device within a preset time period and/or obtaining angle change data collected by a gyroscope sensor in the terminal device within the preset time period; and determining the posture change information based on the acceleration change data and/or the angle change data.

3. The method according to claim 1, wherein the determining the screen orientation of the terminal device comprises:

obtaining angle data collected by a gyroscope sensor in the terminal device at a current moment; and determining the screen orientation of the terminal device based on the angle data.

4. The method according to claim 1, wherein before the calling the front-facing camera of the terminal device to obtain the image, the method further comprising:

determining ambient light information of the terminal device; and based on a value represented by the ambient light information being greater than or equal to a third preset threshold, performing the calling the front-facing camera of the terminal device to obtain the image.

5. The method according to claim 1, wherein before the determining the posture change information and the screen orientation of the terminal device, the method further comprising:

determining a running status of the terminal device; and based on the running status representing that the terminal device is in a desktop state, performing the determining the posture change information and the screen orientation of the terminal device.

6. The method according to claim 1, wherein before the calling the front-facing camera of the terminal device to obtain the image, the method further comprising:

determining current location information of the terminal device; and based on the current location information representing that the terminal device falls within a preset geofencing range, determining that the terminal device enters a preset location.

7. The method according to claim 1, wherein the calling the front-facing camera of the terminal device to obtain the image comprises:

calling the front-facing camera of the terminal device to capture a first image at a first frame rate; and based on a suspected two-dimensional code image existing in the first image, calling the front-facing camera of the terminal device to capture a second image at a second frame rate, wherein the first frame rate is less than the second frame rate.

8. The method according to claim 7, wherein before the calling the front-facing camera of the terminal device to capture the second image at the second frame rate, the method further comprising:

determining distance information between the terminal device and the suspected two-dimensional code image; and based on a value represented by the distance information being less than or equal to a preset distance, performing the calling the front-facing camera of the terminal device to capture the second image at the second frame rate.

9. The method according to claim 8, further comprising:

based on the value represented by the distance information being greater than the preset distance, generating and sending first prompt information, wherein the first prompt information is used to prompt that the front-facing camera of the terminal device needs to approach the suspected two-dimensional code image.

10. The method according to claim 1, wherein the recognizing the two-dimensional code information in the image comprises:

recognizing the two-dimensional code information to obtain and display a plurality of two-dimensional code images; and in response to a confirmation instruction, calling an application interface corresponding to a two-dimensional code image indicated by the confirmation instruction, wherein the confirmation instruction is used to indicate a two-dimensional code image selected by a user.

11. The method according to claim 1, further comprising:

determining a running status of a terminal device; and based on the screen status representing that the terminal device is in a screen-on unlocked state and the running status representing that the terminal device is in a desktop state, calling a rear-facing camera of the terminal device to obtain a second image, recognizing two-dimensional code information in the second image, and displaying an application interface corresponding to the two-dimensional code information.

12. The two-dimensional code recognition method according to claim 1, wherein the value represented by the proximity light information being greater than or equal to the second preset threshold corresponds to a distance between the terminal device and the two-dimensional code being greater than or equal to a distance threshold such that a code scanning success rate is increased.

13. The two-dimensional code recognition method according to claim 4, wherein, before the calling the front-facing camera of the terminal device to obtain the image, based on the valve represented by the ambient light information being less than the third preset threshold, adjusting screen brightness of the terminal device.

14. An electronic device, comprising:

a processor; and an interface circuit, wherein the interface circuit is configured to communicate with another apparatus;

wherein the processor is configured to perform:
  determining a screen status of a terminal device;
  determining proximity light information of the terminal device;
  based on the screen status representing that the terminal device is in a screen-on unlocked state, determining posture change information and a screen orientation of the terminal device; and
  based on a value represented by the posture change information being greater than or equal to a first preset threshold and the screen orientation being a direction other than a first direction, calling a front-facing camera of the terminal device to obtain an image, recognizing two-dimensional code information in the image, and displaying an application interface corresponding to the two-dimensional code information;
  wherein, before the determining the posture change information and the screen orientation of the terminal device, based on a value represented by the proximity light information being greater than or equal to a second preset threshold, determining that the terminal device is in a proximity light unshielded state; and
  wherein the first direction is a positive direction of a z-axis of a world coordinate system.

15. The electronic device according to claim 14, wherein the determining the posture change information of the terminal device comprises:
  obtaining acceleration change data collected by an acceleration sensor in the terminal device within a preset time period and/or obtaining angle change data collected by a gyroscope sensor in the terminal device within the preset time period; and
  determining the posture change information based on the acceleration change data and/or the angle change data.

16. The electronic device according to claim 14, wherein the determining the screen orientation of the terminal device comprises:
  obtaining angle data collected by a gyroscope sensor in the terminal device at a current moment; and
  determining the screen orientation of the terminal device based on the angle data.

17. The electronic device according to claim 14, wherein before the calling the front-facing camera of the terminal device to obtain the image, the processor is further configured to perform:
  determining ambient light information of the terminal device; and
  based on a value represented by the ambient light information being greater than or equal to a third preset threshold, performing the calling the front-facing camera of the terminal device to obtain the image.

18. The electronic device according to claim 14, wherein before the determining the posture change information and the screen orientation of the terminal device, the processor is further configured to perform:
  determining a running status of the terminal device; and
  based on the running status representing that the terminal device is in a desktop state, performing the determining the posture change information and the screen orientation of the terminal device.

19. The electronic device according to claim 14, wherein before the calling the front-facing camera of the terminal device to obtain the image, the processor is further configured to perform:
  determining current location information of the terminal device; and
  based on the current location information representing that the terminal device falls within a preset geofencing range, determining that the terminal device enters a preset location.

20. A non-transitory computer-readable storage medium, wherein the computer-readable storage medium stores instructions, and when the instructions are executed, a computer is enabled to perform operations comprising:
  determining a screen status of a terminal device;
  determining proximity light information of the terminal device;
  based on the screen status representing that the terminal device is in a screen-on unlocked state, determining posture change information and a screen orientation of the terminal device; and
  based on a value represented by the posture change information being greater than or equal to a first preset threshold and the screen orientation being a direction other than a first direction, calling a front-facing camera of the terminal device to obtain an image, recognizing two-dimensional code information in the image, and displaying an application interface corresponding to the two-dimensional code information;
  wherein, before the determining the posture change information and the screen orientation of the terminal device, based on a value represented by the proximity light information being greater than or equal to a second preset threshold, determining that the terminal device is in a proximity light unshielded state; and
  wherein the first direction is a positive direction of a z-axis of a world coordinate system.

* * * * *

UNITED STATES PATENT AND TRADEMARK OFFICE
CERTIFICATE OF CORRECTION

| | | |
|---|---|---|
| PATENT NO. | : 12,346,769 B2 | Page 1 of 1 |
| APPLICATION NO. | : 18/039422 | |
| DATED | : July 1, 2025 | |
| INVENTOR(S) | : Li et al. | |

It is certified that error appears in the above-identified patent and that said Letters Patent is hereby corrected as shown below:

On the Title Page

Item (30), Foreign Application Priority Data: "Jul. 21, 2022 (CN) ........................... 202210855909" should read -- Jul. 21, 2022 (CN) ........................... 202210855909.X --.

Signed and Sealed this
Fifth Day of August, 2025

Coke Morgan Stewart
*Acting Director of the United States Patent and Trademark Office*